(12) United States Patent
Ishibashi et al.

(10) Patent No.: US 7,353,541 B1
(45) Date of Patent: Apr. 1, 2008

(54) SYSTEMS AND METHODS FOR CONTENT DISTRIBUTION USING ONE OR MORE DISTRIBUTION KEYS

(75) Inventors: Yoshihito Ishibashi, Tokyo (JP); Tateo Oishi, Saitama (JP); Akihiro Muto, Tokyo (JP); Jun Kitahara, Chiba (JP); Taizou Shirai, Tokyo (JP)

(73) Assignee: Sony Corporation, Tokyo (JP)

( * ) Notice: Subject to any disclaimer, the term of this patent is extended or adjusted under 35 U.S.C. 154(b) by 1652 days.

(21) Appl. No.: 09/831,071

(22) PCT Filed: Sep. 7, 2000

(86) PCT No.: PCT/JP00/06089

§ 371 (c)(1),
(2), (4) Date: Jun. 21, 2001

(87) PCT Pub. No.: WO01/19017

PCT Pub. Date: Mar. 15, 2001

(30) Foreign Application Priority Data

| Sep. 7, 1999 | (JP) | 11/253660 |
| Sep. 7, 1999 | (JP) | 11/253661 |
| Sep. 7, 1999 | (JP) | 11/253662 |
| Sep. 7, 1999 | (JP) | 11/253663 |
| Sep. 14, 1999 | (JP) | 11/260638 |
| Sep. 17, 1999 | (JP) | 11/264082 |
| Sep. 20, 1999 | (JP) | 11/265866 |

(51) Int. Cl.
*G06F 7/04* (2006.01)
*G06F 17/30* (2006.01)
*G06K 9/00* (2006.01)
*H03M 1/68* (2006.01)
*H04K 1/00* (2006.01)
*H04L 9/00* (2006.01)
*H04L 9/32* (2006.01)

(52) U.S. Cl. .......................... 726/26; 713/176; 726/27; 726/28; 726/29; 726/30; 705/51; 705/54; 705/57

(58) Field of Classification Search .................. None
See application file for complete search history.

(56) References Cited

U.S. PATENT DOCUMENTS 5,784,464 A  7/1998  Akiyama et al.
(Continued)

FOREIGN PATENT DOCUMENTS

EP  0 933 901 A1  8/1999
(Continued)

OTHER PUBLICATIONS

Digital Transmission Content Protection Specification Revision 1.0, (Apr. 12, 1999), Informational Version.
(Continued)

*Primary Examiner*—Benjamin E. Lanier
(74) *Attorney, Agent, or Firm*—Finnegan, Henderson, Farabow, Garrett & Dunner, L.L.P.

(57) ABSTRACT

An information receiving apparatus receives identification information and encrypted identification information and makes a comparison between them to allow prevention of illegal utilization of contents data. Also, a data storage apparatus can record contents data encrypted by a content key and the content key so that the contents data can be reproduced on other apparatuses to improve versatility. Moreover, a management apparatus can manage the contents data in the data storage apparatus to allow other apparatuses to utilize it. And also, an information regulating apparatus can verify a signature on available data to prevent illegal utilization of the contents data. Furthermore, the data storage apparatus can store the content key, its handling policies, the contents data encrypted by the content key and its license conditions information so as to safely provide the contents data. In addition, an information recording apparatus can select favorite contents data and store it on the data storage apparatus. Furthermore, the information receiving apparatus can prevent utilization of provision-prohibited contents data by a provision prohibition list.

36 Claims, 117 Drawing Sheets

U.S. PATENT DOCUMENTS

| | | | |
|---|---|---|---|
| 5,900,608 A | 5/1999 | Iida | |
| 5,910,987 A | 6/1999 | Ginter et al. | |
| 5,915,019 A | 6/1999 | Ginter et al. | |
| 5,917,912 A | 6/1999 | Ginter et al. | |
| 5,949,876 A | 9/1999 | Ginter et al. | |
| 5,982,891 A | 11/1999 | Ginter et al. | |
| 6,226,618 B1 * | 5/2001 | Downs et al. | 705/1 |
| 6,801,999 B1 * | 10/2004 | Venkatesan et al. | 713/167 |

FOREIGN PATENT DOCUMENTS

| | | |
|---|---|---|
| JP | 2-41051 | 2/1990 |
| JP | 7-182837 | 7/1995 |
| JP | 8-185444 | 7/1996 |
| JP | 8-305662 | 11/1996 |
| JP | 09-091344 | 4/1997 |
| JP | 09-326166 | 12/1997 |
| JP | 10-283268 | 10/1998 |
| JP | 10-512074 | 11/1998 |
| JP | 11-185381 | 7/1999 |
| JP | 11-195269 | 7/1999 |
| WO | WO 96 27155 | 9/1996 |
| WO | WO 97/14144 | 10/1996 |
| WO | WO 99/09718 | 2/1999 |
| WO | WO 99/21186 | 4/1999 |

OTHER PUBLICATIONS

Fumitada Takahashi, "Digital Shingou Shori: "Denshi Sukashi" ga Multimedia Jidai wo mamoru; Chosakuken Hogo Gijutsu no Yuuryoku Kouho; Chosakubutsu no Fusei Riyou Boushi ni Myoushu ari: Denshi Sukashi de Copy wo Yokusei" Nikkei Electronics, No. 683, (1997), pp. 99-107.

Asano, "Technology ga Ippai; Digital Contents wo mamoru Digital Sukashi", ASCU, vol. 21, No. 9, (1997), pp. 21-215.

Taro Yoshio, "Kogata Memory Card de Ongaku Chosakuken wo mamoru", Nikkei Electronics, No. 739, (Mar. 22, 1999), pp. 49-53.

Fumitada Takahashi, Taro Yoshio, "Ongaku Haishin mattanashi; Seibi Isogu Chosakuken Hogo Gijutsu sasaeru Gijutsu Jitsuyouki no Haishin System; Chosakuken Kanri nigiru", Nikkei Electronics, No. 738, (Mar. 8, 1999), pp. 94-98.

Tetsuo Nakagawa, et al., "Digital Contents Ryuutsu Gijutsu", Mitsubishi Denki Gihou, vol. 72, No. 5 (1998), pp. 36-39.

Shoko Motoike, Masaki Kiyono, "DVD wo mochiita Contents Ryuutsu Service", Matsushita Technical Journal, vol. 44, No. 5 (1998), pp. 25-33.

Naoji Usuki, et al., "5C Digital transmission Content Protection; IEEE1394 Bus no Chosakuken Hogo Houshiki", Eizou Media Gakkai Gijutsu Houkoku, vol. 22, No. 65 (1998), pp. 37-42.

Daisuke Imaizumi, "Ongaku Haishin Souchi to shiteno Internet", Computopia, vol. 34, No. 393 (Jun. 1, 1999), pp. 96-97.

Hironobu Yamamoto, et al., "Chosakuken wo Hogo shita Ongaku Haishin Platform", NTT R&D, vol. 48, No. 10 (Oct. 10, 1999), pp. 762-769.

* cited by examiner

FIG. 5

DELIVERY/INDIVIDUAL KEY HELD BY AN ELECTRONIC DISTRIBUTION SERVICE CENTER

| DELIVERY KEY | INDIVIDUAL KEY | VERSION | USAGE POSSIBLE PERIOD START | END |
|---|---|---|---|---|
| aaaaaaaa | zzzzzzzz | 1 | 2000/1/1 | 2000/1/31 |
| bbbbbbbb | yyyyyyyy | 2 | 2000/2/1 | 2000/2/29 |
| cccccccc | xxxxxxxx | 3 | 2000/3/1 | 2000/3/31 |
| dddddddd | wwwwwwww | 4 | 2000/4/1 | 2000/4/30 |
| eeeeeeee | vvvvvvvv | 5 | 2000/5/1 | 2000/5/31 |
| ffffffff | uuuuuuuu | 6 | 2000/6/1 | 2000/6/30 |
| gggggggg | tttttttt | 7 | 2000/7/1 | 2000/7/31 |
| hhhhhhhh | ssssssss | 8 | 2000/8/1 | 2000/8/31 |

⇨ TRANSMIT DELIVERY KEY

DELIVERY KEY HELD BY A HOME SERVER

| DELIVERY KEY | VERSION | USAGE POSSIBLE PERIOD START | END |
|---|---|---|---|
| cccccccc | 3 | 2000/3/1 | 2000/3/31 |
| dddddddd | 4 | 2000/4/1 | 2000/4/30 |
| eeeeeeee | 5 | 2000/5/1 | 2000/5/31 |

← DELIVERY KEY TO BE USED

⇩ TRANSMIT INDIVIDUAL KEY

KEY TO BE USED →

INDIVIDUAL KEY HELD BY A CONTENT PROVIDER

| INDIVIDUAL KEY | VERSION | USAGE POSSIBLE PERIOD START | END |
|---|---|---|---|
| xxxxxxxx | 3 | 2000/3/1 | 2000/3/31 |
| wwwwwwww | 4 | 2000/4/1 | 2000/4/30 |
| vvvvvvvv | 5 | 2000/5/1 | 2000/5/31 |
| uuuuuuuu | 6 | 2000/6/1 | 2000/6/30 |
| tttttttt | 7 | 2000/7/1 | 2000/7/31 |
| ssssssss | 8 | 2000/8/1 | 2000/8/31 |

← INDIVIDUAL KEY TO BE USED

| GROUP ID | ID | CONNECTION WITH A SERVICE CENTER | SETTLEMENT PROCESSING | PURCHASE PROCESSING | PROXY SETTLER | PROXY PURCHASER | REGISTRATION |
|---|---|---|---|---|---|---|---|
| GpID1 | ID1 | POSSIBLE | POSSIBLE | POSSIBLE | — | — | POSSIBLE |
| | ID2 | POSSIBLE | IMPOSSIBLE | POSSIBLE | ID1 | — | POSSIBLE |
| | ID3 | POSSIBLE | IMPOSSIBLE | POSSIBLE | ID1 | ID1 | IMPOSSIBLE |
| | ID4 | IMPOSSIBLE | IMPOSSIBLE | IMPOSSIBLE | — | ID2 | IMPOSSIBLE |
| | ID5 | IMPOSSIBLE | POSSIBLE | POSSIBLE | — | — | IMPOSSIBLE |
| GpID2 | ID6 | POSSIBLE | IMPOSSIBLE | POSSIBLE | ID6 | — | IMPOSSIBLE |
| | ID7 | POSSIBLE | IMPOSSIBLE | POSSIBLE | ID6 | — | IMPOSSIBLE |
| | ID8 | POSSIBLE | IMPOSSIBLE | IMPOSSIBLE | — | — | POSSIBLE |
| | ID9 | IMPOSSIBLE | IMPOSSIBLE | POSSIBLE | — | ID6,7,8 | IMPOSSIBLE |
| | ID10 | IMPOSSIBLE | POSSIBLE | POSSIBLE | — | ID6,7,8 | POSSIBLE |
| GpID3 | ID11 | POSSIBLE | IMPOSSIBLE | POSSIBLE | ID11 | — | IMPOSSIBLE |
| | ID12 | POSSIBLE | IMPOSSIBLE | POSSIBLE | ID11 | — | IMPOSSIBLE |
| | ID13 | POSSIBLE | IMPOSSIBLE | POSSIBLE | — | — | IMPOSSIBLE |
| | ID14 | IMPOSSIBLE | IMPOSSIBLE | IMPOSSIBLE | — | ID11,12,13 | IMPOSSIBLE |
| | ID15 | IMPOSSIBLE | IMPOSSIBLE | IMPOSSIBLE | — | ID11 | POSSIBLE |

| GROUP ID | ID | CONNECTION WITH A SERVICE CENTER | SETTLEMENT PROCESSING | SETTLEMENT ID | PURCHASE PROCESSING | PROXY SETTLER | PROXY PURCHASER | REGIS-TRATION | SIG-NATURE |
|---|---|---|---|---|---|---|---|---|---|
| GpID1 | ID1 | POSSIBLE | POSSIBLE | SETTLEMENT ID 1 | POSSIBLE | — | — | POSSIBLE | SIG-NATURE |
| | ID2 | POSSIBLE | IMPOSSIBLE | — | POSSIBLE | ID1 | — | POSSIBLE | |
| | ID3 | POSSIBLE | IMPOSSIBLE | — | POSSIBLE | ID1 | — | IMPOSSIBLE | |
| | ID4 | IMPOSSIBLE | IMPOSSIBLE | — | IMPOSSIBLE | — | ID1 | POSSIBLE | |
| | ID5 | IMPOSSIBLE | IMPOSSIBLE | — | IMPOSSIBLE | — | ID2 | IMPOSSIBLE | |

(B)

| GROUP ID | ID | CONNECTION WITH A SERVICE CENTER | SETTLEMENT PROCESSING | SETTLEMENT ID | PURCHASE PROCESSING | PROXY SETTLER | PROXY PURCHASER | REGIS-TRATION | SIG-NATURE |
|---|---|---|---|---|---|---|---|---|---|
| GpID2 | ID6 | POSSIBLE | POSSIBLE | SETTLEMENT ID 2 | POSSIBLE | — | — | POSSIBLE | SIG-NATURE |
| | ID7 | POSSIBLE | IMPOSSIBLE | — | POSSIBLE | ID6 | — | POSSIBLE | |
| | ID8 | POSSIBLE | IMPOSSIBLE | — | POSSIBLE | ID6 | — | IMPOSSIBLE | |
| | ID9 | IMPOSSIBLE | IMPOSSIBLE | — | IMPOSSIBLE | — | ID6,7,8 | POSSIBLE | |
| | ID10 | IMPOSSIBLE | IMPOSSIBLE | — | IMPOSSIBLE | — | ID6,7,8 | IMPOSSIBLE | |

FIG. 8

(DECRYPTION)

p IS CHARACTERISTIC, a, b ARE COEFFICIENTS OF ELLIPSE CURVE, ELLIPSE CURVE IS $y^2=x^3+ax+b$, G IS A BASE POINT ON A CURVE, r IS DIGIT OF G, UG, $(X_0, Y_0)$ ARE CRYPTOGRAM, $K_sG$ ARE PUBLIC KEYS — S30

↓

CALCULATE $K_suG=(X_v, Y_v)$ — S31

↓

CALCULATE $X_1=X_0/X_v \bmod p$ — S32

↓

CALCULATE $Y_1=Y_0/Y_v \bmod p$ — S33

↓

OBTAIN CRYPTOGRAM $(X_1, Y_1)=(M_X, M_Y)$ — S34

FIG. 13

| | |
|---|---|
| | TYPE OF DATA |
| | TYPE OF A HANDLING POLICY (SINGLE) |
| | EFFECTIVE PERIOD OF A HANDLING POLICY |
| | ID OF CONTENTS |
| | ID OF A CONTENT PROVIDER |
| | ID OF A HANDLING POLICY |
| | VERSION OF A HANDLING POLICY |
| | AREA CODE |
| | USABLE APPARATUS CONDITIONS |
| | USABLE USER CONDITIONS |
| | ID OF A SERVICE PROVIDER |
| | GENERATION MANAGEMENT INFORMATION |
| | NUMBER OF RULES |
| | ADDRESS INFORMATION OF RULES |
| RULE 1 | RULE NUMBER (RULE #) |
| | UTILIZATION RIGHT CONTENT NUMBER (TYPE) |
| | PARAMETER |
| | MINIMUM SALES PRICE |
| | PROFIT AMOUNT OF A CONTENT PROVIDER |
| | PROFIT RATIO OF A CONTENT PROVIDER |
| | DATA SIZE |
| | TRANSMISSION INFORMATION |
| ⋮ | ⋮ |
| RULE N | RULE NUMBER (RULE #) |
| | UTILIZATION RIGHT CONTENT NUMBER (TYPE) |
| | PARAMETER |
| | MINIMUM SALES PRICE |
| | PROFIT AMOUNT OF A CONTENT PROVIDER |
| | PROFIT RATIO OF A CONTENT PROVIDER |
| | DATA SIZE |
| | TRANSMISSION INFORMATION |
| | (EXISTENCE OR ABSENCE OF VERIFICATION OF A SIGNATURE) |
| | PUBLIC KEY CERTIFICATE |
| | SIGNATURE |

FIG. 33

| |
|---|
| TYPE OF DATA |
| TYPE OF A HANDLING POLICY (ALBUM) |
| EFFECTIVE PERIOD OF A HANDLING POLICY |
| ID OF AN ALBUM |
| ID OF A CONTENT PROVIDER |
| ID OF A HANDLING POLICY |
| VERSION OF A HANDLING POLICY |
| AREA CODE |
| USABLE APPARATUS CONDITIONS |
| USABLE USER CONDITIONS |
| ID OF A SERVICE PROVIDER |
| NUMBER OF HANDLING POLICIES OF SINGLE CONTENTS |
| ADDRESS INFORMATION OF A HANDLING POLICY OF SINGLE CONTENTS |

| | |
|---|---|
| SINGLE | HANDLING POLICY 1 |
| | ⋮ |
| | HANDLING POLICY N |

| |
|---|
| GENERATION MANAGEMENT INFORMATION |
| NUMBER OF RULES |
| ADDRESS INFORMATION OF RULES |

| | |
|---|---|
| RULE 1 | RULE NUMBER (RULE #) |
| | UTILIZATION RIGHT CONTENT NUMBER (TYPE) |
| | PARAMETER |
| | MINIMUM SALES PRICE |
| | PROFIT AMOUNT OF A CONTENT PROVIDER |
| | PROFIT RATIO OF A CONTENT PROVIDER |
| | DATA SIZE |
| | TRANSMISSION INFORMATION |
| ⋮ | ⋮ |
| RULE N | RULE NUMBER (RULE #) |
| | UTILIZATION RIGHT CONTENT NUMBER (TYPE) |
| | PARAMETER |
| | MINIMUM SALES PRICE |
| | PROFIT AMOUNT OF A CONTENT PROVIDER |
| | PROFIT RATIO OF A CONTENT PROVIDER |
| | DATA SIZE |
| | TRANSMISSION INFORMATION |

| |
|---|
| (EXISTENCE OR ABSENCE OF VERIFICATION OF A SIGNATURE) |
| PUBLIC KEY CERTIFICATE |
| SIGNATURE |

FIG. 34

| |
|---|
| TYPE OF DATA |
| TYPE OF A HANDLING POLICY (SINGLE) |
| EFFECTIVE PERIOD OF A HANDLING POLICY |
| ID OF CONTENTS |
| ID OF A CONTENT PROVIDER |
| ID OF A HANDLING POLICY |
| VERSION OF A HANDLING POLICY |
| AREA CODE |
| USABLE APPARATUS CONDITIONS |
| USABLE USER CONDITIONS |
| ID OF A SERVICE PROVIDER |
| GENERATION MANAGEMENT INFORMATION |
| NUMBER OF RULES |
| ADDRESS INFORMATION OF RULES |

| | |
|---|---|
| RULE 1 | RULE NUMBER (RULE #) |
| | UTILIZATION RIGHT CONTENT NUMBER (TYPE) |
| | PARAMETER |
| | MINIMUM SALES PRICE |
| | DATA SIZE |
| | TRANSMISSION INFORMATION |
| ⋮ | ⋮ |
| RULE N | RULE NUMBER (RULE #) |
| | UTILIZATION RIGHT CONTENT NUMBER (TYPE) |
| | PARAMETER |
| | MINIMUM SALES PRICE |
| | DATA SIZE |
| | TRANSMISSION INFORMATION |

| |
|---|
| (EXISTENCE OR ABSENCE OF VERIFICATION OF A SIGNATURE) |
| PUBLIC KEY CERTIFICATE |
| SIGNATURE |

FIG. 35

| |
|---|
| TYPE OF DATA |
| TYPE OF A HANDLING POLICY (ALBUM) |
| EFFECTIVE PERIOD OF A HANDLING POLICY |
| ID OF AN ALBUM |
| ID OF A CONTENT PROVIDER |
| ID OF A HANDLING POLICY |
| VERSION OF A HANDLING POLICY |
| AREA CODE |
| USABLE APPARATUS CONDITIONS |
| USABLE USER CONDITIONS |
| ID OF A SERVICE PROVIDER |
| NUMBER OF HANDLING POLICIES OF SINGLE CONTENTS |
| ADDRESS INFORMATION OF A HANDLING POLICY OF SINGLE CONTENTS |
| SINGLE: HANDLING POLICY 1 ⋮ HANDLING POLICY N |
| GENERATION MANAGEMENT INFORMATION |
| NUMBER OF RULES |
| ADDRESS INFORMATION OF RULES |
| RULE 1: RULE NUMBER (RULE #) / UTILIZATION RIGHT CONTENT NUMBER (TYPE) / PARAMETER / MINIMUM SALES PRICE / DATA SIZE / TRANSMISSION INFORMATION |
| ⋮ |
| RULE N: RULE NUMBER (RULE #) / UTILIZATION RIGHT CONTENT NUMBER (TYPE) / PARAMETER / MINIMUM SALES PRICE / DATA SIZE / RANSMISSION INFORMATION |
| (EXISTENCE OR ABSENCE OF VERIFICATION OF A SIGNATURE) |
| PUBLIC KEY CERTIFICATE |
| SIGNATURE |

FIG. 36

| |
|---|
| TYPE OF DATA |
| TYPE OF PRICE INFORMATION (SINGLE) |
| EFFECTIVE PERIOD OF PRICE INFORMATION |
| ID OF CONTENTS |
| ID OF A SERVICE PROVIDER |
| ID OF PRICE INFORMATION |
| VERSION OF PRICE INFORMATION |
| AREA CODE |
| USABLE APPARATUS CONDITIONS |
| USABLE USER CONDITIONS |
| ID OF A CONTENT PROVIDER |
| ID OF A HANDLING POLICY |
| NUMBER OF RULES |
| ADDRESS INFORMATION OF RULES |
| RULE 1: RULE NUMBER (RULE #) / PROFIT AMOUNT OF A SERVICE PROVIDER / PROFIT RATIO OF A SERVICE PROVIDER / PRICE / DATA SIZE / TRANSMISSION INFORMATION |
| ⋮ |
| RULE N: RULE NUMBER (RULE #) / PROFIT AMOUNT OF A SERVICE PROVIDER / PROFIT RATIO OF A SERVICE PROVIDER / PRICE / DATA SIZE / TRANSMISSION INFORMATION |
| (EXISTENCE OR ABSENCE OF VERIFICATION OF A SIGNATURE) |
| PUBLIC KEY CERTIFICATE |
| SIGNATURE |

FIG. 37

| |
|---|
| TYPE OF DATA |
| TYPE OF PRICE INFORMATION (ALBUM) |
| EFFECTIVE PERIOD OF PRICE INFORMATION |
| ID OF AN ALBUM |
| ID OF A SERVICE PROVIDER |
| ID OF PRICE INFORMATION |
| VERSION OF PRICE INFORMATION |
| AREA CODE |
| USABLE APPARATUS CONDITIONS |
| USABLE USER CONDITIONS |
| ID OF A CONTENT PROVIDER |
| ID OF A HANDLING POLICY |
| NUMBER OF PRICE INFORMATION OF SINGLE CONTENTS |
| ADDRESS INFORMATION OF PRICE INFORMATION OF SINGLE CONTENTS |
| SINGLE: PRICE INFORMATION 1 ⋯ PRICE INFORMATION N |
| NUMBER OF RULES |
| ADDRESS INFORMATION OF RULES |
| RULE 1: RULE NUMBER (RULE #) / PROFIT AMOUNT OF A SERVICE PROVIDER / PROFIT RATIO OF A SERVICE PROVIDER / PRICE / DATA SIZE / TRANSMISSION INFORMATION |
| ⋯ |
| RULE N: RULE NUMBER (RULE #) / PROFIT AMOUNT OF A SERVICE PROVIDER / PROFIT RATIO OF A SERVICE PROVIDER / PRICE / DATA SIZE / TRANSMISSION INFORMATION |
| (EXISTENCE OR ABSENCE OF VERIFICATION OF A SIGNATURE) |
| PUBLIC KEY CERTIFICATE |
| SIGNATURE |

FIG. 38

| |
|---|
| TYPE OF DATA |
| TYPE OF PRICE INFORMATION (SINGLE) |
| EFFECTIVE PERIOD OF PRICE INFORMATION |
| ID OF CONTENTS |
| ID OF A SERVICE PROVIDER |
| ID OF PRICE INFORMATION |
| VERSION OF PRICE INFORMATION |
| AREA CODE |
| USABLE APPARATUS CONDITIONS |
| USABLE USER CONDITIONS |
| ID OF A CONTENT PROVIDER |
| ID OF A HANDLING POLICY |
| NUMBER OF RULES |
| ADDRESS INFORMATION OF RULES |
| RULE 1: RULE NUMBER (RULE #) / PRICE / DATA SIZE / TRANSMISSION INFORMATION |
| ⋮ |
| RULE N: RULE NUMBER (RULE #) / PRICE / DATA SIZE / TRANSMISSION INFORMATION |
| (EXISTENCE OR ABSENCE OF VERIFICATION OF A SIGNATURE) |
| PUBLIC KEY CERTIFICATE |
| SIGNATURE |

FIG. 39

| |
|---|
| TYPE OF DATA |
| TYPE OF PRICE INFORMATION (ALBUM) |
| EFFECTIVE PERIOD OF PRICE INFORMATION |
| ID OF AN ALBUM |
| ID OF A SERVICE PROVIDER |
| ID OF PRICE INFORMATION |
| VERSION OF PRICE INFORMATION |
| AREA CODE |
| USABLE APPARATUS CONDITIONS |
| USABLE USER CONDITIONS |
| ID OF A CONTENT PROVIDER |
| ID OF A HANDLING POLICY |
| NUMBER OF PRICE INFORMATION OF SINGLE CONTENTS |
| ADDRESS INFORMATION OF PRICE INFORMATION OF SINGLE CONTENTS |
| SINGLE: PRICE INFORMATION 1 ⋯ PRICE INFORMATION N |
| NUMBER OF RULES |
| ADDRESS INFORMATION OF RULES |
| RULE 1: RULE NUMBER (RULE #) / PRICE / DATA SIZE / TRANSMISSION INFORMATION |
| ⋯ |
| RULE N: RULE NUMBER (RULE #) / PRICE / DATA SIZE / TRANSMISSION INFORMATION |
| (EXISTENCE OR ABSENCE OF VERIFICATION OF A SIGNATURE) |
| PUBLIC KEY CERTIFICATE |
| SIGNATURE |

FIG. 40

| |
|---|
| TYPE OF DATA |
| TYPE OF LICENSE CONDITIONS INFORMATION |
| EFFECTIVE PERIOD OF LICENSE CONDITIONS INFORMATION |
| ID OF CONTENTS |
| ID OF AN ALBUM |
| ID OF AN ENCRYPTION PROCESSING SECTION |
| ID OF AN USER |
| ID OF A CONTENT PROVIDER |
| ID OF A HANDLING POLICY |
| VERSION OF A HANDLING POLICY |
| ID OF A SERVICE PROVIDER |
| ID OF PRICE INFORMATION |
| VERSION OF PRICE INFORMATION |
| ID OF LICENSE CONDITIONS INFORMATION |
| RULE NUMBER OF A REPRODUCTION RIGHT (UTILIZATION RIGHT) |
| UTILIZATION RIGHT CONTENT NUMBER |
| REPRODUCTION REMAINING NUMBER |
| EFFECTIVE PERIOD OF A REPRODUCTION RIGHT |
| RULE NUMBER OF A COPYING RIGHT (UTILIZATION RIGHT) |
| UTILIZATION RIGHT CONTENT NUMBER |
| COPYING REMAINING NUMBER |
| GENERATION MANAGEMENT INFORMATION |
| ID OF AN ENCRYPTION SECTION HOLDING A REPRODUCTION RIGHT |

FIG. 41

| TYPE OF DATA |
|---|
| ID OF AN ENCRYPTION PROCESSING SECTION |
| ID OF A USER |
| ID OF CONTENTS |
| ID OF A CONTENT PROVIDER |
| ID OF A HANDLING POLICY |
| VERSION OF A HANDLING POLICY |
| ID OF A SERVICE PROVIDER |
| ID OF PRICE INFORMATION |
| VERSION OF PRICE INFORMATION |
| ID OF LICENSE CONDITIONS INFORMATION |
| RULE NUMBER (RULE #) |
| PROFIT AMOUNT/PROFIT RATIO OF A CONTENT PROVIDER |
| PROFIT AMOUNT/PROFIT RATIO OF A SERVICE PROVIDER |
| GENERATION MANAGEMENT INFORMATION |
| DATA SIZE OF TRANSMISSION INFORMATION SET BY A CONTENT PROVIDER |
| TRANSMISSION INFORMATION SET BY A CONTENT PROVIDER |
| DATA SIZE OF TRANSMISSION INFORMATION SET BY A SERVICE PROVIDER |
| TRANSMISSION INFORMATION SET BY A SERVICE PROVIDER |
| ID OF A SUPPLIER |

FIG. 42

| |
|---|
| TYPE OF DATA |
| ID OF AN ENCRYPTION PROCESSING SECTION |
| ID OF A USER |
| ID OF CONTENTS |
| ID OF A CONTENT PROVIDER |
| ID OF A HANDLING POLICY |
| VERSION OF A HANDLING POLICY |
| ID OF A SERVICE PROVIDER |
| ID OF PRICE INFORMATION |
| VERSION OF PRICE INFORMATION |
| ID OF LICENSE CONDITIONS INFORMATION |
| RULE NUMBER (RULE #) |
| GENERATION MANAGEMENT INFORMATION |
| DATA SIZE OF TRANSMISSION INFORMATION SET BY A CONTENT PROVIDER |
| TRANSMISSION INFORMATION SET BY A CONTENT PROVIDER |
| DATA SIZE OF TRANSMISSION INFORMATION SET BY A SERVICE PROVIDER |
| TRANSMISSION INFORMATION SET BY A SERVICE PROVIDER |
| ID OF A SUPPLIER |

FIG. 43

| UTILIZATION RIGHT CONTENT NUMBER | | UTILIZATION CONTENTS | | |
|---|---|---|---|---|
| | RIGHT | PERIOD LIMITATION | NUMBER OF TIMES LIMITATION | COPYING LIMITATION |
| (1) | REPRODUCTION RIGHT | NO | NO | — |
| (2) | | YES | NO | — |
| (3) | | YES | NO | — |
| (4) | | NO | YES | — |
| (5) | COPYING RIGHT | NO | NO | NO |
| (6) | | NO | YES | NO |
| (7) | | NO | NO | SCMS |
| (8) | | NO | YES | |
| (9)~(15) | PRELIMINARY | | | |
| (16) | RIGHT CONTENT CHANGE RIGHT | — | — | — |
| (17) | REPURCHASE RIGHT | — | — | — |
| (18) | ADDITIONAL PURCHASE RIGHT | — | — | — |
| (19) | MANAGEMENT TRANSFER RIGHT | — | — | — |

FIG. 44

(A) | EFFECTIVE PERIOD OF A REPRODUCTION RIGHT |

(B) | EFFECTIVE PERIOD OF A REPRODUCTION RIGHT |

(C)
| EFFECTIVE PERIOD OF A REPRODUCTION RIGHT |
| --- |
| NUMBER OF DAYS AND TIME |

(D)
| EFFECTIVE PERIOD OF A REPRODUCTION RIGHT |
| --- |
| NUMBER OF TIMES OF REPRODUCTION |

(E) | EFFECTIVE PERIOD OF A COPYING RIGHT |

(F)
| EFFECTIVE PERIOD OF A COPYING RIGHT |
| --- |
| NUMBER OF TIMES OF COPYING |

(G) | EFFECTIVE PERIOD OF A COPYING RIGHT |

(H)
| EFFECTIVE PERIOD OF A COPYING RIGHT |
| --- |
| NUMBER OF TIMES OF COPYING |

(I)
| EFFECTIVE PERIOD OF RIGHT CONTENT CHANGE RIGHT |
| --- |
| OLD RULE NUMBER |
| NEW RULE NUMBER |

(J)
| EFFECTIVE PERIOD OF A REPURCHASE RIGHT |
| --- |
| OLD RULE NUMBER |
| NEW RULE NUMBER |
| MAXIMUM REDISTRIBUTION GENERATION INFORMATION |

(K)
| EFFECTIVE PERIOD OF AN ADDITIONAL PURCHASE RIGHT |
| --- |
| MINIMUM NUMBER OF HOLDING CONTENTS |
| MAXIMUM NUMBER OF HOLDING CONTENTS |

(L) | EFFECTIVE PERIOD OF A MANAGEMENT TRANSFER RIGHT |

(M)
| EFFECTIVE PERIOD OF A CONTENT PURCHASE RIGHT |
| --- |
| ID OF OLD CONTENTS |
| OLD RULE NUMBER |
| NEW RULE NUMBER |

FIG. 45

| |
|---|
| TYPE OF DATA |
| TYPE OF CONTENTS (SINGLE) |
| EFFECTIVE PERIOD OF CONTENTS |
| CATEGORY OF CONTENTS |
| ID OF CONTENTS |
| ID OF A CONTENT PROVIDER |
| ENCRYPTION METHOD OF CONTENTS |
| DATA LENGTH OF ENCRYPTED CONTENTS |
| ENCRYPTED CONTENTS |
| PUBLIC KEY CERTIFICATE |
| SIGNATURE |

FIG. 46

| TYPE OF DATA | |
|---|---|
| TYPE OF CONTENTS (ALBUM) | |
| EFFECTIVE PERIOD OF CONTENTS | |
| ID OF AN ALBUM | |
| ID OF A CONTENT PROVIDER | |
| NUMBER OF SINGLE CONTENTS | |
| ADDRESS INFORMATION OF SINGLE CONTENTS | |
| SINGLE | CONTENTS 1 |
| | ⋮ |
| | CONTENTS N |
| PUBLIC KEY CERTIFICATE | |
| SIGNATURE | |

FIG. 47

| |
|---|
| TYPE OF DATA |
| TYPE OF KEY DATA (SINGLE) |
| EFFECTIVE PERIOD OF A KEY |
| ID OF CONTENTS |
| ID OF A CONTENT PROVIDER |
| VERSION OF A KEY |
| ENCRYPTION METHOD OF A CONTENT KEY |
| ENCRYPTED CONTENT KEY |
| ENCRYPTION METHOD OF AN INDIVIDUAL KEY |
| ENCRYPTED INDIVIDUAL KEY |
| PUBLIC KEY CERTIFICATE |
| SIGNATURE |

FIG. 48

| |
|---|
| TYPE OF DATA |
| TYPE OF KEY DATA (ALBUM) |
| EFFECTIVE PERIOD OF A KEY |
| ID OF AN ALBUM |
| ID OF A CONTENT PROVIDER |
| VERSION OF A KEY |
| NUMBER OF KEY DATA FOR SINGLE CONTENTS |
| ADDRESS INFORMATION OF KEY DATA FOR SINGLE CONTENTS |
| SINGLE — KEY DATA 1 ⋮ KEY DATA N |
| PUBLIC KEY CERTIFICATE |
| SIGNATURE |

FIG. 50

| | |
|---|---|
| RULE n | RULE NUMBER |
| | UTILIZATION RIGHT CONTENT NUMBER |
| | PARAMETER |
| | MINIMUM PRICE |
| | SHARE (PROFIT RATIO) |
| RULE 1 | RULE NUMBER #1 |
| | UTILIZATION RIGHT CONTENT NUMBER #1 |
| | NO |
| | ¥350 |
| | 30% |
| RULE 2 | RULE NUMBER #2 |
| | UTILIZATION RIGHT CONTENT NUMBER #2 |
| | ONE HOUR |
| | ¥100 |
| | 30% |
| RULE 3 | RULE NUMBER #3 |
| | UTILIZATION RIGHT CONTENT NUMBER #6 |
| | ONCE |
| | ¥30 |
| | 30% |
| RULE 4 | RULE NUMBER #4 |
| | UTILIZATION RIGHT CONTENT NUMBER #13 |
| | #2／#1 |
| | ¥200 |
| | 20% |
| RULE 5 | RULE NUMBER #5 |
| | UTILIZATION RIGHT CONTENT NUMBER #14 |
| | #1／#1 |
| | ¥250 |
| | 20% |

FIG. 76

| | |
|---|---|
| RULE n | RULE NUMBER |
| | PARAMETER |
| | PRICE |
| RULE 1 | RULE NUMBER #1 |
| | 30% |
| | ¥500 |
| RULE 2 | RULE NUMBER #2 |
| | 40% |
| | ¥100 |
| RULE 3 | RULE NUMBER #3 |
| | 40% |
| | ¥100 |
| RULE 4 | RULE NUMBER #4 |
| | 10% |
| | ¥200 |
| RULE 5 | RULE NUMBER #5 |
| | 20% |
| | ¥350 |

FIG. 77

| RULE 1 | #1 |
|---|---|
| | #1 |
| | NO |
| | ¥350 |
| | 30% |
| RULE 2 | #2 |
| | #2 |
| | ONE HOUR |
| | ¥100 |
| | 30% |
| RULE 3 | #3 |
| | #13 |
| | #2/#1 |
| | ¥200 |
| | 20% |

A PART OF A RULE SECTION OF A HANDLING POLICY

| RULE 1 | #1 |
|---|---|
| | 30% |
| | ¥500 |
| RULE 2 | #2 |
| | 40% |
| | ¥100 |
| RULE 3 | #3 |
| | 10% |
| | ¥200 |

A PART OF A RULE PART OF PRICE INFORMATION

PRESENT

| RULE | RULE NUMBER |
|---|---|
| | UTILIZATION RIGHT CONTENT NUMBER |
| | PARAMETER |
| RULE | #2 |
| | #2 |
| | 30 MINUTES/2 HOURS |

A RULE PART OF LICENSE CONDITIONS INFORMATION

AFTER CHANGE

| RULE | RULE NUMBER |
|---|---|
| | UTILIZATION RIGHT CONTENT NUMBER |
| | PARAMETER |
| RULE | #1 |
| | #1 |
| | NO |

A RULE PART OF LICENSE CONDITION INFORMATION

FIG. 78

A PART OF A RULE SECTION OF A HANDLING POLICY

| RULE 1 | RULE NUMBER #1 |
|---|---|
| | UTILIZATION RIGHT CONTENT NUMBER #1 |
| | NO |
| | ¥350 |
| | 30% |

| RULE 2 | RULE NUMBER #2 |
|---|---|
| | UTILIZATION RIGHT CONTENT NUMBER #16 |
| | NO |
| | ¥100 |
| | 50% |

A PART OF A RULE PART OF PRICE INFORMATION

| RULE 1 | RULE NUMBER #1 |
|---|---|
| | 30% |
| | ¥500 |

| RULE 2 | RULE NUMBER #2 |
|---|---|
| | 0% |
| | ¥100 |

(a)

| RULE | RULE NUMBER #1 | RULE NUMBER #1 (RULE NUMBER) |
|---|---|---|
| | ID1 ID1 | (ID OF AN ENCRYPTION PROCESSING SECTION) |
| | NO | — (AN ID OF AN ENCRYPTION PROCESSING SECTION HAVING A REPRODUCTION RIGHT) |

INITIAL STATE:
WITHOUT REPRODUCTION RIGHT, TIME AND NUMBER OF TIMES LIMITATIONS WITHOUT A MANAGEMENT TRANSFER RIGHT (b)

| RULE | RULE NUMBER #1 |
|---|---|
| | ID1 |
| YES | ID1 |

AFTER PURCHASING A MANAGEMENT TRANSFER RIGHT:
WITHOUT REPRODUCTION RIGHT, TIME AND NUMBER OF TIMES LIMITATIONS WITH MANAGEMENT TRANSFER RIGHT (PURCHASER/HOLDER)

(c)

| RULE | RULE NUMBER #1 |
|---|---|
| | ID1 |
| YES | ID2 |

AFTER TRANSFERRING A MANAGEMENT TRANSFER RIGHT : A PART OF A LICENSE CONDITIONS INFORMATION STATE OF A TRANSMITTING SIDE (ID1)

| RULE | RULE NUMBER #1 |
|---|---|
| | ID1 |
| YES | ID2 |

AFTER TRANSFERRING A MANAGEMENT TRANSFER RIGHT : A PART OF LICENSE CONDITIONS INFORMATION STATE OF A RECEIVING SIDE (ID2)

FIG. 81

| UPDATE DATE | | |
|---|---|---|
| SERIAL NUMBER | | |
| CONTENTS BEING OBJECTS OF PURCHASE PROHIBITION | ID 1 OF CONTENTS | ID 2 OF CONTENTS | · · · |
| | • • • | • • • | |
| CONTENT PROVIDER BEING AN OBJECT OF UTILIZATION PROHIBITION | ID 1 OF A CONTENT PROVIDER | ID 2 OF A CONTENT PROVIDER | · · · |
| | • • • | • • • | |
| SERVICE PROVIDER BEING AN OBJECT OF UTILIZATION PROHIBITION | ID 1 OF A SERVICE PROVIDER | ID 2 OF A SERVICE PROVIDER | · · · |
| | • • • | • • • | |
| SIGNATURE | | |

FIG. 108

| ID 1 OF CONTENTS/ID 1 OF A CONTENT PROVIDER/ID 1 OF A SERVICE PROVIDER/REDISTRIBUTION/ID 1 OF AN ENCRYPTION PROCESSING SECTION OF REPURCHASER |
|---|
| ID 2 OF CONTENTS/ID 2 OF A CONTENT PROVIDER/ID 2 OF A SERVICE PROVIDER/REDISTRIBUTION/ID 2 OF AN ENCRYPTION PROCESSING SECTION OF REPURCHASER |
| ・・・ |
| ID 1 OF CONTENTS/ID N OF A CONTENT PROVIDER/ID N OF A SERVICE PROVIDER/REDISTRIBUTION/ID N OF AN ENCRYPTION PROCESSING SECTION OF REPURCHASER |
| SIGNATURE |

FIG. 109

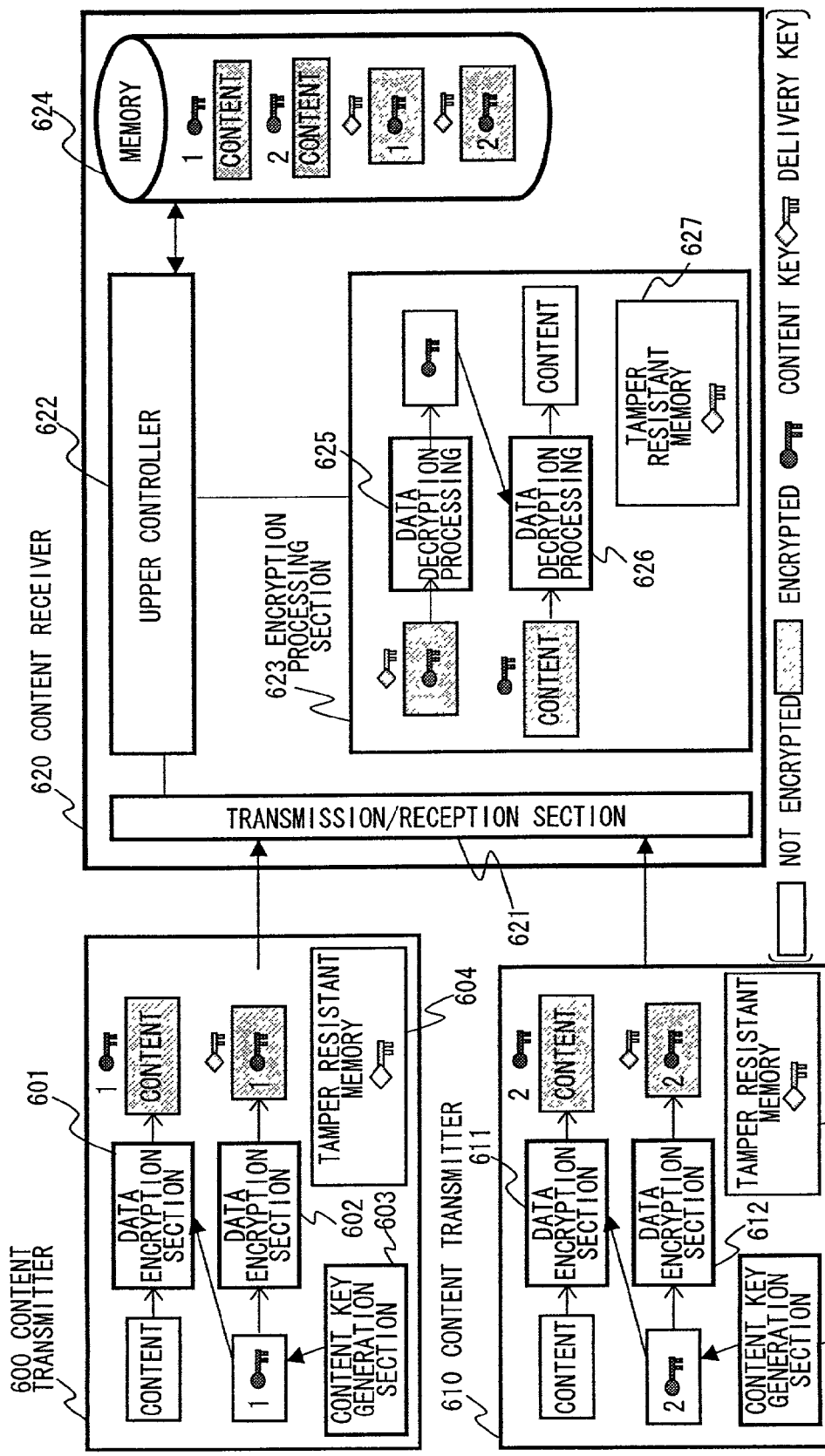

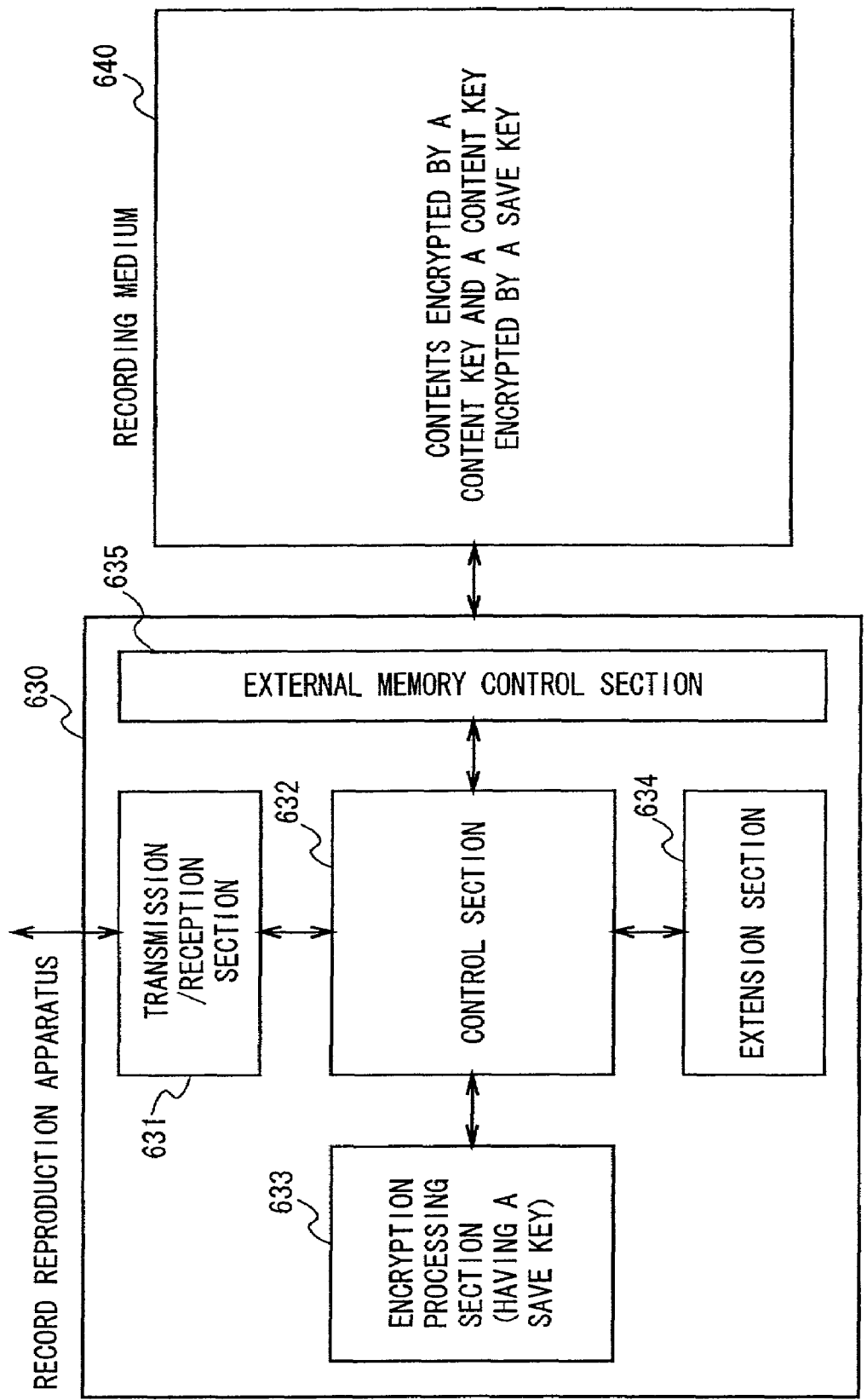

SYSTEMS AND METHODS FOR CONTENT DISTRIBUTION USING ONE OR MORE DISTRIBUTION KEYS

TECHNICAL FIELD

The present invention relates to an information sending system, an information sending apparatus and its method, an information receiving apparatus and its method, a recording and reproducing system, a recording and reproducing apparatus and its method, a reproducing apparatus and its method, a data storage apparatus and its method, a data management system, a management apparatus, a data management method, a data management and migration method, an information provision system, an information regulating apparatus and its method, a data utilization method, an information provision apparatus and its method, an information recording apparatus, a list sending apparatus and its method and a program storage medium, and suitably applies, for instance, to an information sending system wherein a contents holder or seller can safely distribute the contents to contents users.

BACKGROUND ART

Conventionally, there is a system wherein information (contents) such as music is encrypted and sent to an information processing apparatus of a user having executed a predetermined agreement so that the user may decrypt and utilize the contents on the information processing apparatus.

For instance, as shown in FIG. 116, a case where two contents sending apparatuses and one contents receiving apparatus are provided will be described.

First contents sending apparatus 600 comprises data encryption section 601, data encryption section 602, content key generation section 603 and tamper resistant memory 604. Moreover, the tamper resistant memory referred to here may be any such memory as will not have its data easily read by a third party, and no hardware-wise limitation is required in particular (for instance, it may be a hard disk placed in an entry-controlled room or a hard disk of a password-controlled personal computer). Tamper resistant memory 604 stores distribution key $K_d$ necessary to encrypt content key $K_{co}$ supplied in advance from an electronic distribution service center (not illustrated).

In order to generate data to be delivered to contents receiving apparatus 620, first contents sending apparatus 600 generates content key $K_{co1}$ by using content key generation section 603, and encrypts contents by using this key at data encryption section 601. Also, content key $K_{co1}$ is encrypted by using distribution key $K_d$ at data encryption section 602. These encrypted contents and content key $K_{co1}$ are sent to contents receiving apparatus 620.

Incidentally, like contents sending apparatus 600, second contents sending apparatus 610 comprises data encryption section 611, data encryption section 612, content key generation section 613 and tamper resistant memory 614, and generates content key $K_{co2}$ at content key generation section 613, and encrypts contents by using this key at data encryption section 611. Also, data encryption section 612 encrypts content key $K_{co2}$ by using distribution key $K_d$ supplied from the electronic distribution service center (not illustrated). Thus, second contents sending apparatus 610 sends the encrypted contents and encrypted content key $K_{co2}$ to contents receiving apparatus 620.

Contents receiving apparatus 620 comprises sending and receiving section 621, upper controller 622, encryption processing section 623, memory 624, data decryption section 625, data decryption section 626 and tamper resistant memory 627. Moreover, as there are such an indefinite number of contents users that it cannot be grasped how they will handle the apparatuses, the tamper resistant memory referred to here requires its internal data to be protected hardware-wise, and thus encryption processing section 623 is a semiconductor chip of a structure difficult to access from outside and has a multilayered structure wherein the tamper resistant memory inside it has characteristics making it difficult to illicitly read data from outside such as being sandwiched between dummy layers like aluminum layers and having a narrow range of operating voltage or frequency. And tamper resistant memory 627 stores distribution key $K_d$ supplied in advance from the electronic distribution service center (not illustrated).

Incidentally, while tamper resistant memories 604, 614 of first and second contents sending apparatuses 600 and 610 are the memories accessible from outside, methods of accessing them are limited. It may be password or entry control. On the other hand, as for tamper resistant memory 627 of contents receiving apparatus 620, the memory itself has a structure not to be illicitly accessed from outside, and there is limited or no method of reading its internal data from outside by formal means for access. Moreover, while it is impossible to read internal data of tamper resistant memory 627 from outside, there may be a method of access only capable of changing data from outside if former key data or the like is used. Also, in encryption processing section 623, it is possible to access a memory and read predetermined data, but it is impossible to read internal memory from outside.

Contents and content keys $K_{co1}$ and $K_{co2}$ sent from first or second contents sender 600 or 610 are received by sending and receiving section 621 and delivered to upper controller 622. Upper controller 622 stores such data in memory 624 once, and in the case of utilizing the contents, it delivers content key $K_{co}$ and the contents to encryption processing section 623. On receiving them, encryption processing section 623 decrypts them by using distribution key $K_d$ stored in tamper resistant memory 627 in advance in data decryption section 625, and then decrypts them by using content key $K_{co}$ in data decryption section 626, and utilizes the contents. At this time, there are cases where it involves accounting.

Incidentally, in an information processing system shown in FIG. 116, there was a problem that a method had yet to be established for preventing the contents from being illicitly utilized such as providing illegal contents to the system or illicitly benefiting a third party due to accounting involved in use of contents.

Also, in such an information provision system, there are cases where recording and reproducing apparatus 630 shown in FIG. 117 is provided, and such recording and reproducing apparatus 630 has, for instance, record medium 640 consisting of MD (Mini Disk: a trademark) provided in a removable manner.

In this case, recording and reproducing apparatus 630 comprises sending and receiving section 631, control section 632, encryption processing section 633, expansion section 634 and external memory control section 635, and it stores distribution key $K_d$ for decrypting content key $K_{co}$ supplied in advance from an electronic distribution service center (not illustrated) to encryption processing section 633 and also holds save key $K_{save}$ unique to encryption processing section 633.

And recording and reproducing apparatus 630 has encrypted contents and content key $K_{co}$ sent from first or second contents sending apparatus 600 or 610 received by sending and receiving section 631, and sends out the received encrypted contents and content key $K_{co}$ to control section 632. Control section 632 holds the encrypted contents in record medium 640 via external memory control section 635, and sends out encrypted content key $K_{co}$ to encryption processing section 633.

Thus, encryption processing section 633 decrypts encrypted content key $K_{co}$ by using distribution key $K_d$, and then decrypts content key $K_{co}$ by using save key $K_{save}$ and sends out content key $K_{co}$ encrypted by the save key $K_{save}$ to control section 632. Thus, control section 632 has content key $K_{co}$ encrypted by save key $K_{save}$ held by record medium 640 via external memory control section 635.

Moreover, in the case of utilizing contents, in recording and reproducing apparatus 630, control section 322 reads encrypted contents and content key $K_{co}$ from record medium 640 so as to send out the encrypted contents to expansion section 634 and also send out encrypted content key $K_{co}$ to encryption processing section 633. Thus, encryption processing section 633 decrypts encrypted content key $K_{co}$ by the save key $K_{save}$ and sends out acquired content key $K_{co}$ to expansion section 634. Thus, expansion section 634 decrypts encrypted contents by using content key $K_{co}$ and is accordingly capable of using the contents.

In such recording and reproducing apparatus 630, however, even if record medium 640 is loaded, for instance, on a recording and reproducing apparatus other than recording and reproducing apparatus other than recording and reproducing apparatus 630 used for recording contents by holding content key $K_{co}$ encrypted by save key $K_{save}$ unique to encryption processing section 633 on record medium 640 and having the save key $K_{save}$ held by encryption processing section 633, the contents recorded on record medium 640 cannot be reproduced on the other recording and reproducing apparatus since it does not hold the save key $K_{save}$ used for recording the content key $K_{co}$.

Therefore, such record medium 640 had a problem that its versatility is remarkably low in spite of being provided in a removable manner to recording and reproducing apparatus 630.

In addition to this, recording and reproducing apparatus 630 had a problem that, even if a user wanted to utilize the contents recorded on the record medium by recording them on another apparatus or another record medium, they could not be easily utilized since the record medium was provided in a removable manner.

Furthermore, the information processing system had a problem that, even in contents receiving apparatus 620, a method had yet to be established for preventing received contents from being illicitly utilized.

Moreover, contents receiving apparatus 620 to be connected to first and second contents sending apparatuses 600 and 610 had a problem that, as it is assumed to be owned by a user, contents cannot be easily provided for anyone else not in possession of the contents receiving apparatus 620.

In addition, the information processing system had a problem that, in the case where a user uses contents receiving apparatus 620 to record a plurality of favorite contents on a predetermined record medium and creates an album, the favorite contents had to be read and recorded one by one in the record medium by using contents receiving apparatus 620, which recording work was complicated.

Furthermore, the information provision system had a problem that, in the case where any contents of which transmission was stopped due to occurrence of a defect (occurrence of an error in data), for instance, was sent by mistake from first and second contents sending apparatuses 600 and 610 to contents receiving apparatus 620, it was difficult to prevent utilization of the contents on the contents receiving apparatus 620.

DISCLOSURE OF THE INVENTION

The present invention is implemented in consideration of the above points, and proposes an information sending system, an information sending apparatus, an information receiving apparatus, an information sending method, an information receiving method and a program storage medium to prevent contents data from being illicitly utilized.

To find a solution to such a challenge, the present invention provides, in an information sending system for sending predetermined contents data from an information sending apparatus to an information receiving apparatus, the means for holding identification information to identify an information sending apparatus encrypted by a distribution key unique to the information receiving apparatus, adding identification information to contents data in order to make a comparison with identification information encrypted by a distribution key, and sending identification information encrypted by a distribution key together with contents data with identification information added in an information sending apparatus, and provides the means for holding a distribution key, receiving contents data with identification information added and identification information encrypted by a distribution key, decrypting by a distribution key identification information encrypted by the distribution key, and comparing identification information added to contents data with decrypted identification information in an information receiving apparatus.

Thus, it is possible to easily and securely determine whether or not the contents data can be properly utilized from results of comparing identification information added to contents data with decrypted identification information, and an information sending system can be implemented, which is capable of preventing the contents data from being illicitly utilized.

Also, the present invention provides, in an information sending apparatus sending predetermined contents data to an information receiving apparatus, the means for holding identification information to identify an information sending apparatus encrypted by a distribution key unique to the information receiving apparatus, adding identification information to contents data in order to make a comparison with identification information encrypted by a distribution key, and sending identification information encrypted by a distribution key together with contents data with identification information added.

Therefore, it is possible to provide a transmission subject with identification information added to contents data and encrypted identification information to be compared in order to determine whether or not the contents data can be properly utilized, and thus an information sending apparatus and a program storage medium capable of preventing the contents data from being illicitly utilized can be implemented.

Furthermore, the present invention provides, in an information receiving apparatus for receiving predetermined contents data sent from an information sending apparatus, the means for holding a predetermined distribution key unique to the information receiving apparatus, receiving contents data sent from an information sending apparatus with identification information added to identify the information sending apparatus and identification information encrypted by a distribution key, decrypting by a distribution key the identification information encrypted by the distribution key, and comparing the identification information added to the contents data with the decrypted identification information.

Thus, it is possible to easily and securely determine whether or not the contents data can be properly utilized from results of comparing identification information added to contents data with decrypted identification information, and accordingly an information receiving system, an information receiving method and a program storage medium capable of preventing the contents data from being illicitly utilized can be implemented.

In addition, the present invention provides, in an information sending system for sending predetermined contents data from an information sending apparatus to an information receiving apparatus, the means for sending, together with contents data, data of the maximum number of times of possible resending predefined to the contents data in an information sending apparatus, and provides the means for receiving, together with contents data, data of maximum number of times, generating data of the remaining number of times of possible resending of contents data based on data of the maximum number of times, and resending, that is, sending together with contents data, data of the remaining number of times in an information receiving apparatus.

Thus, it is possible to prevent contents data from being resent more often than the predefined maximum number of times of possible resending, and accordingly an information sending system capable of preventing the contents data from being illicitly utilized can be implemented.

Moreover, the present invention provides, in an information sending apparatus for sending predetermined contents data to an information receiving apparatus, the means for sending to an information receiving apparatus, together with contents data, data of the maximum number of times of possible resending predefined to the contents data.

Therefore, it is possible to notify a transmission subject of the predefined maximum number of times of possible resending for contents data, and accordingly an information sending apparatus capable of preventing the contents data from being illicitly utilized can be implemented.

Furthermore, the present invention provides, in an information receiving apparatus for receiving predetermined contents data sent from an information sending apparatus, the means for receiving contents data and data of maximum number of times of possible resending predefined to the contents data sent from the information sending apparatus, generating data of the remaining number of times of possible resending of contents data based on data of the maximum number of times, and resending, that is, sending together with contents data, data of the remaining number of times.

Thus, it is possible to prevent contents data from being resent more often than the predefined maximum number of times of possible resending, and accordingly an information receiving apparatus, an information receiving method and a program storage medium capable of preventing the contents data from being illicitly utilized can be implemented.

Moreover, the present invention provides, in an information sending method for sending predetermined contents data from an information sending apparatus to an information receiving apparatus, the steps of adding identification information to identify the information sending apparatus to contents data by the information sending apparatus, sending contents data with identification information added and identification information to identify the information sending apparatus encrypted by a distribution key unique to the information receiving apparatus by the information sending apparatus, receiving contents data with identification information added and identification information encrypted by a distribution key by the information receiving apparatus, decrypting by a distribution key identification information encrypted by the distribution key by the information receiving apparatus, and comparing identification information added to contents data with decrypted identification information by the information receiving apparatus.

Thus, it is possible to easily and securely determine whether or not the contents data can be properly utilized from results of comparing identification information added to contents data with decrypted identification information, and accordingly an information sending method capable of preventing the contents data from being illicitly utilized can be implemented.

Moreover, the present invention provides, in an information sending method for sending predetermined contents data from an information sending apparatus to an information receiving apparatus, the steps of sending, together with contents data, data of the predefined maximum number of times of possible resending to the contents data by the information sending apparatus, receiving, together with contents data, data of maximum number of times by the information receiving apparatus, generating data of the remaining number of times of possible resending of contents data based on data of the maximum number of times by the information receiving apparatus, and resending, that is, sending together with contents data, data of the remaining number of times by the information receiving apparatus.

Thus, it is possible to prevent contents data from being resent more often than the predefined maximum number of times of possible resending, and accordingly an information sending method and a program storage medium capable of preventing the contents data from being illicitly utilized can be implemented.

Moreover, the present invention is implemented in consideration of the above points, and is intended to propose a recording and reproducing system, a recording and reproducing apparatus, a reproducing apparatus, a data storage apparatus, a recording and reproducing method, a reproducing method and a program storage medium capable of markedly improving versatility of data storage apparatuses.

To find a solution to such a challenge, the present invention provides, in a recording and reproducing system for recording and reproducing predetermined contents data sent from an information sending apparatus on a removable data storage apparatus by a recording and reproducing apparatus, the means for encrypting contents data by a predetermined content key, and sending a content key and the contents data encrypted by the content key in an information sending apparatus, and provides, in the recording and reproducing apparatus, the means for receiving a content key and the contents data encrypted by the content key sent from the information sending apparatus, sending out the received content key and the contents data encrypted by the content key to a data storage apparatus and having them recorded thereby or having the content key and the contents data encrypted by the content key reproduced from the data storage apparatus to read them, and provides, in the data storage apparatus, the means for holding a predetermined record medium and a predetermined save key, encrypting a content key by a save key, recording a content key encrypted by a save key and the contents data encrypted by the content key on a record medium or reproducing a content key encrypted by a save key and the contents data encrypted by the content key from the record medium, and decrypting the content key encrypted by a save key by the save key.

Thus, to the extent that it is not necessary to hold a save key on the recording and reproducing apparatus side, contents data can be reproduced from a data storage apparatus by a recording and reproducing apparatus other than one recording contents data on the data storage apparatus, and thus a recording and reproducing system capable of markedly improving versatility of data storage apparatuses can be implemented.

Also, the present invention provides, in a recording and reproducing apparatus for which a data storage apparatus having a predetermined record medium is provided in a removable manner, the means for controlling recording and reproducing for sending out contents data encrypted by a predetermined content key and the content key to a data storage apparatus, encrypting the content key by using a predetermined save key unique to the data storage apparatus, having the content key encrypted by the save key and the contents data encrypted by content key recorded on a record medium, and also having the content key encrypted by the save key and the contents data encrypted by content key reproduced from the record medium, decrypting the content key encrypted by a save key by using the save key, and reading the acquired content key and the contents data encrypted by the content key from the data storage apparatus.

Thus, to the extent that it is not necessary to hold a save key, the contents data can be reproduced from a data storage apparatus recording contents data on another recording and reproducing apparatus, and thus a recording and reproducing apparatus, a recording and reproducing method and a program storage medium capable of markedly improving versatility of data storage apparatuses can be implemented.

In addition, the present invention provides, in a reproducing apparatus for which a data storage apparatus having a predetermined record medium is provided in a removable manner, the means for controlling reproducing for having contents data encrypted by a predetermined content key recorded in advance on a record medium of the data storage apparatus and a content key encrypted by a predetermined save key unique to the data storage apparatus reproduced, decrypting the content key encrypted by a save key by using the save key, and reading the acquired content key and the contents data encrypted by the content key from the data storage apparatus.

Thus, to the extent that it is not necessary to hold a save key, the contents data can be reproduced from a data storage apparatus on any recording and reproducing apparatus, and thus a reproducing apparatus, a reproducing method and a program storage medium capable of markedly improving versatility of data storage apparatuses can be implemented.

Moreover, the present invention provides, in a data storage apparatus provided in a removable manner on a recording and/or reproducing apparatus for recording and/or reproducing predetermined data under control of the recording and/or reproducing apparatus, the means for holding a predetermined record medium and a predetermined save key, communicating, that is, sending and receiving predetermined contents data encrypted by a predetermined content key and the content key between itself and a recording and/or reproducing apparatus, encrypting a content key by a save key under control of the recording and/or reproducing apparatus, recording the content key encrypted by a save key and contents data encrypted by the content key on a record medium or reproducing the content key encrypted by a save key and contents data encrypted by the content key from the record medium under control of the recording and/or reproducing apparatus, and decrypting the content key encrypted by a save key by using the save key under control of the recording and/or reproducing apparatus.

Thus, even if a recording and reproducing apparatus does not hold a save key, the contents data can be recorded or reproduced, and thus a data storage apparatus and a program storage medium capable of markedly improving versatility can be implemented.

Furthermore, the present invention is implemented in consideration of the above points, and is intended to propose a data management system, a management apparatus, a data storage apparatus and a data management method, a data management and migration method and a program storage medium, which allow contents data recorded on a data storage apparatus to be easily utilized by various apparatuses.

To find a solution to such a challenge, the present invention provides, in a data management system, a predetermined data storage apparatus, a recording apparatus for recording predetermined contents data on a data storage apparatus, a management apparatus for capturing contents data stored in a data storage apparatus and managing movement of the captured contents data to various apparatuses in place of the data storage apparatus to be connected to various apparatuses.

Therefore, it is possible to easily move the contents data recorded on a data storage apparatus to various apparatuses under management of a management apparatus, and thus a data management system that allow contents data recorded on a data storage apparatus to be easily utilized by various apparatuses can be implemented.

Also, the present invention captures predetermined contents data recorded in a data storage apparatus, and manages movement of the captured contents data to various apparatuses in place of the data storage apparatus in a management apparatus connecting various apparatuses with a predetermined data storage apparatus.

Thus, it is possible to manage contents data recorded in a data storage apparatus in place of the data storage apparatus and easily move the contents data to various apparatuses, and thus a management apparatus, a data management method and a program storage medium that allow contents data recorded on a data storage apparatus to be easily utilized by various apparatuses can be implemented.

Furthermore, the present invention manages, under control of a predetermined recording apparatus, movement of contents data to various apparatuses in a data storage apparatus for recording predetermined contents data, and when the various apparatuses are connected to a predetermined management apparatus to be connected to, it moves contents data to the management apparatus.

Therefore, it is possible to rely on a management apparatus for management of recorded contents data and easily move the contents data to various apparatuses via the management apparatus, and thus a data storage apparatus, a data management and migration method and a program storage medium that allow contents data recorded on a data storage apparatus to be easily utilized by various apparatuses can be implemented.

Moreover, the present invention provides, in a data management method, the steps of recording predetermined contents data on a predetermined data storage apparatus by a predetermined recording apparatus, and managing, that is, capturing contents data stored in a data storage apparatus and managing movement of the captured contents data to various apparatuses in place of the data storage apparatus by a management apparatus to be connected to various apparatuses.

Thus, it is possible to easily move the contents data recorded on a data storage apparatus to various apparatuses under management of a management apparatus, and thus a data management method that allows contents data recorded on a data storage apparatus to be easily utilized by various apparatuses can be implemented.

Furthermore, the present invention is implemented in consideration of the above points, and is intended to propose an information provision system, an information regulating apparatus, an information receiving apparatus, an information provision method, an information regulating method, a data utilization method and a program storage medium capable of preventing contents data from being illicitly utilized.

To find a solution to such a challenge, the present invention provides, in an information provision system, an information receiving apparatus for receiving predetermined contents data that is sent and adding a signature to and sending utilization permission data showing the received contents data, an information regulating apparatus for verifying a signature on utilization permission data to determine whether the utilization permission data is illegal data and if determined so, prohibiting the information receiving apparatus from utilizing the contents data.

Thus, an information provision system can be implemented, which is capable of determining by an information regulating apparatus in advance whether the contents data received by an information receiving apparatus will be illicitly utilized and preventing the contents data from being illicitly utilized.

Also, in the present invention, an information regulating apparatus connected online to a predetermined information receiving apparatus shows predetermined contents data received from the information receiving apparatus and has utilization permission data with a signature added sent so as to verify the signature on the utilization permission data and determine whether the utilization permission data is illegal data and if determined so, the information receiving apparatus is prohibited from utilizing the contents data.

Thus, an information regulating apparatus, an information regulating method and a program storage medium capable of, by determining in advance whether the contents data received by the information receiving apparatus will be illicitly used, preventing the contents data from being illicitly utilized can be implemented.

Moreover, in the present invention, an information receiving apparatus connected online to a predetermined information regulating apparatus receives predetermined contents data that is sent and adds to utilization permission data showing the received contents data a signature capable of determining whether the contents data shown by the utilization permission data is tampered to other contents data and then sends it to the information regulating apparatus.

Thus, an information receiving apparatus, a data utilization method and a program storage medium capable of, by having an information regulating apparatus determine in advance whether received contents data will be illicitly utilized, preventing the contents data from being illicitly utilized can be implemented.

Furthermore, the present invention provides, in an information provision method, the steps of sending, that is, receiving predetermined contents data and adding a signature to and sending utilization permission data showing the received contents data by an information receiving apparatus, and prohibiting utilization, that is, verifying a signature on utilization permission data to determine whether the utilization permission data is illegal data and if determined so, prohibiting the information receiving apparatus from utilizing the contents data by information regulating apparatus.

Thus, an information provision method can be implemented, which is capable of determining by an information regulating apparatus in advance whether the contents data received by an information receiving apparatus will be illicitly utilized and preventing the contents data from being illicitly utilized.

In addition, the present invention is implemented in consideration of the above points, and is intended to propose an information provision system, an information provision apparatus, a data storage apparatus, an information provision method, a data store method and a program storage medium capable of easily providing contents data.

To find a solution to such a challenge, the present invention provides, in an information provision system providing an information provision apparatus with predetermined contents data sent from an information sending apparatus, the means for encrypting contents data by a predetermined content key, and sending a content key and contents data encrypted by the content key in the information sending apparatus, and provides the means for receiving the content key and contents data encrypted by the content key sent from the information sending apparatus, decrypting by the content key the contents data encrypted by the content key, inserting a digital watermark, that is, inserting by a digital watermark predetermined information into the contents data decrypted by the content key, and recording the contents data with the information inserted on a removable record medium in the information provision apparatus.

Thus, it is possible, even if an information user does not have a contents data receiving apparatus, to record contents data on a record medium of the information user with ensured security, and accordingly an information provision system capable of easily providing contents data can be implemented.

Moreover, the present invention provides, in an information provision apparatus providing predetermined contents data sent from an information sending apparatus, the means for receiving contents data encrypted by a predetermined content key and the content key sent from the information sending apparatus, decrypting by the content key the contents data encrypted by the content key, inserting a digital watermark, that is, inserting by a digital watermark predetermined information into the contents data decrypted by the content key, and recording the contents data with the information inserted on a removable record medium.

Thus, it is possible, even if an information user does not have a contents data receiving apparatus, to record contents data on a record medium of the information user with ensured security, and accordingly an information provision apparatus, an information provision method and a program storage medium capable of easily providing contents data can be implemented.

Furthermore, the present invention provides, in an information provision apparatus providing predetermined contents data sent from an information sending apparatus, the means for creating license conditions information prescribing conditions for using contents data based on handling policies prescribing conditions for use of a content key sent from the information sending apparatus together with a content key and the contents data encrypted by the content key, and storing, that is, sending the handling policies and the license conditions information together with the content key and the contents data encrypted by the content key to a predetermined removable data storage apparatus and storing them thereon.

Thus, it is possible, even if an information user does not have a contents data receiving apparatus, to record contents data on a data storage apparatus of the information user with ensured security, and accordingly an information provision apparatus, an information provision method and a program storage medium capable of easily providing contents data can be implemented.

In addition, the present invention provides, in an data storage apparatus storing predetermined contents data sent from an information provision apparatus, the means for receiving a content key and contents data encrypted by the content key, handling policies prescribing conditions for using the content key, and license conditions information prescribing conditions for using the contents data created as necessary based on the handling policies sent from a predetermined record medium and an information provision apparatus, and recording the content key, the contents data encrypted by the content key, the handling policies and the license conditions information on a record medium.

Thus, it is possible, even if an information user does not have a contents data receiving apparatus, to record contents data with ensured security, and accordingly a data storage apparatus, a data storage method and a program storage medium capable of easily providing contents data can be implemented.

Furthermore, the present invention is implemented in consideration of the above points, and implements an information recording apparatus, a data storage apparatus, a data store method and a program storage medium capable of easily recording a plurality of favorite contents data.

To find a solution to such a challenge, the present invention provides, in an information recording apparatus storing predetermined contents data on a predetermined data storage apparatus, the means for selecting, that is, categorizing and managing a contents server holding a plurality of contents data and the contents data held on the contents server, and if a desired category and a number of contents are specified, arbitrarily selecting a plurality of contents data equivalent to the specified number of contents among the contents data belonging to the specified category, and storing, that is, reading the selected contents data from the contents server and storing it on the data storage apparatus.

Thus, it is possible to easily select and store on a data storage apparatus a plurality of a user's favorite contents data, and accordingly an information recording apparatus, a data store method and a program storage medium capable of easily recording a plurality of favorite contents data can be implemented.

Moreover, the present invention provides, in a data storage apparatus on which predetermined contents data is stored by an information recording apparatus, the means for receiving a plurality of contents data belonging to a desired category among a plurality of categorized contents data and equivalent to a desired number of contents sent from a predetermined record medium and the information recording apparatus, and recording the contents data collectively on the record medium.

Thus, a data storage apparatus, a data store method and a program storage medium capable of recording a plurality of favorite contents data sent from an information recording apparatus can be implemented.

Furthermore, the present invention is implemented in consideration of the above points, and is intended to propose an information provision system, a list sending apparatus, an information receiving apparatus, an information provision method, an information receiving method, a list sending method and a program storage medium capable of almost certainly preventing contents data of which provision is prohibited from being utilized.

To find a solution to such a challenge, the present invention provides, in an information provision system, an information sending apparatus for sending predetermined contents data, a list sending apparatus for creating a provision prohibition list showing contents data designated as provision-prohibited and sending the created prohibition list, and an information receiving apparatus for determining whether contents data sent from the information sending apparatus is provision-prohibited based on the provision prohibition list, and if determined so, stopping capture of the contents data.

Thus, in an information receiving apparatus, an information provision system can be implemented, which is capable of almost certainly preventing provision-prohibited contents and contents sent from a utilization-prohibited information sending apparatus from being bought and accordingly capable of almost certainly preventing provision-prohibited contents data from being utilized.

Also, the present invention provides, in a list sending apparatus for sending a predetermined list to an information receiving apparatus receiving predetermined contents data sent from an information sending apparatus, the means for creating a list, that is, creating a provision prohibition list showing contents data designated as provision-prohibited, and sending a provision prohibition list to the information receiving apparatus.

Thus, in an information receiving apparatus, a list sending apparatus, a list sending method and a program storage medium capable of, based on a provision prohibition list, almost certainly preventing provision-prohibited contents and contents sent from a utilization-prohibited information sending apparatus from being bought and accordingly capable of almost certainly preventing provision-prohibited contents data from being utilized can be implemented.

Moreover, the present invention provides, in an information receiving apparatus receiving predetermined contents data sent from an information sending apparatus and a predetermined list sent from a list sending apparatus, the means for holding a list, that is, holding a provision prohibition list showing contents data designated as provision-prohibited sent from the list sending apparatus, and stopping capture, that is, determining whether contents data sent from an information sending apparatus is provision-prohibited, and if determined so, stopping capture of the contents data.

Thus, an information receiving apparatus, an information receiving method and a program storage medium capable of almost certainly preventing provision-prohibited contents and contents sent from a utilization-prohibited information sending apparatus from being bought and accordingly capable of almost certainly preventing provision-prohibited contents data from being utilized can be implemented.

Moreover, the present invention provides, in an information providing method, the steps of sending a list, that is, creating a provision prohibition list showing contents data designated as provision-prohibited and sending the created provision prohibition list by a list sending apparatus, sending predetermined contents data by an information sending apparatus, and stopping capture, that is, determining by an information receiving apparatus whether contents data sent from an information sending apparatus is provision-prohibited based on the provision prohibition list, and if determined so, stopping capture of the contents data.

Thus, in an information receiving apparatus, an information provision method can be implemented, which is capable of almost certainly preventing provision-prohibited contents and contents sent from a utilization-prohibited information sending apparatus from being bought and accordingly capable of almost certainly preventing provision-prohibited contents data from being utilized.

Incidentally, in online equipment and offline equipment of an information receiving apparatus, when sending contents data between the online equipment and the offline equipment, history information is created according to identification information of the contents data and identification information of the equipment of the source, and on receipt of a provision prohibition list, the history information is searched, and if contents data that newly became provision-prohibited is sent, a current provision prohibition list held by the equipment is sent to the source of the contents data so as to prevent any illegal contents data from diffusing from the source equipment to any other equipment.

BRIEF DESCRIPTION OF THE DRAWINGS

FIG. 5 is a skeleton diagram showing an example of a periodic update of a key.

FIG. 7 is a skeleton diagram showing data contents of a user registration database.

FIG. 8 is a skeleton diagram showing registration information of each individual group.

FIG. 13 is a flowchart showing a decrypting process of elliptic curve encryption.

FIG. 33 is a diagram showing handling policies of single contents.

FIG. 34 is a diagram showing handling policies of album contents.

FIG. 35 is a diagram showing another example of handling policies of single contents.

FIG. 36 is a diagram showing another example of handling policies of album contents.

FIG. 37 is a diagram showing price information of single contents.

FIG. 38 is a diagram showing price information of album contents.

FIG. 39 is a diagram showing another example of price information of single contents.

FIG. 40 is a diagram showing another example of price information of album contents.

FIG. 41 is a diagram showing license conditions information.

FIG. 42 is a diagram showing accounting information.

FIG. 43 is a diagram showing another example of accounting information.

FIG. 44 is a diagram showing a list of utilization rights.

FIG. 45 is a diagram showing utilization rights.

FIG. 46 is a diagram showing single contents.

FIG. 47 is a diagram showing album contents.

FIG. 48 is a diagram showing key data for single contents;

FIG. 50 is a diagram showing key data for album contents.

FIG. 76 is a skeleton diagram showing a rule section of a handling policy.

FIG. 77 is a skeleton diagram showing contents of a rule section of price information.

FIG. 78 is a skeleton diagram showing an example of changed contents of rights.

FIG. 81 is a skeleton diagram showing transition of a rule section of license conditions information.

FIG. 108 is a diagram showing contents purchase prohibition list.

FIG. 109 is a diagram showing a contents redistribution/repurchase list.

FIG. 116 is a block diagram showing a conventional example.

FIG. 117 is a block diagram showing configuration of a conventional recording and reproducing apparatus.

BEST MODE FOR CARRYING OUT THE INVENTION

An embodiment of the present invention will be hereinafter described in detail with reference to the drawings.

(1) Information Distribution System

Figure 1:
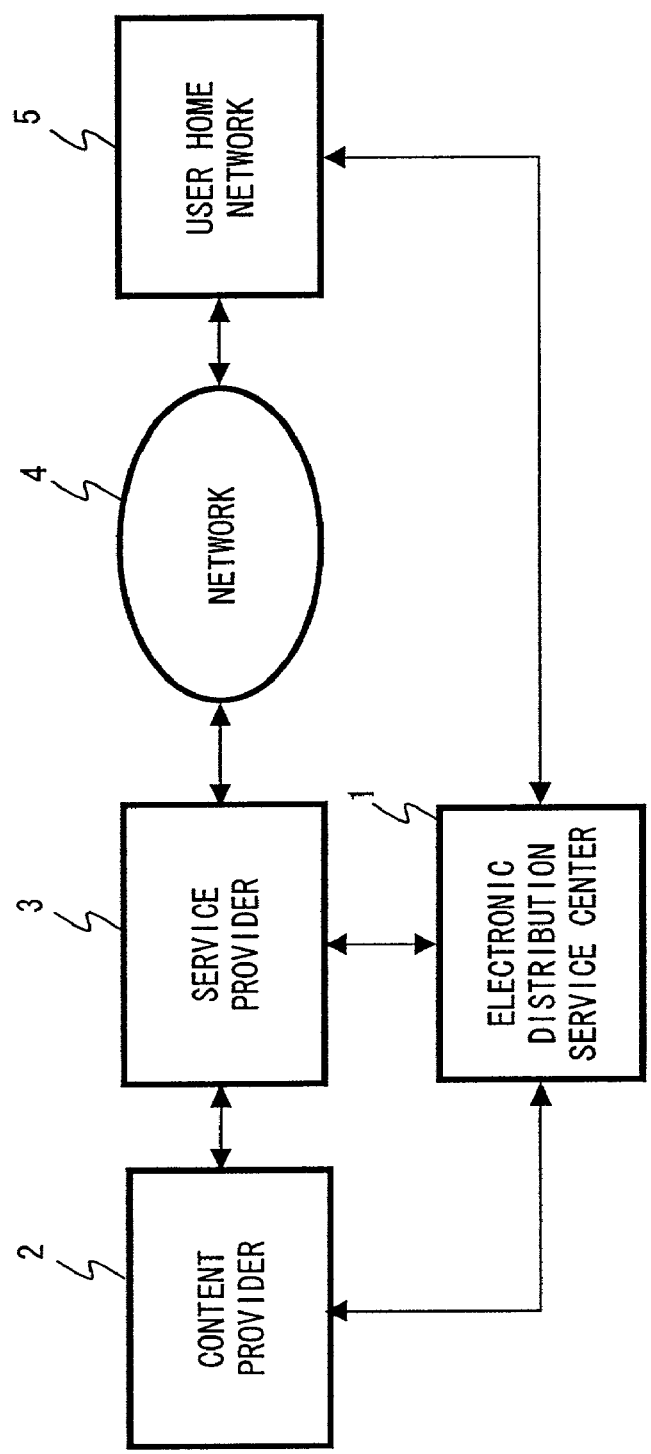
FIG. 1 is a block diagram showing overall configuration of an electronic music distribution system according to the present invention.

FIG. 1 is a diagram illustrating an EMD (Electronic Music Distribution) system 10 to which the present invention is applied. Contents to be distributed to a user by this system are digital data in which digital data itself has value and, in this example, a piece of contents corresponds to music data for one tune. Contents are provided to a user with a piece of contents as one unit (single) or a plurality of pieces of contents as one unit (album). The user purchases the contents (in fact, purchases a right to utilize a content key $K_{co}$) and utilizes the contents to be provided (in fact, decodes the contents using the content key $K_{co}$ to utilize the contents). Further, it goes without saying that the system is applicable not only to music data but also to all purchases of contents such as video, games programs and the like.

An electronic service center (END service center) 1 transmits an individual key $K_i$ and a public key certificate of a content provider 2 to the content provider 2, transmits a public key certificate of a service provider 3 to the service provider 3, transmits a delivery key $K_d$ and registration information to a user home network 5, receives charge information or the like and registration information corresponding to use of contents from the user home network 5, settles an account of utilization fees based on the charge information, and performs processing for distributing profits to the content provider 2, the service provider 3 and the electronic distribution service center 1 itself.

The content provider 2 has digitized contents, inserts an electronic watermark in the contents in order to prove that the contents is its own, compresses and encrypts the contents, generates a handling policy of the contents, and transmits the contents to the service provider 3 with signature data added.

The service provider 3 adds price information to the contents supplied by the content provider 2 via a network 4 composed of a dedicated cable network, the Internet or satellite communication, and transmits the contents to the user home network 5 with signature data added.

The user home network 5 obtains the contents sent by the service provider 3 with the price information added, purchases a content utilization right and executes purchase processing. The purchased utilization right may be, for example, a reproduction utilization right or a right to copy. Then, charge information generated by the purchase processing is stored in an tamper resistant memory in an encryption processing section, and is transmitted to the electronic distribution service center 1 when the user home network 5 obtains the delivery key $K_d$ from the electronic distribution service center 1.

Figure 2:
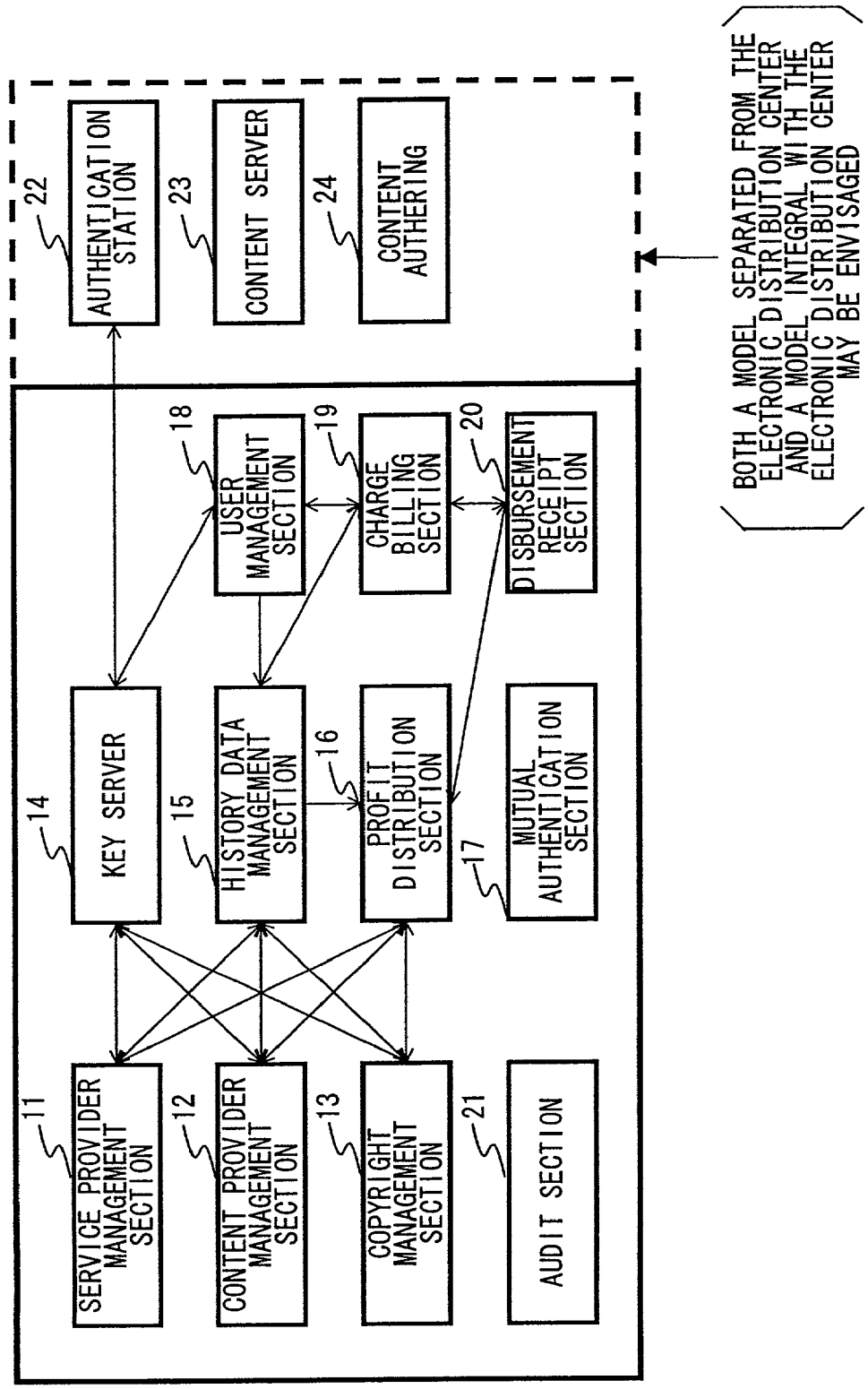
FIG. 2 is a block diagram showing configuration of an electronic distribution service center.

FIG. 2 is a block diagram showing functions of the electronic distribution service center 1. A service provider management section 11 supplies the public key certificate of the service provider 3 and information on profit distribution to the service provider 3, and at the same time, receives information (price information) to be attached to the contents, if necessary. A content provider management section 12 transmits an individual key $K_i$, the individual key $K_i$ encrypted by the delivery key $K_d$, and the public key certificate of the content provider 2, and at the same time, supplies the information on profit distribution, and receives information (a handling policy) to be attached to the contents, if necessary. A copying right management section 13 transmits information indicating results of content utilization of the user home network 5 to an organization managing copying rights, e.g., JASRAC (Japanese Society for Rights of Authors, Composers and Publishers). A key server 14 performs generation, maintenance, management of keys used for the entire system, and the individual key $K_i$ different for each content provider is generated and the individual key $K_i$ encrypted by the delivery key $K_d$ is generated together, which are supplied to the content provider 2 via the content provider management section 12, the individual key $K_i$ encrypted by the delivery key $K_d$ is supplied to an authentication station 22, if necessary, and the delivery key $K_d$ is supplied to the user home network 5 via a user management section 18. In addition, a public key and a secret key of the electronic distribution center 1 as well as a public key and a secret key peculiar to equipment maintained by the user are all generated and managed, the public keys are transmitted to the authentication station 22 to be utilized for preparing a public key certificate. Further, in some cases, a save key $K_{save}$ corresponding to an ID for each apparatus peculiar to an encryption processing section 92 to be described later is generated and maintained.

Figure 3:
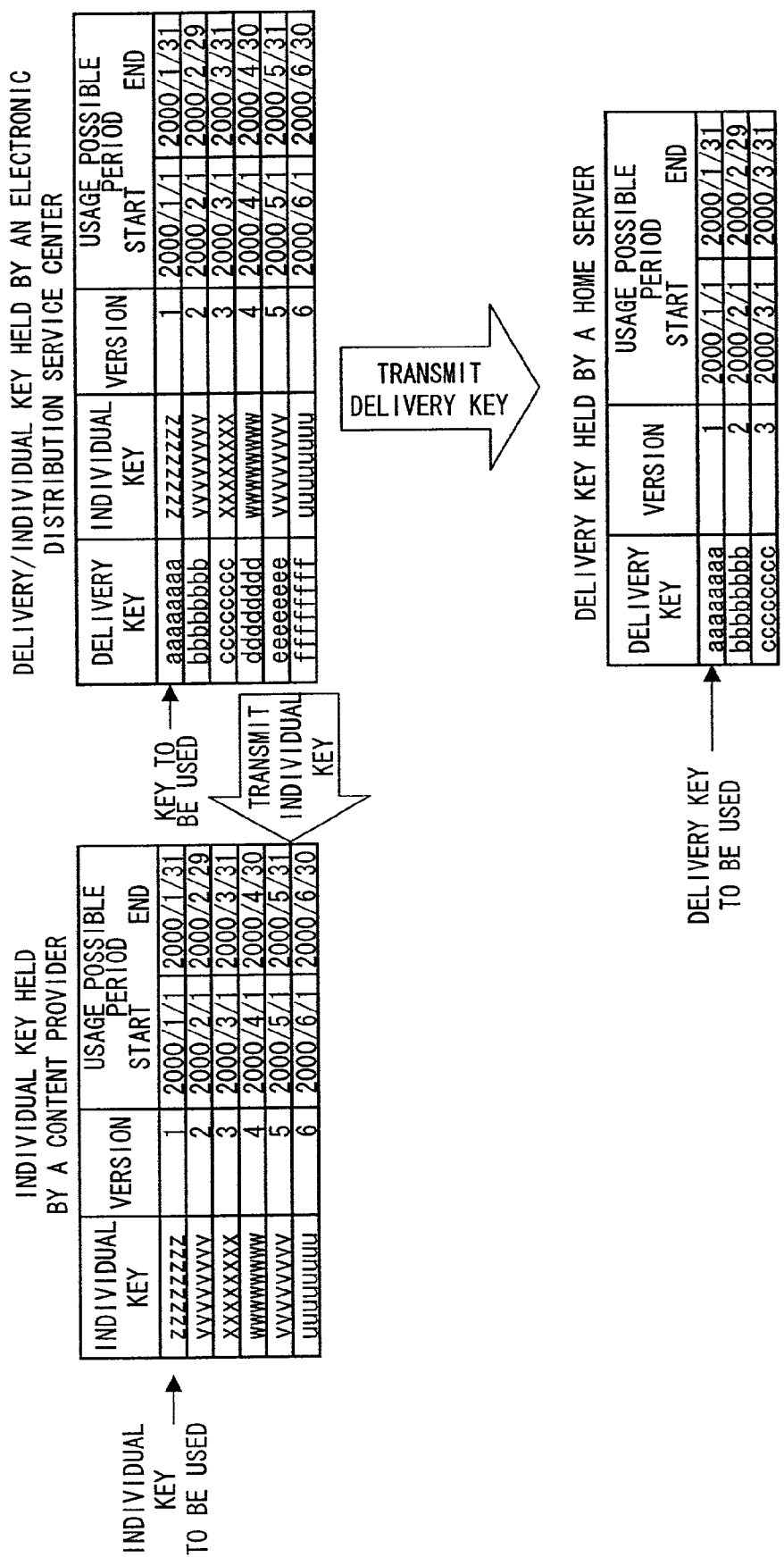
FIG. 3 is a skeleton diagram showing an example of a periodic update of a key.

An example of periodic transmission of a key from the electronic distribution service center 1 to the content provider 2 and a home server 51 (to be described later) forming the user home network 5 will be described with reference to FIGS. 3 through 6. FIG. 3 shows the delivery key $K_d$ held by the electronic distribution service center 1, the individual key $K_i$, the individual key $K_i$ held by the content provider 2, and the delivery key $K_d$ held by the home server 51 in January 2000 when the content provider starts provision of contents and the home server 51 forming the user home network 5 starts utilization of the contents. Further, although further description is omitted, the content provider 2 also maintains the individual key $K_i$ encrypted by the delivery key $K_d$ corresponding to the individual key $K_i$.

In the example of FIG. 3, the delivery key $K_d$ and the individual key $K_i$ are usable from the first day of a calendar month and the last day of the month, and for example, the delivery key $K_d$ being a version 1 having a value of "aaaaaaaa" that is a random number of a predetermined number of bits, and the individual key $K_i$ being a version 1 having a value "zzzzzzzz" are usable from Jan. 1, 2000 until Jan. 31, 2000 (i.e., the content key $K_{co}$ for encrypting contents that the service provider 3 delivers to the user home network 5 in a period from Jan. 1, 2000 until Jan. 31, 2000 is encrypted by the individual key $K_i$ being the version 1, and the individual key $K_i$ being the version 1 is encrypted by the delivery key $K_d$ being the version 1), the delivery key $K_d$ being a version 2 having a value of "bbbbbbbb" that is a random number of a predetermined number of bits and the individual key $K_i$ being a version 2 having a value of "yyyyyyyy" are usable from Feb. 1, 2000 until Feb. 29, 2000 (i.e., the content key $K_{co}$ for encrypting contents that the service provider 3 delivers to the user home network 5 during the period is encrypted by the individual key $K_i$ being the version 2, and the individual key $K_i$ being the version 2 is encrypted by the delivery key $K_d$ being the version 2). Similarly, the delivery key $K_d$ and the individual key $K_i$ being a version 3 is usable in March 2000, the delivery key $K_d$ and the individual key $K_i$ being a version 4 is usable in April 2000, the delivery key $K_d$ and the individual key $K_i$ being a version 5 is usable in May 2000, the delivery key $K_d$ and the individual key $K_i$ being a version 6 is usable in June 2000.

Prior to the content provider 2 starting to provide contents, the electronic delivery service center 1 transmits six individual keys $K_i$ of the versions 1 through 6 that are usable from January until June 2000 and the individual keys each encrypted by the delivery key $K_d$ of the identical versions to the content provider 2, and the content provider 2 receives and stores the six individual keys $K_i$ and the individual keys $K_i$ encrypted by the delivery keys $K_d$. The contents provider 2 stores the individual keys $K_i$ for six months ad the individual keys $K_i$ encrypted by the delivery keys $K_d$ because a predetermined period is needed for the content provider 2 to prepare for encryption and the like of the contents and the content key $K_{co}$ before providing the contents.

In addition, prior to the home server 51 starting to utilize the contents, the electronic distribution service center 1 transmits three delivery keys $K_d$ being the versions 1 through 3 that are usable from January until March 2000 to the home server 51, and the home server 51 receives and stores the three delivery keys $K_d$. The home server 51 stores the delivery keys $K_d$ for three months in order to avoid such a situation in which contents cannot be purchased despite a contract term during which the contents can be purchased due to such a trouble that the home server 51 cannot connect to the electronic distribution service center 1 arising out of congestion f lines or the like, and in order to reduce load of the electronic distribution service center 1 by decreasing the frequency of connection to the electronic distribution service center 1 and controlling simultaneous accesses of respective apparatuses to the electronic distribution service center 1.

During the period from Jan. 1, 2000 until Jan. 31, 2000, the delivery key $K_d$ and the individual key $K_i$ being the version 1 are utilized in the home server 51 forming the electronic distribution service center 1, the content provider 2 and the user home network 5.

Figure 4:
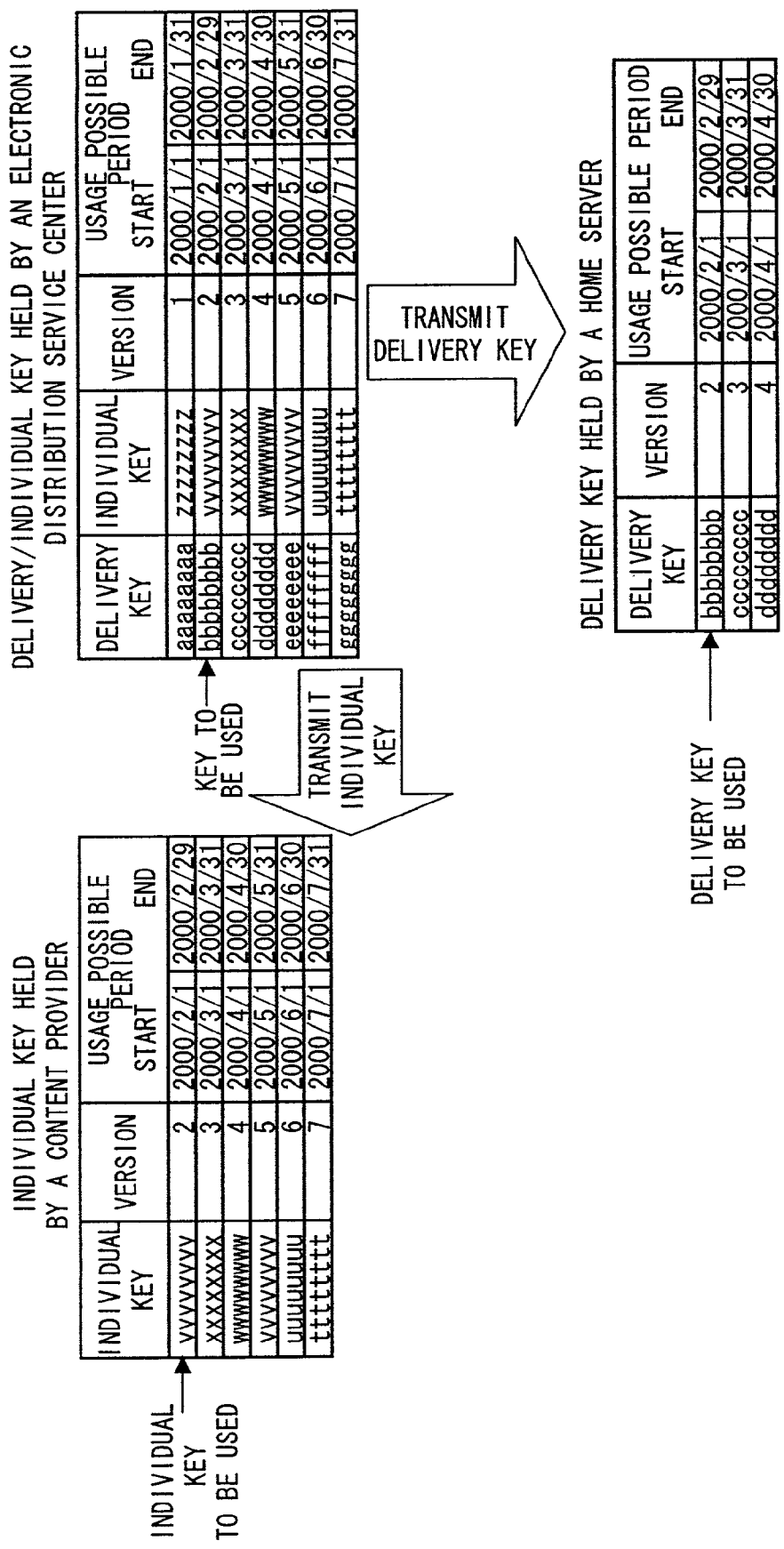
FIG. 4 is a skeleton diagram showing an example of a periodic update of a key.

Transmission of the delivery key $K_d$ and the individual key $K_i$ of the electronic distribution service center 1 to the content provider 2 and the home server 51 on Feb. 1, 2000 will be described with reference to FIG. 4. The electronic distribution service center 1 transmits six individual keys $K_i$ of the versions 2 through 7 that are usable from February 2000 until July 2000 and the individual keys each encrypted by the delivery keys $K_d$ of the identical versions to the content provider 2, and the content provider 2 receives the six individual keys $K_i$ and the individual keys $K_i$ encrypted by the delivery keys $K_d$, overwrites the individual keys $K_i$ and the individual keys $K_i$ encrypted by the delivery keys $K_d$ that are stored before the receipt with the received keys, and stores the new individual keys $K_i$ and the individual keys $K_i$ encrypted by the delivery keys $K_d$. The electronic distribution service center 1 transmits three delivery keys $K_d$ being the versions 2 through 4 that are usable from February 2000 until April 2000 to the home server 51, and the home server 51 receives the three delivery keys $K_d$, overwrites the delivery keys $K_d$ that are stored before receipt with the received keys, and stores the new delivery keys $K_d$. The electronic distribution service center 1 stores the delivery keys $K_d$ being the versions 1 through 7 and the individual keys $K_i$ as they are. This is for the purpose of making the delivery keys $K_d$ utilized in the past to be available when an unexpected trouble occurs, or an illegality occurs or is found.

During the period from Feb. 1, 2000 until Feb. 29, 2000, the delivery key $K_d$ and the individual key $K_i$ being the version 2 are utilized in the home server 51 forming the electronic distribution service center 1, the content provider 2, and the user home network 5.

Transmission of the delivery key $K_d$ and the individual key $K_i$ of the electronic distribution service center 1 to the content provider 2 and the home server 51 on Mar. 1, 2000 will be described with reference to FIG. 5. The electronic distribution service center 1 transmits six individual keys $K_i$ of the versions 3 through 8 that are usable from March 2000 until August 2000 and the individual keys each encrypted by the delivery keys $K_d$ of the identical versions to the content provider 2, and the content provider 2 receives the six individual keys $K_i$ and the individual keys $K_i$ encrypted by the delivery keys $K_d$, overwrites the individual keys $K_i$ and the individual keys $K_i$ encrypted by the delivery keys $K_d$ that are stored before the receipt with the received keys, and stores the new individual keys $K_i$ and the individual keys $K_i$ encrypted by the delivery keys $K_d$. The electronic distribution service center 1 transmits three delivery keys $K_d$ being the versions 3 through 5 that are usable from March 2000 until May 2000 to the home server 51, and the home server 51 receives the three delivery keys $K_d$, overwrites the delivery keys $K_d$ that are stored before the receipt with the received keys, and stores the new delivery keys $K_d$. The electronic distribution service center 1 stores the delivery keys $K_d$ being the versions 1 through 8 and the individual keys $K_i$ as they are. This is for the purpose of making the delivery keys $K_d$ utilized in the past to be available when an unexpected trouble occurs, or an illegality occurs or is found.

During the period from Mar. 1, 2000 until Mar. 31, 2000, the delivery key $K_d$ and the individual key $K_i$ being the version 3 are utilized in the home server 51 forming the electronic distribution service center 1, the content provider 2, and the user home network 5.

Figure 6:
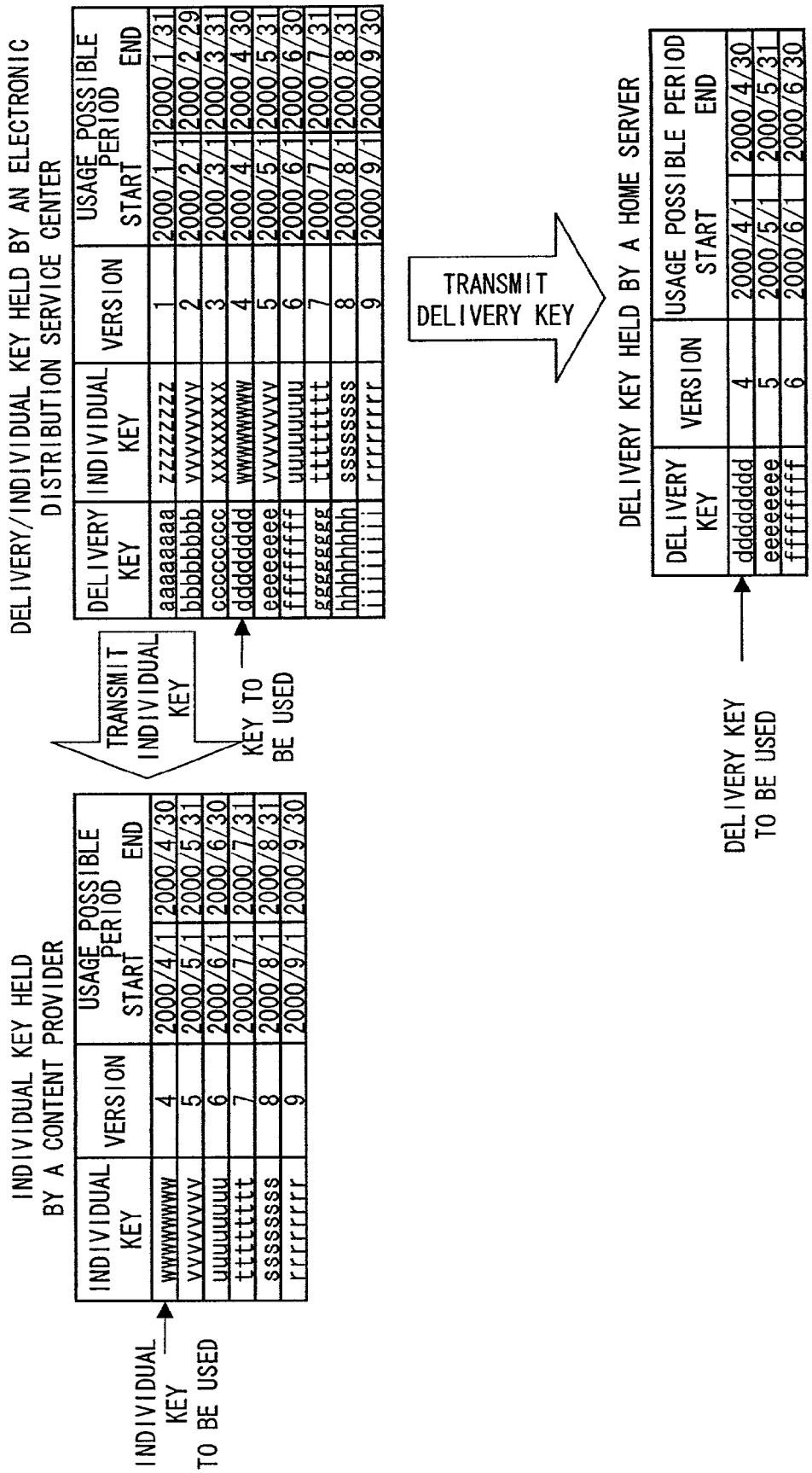
FIG. 6 is a skeleton diagram showing an example of a periodic update of a key.

Transmission of the delivery key $K_d$ and the individual key $K_i$ of the electronic distribution service center 1 to the content provider 2 and the home server 51 on Apr. 1, 2000 will be described with reference to FIG. 6. The electronic distribution service center 1 transmits six individual keys $K_i$ of the versions 4 through 9 that are usable from April 2000 until September 2000 and the individual keys each encrypted by the delivery keys $K_d$ of the identical versions to the content provider 2, and the content provider 2 receives the six individual keys $K_i$ and the individual keys $K_i$ encrypted by the delivery keys $K_d$, overwrites the individual keys $K_i$ and the individual keys $K_i$ encrypted by the delivery keys $K_d$ that are stored before the receipt with the received keys, and stores the new individual keys $K_i$ and the individual keys $K_i$ encrypted by the delivery keys $K_d$. The electronic distribution service center 1 transmits three delivery keys $K_d$ being the versions 4 through 6 that are usable from April 2000 until June 2000 to the home server 51, and the home server 51 receives the three delivery keys $K_d$, overwrites the delivery keys $K_d$ that are stored before the receipt with the received keys, and stores the new delivery keys $K_d$. The electronic distribution service center 1 stores the delivery keys $K_d$ being the versions 1 through 9 and the individual keys $K_i$ as they are. This is for the purpose of making the delivery keys $K_d$ utilized in the past to be available when an unexpected trouble occurs, or an illegality occurs or is found.

During the period from Apr. 1, 2000 until Apr. 30, 2000, the delivery key $K_d$ and the individual key $K_i$ being the version 4 are utilized in the home server 51 forming the electronic distribution service center 1, the content provider 2, and the user home network 5.

In this way, by distributing the delivery keys $K_d$ and the individual keys $K_i$ of the future months in advance, even if a user does not access the center at all for one or two months, the user can purchase contents for the time being, and can received the keys by accessing the center in a timely manner.

History data management section 15 (FIG. 2) of the electronic distribution service center 1 maintains and manages charge information that is information indicating results of utilization of the contents collected by the user management section 18, price information (any one or both of information sent from the service provider 3 and information added to the charge information and sent by the user) corresponding to the contents, if necessary, and a handling policy (any one or both of information sent from the content provider 2 and information added to the charge information and sent by the user) corresponding to the contents, if necessary, and outputs data when the service provider management section 11, the content provider management section 12 or the like utilizes the charge information, the utilization history or the like. Further, the price information and the handling policy may not be sent from the service provider 3 or the content provider 2, if necessary data is written in the charge information. Profit distribution section 16 calculates profits of the electronic distribution service center 1, the content provider 2 and the service provider 3 based on the charge information, the price information, if necessary, and the handling policy supplied from the history data management section 15. The information is supplied to receipt and disbursement section 20, and in some cases, profit distribution is performed via the receipt and disbursement section 20, or in other cases, payment distribution is not performed and only the information is transmitted to the service provider management section 11, the content provider management section 12, and the copying right management section 13, sales itself is paid to the service provider, and the service provider 3 distributes the profit to each beneficiary. Mutual authentication section 17 executes mutual authentication to be described later with predetermined apparatuses in the content provider 2, the service provider 3 and the user home network 5.

The user management section 18 has a user registration database, and when receiving a request for registration from an apparatus of the user home network 5, retrieves through the user registration database, and prepares registration information to the effect that the apparatus is to be registered or to be rejected registration or the like depending on the recorded contents. When the user home network 5 is composed of a plurality of apparatuses having a function capable of connecting to the electronic distribution service center 1, the user management section 18 provides for an apparatus to be settled in the registration information, registers a settlement ID, and further provides for a scope of apparatuses forming the user home network, provides for information such as suspension of trade, and transmits the information to a predetermined apparatus (an apparatus that can be settled) of the user home network 5.

An example of the user registration database shown in FIG. 7 illustrates a registration state for each network group established in the user home network 5, and a group ID indicating a group, an ID peculiar to an apparatus forming the home network 5, and information corresponding to the ID such as whether or not connection is possible with the electronic distribution service center 1, whether or not settlement processing is possible, whether or not contents can be purchased, which apparatus performs the settlement processing, which apparatus requests purchase of the contents, whether or not registration is possible, or the like are recorded in each group.

The group ID recorded in the user registration database is allocated to each user home network, and settlement and update of information are performed by this group unit. Therefore, in principle, a representative apparatus in the group collectively performs communication, settlement processing and information update with the electronic distribution service center 1, and other apparatuses in the group do not directly communicate with the electronic distribution service center 1. The ID recorded in the user registration database is the ID allocated to each apparatus separately and is used for identifying an apparatus.

Information on whether or not connection with the electronic distribution service center 1 recorded in the user registration database is possible indicates whether or not it possible to physically connect with the electronic service center 1, and even an apparatus recorded as capable of connecting, other than an apparatus recorded as capable of performing settlement processing, cannot be connected to the electronic distribution service center 1 in principle. (However, if a representative apparatus in a group does not perform settlement processing operation due to some reason, an apparatus can be temporarily connected to the electronic distribution service center 1 as a proxy.) In addition, an apparatus recorded as not capable of connecting outputs charge information or the like to the electronic distribution service center 1 via an apparatus capable of performing settlement processing of the user home network 5.

Information on whether or not the settlement processing recorded in the user registration database is possible indicates whether or not the apparatus can make a settlement. When the user home network 5 is composed of a plurality of apparatuses that are capable of performing purchase or the like of utilization right of contents, one apparatus that can perform settlement processing among the apparatuses transmits charge information, price information, if necessary, and a handling policy of all the apparatuses registered in the electronic distribution service center 1 of the user home network 5 to the electronic distribution service center 1, and receives the delivery key $K_d$ and the registration information from the electronic distribution service center 1 according to the completion of the settlement processing. In this way, processing of the electronic distribution service center 1 is reduced compared with performing processing for each apparatus.

Information on whether or not purchase processing recorded in the user registration database indicates whether or not the apparatus can purchase the utilization right of contents. An apparatus that is incapable of purchasing obtains the utilization right of the contents by performing proxy purchase (this means that another apparatus purchases the right and all the right is assigned. No right remains in the supplier side) of the utilization right from another apparatus capable of purchasing, re-distribution (this means a method in which the utilization right of contents already purchased is purchased again with identical contents of the utilization right or different contents of the utilization right and supplied to another apparatus. In this case, no right remains in the supplier side. Main purpose of re-distribution is to make a discount. The privilege of discount is granted on condition that an apparatus belongs to a group that uses an identical settlement ID. This is because processing burden of the electronic distribution service center 1 is reduced in processing within the group using the identical settlement ID, and therefore a discount is granted in return), or management transfer (although a content reproduction right, particularly an indefinite reproduction right can be transferred, which apparatus is a reproduction right receiver is managed in a reproduction right transmitter, and when the reproduction right is not returned, the management transfer cannot be performed at all again, and the reproduction right can only be returned to the reproduction right transmitter that gave the reproduction right).

Here, a utilization method/a utilization right and purchase method of contents will be briefly described. As a utilization method of contents, there are two methods, namely a method in which a user itself manages and maintains the utilization right of contents, a method in which a user executes the utilization right held by another apparatus and utilizes the right in the user's own apparatus. As the utilization right of contents, there are an unlimited reproduction right (a right without any limit on a period and the number of times of reproduction of contents; if the contents is music contents, the reproduction is sound reproduction, and if the contents is a game program or the like, the reproduction is execution), a reproduction right with limited number of times (a right with the number contents can be reproduced is limited), an unlimited copying right (a right without any limit on a period and the number of times of copying contents), a copying right with limited number of times (a right with limit on the number of times of copying contents) (as a copying right, there are a copying right without copy management information, a copying right with copy management information (SCMS), other copying rights for special purpose media, and the like) (in addition, in some cases, there is a copying right with a limit of time), and a management transfer right. As a method of purchasing the utilization right, there are utilization right content change for changing contents of the utilization right already purchased to other contents, redistribution for separately purchasing the utilization right based on the right already purchased by another apparatus, proxy purchase for having another apparatus to purchase the utilization right on behalf of the user's apparatus, album purchase for collectively purchasing and managing a plurality of contents utilization rights, and the like in addition to ordinary purchase for directly purchasing the abovementioned utilization rights.

Information written in a proxy settler recorded in the user registration database indicates an ID of an apparatus which is made to transmit charge information generated when the utilization right of contents is purchased to the electronic distribution service center 1 on behalf of the user's apparatus.

In formation written in a proxy purchaser recorded in the user registration database indicates an ID of an apparatus which performs purchase of the utilization right on behalf of an apparatus that is incapable of purchasing the utilization right of contents. However, if all the apparatuses within the group that can perform purchase processing are appointed as proxy purchasers, it is not specifically necessary to make a record.

Information on whether or not a registration recorded in the user registration database is possible is updated based on information on outstanding charge, illegal processing or the like supplied from a settlement organization (e.g., a bank) or a credit card company. In response to a request for registration of an apparatus having an ID that is recorded as registration unavailable, the user management section 18 rejects its registration, and the apparatus rejected registration not only cannot purchase contents of this system but also cannot transmit or receive data between other apparatuses within the user home network 5 thereafter. In addition, in some cases, utilization of purchased contents is also limited. (However, an apparatus may be registered again after it is brought in the electronic distribution service center 1 or the like and completed inspection.) In addition, a state such as "settlement unprocessed," "temporary suspension" or the like may exist in addition to "registration available" and "registration unavailable."

In addition, the user management section 18 is supplied charge information, registration information, price information, if necessary, and a handling policy from an apparatus in the user home network 5, an outputs the charge information, price information and the handling policy to the history data management section 15 and supplies the delivery key $K_d$ and the registration information to the apparatus in the user home network 5. Timing for supplying will be described later.

Here, the registration information will be described with reference to FIG. 8. Registration information of FIG. 8 is added a settlement ID and a signature in addition to information in the user registration database, and only includes information of an identical settlement group. The settlement ID indicates an ID of a user within the user information database (e.g., a bank account number and a credit card number) that charge billing section 19 and the receipt and disbursement section 20 use when performing settlement. Generation of a signature will be described later.

Returning to FIG. 2, the charge billing section 19 calculates a charge to a user based on the charge information, the price information, if necessary, and the handling policy supplied from the history data management section 15, and supplies the results to the receipt and disbursement section 20. In addition, the charge billing section 19 supplies settlement information to the user via the user management section 18, if necessary. The receipt and disbursement section 20 communicates with an external bank or the like (not shown) based on the amounts of disbursements and utilization fees to be collected to and from the user, the content provider 2 and the service provider 3, and executes settlement processing. Further, in some cases, the receipt and disbursement section 20 sends all the sales to the service provider 3, and the service provider 3 distributes profits based on distribution money information transmitted via the profit distribution section 16. An audit section 21 audits justification of the charge information, the price information and the handling policy supplied from the apparatus in the user home network 5 in view of the handling policy supplied from the content provider 2 and the price information supplied from the service provider 3.

In addition, as the processing of the audit section 21, there are processing for auditing matching of an amount inputted from the user home network 5 and a total amount of distributed profits or an amount sent to the service provider 3, and processing for auditing whether or not, for example, a content provider ID and a service provider ID that could not exist or a share, a price or the like that are improbable exist in data within the charge information supplied from the apparatus in the user home network 5.

The authentication station 22 generates a certificate of the public key supplied from the key server 14, supplies the certificate to the content provider 2 and the service provider 3, and also generates a public key certificate to be stored in a mass storage section 68 (to be described later) of the home server 51 and in small storage section 75 (to be described later) of a fixed apparatus 52 when a user apparatus is manufactured. If the content provider 2 does not perform authoring of contents, as an alternative method, there are a content server 23 for holding the contents and a content authoring 24.

Figure 9:
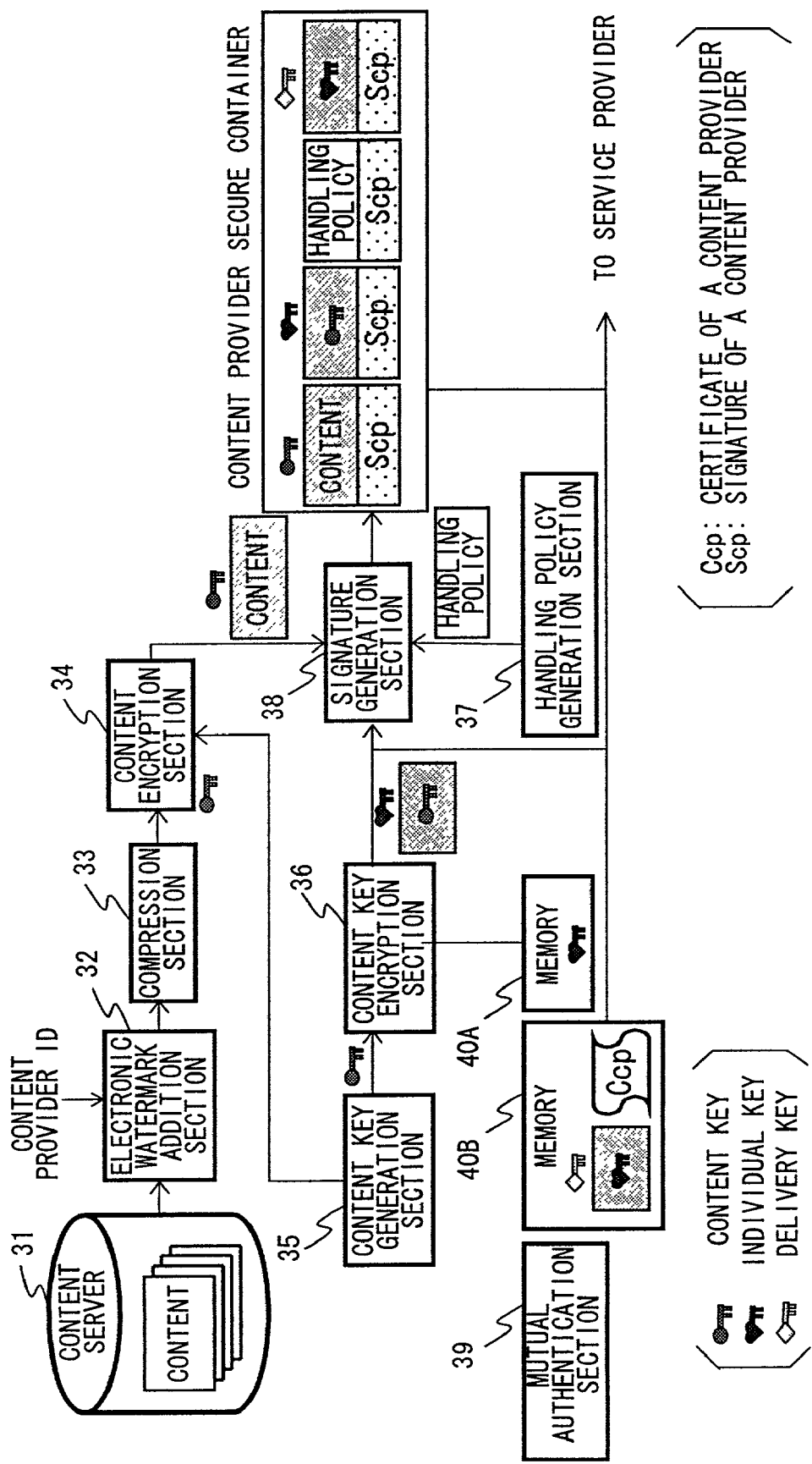
FIG. 9 is a block diagram showing configuration of a contents provider.

FIG. 9 is a block diagram showing a configuration of functions of the content provider 2. The content server 31 stores contents to be supplied to a user, and supplies the contents to an electronic watermark adding section 32. The electronic watermark adding section 32 inserts a content provider ID in the contents supplied from the content server 31 in the form of an electronic watermark indicating the contents are properties of the user, and supplies the contents to a compression section 33. The compression section 33 compresses the contents supplied from the electronic watermark adding section 32 by the method of ATRAC (Adaptive Transform Acoustic Coding) (trademark) or the like, and supplies the contents to a content encryption section 34 that is content encryption means. Incidentally, a method such as MP3, AAC or the like can be used as a compression method instead of ATRAC. The content encryption section 34 encrypts the contents compressed by the compression section 33 by a common key encryption method such as DES (Data Encryption Standard) using a key supplied from a content key generation section 35 (the key is hereinafter referred to as a content key $K_{co}$ 9), and outputs the results to a signature generation section 38 that is transmission means.

The content key generation section 35 generates random numbers of a predetermined number of bits to be the content key $K_{co}$, and supplies the random numbers from which bit rows inappropriate for encryption called a weak key (e.g., $K_{co}$=1E1E1E0E0E0E0E, 1EE01EE00EF00EF0 or the like) are removed to the content encryption section 34 and the content key encryption section 36. When an encryption algorithm without such an inappropriate bit row is used, processing for removing an inappropriate bit row is unnecessary. The content key encryption section 36 encrypts the content key $K_{co}$ by a common key encryption method such as DES using the individual key $K_i$ supplied from the electronic distribution service center 1, and outputs the results to the signature generation section 38. Incidentally, the encryption method is not limited to DES, and a public key encryption method such as RSA (Rivest, Shamir, Adleman) may be used.

DES is the encryption method for processing with 64 bits of plain text as one block using a common key of 56 bits. Processing of DES consists of a part for agitating a plain text to convert it to an encryption text (a data agitation section) and a part for generating a key (enlarged key) to be used in the data agitation section from the common key (a key processing section). Since al the algorithms of DES are made public, only basic processing of the data agitation section will be briefly described.

First, the plain text 64 bits are divided into H0 of the upper 32 bits and L0 of the lower 32 bits. An output of an F function that is the agitated L0 of the lower 32 bits with the enlarged key K1 of 48 bits supplied from the key processing section and L0 of the lower 32 bits as inputs. The F function consists of two types of basic conversions of "letter replacement" for replacing a numeral value with a predetermined rule and "permutation" for changing a bit position with a predetermined rule. Then, H0 of the upper 32 bits and the output of the F function are exclusively logically summed, and the results are designated as L1. L0 is designated as H1.

Based on H0 of the upper 32 bits and L0 of the lower 32 bits, the above-mentioned processing is repeated sixteen times, and the resulted H16 of the upper 32 bits and L16 of the lower 32 bits are outputted as an encrypted text. Decryption is realized by tracing the above-mentioned procedures conversely using the common key used for encryption.

Further, although DES is shown as a common key encryption in this embodiment, either FEAL (Fast Encryption Algorithm), IDEA (International Data Encryption Algorithm), or E2 proposed by NTT (trademark) or AES (Advanced Encryption Standard) that is the next encryption standard of the United States may be used.

A handling policy generation section 37 generates a handling policy of contents and outputs the handling policy to the signature generation section 38 corresponding to contents to be encrypted. Further, in some cases, the handling policy generation section 37 supplies the generated a handling policy to the electronic distribution service center 1 via communicating means (not shown), and the data is maintained and managed. The signature generation section 38 adds an electronic signature to the encrypted content key $K_{co}$, the encrypted individual key $K_i$ and the handling policy, and transmits them to the service provider 3 together with a certificate $C_{cp}$ of the content provider 2. (The encrypted contents, the encrypted content key $K_{co}$, the encrypted individual key $K_i$ and the handling policy to each of which the electronic signature is added using a secret key of the content provider 3 are hereinafter referred to as a content provider secure container.) Further, one signature may be added to entire data instead of adding a signature separately to respective data.

A mutual authentication section 39 mutually authenticates with the electronic distribution service center 1, and mutually authenticate with the service provider 3 prior to transmitting the content provider secure container to the service provider 3, if necessary. Since a memory 40A holds the individual key $K_i$ that the content provider 2 must hold secretly, a tamper resistant memory that is not easily read by a third party is desired, but no specific hardware limitation is necessary. (For example, the memory may be a hard disk existing in a room to which entry is managed, a hard disk of a personal computer that is managed by a password, or the like.) In addition, since a memory 40B only stores the individual key $K_i$ that is encrypted by the delivery key $K_d$ and the public key certificate of the content provider 2, the memory may be any ordinary storage device or the like since it is information made public, there is no need to keep it secret). Further, the memories 40A and 40B may be united.

The signature, which is attached to data or a certificate to be described later, is data for checking tamper and authenticating a person preparing the certificate, and is prepared by finding a hash value by a hash function based on data that is desired to be transmitted and using a secret key of a public key encryption.

The hash function and the signature will be described. The hash function is a function for obtaining predetermined data that is desired to be transmitted, compressing the data into data with a predetermined bit length, and outputting the data as a hash value. The hash function has a characteristic that is difficult to estimate an input from the hash value (output), and when one bit of the data inputted in the hash function changes, many bits of the hash value change, and it is difficult to find out input data having the identical hash value. As the hash function, MD (Message Digest) 4, MD 5, SHA (Secure Hash Algorithm)-1 and the like are used.

Figure 10:
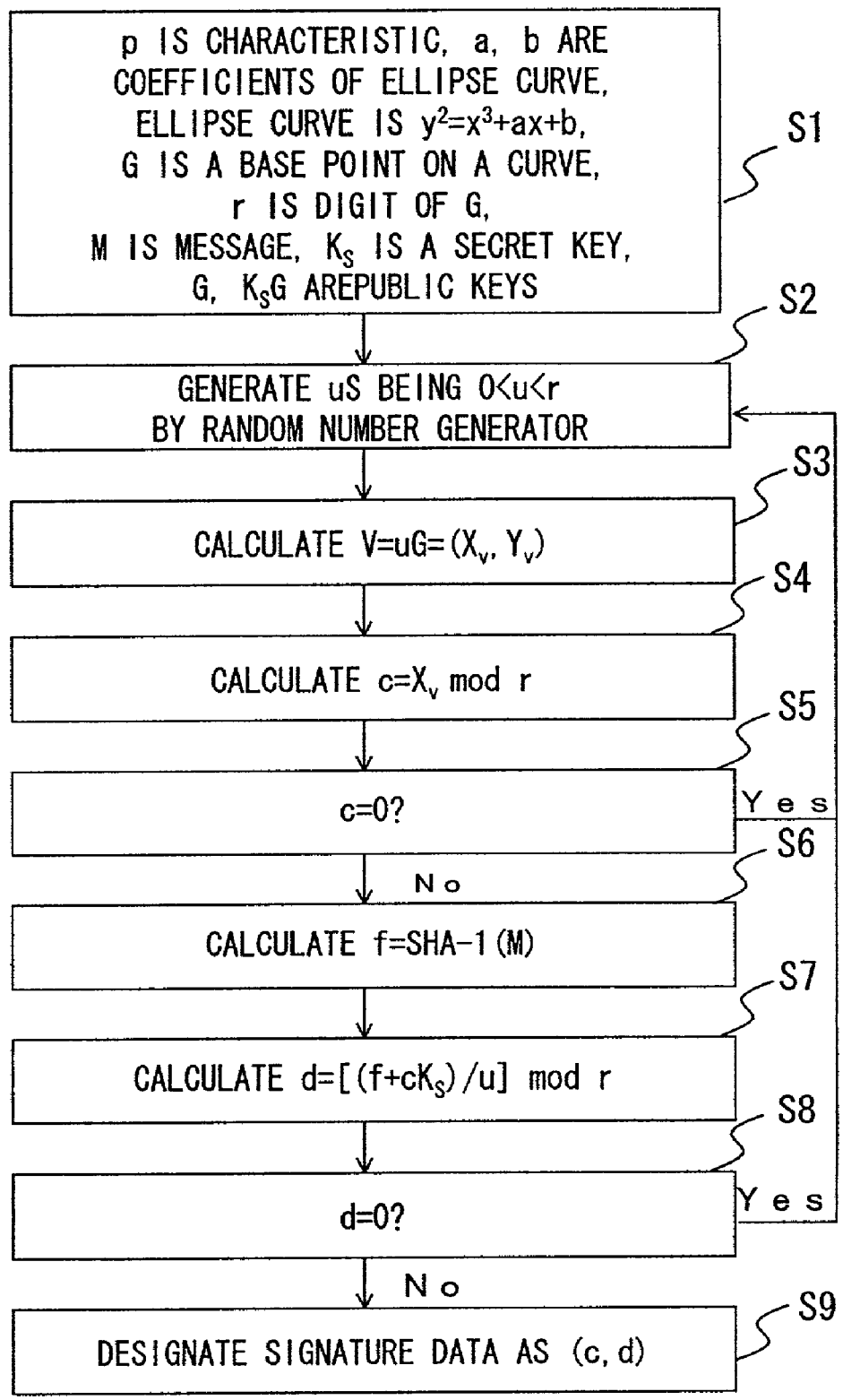
FIG. 10 is a flowchart showing a procedure for generating a signature.

The signature generation section 38 of a transmission apparatus (the content provider 2) for transmitting data and a signature, for example, generates a signature using an elliptical curve encryption that is a public key encryption method. The processing will be described with reference to FIG. 10 (EC-DSA (Elliptic Curve Digital Signature Algorithm), IEEE P1363/D3). In step S1, M is a message, p is a characteristic, a and b are coefficients of an elliptic curve (elliptic curve: $y^2=x^3+ax+b$), G is a base point on the elliptic curve, r is a digit of G, and $K_s$ is a secret key ($0<K_s<r$). In step S2, a random number u is generated by the random number generation unit such that $0<u<r$. In step S3, coordinates where the base point is multiplied by u are calculated. Further, an addition on the elliptic curve and a two times multiplication are defined as follows:

When $P=(X_0, Y_0)$, $Q=(X_1, Y_1)$ $R=(X_2, Y_2)=P+Q$, and $P \neq Q$, $$X_2=\lambda^2-X_0-X_1$$

$$Y_2=\lambda(X_0-X_2)-Y_0$$

$$\lambda=(Y_1-Y_0)/(X_1-X_0)$$

When $P=Q$, $$X_2=\lambda^2-2X_0$$

$$Y_2=\lambda(X_0-X_2)-Y_0$$

$$\lambda=(3X_0^2+a)/2Y_0$$

and u times the point G is calculated using the above equations (Most understandable though slow operation method is as follows: calculate G, 2G, 4G . . . , and add to where there is 1 by binary number developing u corresponding $(2^1) \times G$ (i is a bit position when counted from LSB of u)). In step S4, $c=X_v$ mod r is calculated, in step S5, it is determined if the value is 0, and if it is not 0, the processing proceeds to step S6, where the hash value of the message M is calculated, and f=SHA-1 (M) Then, in step S7, $d=[(f+cK_s)/u]$ mod r is calculated, and in step S8, it is determined if d is 0. If d is not 0, c and will be signature data. Assuming that r has the length of 160 bits, the signature data has 320 bit length.

In step S5, if c is 0, the processing returns to step S2 and a new random number is generated. If d is 0 in step S8, the processing also returns to step S2 and another random number is generated.

Figure 11:
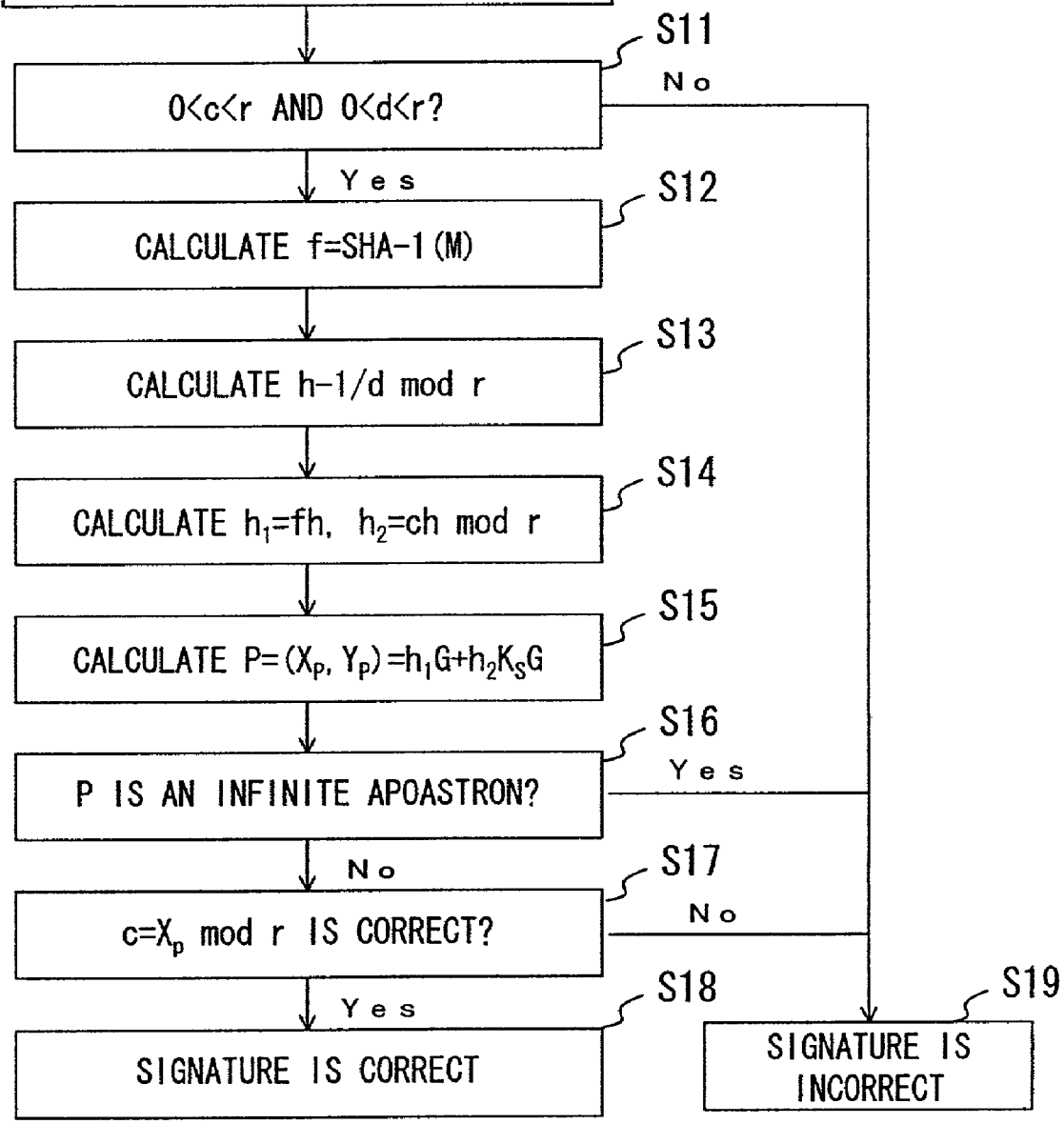
FIG. 11 is a flowchart showing a procedure for verifying a signature.

A receiving apparatus (the user home network 5) having received the signature and the data, for example, verifies the signature using the elliptic curve encryption that is a public key encryption method. The processing will be described with reference to FIG. 11. In step S10, M is a message, p is a characteristic, a and b are coefficients of the elliptic curve (elliptic curve: $y^2=x^3+ax+b$), G is a base point on the elliptic curve, r is a digit of G, G and $K_sG$ are public keys ($0<K_s<r$). In step S11, it is inspected if the signature data c and d satisfy $0<c$, $d<r$. If the signature data satisfy this, in step S12, the hash value of the message M is calculated, and f=SHA-1 (M). Then, in step S13, h=1/d mod r is calculated, and in step S14 $h_1$=fh, $h_2$=ch mod r is calculated. In step S15, $P=(X_p, Y_p)=h_1G+h_2K_sG$ is calculated using already calculated $h_1$ and $h_2$. Since a verifier of the signature knows the public keys G and $K_sG$, calculation can be made as in step S3. Then, in step S16, it is determined if P is an infinite apoastron, and if it is not an infinite apoastron, the processing proceeds to step S17 (in fact, the determination of the infinite apoastron is completed in step S15. That is, when an addition of P=(X, Y), Q=(X, −Y) is performed, it has been found that the aforementioned X cannot be calculated, and R is the infinite apoastron. In step S17, $X_p$ mod r is calculated, and the result is compared with the signature data c. If both the values match, the processing proceeds to step S18, and it is determined that the signature is correct.

If the signature is determined to be correct, it is seen that the received data is not tampered, and is the data transmitted from the transmission apparatus holding the secret key corresponding to the public key.

In step S11, if the signature data c and d do not satisfy $0<c$, $d<r$, the processing proceeds to step S19. In addition, in step S16, if P is the infinite apoastron, the processing also proceeds to step S19. Moreover, in step S17, if the value of $X_p$ mod r does not match the signature data c, the processing also proceeds to step S19. In step S19, it is determined that the signature is not correct.

If it is determined that the signature is not correct, it is seen that the received data is tampered or is not data transmitted from the transmission apparatus holding the secret key corresponding to the public key.

Further, although SHA-1 is used as the hash function in this embodiment, any function such as MD4, MD 5 and the like may be used. In addition, generation and verification of a signature may be performed using an RSA encryption (ANSI X9.31-1).

Encryption and decryption of the public key encryption method will now be described. Contrary to the common key encryption method using an identical key (common key) in encryption and decryption, the public key encryption method uses different keys to be used for encryption and decryption respectively. If the public key encryption method is used, even if one key is made public, the other key can be kept secret, and the key that may be made public is called a public key and the other key that should be kept secret is called a secret key.

Figure 12:
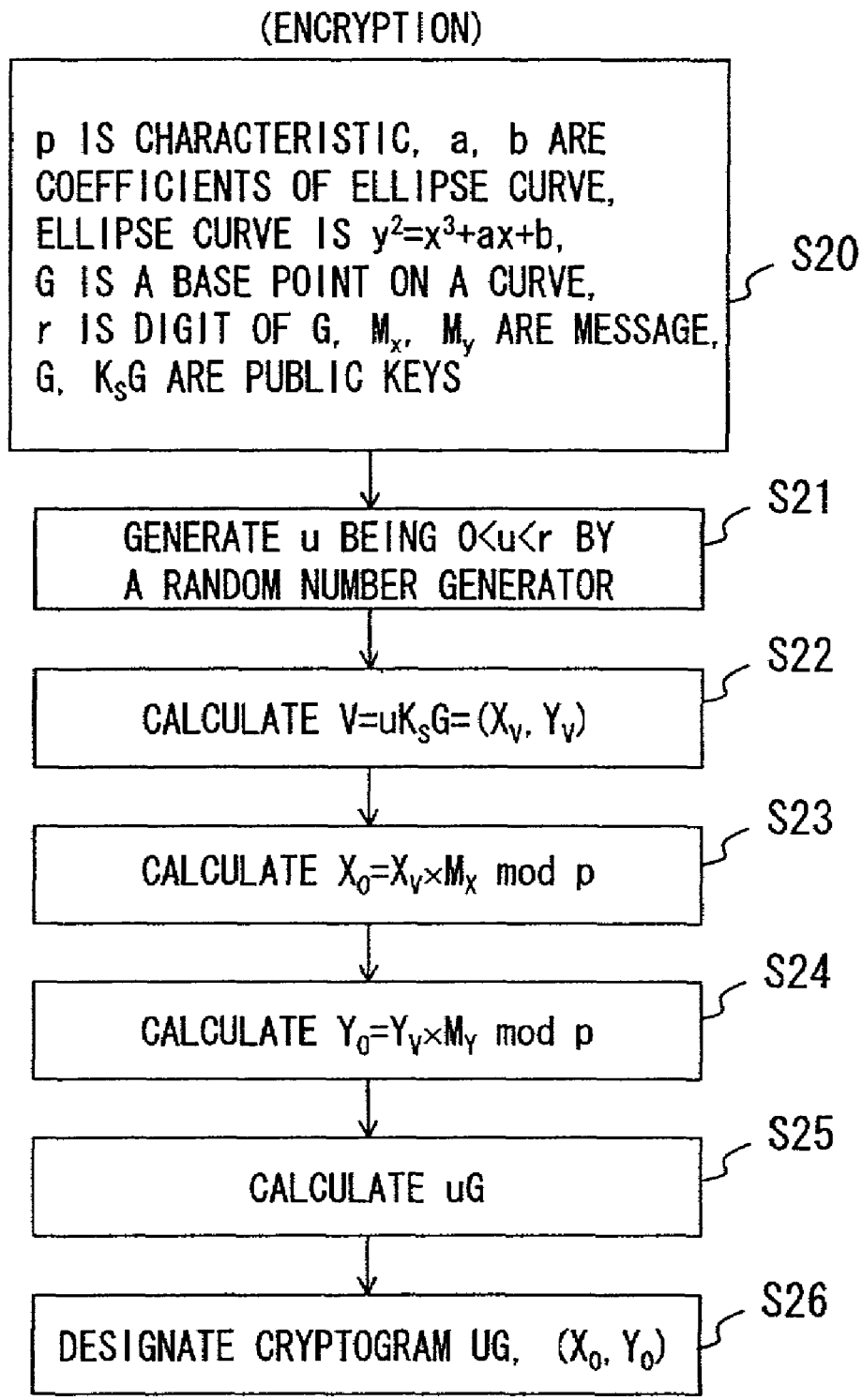
FIG. 12 is a flowchart showing a method of elliptic curve encryption.

The elliptic curve encryption method that is representative of the public key encryption method will be described. In FIG. 12, in step S20, $M_x$ and $M_y$ are messages, p is a characteristic, a and b are coefficients of an elliptic curve (elliptic curve: $y^2=x^3+ax+b$), G is a base point on the elliptic curve, r is a digit of G, G and $K_sG$ are public keys ($0<K_s<r$). In step S21, a random number u is generated such that $0<u<r$. In step S22, coordinates V that are u times the public key $K_sG$. Further, since scalar times on the elliptic curve is identical with the method described in the signature generation, description is omitted here. In step S23, the X coordinates of V are multiplied by $M_x$ to find a balance by p, which is $X_0$. In step S24, the Y of V is multiplied by $M_y$ to find a balance by p, which is $Y_0$. Further, if the length of the message is smaller than the number of bits of p, $M_y$ uses a random number, and My is cancelled in the decryption section. In step S25, uG is calculated, and in step S26, a cryptogram uG, ($X_0$, $Y_0$) is found.

Decryption of the public key encryption method will now be described with reference to FIG. 13. In step S30, uG, ($X_0$, $Y_0$) is cryptogram data, p is a characteristic, a and b are coefficient of an elliptic curve (elliptic curve: $y^2=x^3+ax+b$), G is a base point on the elliptic curve, r is a digit of G, and $K_s$ is a secret key ($0<K_s<r$). In step S31, the encryption data uG is multiplied by the secret key $K_s$. In step S32, the X coordinates of ($X_0$, $Y_0$) among the encryption data is taken out, and $X_1=X_0/X_v$ mod p is calculated. In step S33, $Y_1=Y_0/Y_v$ mod p is calculated. Then, in step S34, $X_1$ is $M_x$ and $Y_1$ is $M_y$ to take out the message. Then, if $M_y$ is not the message, $Y_1$ is cancelled.

In this way, in the public key encryption method, with the secret key being $K_s$ and the public keys being G, $K_sG$, a key to be used for encryption and a key to be used for decryption may be different keys.

In addition, as another example of the public key encryption method, the RSA encryption (Rivest, Shamir, Adleman) is known.

Figure 14:
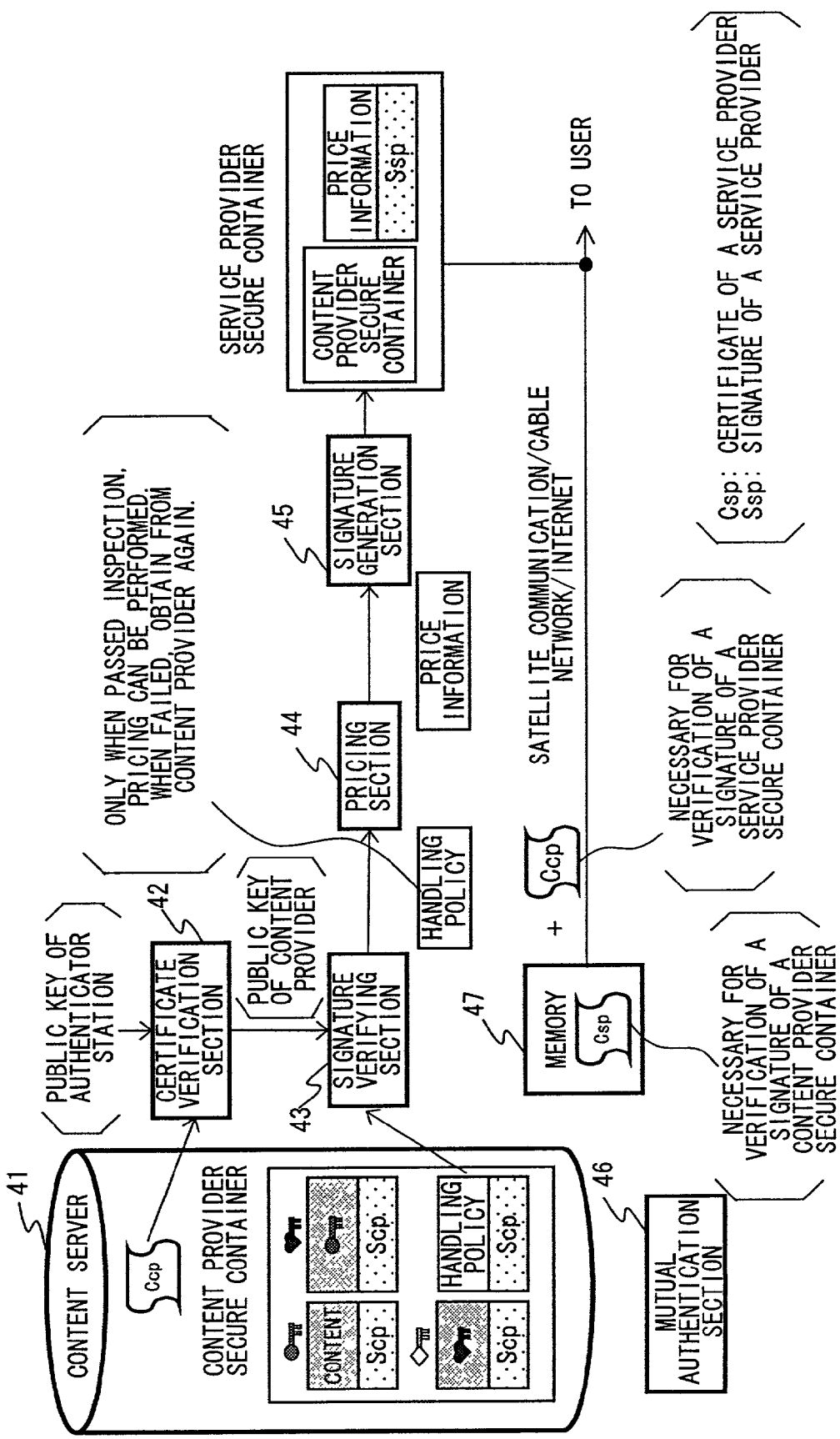
FIG. 14 is a block diagram showing configuration of a service provider.

FIG. 14 is a block diagram showing a configuration of the service provider 3. A content sever 41 stores the public key certificate and the encrypted contents of the content provider 2 that are supplied from the content provider 2. The public key certificate of the content provider 2 is verified a signature on the certificate by the public key of the authentication station 22 in a certificate inspection section 42, and if the verification is successful, the public key of the content provider 2 is supplied to the signature verification section 43. In the signature verification section 43, the signature of the content provider 2 with respect to the handling policy stored in the content server 41 is verified using the public key of the content provider 2 that is verified before, and if the verification is successful, the handling policy are supplied to a pricing section 44. In the pricing section 44, price information is prepared from the handling policy and supplied to a signature generation section 45. In the signature generation section 45, a signature with respect to the price information is generated using the secret key of the service provider 3 held in a tamper resistant memory (not shown) (as in 40A of the content provider 2) (the content provider secure container and the price information with an electronic signature added using the secret key of he service provider 3 are hereinafter referred to as a service provider secure container). Further, one signature may be generated for the entire content provider secure container and price information instead of adding a signature to the price information. Then, the service provider secure container, the public key certificate of the content provider 2 and the public key certificate of the service provider 3 are supplied to the user home network 5 via the network 4 (FIG. 1). A mutual authentication section 46 mutually authenticates with the electronic distribution service center, and if possible, mutually authenticates with the user home network 5 via the content provide, the Internet, cable communication or the like, if necessary.

Figure 15:
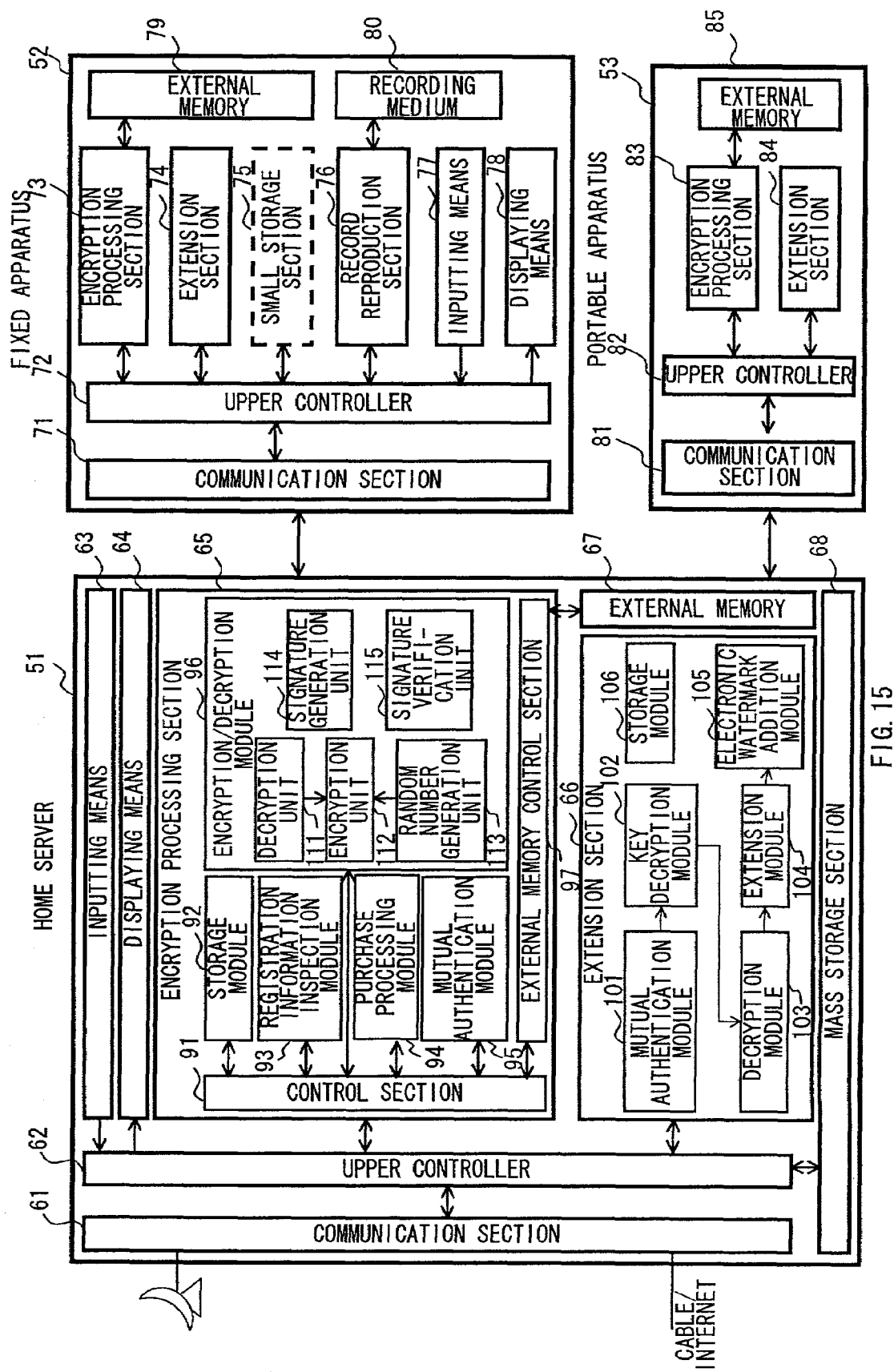
FIG. 15 is a block diagram showing configuration of a user home network.

FIG. 15 is a block diagram showing a configuration of the user home network 5. A home server 51 receives a secure container containing contents from the service provider 3 via the network 4, purchases the utilization right of the contents, and performs decryption, extension, reproduction and copying of the contents by executing the right.

The communication section 61 communicates with the service provider 3 or the electronic distribution service center 1 via the network 4, and receives or transmits predetermined information. An upper controller 62 receives a signal from inputting means 63, displays a predetermined message or the like on displaying means 64, performing utilization right purchase processing or the like by utilizing an encryption processing section 65, supplies encrypted contents read out from mass storage section 68 to an extension section 66, and stores the encrypted contents in the mass storage section 68. The inputting means 63 transmits a signal from a remote controller or input data from an input button to the upper controller 62. The displaying means 64 is composed of a display device such as a liquid crystal display, and sends an instruction to a user and displays information. The inputting means 63 and the displaying means 64 become a touch panel liquid crystal display or the like, if necessary, ad may be united as one means. The encryption processing section 65 mutually authenticates with the service provider 3, the electronic distribution service center 1 or encryption processing sections of other apparatuses, purchases the content utilization right, and at the same time, performs encryption/decryption of predetermined data, manages an external memory that holds the content key $K_{co}$ and licensing conditions information, and further stores the delivery key $K_d$, the charge information or the like. The extension section 66 mutually authenticates with the encryption processing section 65 to receive the content key $K_{co}$, decrypts the encrypted contents supplied from the upper controller 62 using the content key $K_{co}$, extends the contents by a predetermined method such as ATRAC, and further inserts a predetermined electronic watermark in the contents. The external memory 67 is composed of a nonvolatile memory such as a flash memory or a nonvolatile memory with a back-up power source, and stores the content key $K_{co}$ decrypted by the save key $K_{save}$ and the license conditions information. The mass storage section 68 is a storage device such as an HDD or an optical disk, which stores the content provider secure container and the service provider secure container (the encrypted contents, the content key $K_{co}$ encrypted by the individual key $K_i$, the individual key $K_i$ encrypted by the delivery key $K_d$, the handling policy, the price information and the signatures on them), the public key certificate, the registration information or the like.

The encryption processing section 65 for mutually authenticating with the electronic distribution service center 1, purchasing the content utilization right and, at the same time, generating the charge information, performing decryption/encryption of predetermined data, managing an external memory holding the content key $K_{co}$ and the license conditions information, and further storing the delivery key $K_d$, the charge information or the like is composed of a control section 91, a storage module 92, a registration information inspection module 93, a purchase processing module 94, a mutual authentication module 95, an encryption/decryption module 96, and an external memory control section 97. The encryption processing section 65 is composed of a single chip IC exclusively for encryption processing, has a multi-layered structure, and has characteristics for making it difficult to read out data illegally from outside (tamper resistant feature) in that a memory cell inside is sandwiched by dummy layers such as aluminum layers and a width of voltage or frequency of operation is narrow.

The control section 91 controls each module according to a command from the upper controller 62, and at the same time, returns a result from each module to the upper controller 62. The storage module 92 stores data such as the charge information supplied from the purchase processing module 94 and the delivery key $K_d$, and supplies data such as the delivery key $K_d$ when other function blocks execute predetermined processing. The registration information inspection module 93 inspects the registration information supplied from the upper controller 62, and determined whether or not to mutually authenticate with other apparatuses in the user home network 5, whether or not to accept the charge information, whether or not to perform re-distribution or the like of the contents. The purchase processing module 94 generates license conditions information anew from the handling policy and the price information (as well as already holding license conditions information depending on a case) included in the secure container received from the service provider 3 to output to the external memory control section 97 or the control section 91, and generates charge information to output to the storage module 92. The mutual authentication module 95 executes mutual authentication with the electronic distribution service center 1, the encryption processing sections of other apparatuses in the home network 5 and the extension section 66, and generates a temporary key $K_{temp}$ (a session key), if necessary to supply to the encryption/decryption module 96.

The encryption/decryption module 96 is composed of a decryption unit 111, an encryption unit 112, a random number generation unit 113, a signature generation unit 114, and a signature verification unit 115. The decryption unit 111 decrypts the individual key $K_i$ encrypted by the delivery key $K_d$, decrypts the content key $K_{co}$ encrypted by the individual key $K_i$, and decrypts various kinds of data encrypted by the temporary key $K_{temp}$. The encryption unit 112 encrypts the decrypted content key $K_{co}$ by the save key $K_{save}$ held in the storage module 92 to output to the external memory control section 97 via the control section 91, and encrypts various kinds of data by the temporary key $K_{temp}$. The random number generation unit 113 generates a random number of a predetermined number of figures, and supplies the random number to the mutual authentication module 95 or the signature generation unit 114. The signature generation unit 114 calculates the hash value of the message supplied from the control section 91, and generates signature data using the random number supplied from the random number generation unit 113 to output to the control section 91. The signature verification unit 115 determines whether or not the signature is correct from the message and the signature data supplied from the control section, and output the results to the control section 91. Further, the generation/verification method of the signature is the same as the case described above with reference to FIGS. 10 and 11.

Figure 16:
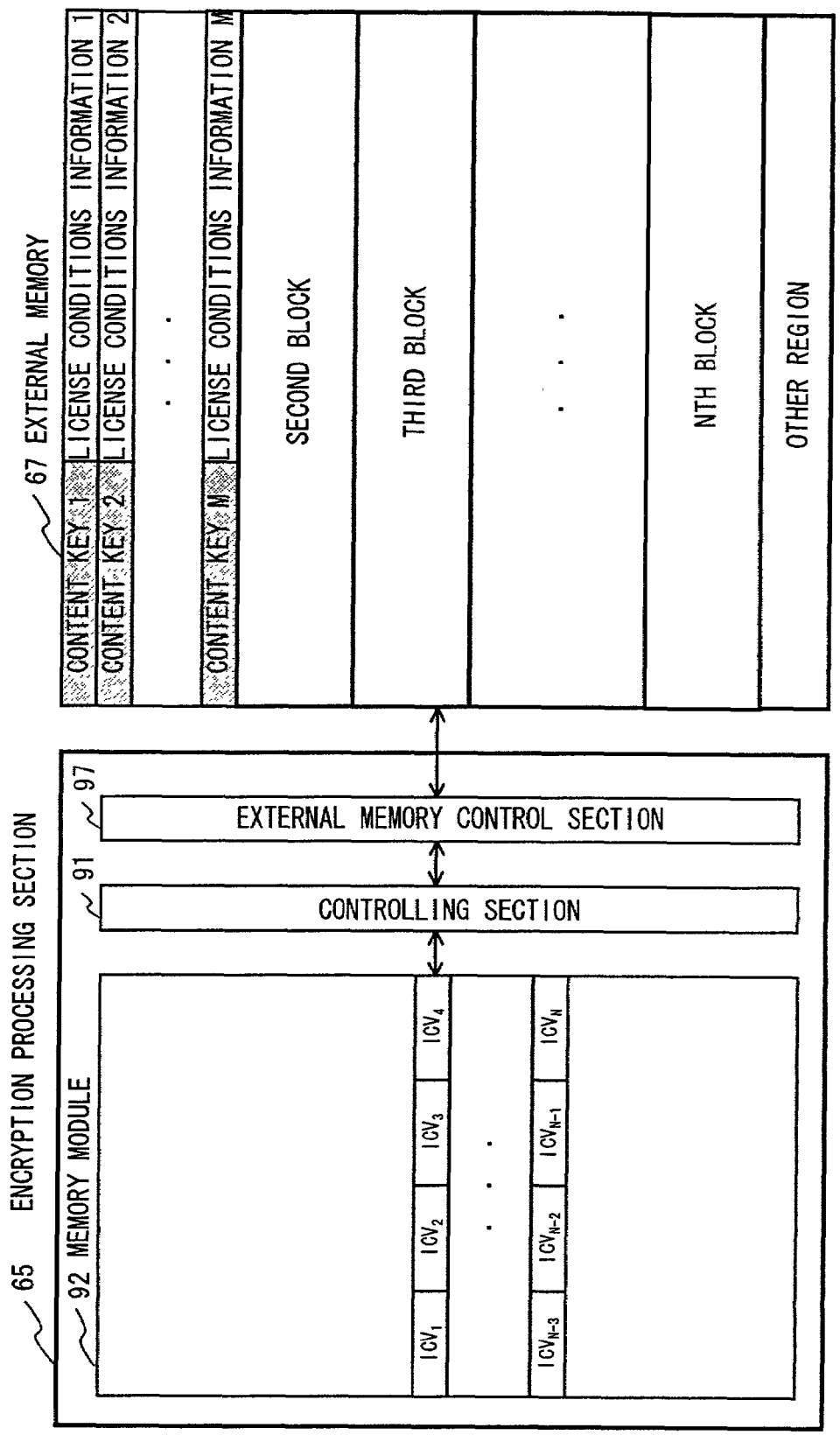
FIG. 16 is a skeleton diagram served for explanation of operation of an external memory control section.

The external memory control section 97 reads and writes data by controlling the external memory 67, and performs data verification to find if the data in the external memory has been tampered. FIG. 16 is a block diagram illustrating operations of the external memory control section 97. In FIG. 16, N hash values for preventing tampering (integrity Check Value) are stored in the storage module 92. The external memory 67 is divided into N blocks of data regions, and each data region is made such that M sets of content key $K_{co}$ and the license conditions information can be written. In addition, other regions that can be used freely are also prepared in the external memory 67. The hash value ICV for preventing tampering has a hash value for all the data in the external memory 67 corresponding to the hash value ICV. Reading procedures and writing procedures of the external memory will be described later using a flowchart.

The extension section 66 (FIG. 15) for decrypting and extending contents and adding a predetermined electronic watermark is composed of a mutual authentication module 101, a key decryption module 102, a decryption module 103, an extension module 104, an electronic addition module 105 and a storage module 106. The mutual authentication module 101 mutually authenticates with the encryption processing section 65, and outputs the temporary key $K_{temp}$ to the key decryption module 102. The key decryption module 102 decrypts by the temporary key $K_{temp}$ the content key $K_{co}$ read out from the external memory 67 and encrypted by the temporary key $K_{temp}$ to output to the decryption module 103. The decryption module 103 decrypts the contents recorded in the mass storage section 68 by the content key $K_{co}$ to output to the extension module 104. The extension module 104 further extends the decrypted contents with a method such as ATRAC to output to the electronic watermark addition module 105. The electronic watermark addition module 105 inserts to the contents the individual ID of the encryption processing section to which the purchase processing has been applied using the electronic watermark technology to output to other apparatuses or a speaker (not shown), and reproduces music.

Key data required for the mutual authentication with the encryption processing section 65 is stored in the storage module 106. Further, the extension section 66 is desirably provided with the tamper resistant feature.

The external memory 67 stores the license conditions information generated when the right is purchased in the purchase processing module 94 and the content key $K_{co}$ encrypted by the save key $K_{save}$. The mass storage section 68 records the secure container, the public key certificate, the registration information or the like supplied from the service provider 3.

The fixed apparatus 52 for recording the contents supplied from the service provider 3 in an inserted recording medium 80 such as an optical disk and a semiconductor memory and reproducing the recording media is composed of a communication section 71, an upper controller 72, an encryption processing section 73, an extension section 74, a small storage section 75, a record reproduction section 76, inputting means 77, displaying means 78, an external memory 79 and a recording medium 80. Since the communication section 71 has the same function as the communication section 61, its description is omitted. Since the upper controller 72 has the same function as the upper controller 62, its description is omitted. Since the encryption processing section 73 has the same function as the encryption processing section 65, its description is omitted. Since the extension section 74 has the same function as the extension section 66, its description is omitted. Although the small storage section 75 has the same function as the mass storage section 68, contents themselves are not stored and only the public key certificate, the registration information or the like are stored. The record reproduction section 76 has the recording medium 80 such as an optical disk and a semiconductor memory inserted therein, records contents in the recording medium 80 and output the read out contents to the extension section. Since the inputting means 77 has the same function as the inputting means 63, its description is omitted. Since the displaying means 78 has the same function as the displaying means 64, its description is omitted. Since the external memory 79 has the same function as the external memory 67, its description is omitted. The recording medium 80 is, for example, an MD (Mini Disk: trademark) or a storage medium exclusively used for electronic distribution (Memory Stick using a semiconductor memory: trademark).

A portable apparatus 53 that is carries by a user to reproduce and enjoy music is composed of a communication section 81, an upper controller 82, an encryption processing section 83, an extension section 84 and an external memory 85. Since the communication section 81 has the same function as the communication section 61, its description is omitted. Since the upper controller 82 has the same function as the upper controller 62, its description is omitted. Since the encryption processing section 83 has the same function as the encryption processing section 65, its description is omitted. Since the extension section 84 has the same function as the extension section 66, its description is omitted. Since the external memory 85 has the same function as the external memory 67, its description is omitted. However, these memories are not limited to a semiconductor memory, and may be any memory such as an HDD and a rewritable optical disk.

Figure 17:
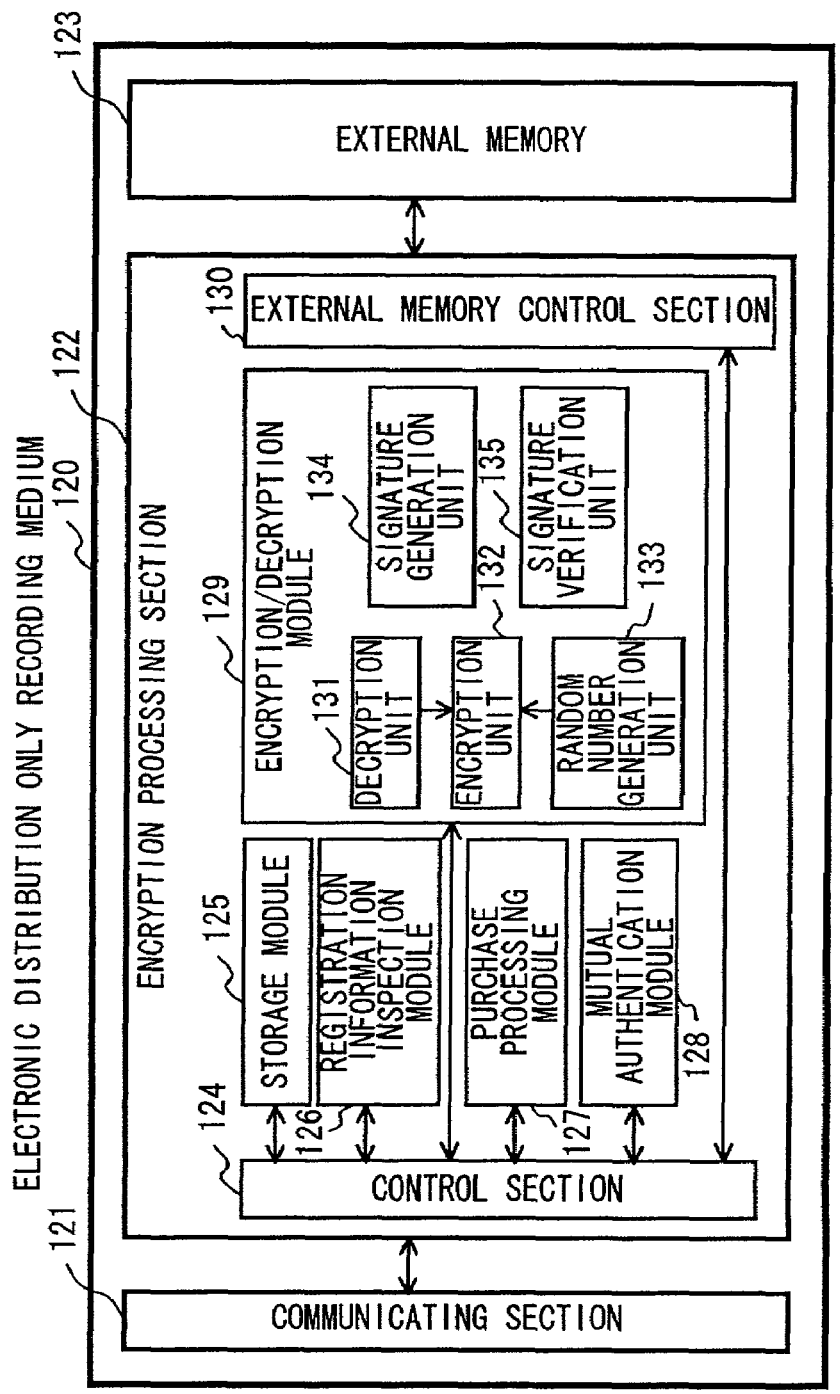
FIG. 17 is a block diagram showing configuration of a record medium dedicated to electronic distribution.

FIG. 17 illustrates a configuration of the recording media exclusively for electronic distribution. A recording medium 120 for storing electronically distributed contents is composed of a communication section 121, the encryption processing section 122, and the external memory 123. The communication section 121 performs transmission and reception of data with the record reproduction section 76 of the fixed apparatus 52 (FIG. 15). Since the encryption processing section 122 for mutually authenticating with the fixed apparatus 52, being assigned the content utilization right, performing decryption/encryption of predetermined data, managing the external memory holding the content key $K_{co}$, the license conditions information and the like, and storing the save key $K_{save}$ or the like has a configuration having the same function as the encryption processing section 65, its description is omitted. The external memory 123 stores the content key $K_{co}$ encrypted by the save key $K_{save}$, contents encrypted by the content key $K_{co}$, the license condition information providing conditions for use of the contents, a handling policy, if necessary, and price information.

The recording media exclusively for electronic distribution 120 has a method of using different from the recording medium described for the fixed apparatus 52. While the ordinary recording medium 80 is a substitute for the mass storage section 68, the recording medium exclusively for electronic distribution 120 is not different from a portable apparatus that does not have the extension section. Therefore, although an apparatus such as the fixed apparatus 52 having the extension section 74 is necessary when reproducing contents, the recording medium exclusively for electronic distribution 120 can perform processing similar to that of the home server 51 or the portable apparatus 53 concerning the function for managing the contents or the like. Due to these differences, while contents recorded in the ordinary recording medium 80 cannot be reproduced by an apparatus other than the one that has recorded the same, contents recorded in the recording medium exclusively for electronic distribution 120 can be reproduced by an apparatus other than the one that has recorded the same. That is, since the ordinary recording medium 80 only has contents encrypted by the content key $K_{co}$, the contents cannot be reproduced by an apparatus other than the one that has (has recorded) the content key $K_{co}$. On the other hand, since the recording medium exclusively for electronic distribution 120 retains not only the contents encrypted by the content key $K_{co}$ but also the content key $K_{co}$ encrypted by the save key $K_{save}$ peculiar to the recording medium exclusively for electronic distribution, the contents can be reproduced by other apparatuses.

That is, after performing mutual authentication between the mutual authentication module 128 of the encryption processing section 122 and the mutual authentication module (not shown) of the encryption processing section 73, the recording medium exclusively for electronic distribution 120 decrypts the content key $K_{co}$ by the save key $K_{save3}$, encrypts the content key $K_{co}$ by the shared temporary key $K_{temp}$ to transmit to the encryption processing section 73 for reproducing.

Figure 18:
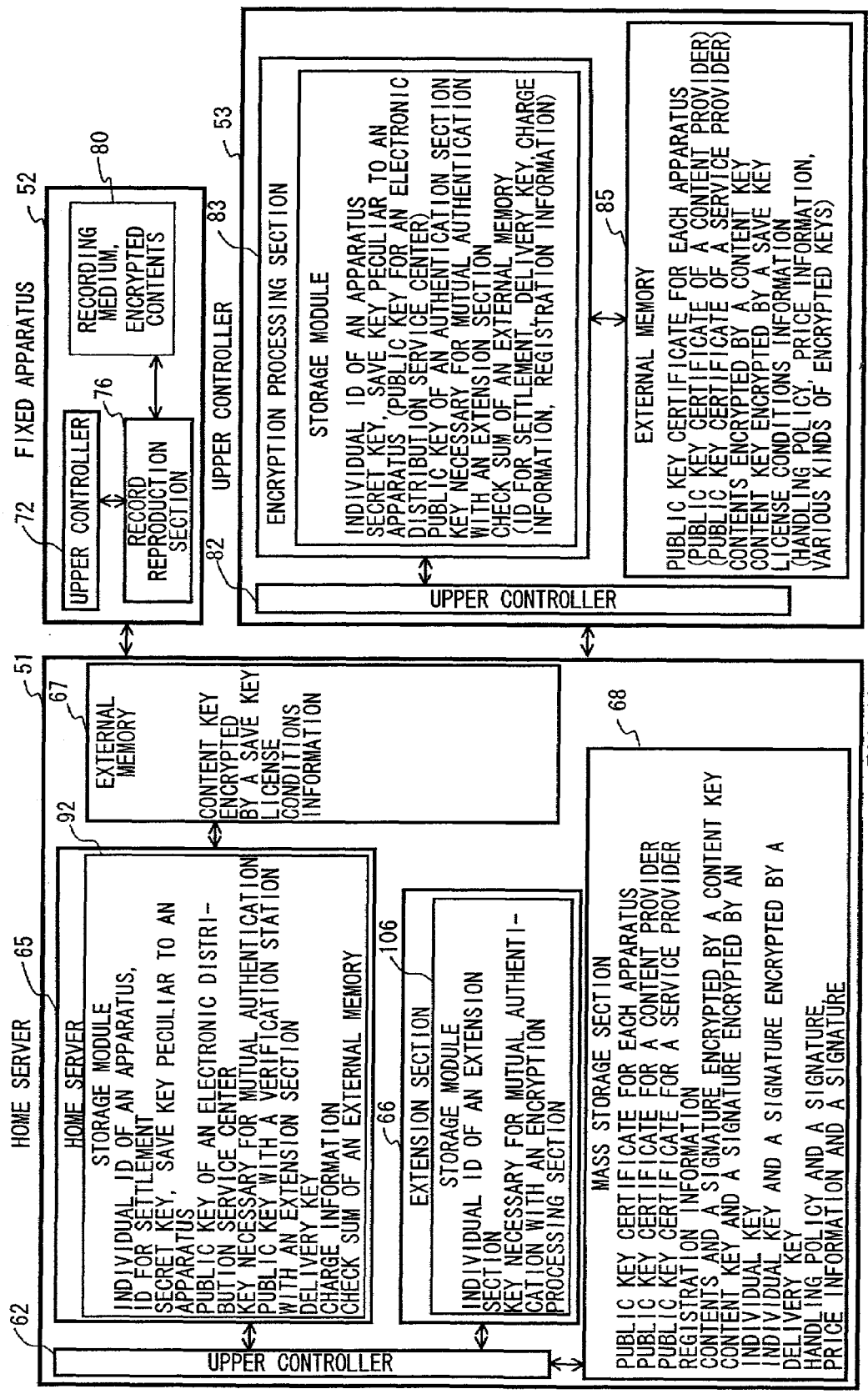
FIG. 18 is a block diagram showing data contents of the equipment.

FIG. 18 is a block diagram illustrating a data recording state in each apparatus. In the home server 51, an individual ID for specifying an apparatus (identical with the one for specifying the encryption processing section), an ID for settlement to be used for charge processing (which can be substituted by the individual ID, if necessary, or may be unnecessary because it is in the registration information), a secret key different for each apparatus, the save key $K_{save}$, the public key of the electronic distribution service center 1 to be used when mutually authenticating with the electronic distribution service center 1 (unnecessary if there is the public key certificate of the electronic distribution service center 1), the public key of the authentication station 22 for verifying the public key certificate, and the common key to be used when mutually authenticating with the extension section 66 are stored in the storage module 92 in the encryption processing section 65. These data are data that are stored in advance when an apparatus is manufactured. On the other hand, the delivery key $K_d$ to be periodically distributed from the electronic distribution service center 1, the charge information to be written upon the purchase processing, the content key $K_{co}$ held in the external memory 67, and the hash value for tamper checking of the license conditions information are data that are stored after starting use an apparatus, and are also stored in the storage module 92. The individual ID for specifying the extension section and the common key to be used when mutually authenticating with the encryption processing section 65 are stored in the storage module 106 in the extension section 66 in advance when an apparatus is manufactured. Further, since the encryption processing section 65 and the extension section 66 are associated one to one, IDs of each section may be held by respective storage modules (since the mutual authentication is performed by the common key, as a result, communication can only be made between the corresponding encryption processing section and the extension section associated with each other. However, processing may be the mutual authentication of the public key encryption method. In this case, a stored key is not the common key, but the secret key peculiar to the extension section 66.)

The content key $K_{co}$ that is encrypted by the save key $K_{save}$ to be used when contents are decrypted, and the license conditions information indicating conditions for utilizing the content key $K_{co}$ are stored in the external memory 67. In addition, the certificate (the public key certificate of an apparatus) of the public key corresponding to the secret key for each apparatus in the storage module 92, the registration information, the content provider secure container (contents encrypted by the content key $K_{co}$ and its signature, the content key $K_{co}$ encrypted by the individual key $K_i$ and its signature, the individual key $K_i$ encrypted by the delivery key $K_d$ and its signature, and the handling policy and its signature), the service provider secure container (the price information and its signature), the public key certificate of the content provider 2, and the public key certificate of the service provider 3 are stored in the mass storage section 68.

The encryption processing section 83 that is identical with the encryption processing section 65 held by the home server 51 and the external memory 85 that is identical with the external memory 67 are provided in the portable apparatus 53 (the one having the identical internal data is omitted, e.g., the extension section). However, data to be stored inside these memories is slightly different as shown in the figure. As the data retained by the storage module in the encryption processing section 83, the individual ID for specifying an apparatus, the secret key that is different for each apparatus, the save key $K_{save}$, the public key of the electronic distribution service center 1 to be used when mutually authenticating with the electronic distribution service center 1 (however, it is not necessary to have the home server 51 to perform all the procedures with the electronic distribution service center 1 on its behalf), the public key of the authentication station 22 for verifying the public key certificate, and the common key to be used when mutually authenticating with the extension section 84 are stored. These data are data that are stored in advance when an apparatus is manufactured. In addition, the hash value for checking tamper of the content key $K_{co}$ and the license conditions information to be retained in the external memory 85, the ID for settlement, if necessary, the delivery key $K_d$, and (a part of) the registration information (if the purchase processing is not performed, the ID for settlement and the delivery key $K_d$ are not necessary) are data to be stored after starting an apparatus, which are also stored (if the purchase processing is performed, the charge information is stored as well.) The certificate of the public key corresponding to the secret key for each apparatus in the encryption processing section 83, the contents encrypted by the content key $K_{co}$ and its signature (in addition, in some cases, the content key $K_{co}$ encrypted by the individual key $K_i$ and its signature, if necessary, the individual key $K_i$ encrypted by the delivery key $K_d$ and its signature, the handling policy and its signature, if necessary, and the price information and its signature are also stored), the content key $K_{co}$ encrypted by the save key $K_{save}$ to be used for decrypting the contents, the license conditions information indicating conditions for utilizing the contents are stored in the external memory 85. A public key certificate for the content provider 2 and the public key certificate for the service provider 3 are also stored, if necessary.

The recording medium 80 is provided in the fixed apparatus 52 in addition to the configuration of the home server 51. The recording medium 80 may be an ordinary MD or CD-R, or may be a storage medium exclusively for electronic distribution. In the former case, although data to be stored is decrypted contents with a copy prohibit signal added, encrypted contents may be naturally included (the content key $K_{co}$ encrypted by the save key $K_{save}$ may be stored together. Then, only an apparatus that stores the contents can reproduce the contents. This is because the save key $K_{save}$ is different for each apparatus.)

Figure 19:
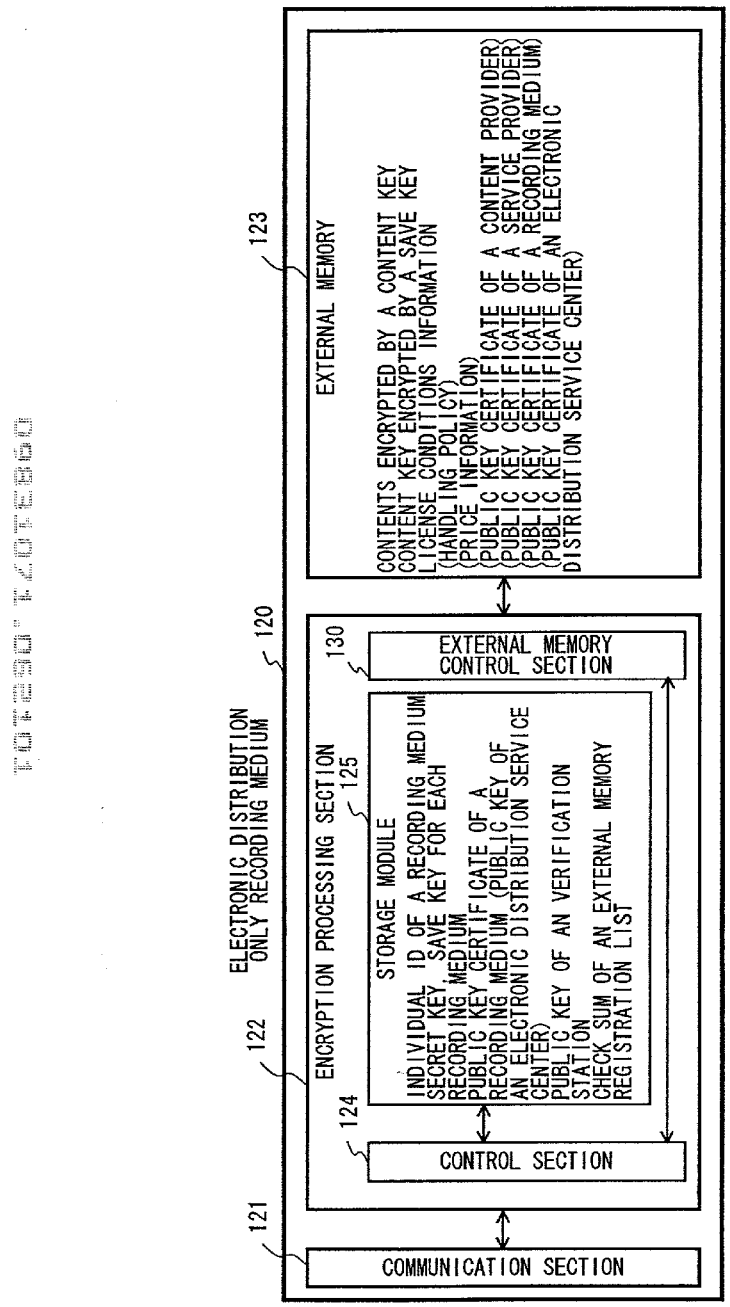
FIG. 19 is a block diagram showing data contents held by a record medium.

In addition, as the storage medium, FIG. 19 is possible. In the storage medium exclusively for electronic distribution 120, the individual ID of the recording medium, the secret key different for each recording medium, the public key certificate corresponding to the secret key (which may be recorded in the external memory 123), the save key $K_{save}$ to be used for encrypting the content key $K_{co}$ (which are generally different for each storage medium), the public key of the electronic distribution service center 1 (which is not required if there is not communication with the center or if the public key certificate of the electronic distribution service center 1 exists in the external memory 123), the public key of the authentication station, the hash value for inspecting tamper of the external memory 123, and (a part of) the registration information are stored in a storage module 125 in the encryption processing section 122. The contents encrypted by the content key $K_{co}$ (and its signature), and the content key $K_{co}$ and the license conditions information encrypted by the save key $K_{save}$ are stored in the external memory 123, and the handling policy (and its signature), the price information (and its signature), the public key certificate of the content provider 2, and the public key certificate of the service provider 3 are also stored, if necessary.

Figure 20:
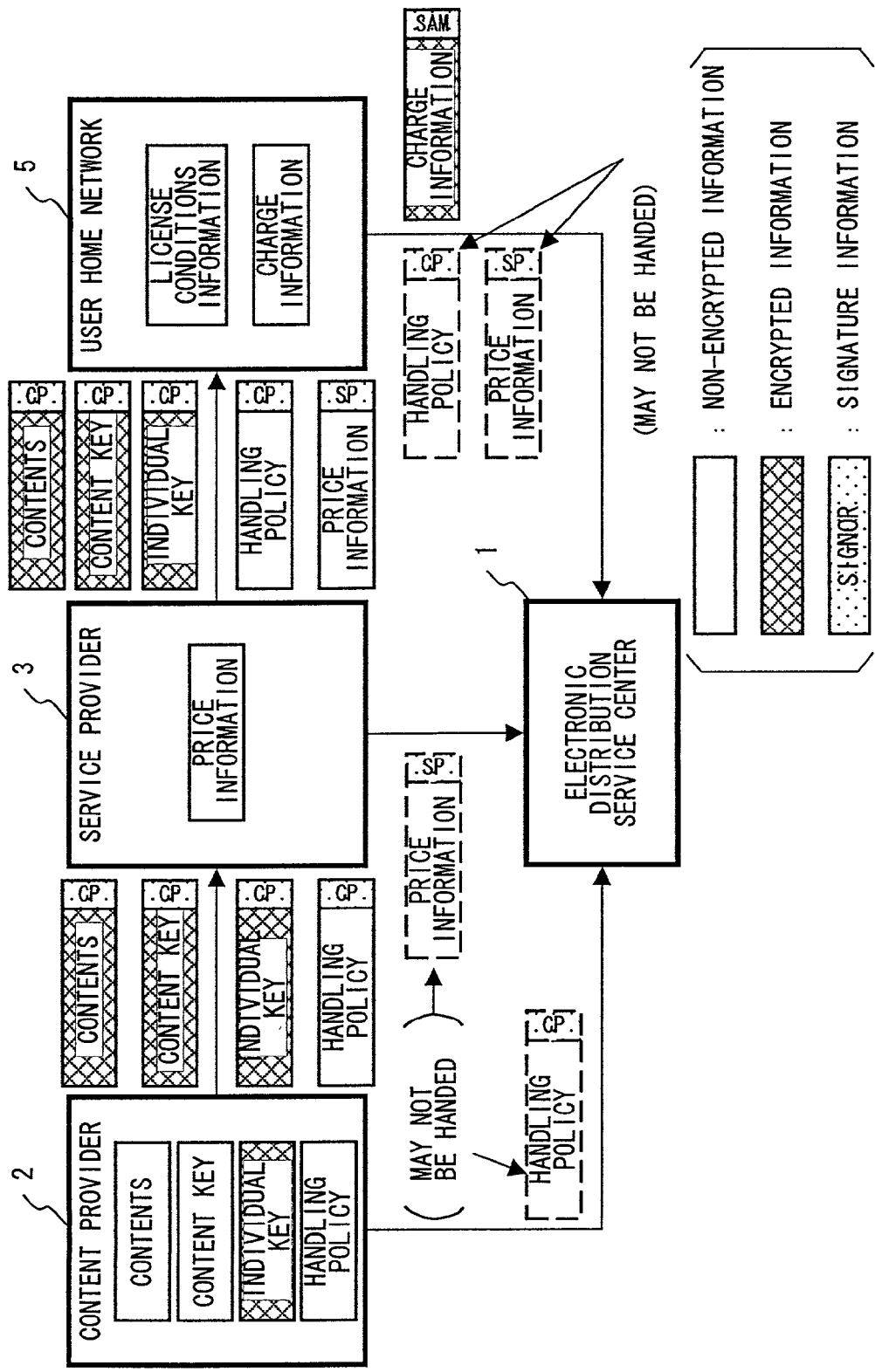
FIG. 20 is a skeleton block diagram showing data flow of the entire system.
Figure 21:
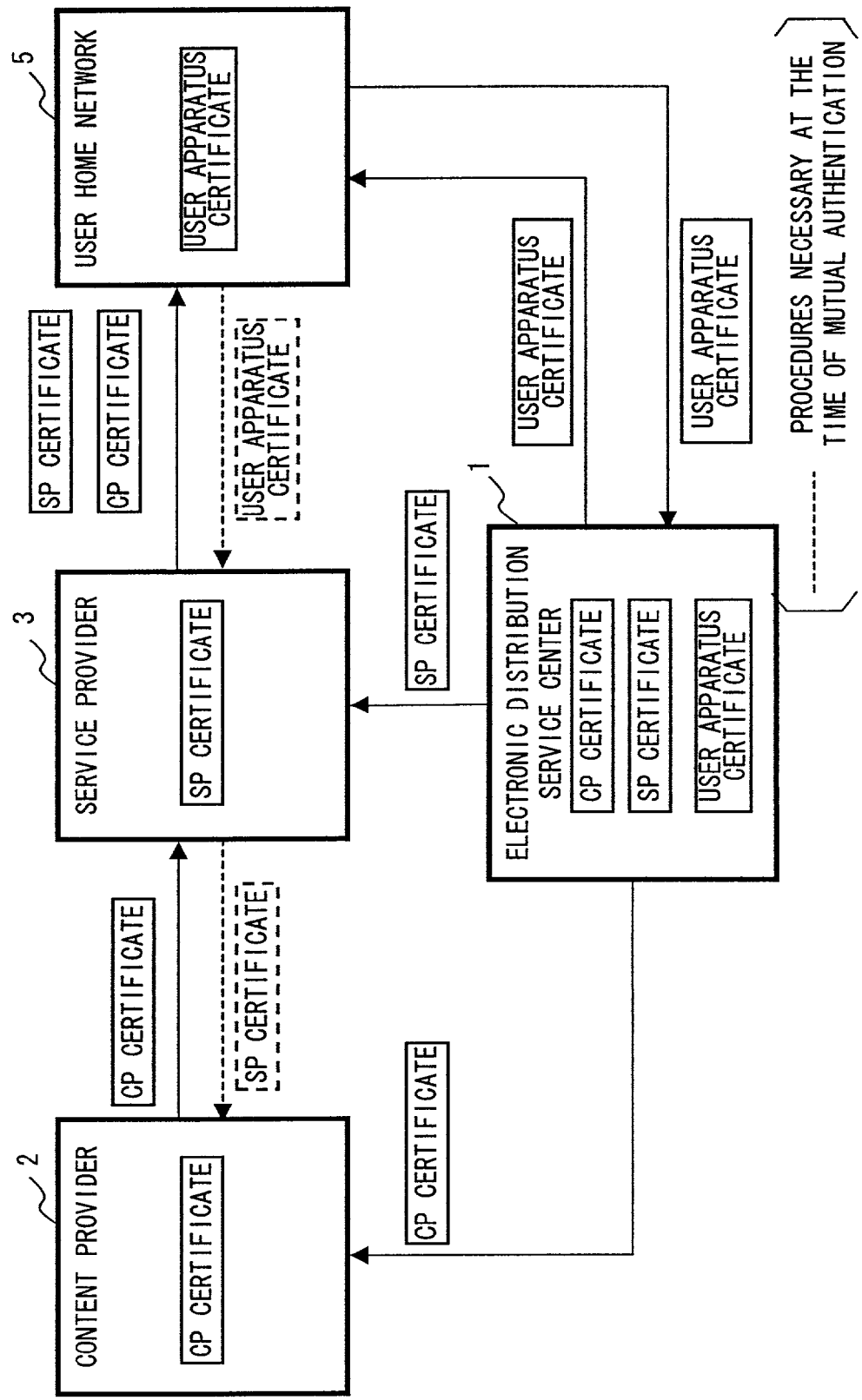
FIG. 21 is a skeleton block diagram showing flow of a public key certificate.

FIGS. 20 and 21 are drawings for illustrating information to be transmitted and received among the electronic distribution service center 1, the content provider 2, the service provider 3, and the user home network 5. The content provider 2 adds the public key certificate (whose details will be described later) of the content provider 2 to the content provider secure container (whose details will be described later) and sends it to the service provider 3. In addition, the content provider 2 transmits the handling policy and its signature, and the certificate of the content provider 2 to the electronic distribution service center 1, if necessary.

The service provider 3 verifies the public key certificate of the content provider 2, obtains the public key of the content provider 2, and verifies the signature of the received content provider secure container (in some cases, verifies only the handling policy). After successfully verifying the signature, the service provider 3 takes out the handling policy from the content provider secure container, and generates the price information based on the handing policy, and makes it the service provider secure container by adding the signature to the price information (details will be described later). The content provider secure container, the service provider secure container, the public key certificate of the content provider 2, and the public key certificate of the service provider 3 (whose details will be described later) are transmitted to the user home network 5. In addition, the service provider 3 transmits the price information and its signature, and the public key certificate of the service provider 3 to the electronic distribution service center 1, if necessary.

After verifying the received secure containers, the user home network 5 performs the purchase processing based on the handling policy and the price information included in the secure containers, generates the charge information to store in the storage module in the encryption processing section, generates the license conditions information, decrypts the content key $K_{co}$ and re-encrypts the same by the save key $K_{save}$, and stores the license conditions information and the re-encrypted content key $K_{co}$ in the external memory 67. Then, the user home network 5 decodes the content key $K_{co}$ by the save key $K_{save}$ along the license conditions information, and decrypts the contents by the key to utilize. The charge information is encrypted by the temporary key $K_{temp}$ at a predetermined timing, added a signature, and transmitted to the electronic distribution service center 1 together with the handling policy and the price information, if necessary.

The electronic distribution service center 1 calculates usage fees based on the charge information and the price information, and calculates profits of each of the electronic distribution service center 1, the content provider 2 and the service provider 3. The electronic distribution service center 1 further compares the handling policy received from the content provider 2, the price information and the handling policy, if necessary, received from the service provider 3, and the handling policy and the price information received from the user home network 5, and monitors whether or not illegality such as tampering of the handling policy or illegal addition of prices has occurred in the service provider 3 or the user home network 5.

Moreover, the electronic distribution service center 1 transmits the public key certificate of the content provider to the content provider 2, and transmits the public key certificate of the service provider to the served provider 3. In addition, since the public key certificate prepared according to each apparatus is embedded in each apparatus when the apparatus is shipped from a factory, the electronic distribution service center 1 transfers the data concerning the public key certificate of each apparatus to the factory.

Figure 22:
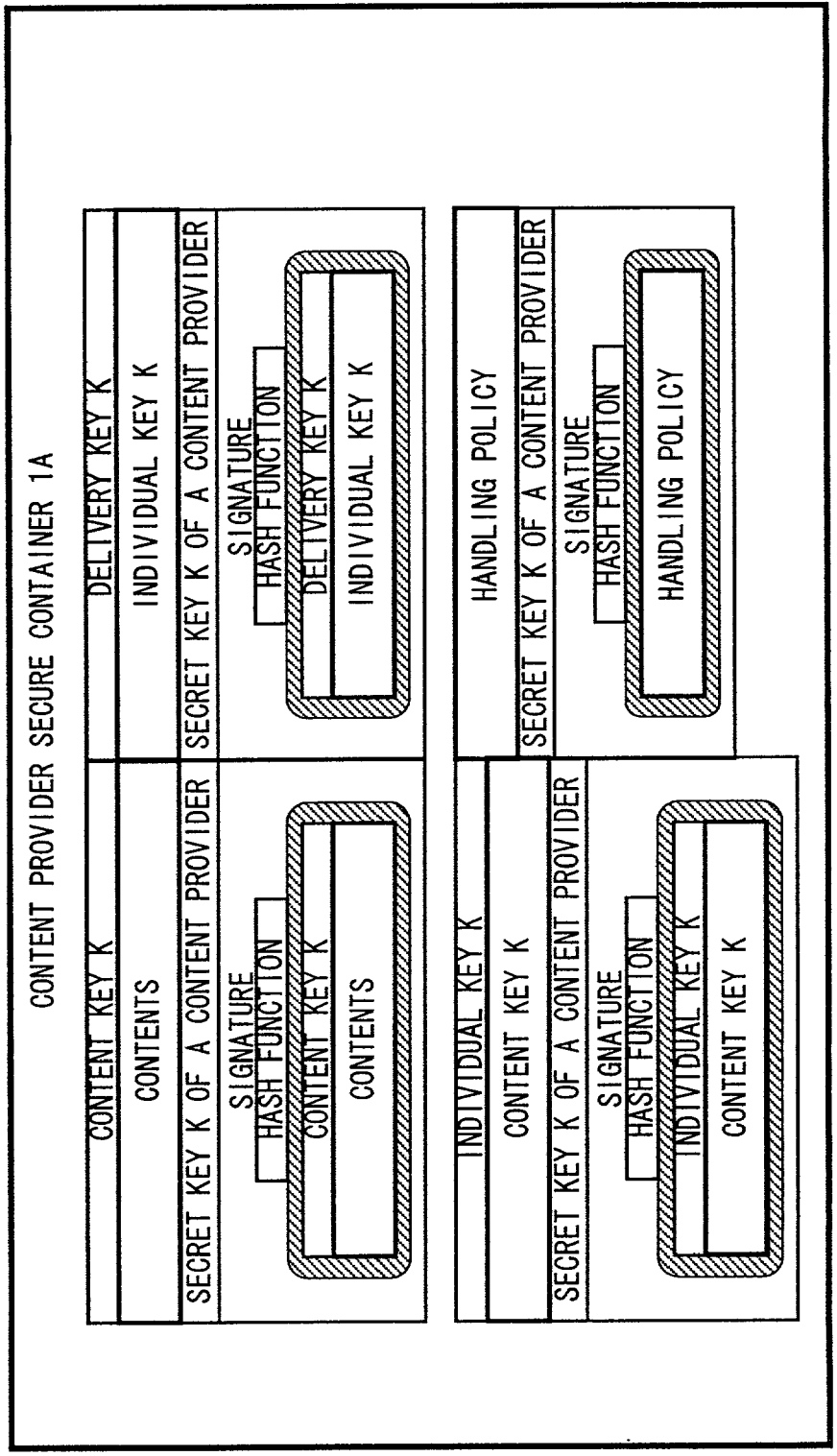
FIG. 22 is a skeleton diagram showing a contents provider secure container.

FIG. 22 illustrates the content provider secure container. The content provider secure container 1A includes the contents encrypted by the content key $K_{co}$ and its signature, the content key $K_{co}$ encrypted by the individual key $K_i$ and its signature, the individual key $K_i$ encrypted by the delivery key $K_d$ and its signature, and the handling policy and its signature. The signature is data generated by applying the secret key $K_{scp}$ of the content provider 2 to a hash value generated by applying the hash function to each piece of data. Further, although a signature is generated separately for each of the key data (the content key $K_{co}$ encrypted by the individual key $K_I$ and the individual key $K_i$ encrypted by the delivery key $K_d$) and added in the case of FIG. 22, each piece of key data (the content key $K_{co}$ encrypted by the individual key $K_I$ and the individual key $K_i$ encrypted by the delivery key $K_d$) may be consolidated into one, and one signature may be generated for the consolidated data and added. By consolidating the key data to be always used together into one and adding a signature to the consolidated data, one verification of the signature is sufficient.

Figure 23:
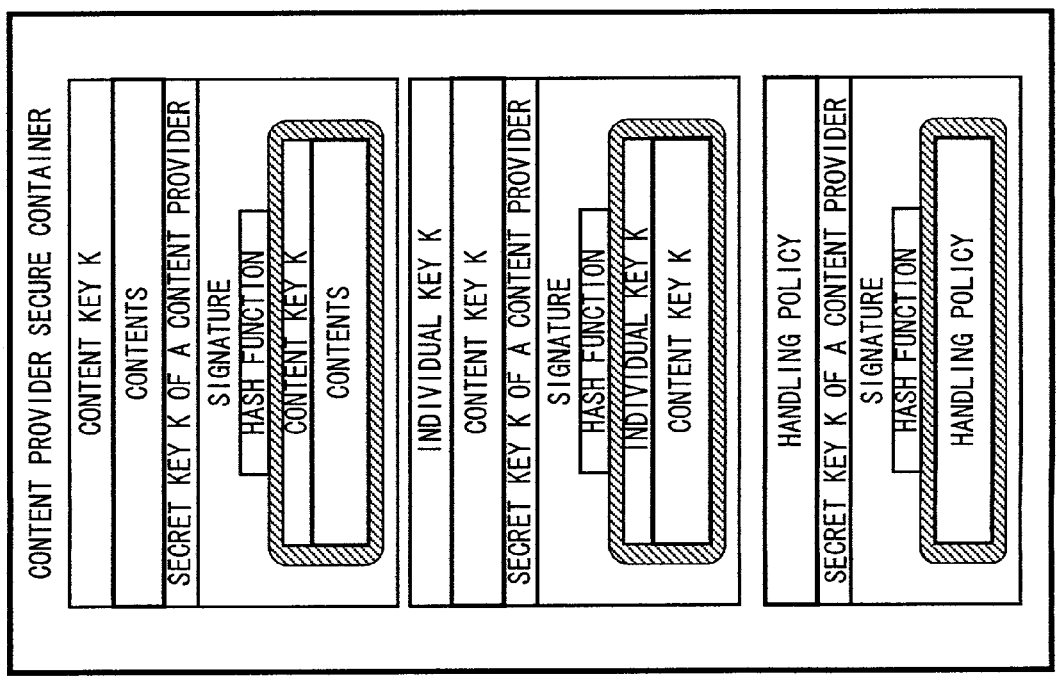
FIG. 23 is a skeleton diagram showing a contents provider secure container.

FIG. 23 illustrates another example of the content provider secure container. The content provider secure container 1B includes the contents encrypted by the content key $K_{co}$ and its signature, the content key $K_{co}$ encrypted by the individual key $K_i$ and its signature, and a handling policy and its signature.

Figure 24:
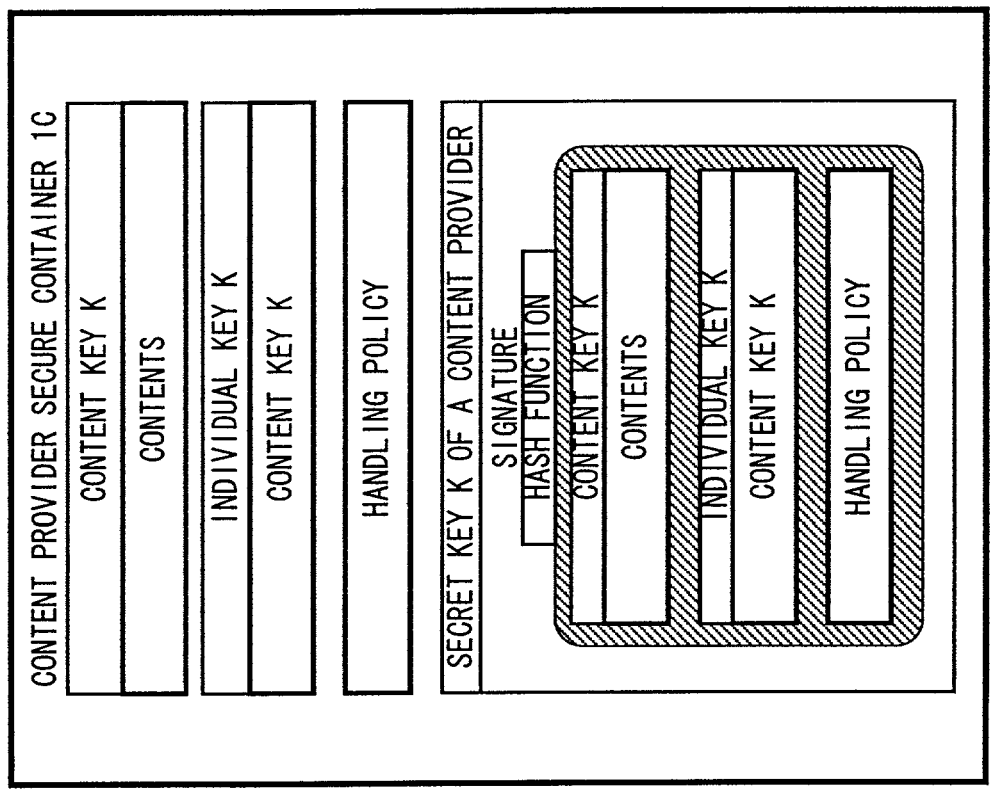
FIG. 24 is a skeleton diagram showing a contents provider secure container.

FIG. 24 illustrates another example of the content provider secure container. The content provide secure container IC includes the contents encrypted by the content key $K_{co}$, the content key $K_{co}$ encrypted by the individual key $K_i$, the individual key $K_i$ encrypted by the delivery key $K_d$, a handling policy and signatures. The signature is data generated by applying the secret key $K_{scp}$ of the content provider 2 to a hash value generated by applying a hash function to the contents encrypted by the content key $K_{co}$, the content key $K_{co}$ encrypted by the individual key $K_i$, the individual key $K_i$ encrypted by the delivery key $K_d$, and a handling policy.

Figure 25:
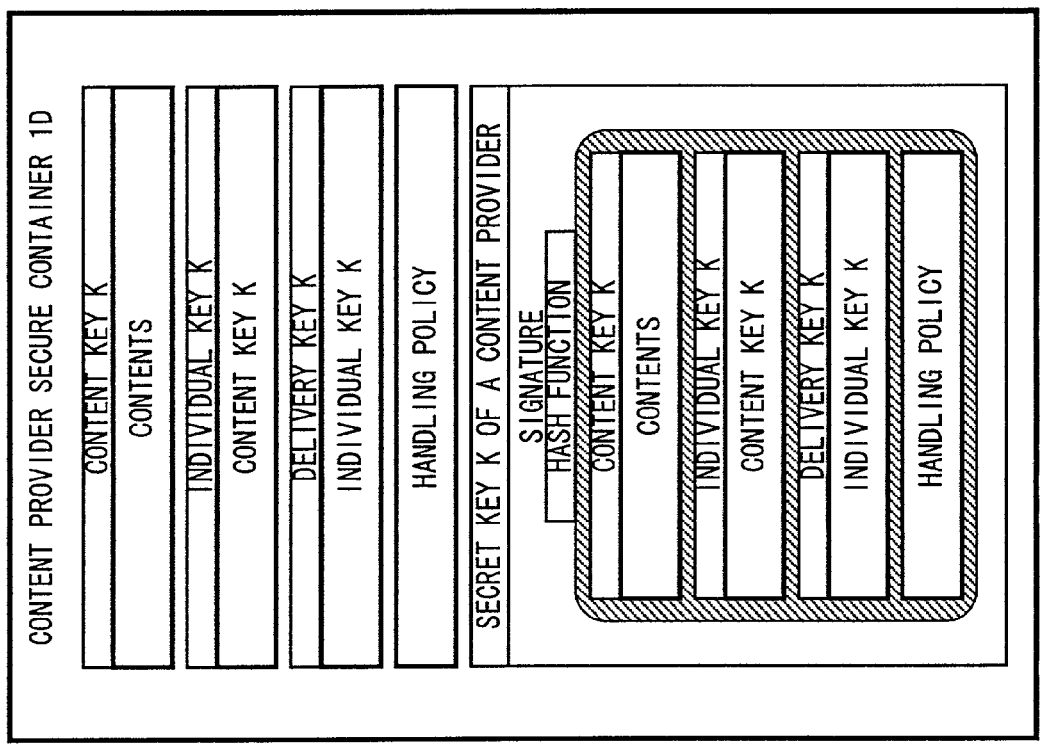
FIG. 25 is a skeleton diagram showing a contents provider secure container.

FIG. 25 illustrates another example of the content provider secure container. The content provider secure container ID includes the contents encrypted by the content key $K_{co}$, the content key $K_{co}$ encrypted by the individual key $K_i$, a handling policy and signatures. The signature is data generated by applying the secret key $K_{scp}$ of the content provider 2 to a hash value generated by applying a hash function to the contents encrypted by the content key $K_{co}$, the content key $K_{co}$ encrypted by the individual key $K_i$, and a handling policy.

Figure 26:
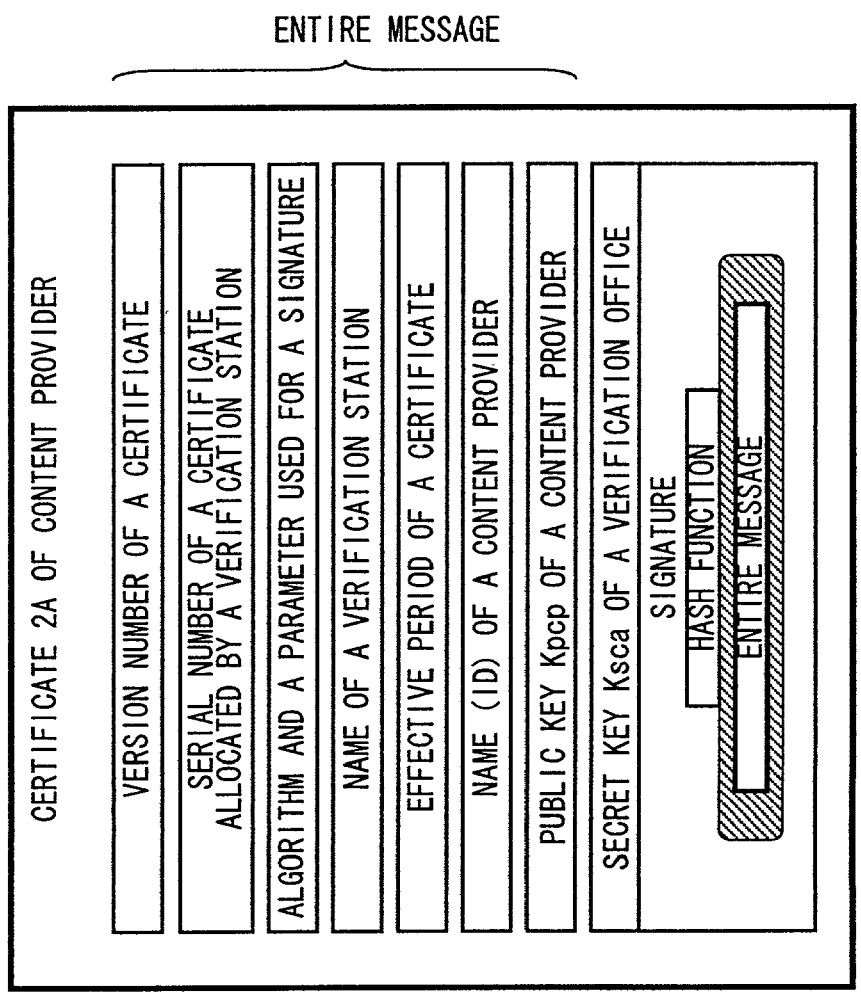
FIG. 26 is a skeleton block diagram showing a public key certificate of a contents provider.

FIG. 26 illustrates the public key certificate of the content provider 2. The public key certificate 2A of the content provider 2 includes a version number of the public key certificate, a serial number of the public key certificate to be allocated to the content provider 2 by the authentication station, an algorithm and a parameter used for the signature, a name of the authentication station, an effective period of the public key certificate, a name of the content provider 2, the public key $K_{pcp}$ of the content provider 2, and signatures. The signature is data generated by applying the secret key $K_{sca}$ of the authentication station to a hash value generated by applying a hash function to the version number of the public key certificate, a serial number of the public key certificate to be allocated to the content provider 2 by the authentication station, an algorithm and a parameter used for the signature, a name of the authentication station, an effective period of the public key certificate, and a name of the content provider 2, the public key $K_{pcp}$ of the content provider 2.

Figure 27:
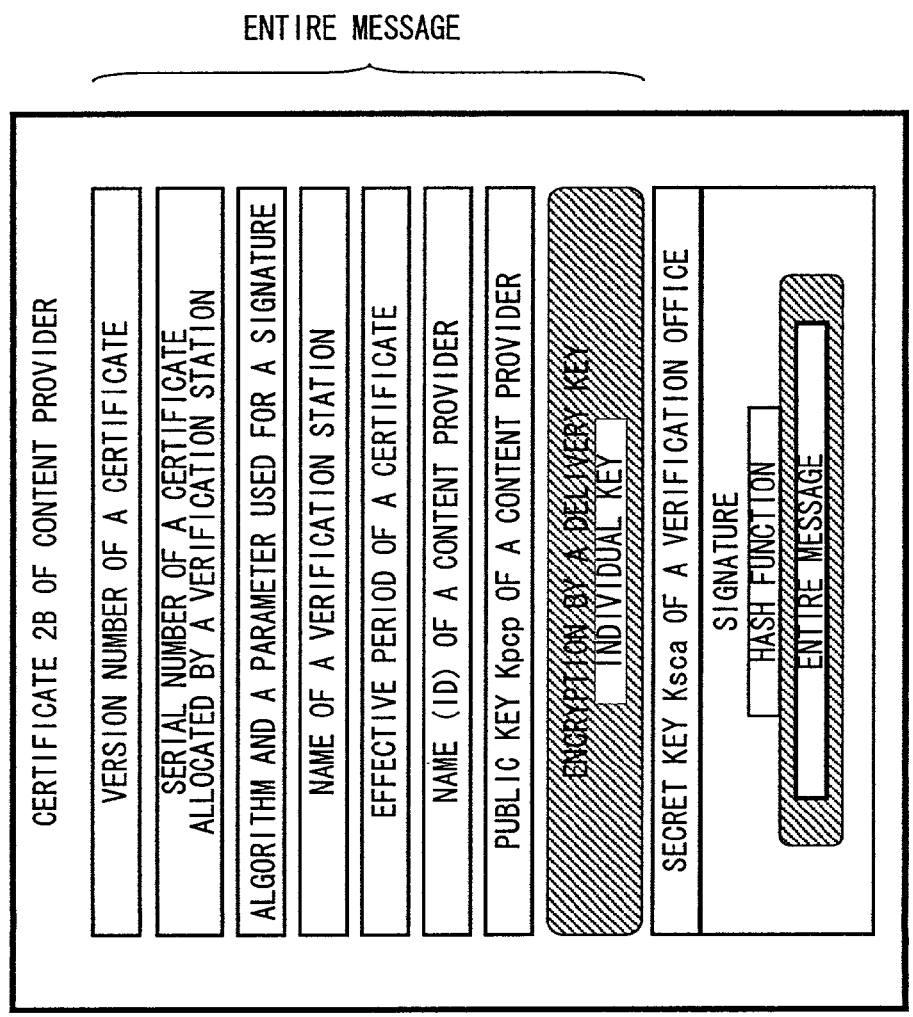
FIG. 27 is a skeleton block diagram showing a public key certificate of a contents provider.

FIG. 27 illustrates another example of the public key certificate of the content provider 2. The public key certificate 2B of the content provider 2 includes a version number of the public key certificate, a serial number of the public key certificate to be allocated to the content provider 2 by the authentication station, an algorithm and a parameter used for the signature, a name of the authentication station, an effective period of the public key certificate, a name of the content provider 2, the public key $K_{pcp}$ of the content provider 2, the individual key $K_i$ encrypted by the delivery key $K_d$, and signatures. The signature is data generated by applying the secret key $K_{sca}$ of the authentication station to a hash value generated by applying a hash function to a version number of the public key certificate, a serial number of the public key certificate to be allocated to the content provider 2 by the authentication station, an algorithm and a parameter used for the signature, a name of the authentication station, an effective period of the public key certificate, a name of the content provider 2, the public key $K_{pcp}$ of the content provider 2, and the individual key $K_i$ encrypted by the delivery key $K_d$.

Figure 28:
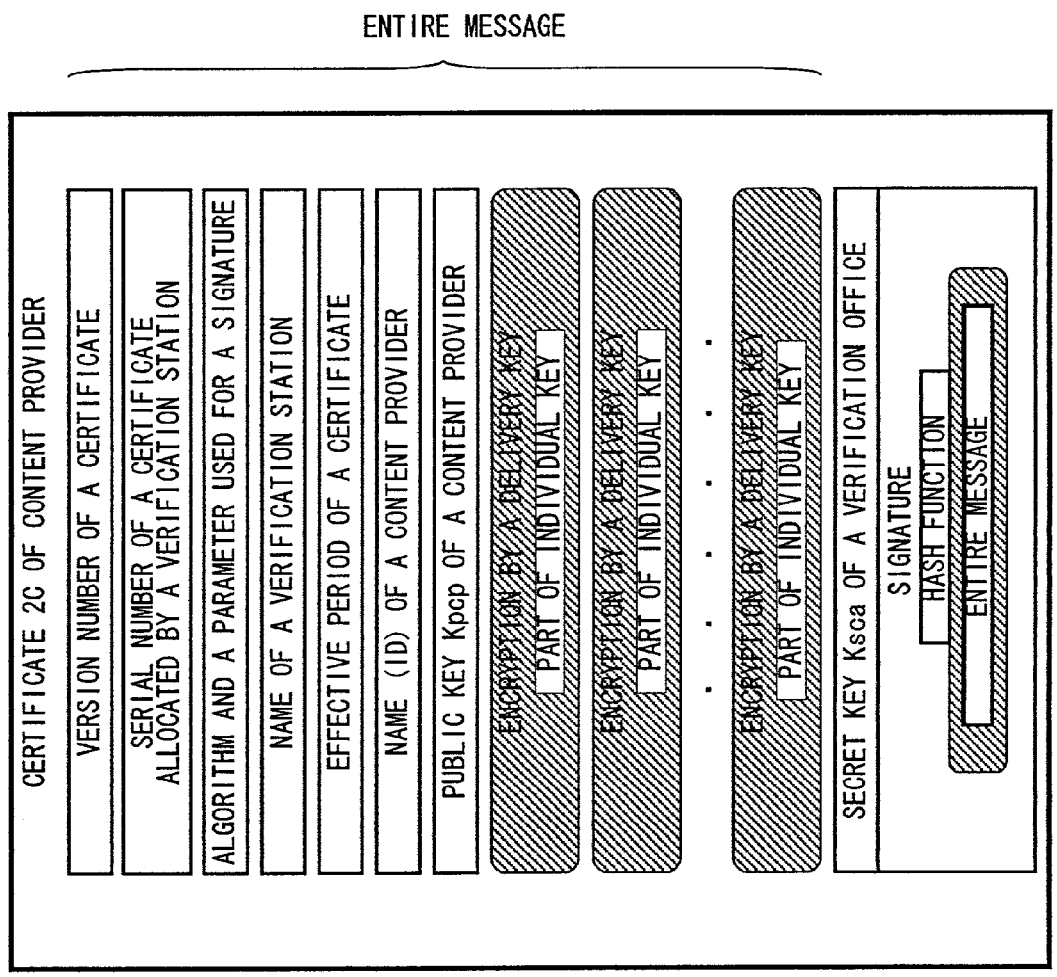
FIG. 28 is a skeleton block diagram showing a public key certificate of a contents provider.

FIG. 28 illustrates yet another example of the public key certificate of the content provider 2. The public key certificate 2B of the content provider 2 includes a version number of the public key certificate, a serial number of the public key certificate to be allocated to the content provider 2 by the authentication station, an algorithm and a parameter used for the signature, a name of the authentication station, an effective period of the public key certificate, a name of the content provider 2, the public key $K_{pcp}$ of the content provider 2, a predetermined type of data that is a part of the individual key $K_i$ encrypted by the delivery key $K_d$, and signatures. The signature is data generated by applying the secret key $K_{sca}$ of the authentication station to a hash value generated by applying a hash function to a version number of the public key certificate, a serial number of the public key certificate to be allocated to the content provider 2 by the authentication station, an algorithm and an parameter used for the signature, a name of the authentication station, an effective period of the public key certificate, a name of the content provider 2, the public key $K_{pcp}$ of the content provider 2, and a predetermined type of data that is a part of the individual key $K_i$ encrypted by the delivery key $K_d$.

Figure 29:
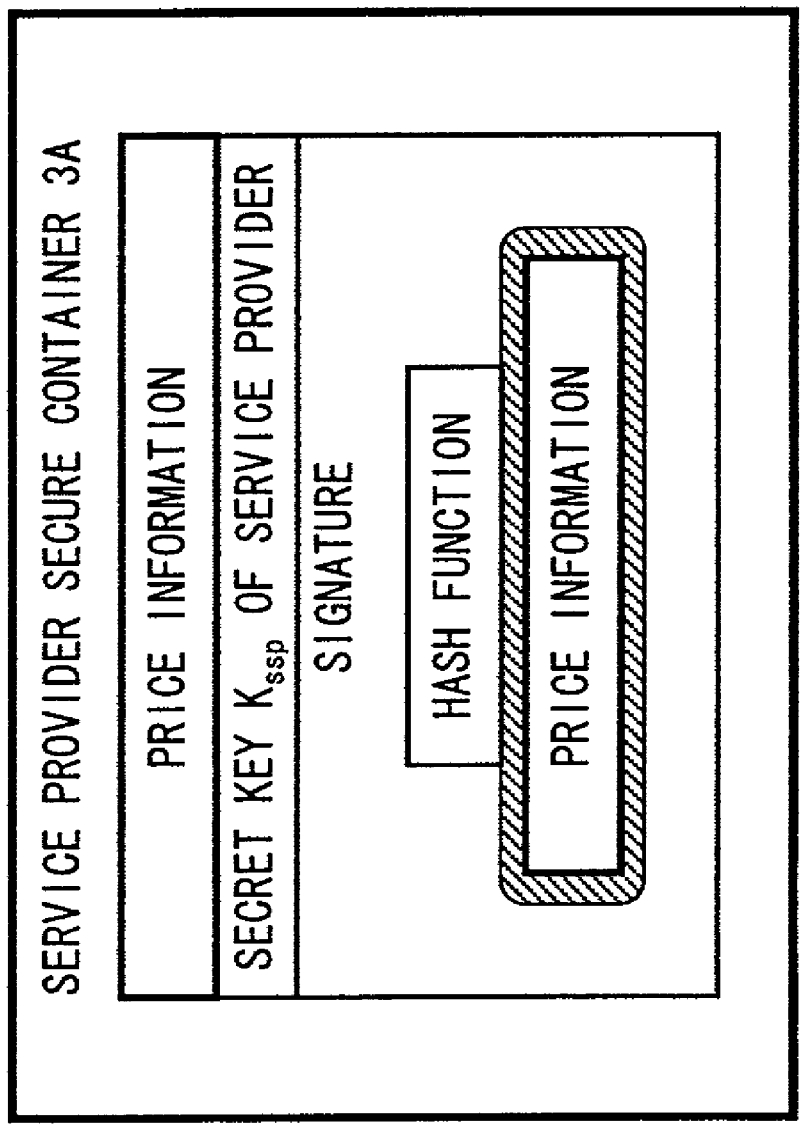
FIG. 29 is a skeleton diagram showing a service provider secure container.

FIG. 29 illustrates the service provider secure container. The service provider secure container 3A is comprised of price information and signatures. The signature is data generated by applying the secret key $K_{ssp}$ of the service provider 3 to a hash value generated by applying a hash function to price information, if necessary.

Figure 30:
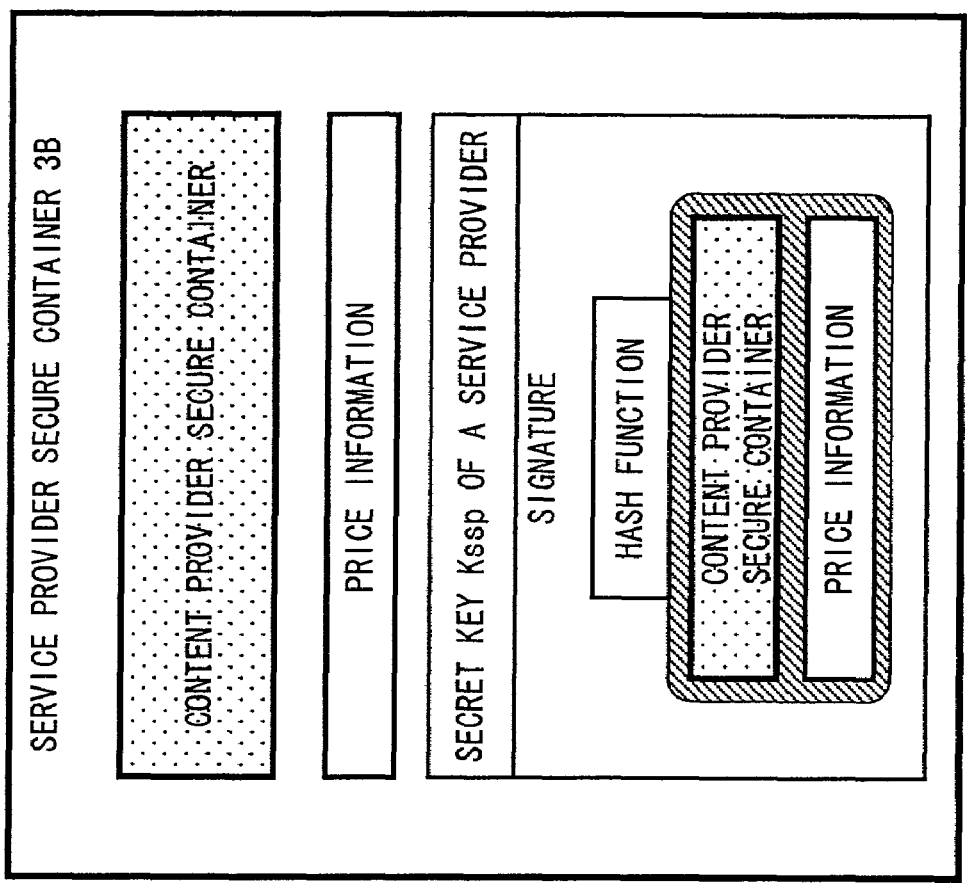
FIG. 30 is a skeleton diagram showing a service provider secure container.

FIG. 30 illustrates another example of the service provider secure container. The service provider secure container 3B includes the content provider secure container, price information and signatures. The signature is data generated by applying the secret key $K_{ssp}$ of the service provider 3 to a hash value generated by applying a hash function to the content provider secure container and the price information.

Figure 31:
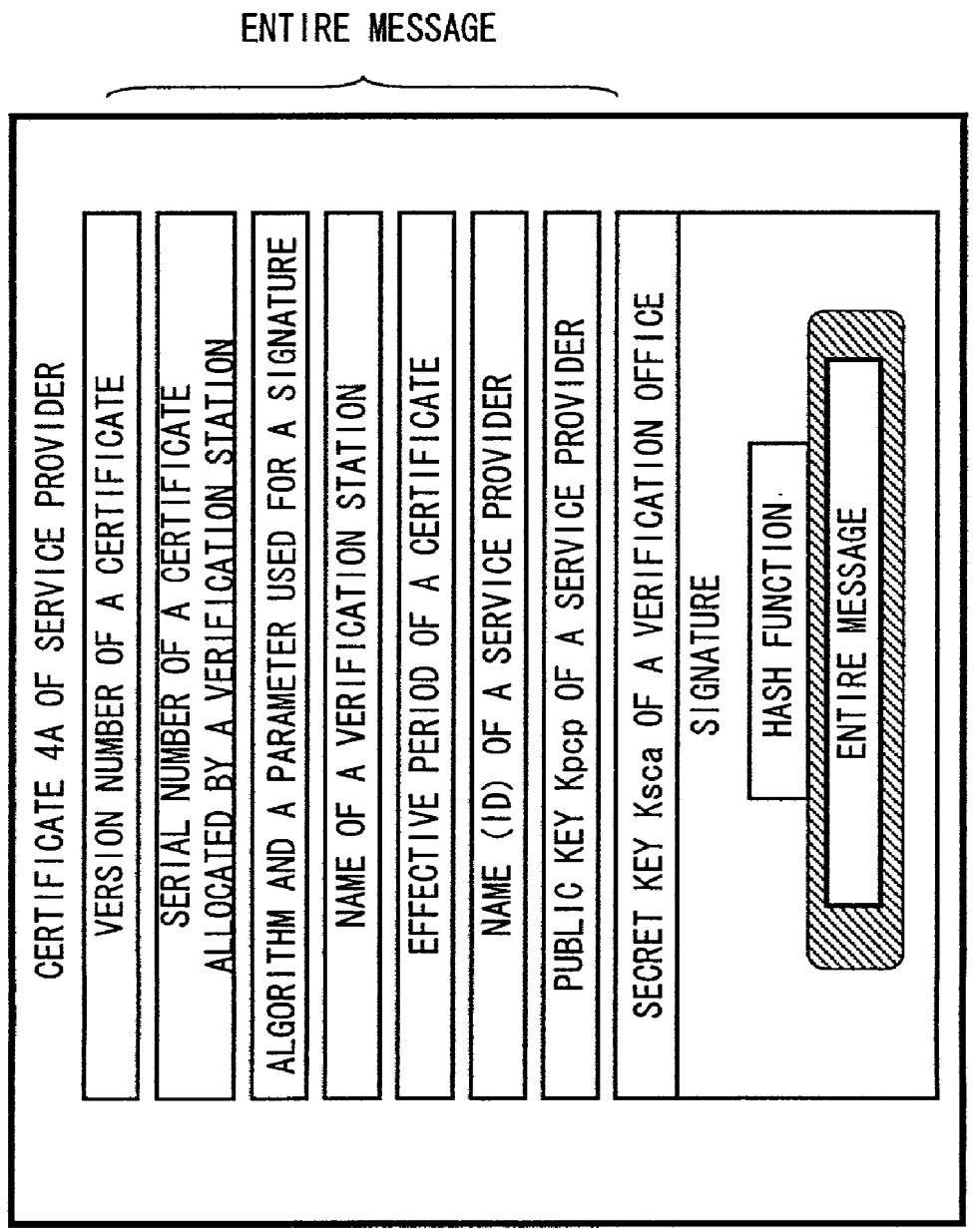
FIG. 31 is a skeleton diagram showing a public key certificate of a service provider.

FIG. 31 illustrates the public key certificate of the service provider 3. The public key certificate 4A of the service provider 3 includes a version number of the public key certificate, a serial number of the public key certificate to be allocated to the content provider 3 by the authentication station, an algorithm and a parameter used for the signature, a name of the authentication station, an effective period of the public key certificate, a name of the service provider 3, the public key $K_{pcp}$ of the service provider 3, and signatures. The signature is data generated by applying the secret key $K_{sca}$ of the authentication station to a hash value generated by applying a hash function to a version number of the public key certificate, a serial number of the public key certificate to be allocated to the service provider 3 by the authentication station, an algorithm and a parameter used for the signature, a name of the authentication station, an effective period of the public key certificate, and a name of the service provider 3, the public key $K_{pcp}$ of the service provider 3.

Figure 32:
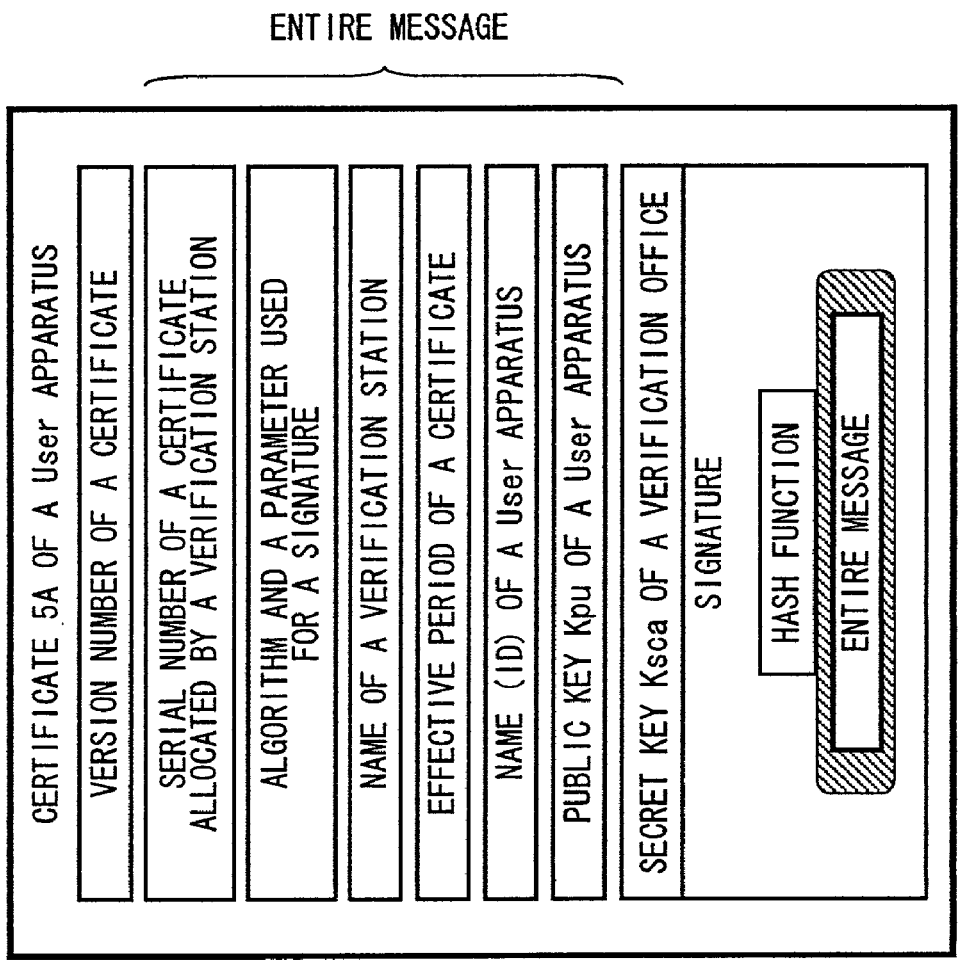
FIG. 32 is a skeleton diagram showing a public key certificate of user equipment.

FIG. 32 illustrates the public key certificate of the user apparatus. The public key certificate 5A of the user apparatus includes a version number of the public key certificate, a serial number of the public key certificate to be allocated to the user apparatus (more precisely the encryption processing section (a exclusive use ticket)) by the authentication station, an algorithm and a parameter used for the signature, a name of the authentication station, an effective period of the public key certificate, a name of the user apparatus, the public key $K_{pu}$ of the user apparatus, and the signatures. The signature is data generated by applying the secret key $K_{sca}$ of the authentication station to a hash value generated by applying a hash function to the version number of the public key certificate, a serial number of the public key certificate to be allocated to the user apparatus by the authentication station, an algorithm and a parameter used for the signature, a name of the authentication station, an effective period of the public key certificate, and a name of the user apparatus, the public key $K_{pu}$ of the user apparatus.

FIGS. 33 and 34 shows a data format of a handling policy that is generated for each single content or album content by the content provider 2 and shows contents of a utilization right purchasable by the user home network 5.

In the data of the handling policy for the single content (FIG. 33), a type of the data, a type of the handling policy, an effective period of the handling policy, an ID of the contents, an ID of the content provider, an ID of the handling policy, aversion of the handling policy, a regional code, usable apparatus conditions, usable user conditions, an ID of the service provider, generation management information, the number of rules including the purchasable utilization right indicated by the handling policy, address information indicating the storage position of the rules, the rules stored in the position indicated by the address information, the public key certificate and signatures.

The rule is composed of a rule number given as a serial number for each utilization right, a utilization right content number indicating the utilization right contents, its parameter, a minimum sales price, a profit amount of the content provider, a profit ratio of the content provider, a data size, and transmission information.

In addition, data of a handling policy for the album contents (FIG. 34), a type of data, a type of the handling policy, an effective period of the handling policy, an ID of the album, a version of the handling policy, an ID of the contents, an ID of the content provider, an ID of the handling policy, aversion of the handling policy, a regional code, usable apparatus conditions, usable user conditions, an ID of the service provider, the number of a handling policy of single contents forming the album, address information indicating a storing position of the handling policy of the single content, a data packet of the handling policy of the single content stored in the position indicated by the address information, generation management information, the number of rules including the purchasable utilization right indicated by the handling policy, address information indicating the storage position of the rules, the rules stored in the position indicated by the address information, the public key certificate and signatures.

Further, similar to the rule of the handling policy of the single content, the rules is composed of a rule number given as a serial number for each utilization right, a utilization right content number indicating the utilization right contents, its parameter, a minimum sales price, a profit amount of the content provider, a profit ratio of the content provider, a data size, and transmission information.

In these a handling policy, a type of data indicates that the data is the data of a handling policy, and a type of the handling policy indicates which of single or album contents the handling policy is. The effective period of the handling policy indicates a usage period of the handling policy by a date on which the period expires, or by the number of days from a date to be a basis when the use has started to a data when the period expires. An ID of the contents and an ID of the album indicates the purchasable single contents or album contents indicated by the handling policy, an ID of the content provider indicates the ID of the content provider 2 that has provided for the handling policy.

In addition, an ID of the handling policy is for identifying the handling policy, and is used, for example, for identifying the handling policy in the case in which a plurality of a handling policy are set for identical contents. A version of the handling policy indicates revision information of a policy that is revised according to a use period. Therefore, the handling policy is managed by the ID of the handling policy and the version of the handling policy.

A regional code indicates a region where a handling policy is usable by coding the region, and can assign a code indicating a specific region limiting regions where the handling policy is usable and a code that can make the handling policy usable in all the regions to the regional code. Usable apparatus conditions indicate conditions of an apparatus that can utilize the handling policy, and usable user conditions indicate conditions of a user who can utilize the handling policy.

An ID of a service provider indicates an ID of a service provider 3 that utilizes a handling policy, and the ID of the service provider includes an ID of a specific service provider 3 limiting a service provider 3 that can use the handling policy and an ID that makes the handling policy usable for a plurality of (all) the service providers.

Moreover, generation management information indicates a maximum number of times contents can be re-purchased. A signature is affixed to the entirety ranging from a type of data to a public key certificate excluding the signature from a handling policy. An algorithm and a parameter used in preparing the signature and a key to be used for verification of the signature are included in the public key certificate. In addition, in rules, a utilization right content number is a number added for each utilization right content, and a parameter indicates a parameter of right contents. A minimum sales price indicates a minimum sales price in selling single or album contents according to the utilization right contents, a profit amount and a profit ratio of a content provider indicates an amount of a profit that a content provider 2 can obtain when the single contents and the album contents are purchased, and a profit ratio to the sales price. A data size indicates data size of transmission information, and the transmission information consists of a point to be added to a user through a purchase of the utilization right set by the content provider 2, mileage information made up of a discount amount of the utilization right according to the point, and various kinds of information set by the content provider 2, if necessary.

Here, in the handling policy of the album contents, a plurality of rules indicate a purchase form of the album. In addition, in a handling policy of a plurality of single contents stored in the handling policy of the album contents, rules stored in the handling policy indicate a purchase form of the single contents in the album such as a form in which respective corresponding single contents can be independently purchased as a single tune out of the album, or a form in which respective corresponding single contents can be purchased as an album tune only (that is, can only be purchased together with other single contents as an album).

Therefore, in a handling policy of album contents, it is defined such that either of album contents or single contents that can be soled as a single tune can be selected to be purchased in the manner in which the album contents are purchased based on rules of the handling policy and the single contents are purchased as a single tune.

In addition, in a handling policy of album contents, with the addition of a signature to the entire album contents, tamper or the like can be checked for a handling policy of each single content as well together with the handling policy of the album contents simply by verifying the signature without respectively verifying the handling policy of the single contents stored in the handling policy, hence, the verification of a signature can be thereby simplified.

Incidentally, in a handling policy of single and album contents, presence or absence of a verification of a signature can be stored, if necessary, which indicates whether or not the verification of a signature is executed to the contents. This is because the verification of a signature takes time, and, if information on presence or absence of the verification of a signature with respect to a handling policy is stored, makes the verification of a signature of contents to be executed or not to be executed according to the information.

In addition, in a handling policy of album contents, although it stores a handling policy of a plurality of single contents forming the album, it may not store a handling policy of the plurality of single contents.

Moreover, in a handling policy of single and album contents, since a profit amount and a profit ratio of a content provider can be managed altogether by the electronic distribution service center 1, the handling policy can be formed excluding the profit amount and the profit ratio of the content provider.

FIGS. 37 and 38 illustrate a data format of price information, and the price information is generated for each a handling policy of single contents to be given by a content provider 2 and for each a handling policy of album contents in a service provider 3, and indicates a price of the single contents and the album contents.

In the data of the handling policy for the single content (FIG. 37), a type of the data, a type of the price information, an effective period of the price information, an ID of the contents, an ID of the service provider, an ID of the price information, a version of the price information, a regional code, usable apparatus conditions, usable user conditions, an ID of the content provider, an ID of the handling policy to which the price information is added, the number of rules including the purchasable utilization right indicated by the price information, address information indicating the storage position of the rules, the rules stored in the position indicated by the address information, the public key certificate and signatures.

The rule is composed of a rule number given as a serial number for each utilization right, a profit amount of the service provider, a profit ratio of the service provider, a price, a data size, and transmission information.

In addition, in the data of the handling policy for the single content (FIG. 38), a type of the data, a type of the price information, an effective period of the price information, an ID of the album, an ID of the service provider, an ID of the price information, a version of the price information, a regional code, usable apparatus conditions, usable user conditions, an ID of the content provider, an ID of the handling policy to which the price information is added, the number of pieces of price information of single contents forming the album, address information indicating a storage position of the price information of the single contents, a data packet of the price information of the single contents stored in the position indicated by the address information, the number of rules including the purchasable utilization right indicated by the price information, address information indicating the storage position of the rules, the rules stored in the position indicated by the address information, the public key certificate and signatures.

Similar to the rule of the price information for the single contents, the rule is composed of a rule number given as a serial number for each utilization right, a profit amount of the service provider, a profit ratio of the service provider, a price, a data size, and transmission information.

In the above-mentioned price information, a type of data indicates that the data is the data of price information, and a type of the price information indicates which of single or album contents the price information is. The effective period of the price information indicates a usage period of the price information by a date on which the period expires, or by the number of days from a date to be a basis when the use has started to a data when the period expires. An ID of the contents and an ID of the album indicates the purchasable single contents or album contents indicated by the price information, an ID of the service provider indicates the ID of the service provider 3 that has prepared the price information.

In addition, an ID of the price information is for identifying the price information, and is used, for example, for identifying the price information in the case in which a plurality of pieces of price information are set for identical contents. A version of the price information indicates revision information of price information that is revised according to a use period. Therefore, the price information is managed by the ID of the price information and the version of the price information.

A regional code indicates a region where price information is usable by coding the region, and can assign a code indicating a specific region limiting regions where the price information is usable and a code that can make the price information usable in all the regions to the regional code. Usable apparatus conditions indicate conditions of an apparatus that can utilize the price information, and usable user conditions indicate conditions of a user who can utilize the price information. An ID of a content provide indicates an ID of a content provider 2 that has provided for a handling policy to which the price information is added. An ID of the handling policy is for identifying the handling policy to which the price information is added.

Moreover, a signature is affixed to the entirety ranging from a type of data to a public key certificate excluding the signature from price information. An algorithm and a parameter used in preparing the signature and a key to be used for verification of the signature are included in the public key certificate.

In addition, in rules, a rule number uses a rule number of a rule indicated by a corresponding a handling policy as it is. A profit amount and a profit ratio of a service provider indicates an amount of profit that a service provider 3 can obtain when single contents and album contents are purchased and a profit ration to a price, and the price indicates a sales price of the single contents and the album contents that are set by the service provider 3 based on utilization right contents and a corresponding minimum sales price. A data size indicates data size of transmission information, and the transmission information consists of a point to be added to a user through a purchase of the utilization right set by the service provider 3, mileage information made up of a discount amount of the utilization right according to the point, and various kinds of information set by the service provider 3, if necessary.

Here, when generating price information, the service provider 3 can set all the purchasable utilization right indicated by a corresponding a handling policy as a purchasable right indicated by the price information, and at the same time, can set a utilization right arbitrary selected out of all the purchasable utilization right indicated by the handling policy, thus, can select a utilization right provided for by the content provider 2.

In addition, in price information of album contents, a plurality of rules provides for a sales price corresponding to a purchase form of an album. Further, in price information of a plurality of single contents stored in the price information of the album contents, rules of price information of single contents that can be soled as a single tune provides for a sales price of single contents that can be sold as the single tune.

Therefore, in price information of album contents, the price information is made such that a sales price of an album and a sales price of single contents that can be sold as a single tune can be recognized by one piece of the price information.

In addition, in price information of album contents, with the addition of a signature to the entire album contents, tamper or the like can be checked for price information of each single content as well together with the price information of the album contents simply by verifying the signature without respectively verifying the signature of price information of the single contents stored in the price information, hence, the verification of a signature can be thereby simplified.

Incidentally, in price information of a single and an album, presence or absence of a verification of a signature with respect to contents as in the above-mentioned a handling policy concerning FIGS. 33 and 34. In addition, in price information of album contents, although it stores price information of a plurality of single contents forming the album, it may not store price information of the plurality of single contents.

Moreover, in price information of single and album contents, since a profit amount and a profit ratio of a service provider can be managed altogether by the electronic distribution service center 1, the price information may be formed excluding the profit amount and the profit ratio of the service provider.

FIG. 41 illustrates a data format of license conditions information, and the license conditions information is prepared, when a user purchases contents, based on a handling policy of the purchased contents in an apparatus in the user home network 5, and indicates utilization right contents selected by the user among utilization right contents indicated by the handling policy.

In data of license conditions information, a type of data, a type of license conditions information, an effective period of the license conditions information, an ID of contents, an ID of an album, an ID of an encryption processing section, an ID of a user, an ID of a content provider, an ID of a handling policy, version of the handling policy, an ID of a service provider, an ID of price information, a version of price information, an ID of license conditions information, a rule number attached to a reproduction right (utilization right) as a serial number, a utilization right content number, a remaining number of time of reproduction, an effective period of the reproduction right, a rule number attached to a copying right (utilization right) as a serial number, a utilization right content number, a remaining number of times of copying, generation management information, and an ID of an encryption section having a reproduction right are stored.

In license conditions information, a type of data indicates that the data is data of the license conditions information, a type of license conditions information indicates whether the license conditions information is license conditions information of single contents or album contents. An effective period of license conditions information indicates a usage period of the license conditions information by a data when the period expires, the number of days from a day to be a basis of start using until a data when the period expires.

An ID indicating purchased single contents is described in an ID of contents, and an ID indicating an album is described in an ID of an album only when the album is purchased. In fact, if contents are purchased as a single, the ID indicating the purchased single contents is described in an ID of the contents, and if contents are purchased as an album, IDs of all the single contents forming the album are described in the ID of contents and an ID indicating the purchased album is described in the ID of an album. Therefore, just looking at the ID of an album, whether purchased contents are a single or an album can be easily determined.

An ID of an encryption processing section indicates an encryption processing section of an apparatus in the user home network 5 that performed purchase processing of contents. When an apparatus in the user home network 5 that purchased contents is shared by a plurality of users, an ID of a user indicates a plurality of users sharing an apparatus.

In addition, an ID of a content provider indicates an ID of a content provider 2 that has provider for a handling policy used for preparing license conditions information, and an ID of a handling policy indicates a handling policy used for preparing the license conditions information. An version of a handling policy indicates revision information of a handling policy used for preparing license conditions information. An ID of a service provider indicates an ID of a service provider 3 that has prepared price information used for preparing license conditions information, and an ID of price information indicates price information used for preparing the license conditions information. A version of price information indicates revision information of a handling policy used for preparing license conditions information. Therefore, a content provider 2 or a service provider 3 that has provided contents purchased by a user can be found by the ID of a content provider, the ID of a handling policy, the version of a handling policy, the ID of a service provider, the ID of price information and the version of price information.

An ID of license conditions information is attached by an encryption processing section of an apparatus in a user home network 5 that has purchased contents, and is used for identifying the license conditions information. A rule number of a reproduction right indicates a serial number attached to a reproduction right among a utilization right, and uses a rule number of a rule indicated by a corresponding handling policy or price information as it is. Utilization right contents indicate contents of a reproduction right to be described later. A remaining number of times of reproduction indicates a remaining number of times of reproduction among a number of times of reproduction set in advance to contents, and an effective period of a reproduction right indicates a corresponding reproduction available period of purchased contents by a date and time when the period expires.

In addition, a rule number of a copying right indicates a serial number attached to a copying right among a utilization right, and uses a rule number of a rule indicated by a corresponding handling policy and price information as it is. Utilization right contents indicate contents of a copying right to be described later. A remaining number of times of copying indicates a remaining number of times of copying among a number of times of copying set in advance to purchased contents.

Moreover, generation management information indicates, when contents are re-purchased, a remaining number of times the contents can be re-purchased. An ID of an encryption processing section having a reproduction right indicates an encryption processing section having a reproduction right at the current time, and when management is shifted, an ID of an encryption processing section having a reproduction right is changed.

Incidentally, in license conditions information, an effective period may be provided for with respect to a copying right, and when the effective period is provided for, a period for purchased contents in which copying is available is indicated by a date and time when the period expires, or the like.

FIG. 42 indicates charge information, and the charge information is generated, when contents are purchased, by an apparatus in the user home network 5 based on a handling policy and price information corresponding to the contents.

In data of charge information, a type of data, an ID of an encryption processing section, an ID of a user, an ID of contents, an ID of a content provider, an ID of a handling policy, a version of a handling policy, an ID of a service provider, an ID of price information, a version of price information, an ID of license conditions information, a rule number, a profit amount and a profit ratio of a content provider 2, a profit amount and a profit ratio of a service provider, generation management information, a data size of transmission information set by a content provider, the transmission information set by the content provider, a data size of transmission information set by a service provider, transmission information set by the service provider, and an ID of a supplier.

In charge information, a type of data indicates that the data is charge information, and an ID executes purchase processing of contents and indicates an encryption processing section of an apparatus that has generated the charge information. When a plurality of users share an apparatus in a user home network 5 that has purchased the contents, an ID of a user indicates a plurality of users who share the apparatus, and ID of contents indicates the purchased contents (single contents and album contents).

In addition, an ID of a content provider indicates an ID of a content provider 2 that has provided for a handling policy used for a purchase processing (an ID of a content provider included in the handling policy), and an ID of a handling policy indicates a handling policy used for the purchase processing. A version of a handling policy indicates revision information of a handling policy used for purchase processing. An ID of a service provider indicates an ID of a service provider 3 that has prepared price information used for purchase processing (an ID of a service provider included in the price information), and an ID of price information indicates price information used for the purchase processing. A version of price information indicates revision information of price information used for purchase processing.

An ID of license conditions information indicates an ID of license conditions information that has been prepared upon purchase processing, and a rule number indicates a rule number attached to a purchased utilization right as a serial number. A profit amount and a profit ratio of a content provider indicate an amount of dividend that is distributed to a content provider 2 through purchase of contents and its ratio to sales, and a profit amount and a profit ratio of a service provider indicate an amount of dividend that is distributed to a service provider 3 through purchase of contents and its ratio to sales.

Moreover, generation management information indicates a generation of purchased contents. In addition, a data size indicating a handling policy used for purchase processing and transmission information are stored as they are in a data size of transmission information set by a content provider and the transmission information set by the content provider, and a data size indicating price information used for purchase processing and transmission information are stored as they are in a data size of transmission information set by a service provider and the transmission information set by the service provider. An ID of a supplier indicates an apparatus of a supplier that has applied purchase processing, and the ID is accumulated every time re-purchase of contents is conducted.

Incidentally, in charge information, since a profit amount and a profit ratio of a content provider and a profit amount and a profit ratio of a service provider may be managed altogether by the electronic distribution service center 1, the charge information may be formed excluding the profit amount and the profit ratio of the content provider as shown in FIG. 43.

FIG. 44 shows contents of a purchasable utilization right, and as the utilization right, there are roughly a reproduction right, a copying right, a right content changing right, a re-purchase right, an additional purchase right, and a management transfer right.

The reproduction right includes an unlimited reproduction right that does not have limitations on a period or the number of times of reproduction, a reproduction right with a period limitation that limits a reproduction period, a reproduction right with a cumulating time limitation that limits cumulating time of reproduction, and a reproduction right with a number of times limitation that limits the number of times of reproduction. The copying right includes an unlimited copying right without a period limitation, a number of times limitation and copy management information (e.g., the serial copy management: SCMS), a copying right with a number of times limitation and without copy management information that limits the number of times of copying but does not have copy management information, a copying right with copy management information that does not have a period limitation and a number of times limitation but adds and provides copy management information, and a copying right with a number of times limitation and copy management information that limits the number of times of copying, and adds and provides copy management information. Incidentally, in addition to the above, as a copying right, there are a copying right with a period limitation that limits a copy available period (including the one that adds copy management information and the one that does not add the copy management information), and a copying right with a cumulating time limitation that limits a cumulating time of copying (i.e., a cumulating time required for reproduction of copied contents) (including the one that adds copy management information and the one that does not add the copy management information), and the like.

In addition, the right contents changing right is a right for changing contents of a right already purchased to other contents, and the re-purchase right is a right for separately purchasing a utilization right based on a right purchased by other apparatuses as described above. The additional purchase right is a right for purchasing and adding to independently purchased contents other contents of an album including the contents, and the management transfer right is a right for transferring a purchased right to change an owner.

An specific example of utilization right contents shown in FIG. 33, etc. will now be described. In fact, as shown in FIG. 45A, as data of the unlimited reproduction right, information on an effective period of a reproduction right that indicates an effective period of a reproduction right by a date on which the period expires, or the number of days from a date to be a basis of starting an effective period until a date on which the period expires, or the like is stored in a region of utilization right contents. As shown in FIG. 45B, as data of the reproduction right with a period limitation, information on an effective period of the reproduction right that indicates an effective period of a reproduction right by a date on which the period expires, or the number of days from a date to be a basis of starting an effective period until a date on which the period expires, or the like is stored in a region of utilization right contents.

As shown in FIG. 45C, as data of the reproduction right with a cumulating limitation, information on an effective period of the reproduction right that indicates an effective period of a reproduction right by a date on which the period expires, or the number of days from a date to be a basis of starting an effective period until a date on which the period expires, or the like, and information on the number of days and time indicating a limitation of accumulating time contents can be reproduced are stored in a region of utilization right contents. As shown in FIG. 45D, as data of the reproduction right with a number of times limitation, information on an effective period of the reproduction right that indicates an effective period of a reproduction right by a date on which the period expires, or the number of days from a date to be a basis of starting an effective period until a date on which the period expires, or the like, and information on the number of times of reproduction indicating the number of times contents can be reproduced are stored in a region of utilization right contents.

In addition, as shown in FIG. 45E, as data of the unlimited copying right without copy management information, information on an effective period of the copying right that indicates an effective period of a copying right by a date on which the period expires, or the number of days from a date to be a basis of starting an effective period until a date on which the period expires, or the like is stored in a region of utilization right contents. As shown in FIG. 45F, as data of the copying right with a number of times limitation and without copy management information, information on an effective period of the copying right that indicates an effective period of a copying right by a date on which the period expires, or the number of days from a date to be a basis of starting an effective period until a date on which the period expires, or the like, and information on the number of times of copying that indicates the number of times contents can be copied are stored in a region of utilization right contents.

In addition, as shown in FIG. 45G, as data of the copying right with copy management information, information on an effective period of the copying right that indicates an effective period of a copying right by a date on which the period expires, or the number of days from a date to be a basis of starting an effective period until a date on which the period expires, or the like is stored in a region of utilization right contents. As shown in FIG. 45H, as data of the copying right with a number of times limitation and copy management information, information on an effective period of the copying right that indicates an effective period of a copying right by a date on which the period expires, or the number of days from a date to be a basis of starting an effective period until a date on which the period expires, or the like, and information on the number of times of copying that indicates the number of times contents can be copied are stored in a region of utilization right contents.

Moreover, as shown in FIG. 45I, as data of the right contents changing right, information on an effective period of the right contents changing right that indicates an effective period of a right content changing right by a date on which the period expires, or the number of days from a date to be a basis of starting an effective period until a date on which the period expires, or the like, an old rule number for retrieving utilization right contents before change, and a new rule number for retrieving utilization right contents after change are stored in a region of utilization right contents. Incidentally, as utilization right contents, a plurality of kinds of contents exist for each utilization right content in one reproduction right with period limitation as a plurality kinds of reproduction right with period limitation exist by setting the period. Therefore, since it is difficult to manage utilization right contents only by a utilization right contents number, in the right contents changing right, utilization right contents are managed by a rule number attached for each of a plurality of contents for each of these utility right contents.

As shown in FIG. 45J, as data of the repurchase right, information on an effective period of the repurchase right that indicates an effective period of a repurchase right by a date on which the period expires, or the number of days from a date to be a basis of starting an effective period until a date on which the period expires, or the like, an old rule number for retrieving utilization right contents before repurchase, and a new rule number for retrieving utilization right contents after repurchase, and maximum distribution generation information that indicates the maximum number of times contents can be repurchased are stored in a region of utilization right contents.

As shown in FIG. 45K, as data of the additional purchase right, information on an effective period of the additional purchase right that indicates an effective period of an additional purchase right by a date on which the period expires, or the number of days from a date to be a basis of starting an effective period until a date on which the period expires, or the like, and a minimum holding contents number and a maximum holding contents number indicating single contents already purchased among a plurality of single contents forming album contents are stored in a region of utilization right contents.

As shown in FIG. 45L, as data of the management transfer right, information on an effective period of the management transfer right that indicates an effective period of a management transfer right by a date on which the period expires, or the number of days from a date to be a basis of starting an effective period until a date on which the period expires, or the like is stored in a region of utilization right contents.

Incidentally, as such utilization right contents, for example, when data of a game is divided into a plurality of contents, a contents purchase right for purchasing the contents in accordance with a predetermined order may be provided for. Further, as shown in FIG. 45M, as data of the contents purchase right, information on an effective period of the contents purchase right that indicates an effective period of a contents purchase right by a date on which the period expires, or the number of days from a date to be a basis of starting an effective period until a date on which the period expires, or the like, an ID of contents already purchased, an old rule number for retrieving utilization right contents already purchased, and a new rule number for retrieving utilization right contents to be purchased anew are stored in a region of utilization right contents. In this way, a game program having a series of stories is made to be purchased, and contents (game) themselves can be upgraded.

FIG. 46 shows a data format of single contents, and in data of the single contents, a type of data, a type of contents, an effective period of contents, a category of contents, an ID of contents, an ID of a content provider, an encryption method of contents, a data length of encrypted contents, the encrypted contents, a public key certificates and a signature are stored.

In the single contents, the type of data indicates that the data is data of the contents, and the type of contents indicates that the contents are a single. The effective period of contents indicates a distribution period of the contents by a data on which the period expires, the number of days from a data to be a basis when distribution is started until the period expires, or the like. The category of contents indicates whether the contents are music data, program data, video data, or the like, and the ID of contents is for identifying the single contents.

The ID of a content provider indicates an ID of a content provider 2 having the single contents. The encryption method of contents indicates an encryption method used for encryption of the contents (e.g., DES). The signature is attached to the entirety from the type of data to the public key certificate excluding the signature from data of the single contents. An algorithm and a parameter used in preparing the signature as well as a key to be used for verification of the signature are included in the public key certificate.

In addition, FIG. 47 indicates a data format of album contents, and in data of the album contents, a type of data, a type of contents, an effective period of contents, an ID of an album, an ID of a content provider, the number of single contents, address information of single contents, single contents, a public key certificates and a signature are stored.

In the album contents, the type of data indicates that the data is data of the contents, and the type of contents indicates that the contents are an album. The effective period of contents indicates a distribution period of the contents by a data on which the period expires, the number of days from a data to be a basis when distribution is started until the period expires, or the like, and the ID of an album is for identifying the album contents.

The ID of a content provider indicates an ID of a content provider 2 having the album contents. The number of single contents indicates the number of single contents forming an album, the address information indicates a storage position of single contents forming the album, and is a data packet of a plurality of single contents forming the album that are actually stored in a position indicated by the address information. In addition, the signature is attached to the entirety from the type of data to the public key certificate excluding the signature from data of the single contents. An algorithm and a parameter used in preparing the signature as well as a key to be used for verification of the signature are included in the public key certificate.

In addition, in album contents, with the addition of a signature to the entire album contents, tamper or the like can be checked for each single content as well together with the album contents simply by verifying the signature without respectively verifying the single contents stored in the album contents, hence, the verification of a signature can be thereby simplified.

FIG. 48 shows a data format of a key for single contents, and in key data for the single contents, a type of data, a type of key data, an effective period of a key, an ID of contents, an ID of a content provider, a version of a key, an encryption method of a content key $K_{co}$, an encrypted content key $K_{co}$, an encryption method of an individual key $K_i$, an encrypted individual key $K_i$, a public key certificated and a signature are stored.

In the key data for single contents, the type of data indicate that the data is data of a key, the type of key data indicates the key data is for single contents. The effective data of a key indicates a usage period of a key (a content key $K_{co}$ and an individual key $K_i$) shown in the key data by a data on which the period expires, the number of days from a data to be a basis when use is started until the period expires, or the like, and the ID of contents indicates single contents to be encrypted by the content key $K_{co}$. The ID of a content provider holds contents and indicates an ID of a content provider 2 that has generated the content key $K_{co}$.

The version of a key indicates revision information of a key (a content key $K_{co}$ and an individual key $K_i$) that has been revised according to a usage period. The encryption method of contents key $K_{co}$ indicates an encryption method (e.g., DES) used for encryption of the content key $K_{co}$ using an individual key $K_i$, and the encrypted content key $K_{co}$ indicates a content key $K_{co}$ that has been encrypted using the individual key $K_i$ by the encryption method. The encryption method of an individual key $K_i$ indicates an encryption method (e.g., Triple-DES-CBC) for encrypting an individual key $K_i$ using a delivery key $K_d$, and the encrypted individual key $K_i$ indicates an individual key $K_i$ that has been encrypted using a delivery key $K_d$ by the encryption method. The signature is attached to the entirety from the type of data to the public key certificate excluding the signature from data of the single contents. An algorithm and a parameter used in preparing the signature as well as a key to be used for verification of the signature are included in the public key certificate.

Here, the delivery key $K_d$ and the individual key $K_i$ are delivered from a content provider 2, always united by key data for single contents. Then, in the key data for single contents, one signature is added to the entire data. Therefore, in an apparatus having received the key data for single contents, it is not necessary to separately verify signatures with respect to an encrypted content key $K_{co}$ and an encrypted key $K_i$, the signatures are deemed to be verified with respected to the encrypted content key $K_{co}$ and the encrypted individual key $K_i$ simply by verifying one signature of the key data for single contents, hence, the verification of a signature with respect to the encrypted content key $K_{co}$ and the encrypted individual key $K_i$ can be thereby simplified.

Figure 49:
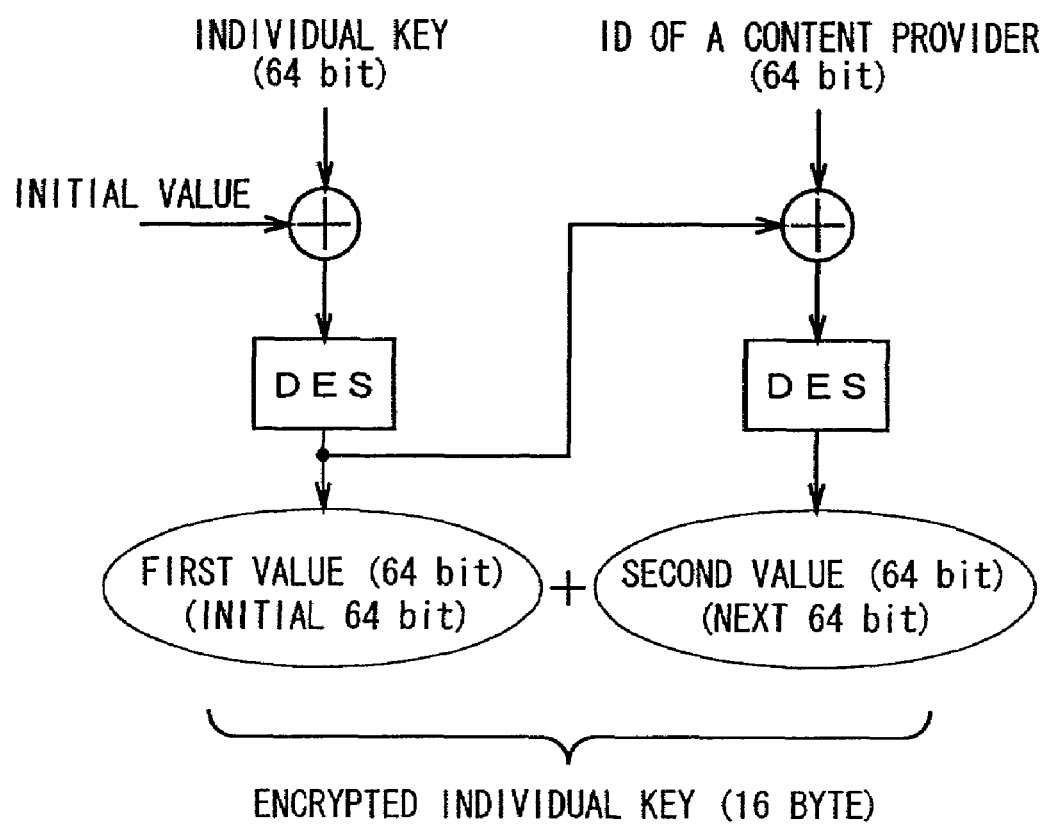
FIG. 49 is a block diagram served for explanation of encryption processing of an individual key.

Incidentally, an individual key $K_{co}$ is encrypted with an ID of a content provider that encrypts a content key $K_i$ using the individual key $K_i$. A method for encrypting an individual key $K_i$ together with an ID of a content provider by an encryption method called the CBC of a triple DES will be described with reference to FIG. 49. That is, with such an encryption method, after connecting a predetermined initial value and an individual key $K_i$ (64 bits), the individual key $K_i$ is encrypted by an encryption method by the CBC mode of triple DES, and after connecting a first value of a resulting 64 bits with an ID (64 bits) of a content provider, the individual key $K_i$ is encrypted by an encryption method by the CBC mode of triple DES using the delivery key $K_d$ again, thereby obtaining a second value of 64 bits. In such an encryption method, data of 16 bites connecting the first value and the second value becomes the encrypted individual key $K_i$ that is stored in key data for single contents (in this case, the first value corresponds to first 64 bit data of the encrypted individual key $K_i$ to be stored in the key data for single contents, and the second value becomes 64 bit data following the first value among the encrypted individual key $K_i$ to be stored in the key data for single contents.)

In addition, FIG. 50 shows key data for album contents, and in the key data for album contents, a type of data, a type of key data, an effective period of a key, an ID of an album, an ID of a content provider, a version of a key, the number of key data for single contents to be used for encrypting single contents forming an album, address information indicating a storage position of the key data, a key data packet stored in a position indicated by the address information, a public key certificate and a signature are stored.

In the key data for album contents, the type of data indicate that the data is data of a key, the type of key data indicates the key data is for album contents. The effective data of a key indicates a usage period of a key (a content key $K_{co}$) shown in the key data by a data on which the period expires, the number of days from a data to be a basis when use is started until the period expires, or the like, and the ID of an album indicates album contents consisting of single contents to be encrypted by the content key. $K_{co}$. The ID of a content provider indicates an ID of a content provider 2 that encrypts album contents.

The version of a key indicates revision information of a key (a content key $K_{co}$) revised according to a usage period. The signature is attached to the entirety from the type of data to the public key certificate excluding the signature from data of the single contents. An algorithm and a parameter used in preparing the signature as well as a key to be used for verification of the signature are included in the public key certificate.

In addition, in key data for album contents, with the addition of a signature to the entire album contents, tamper or the like can be checked for key data of each single content as well together with key data of the album contents simply by verifying the signature without respectively verifying key data for a plurality of single contents stored in key data for the album contents, hence, the verification of a signature can be thereby simplified.

Figure 51:
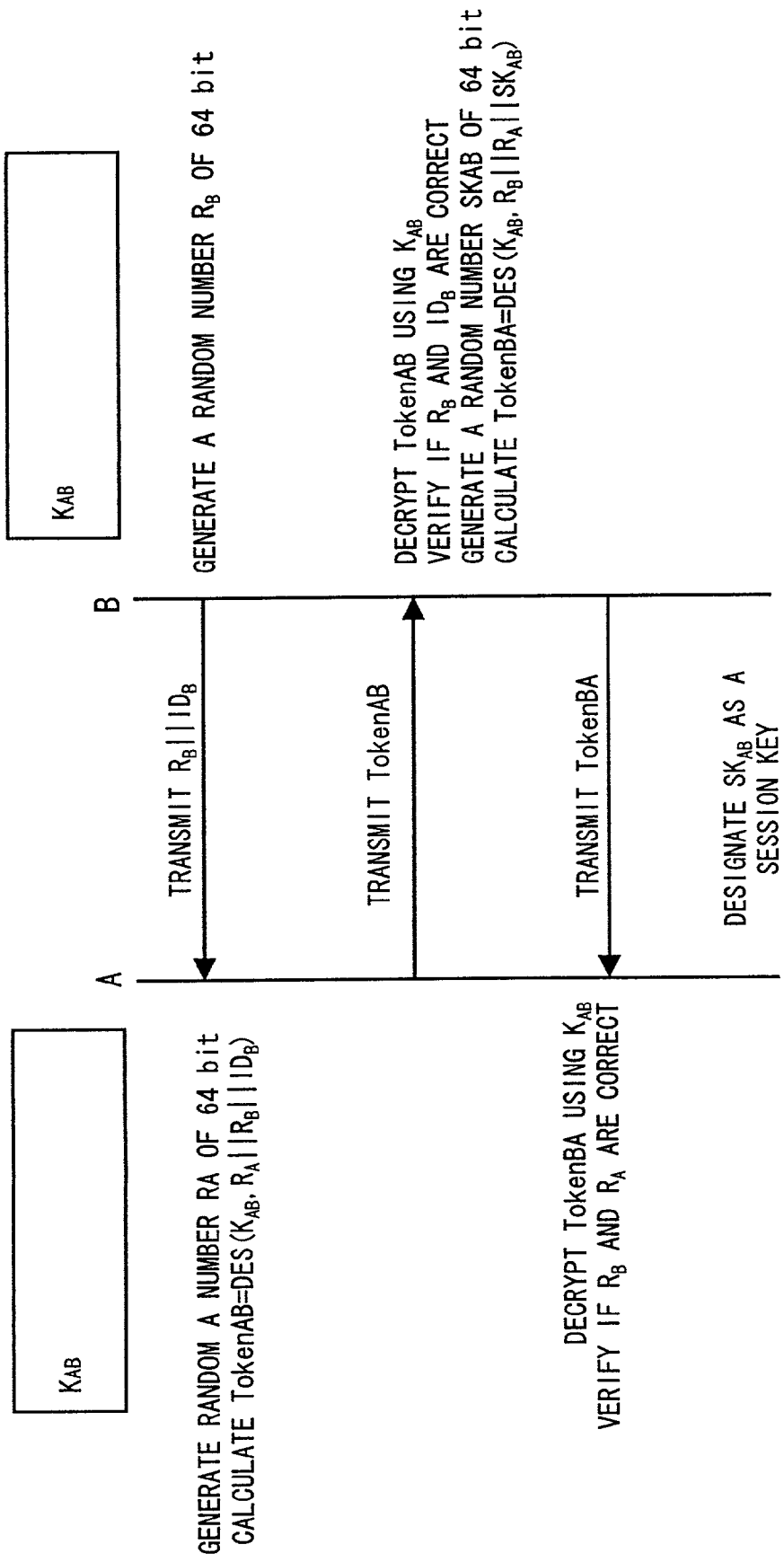
FIG. 51 is a timing chart showing a mutual authentication process using symmetrical key technology.

FIG. 51 illustrates operations of mutual authentication of an encryption processing section 65 and an extension section 66, in which one common key uses DES that is a common key encryption. In FIG. 51, given that A is an extension section 66 and B is an encryption processing section 65, the encryption processing section 65 generates a random number $R_B$ of 64 bits, and transmits $R_B$ and $ID_B$ that is its own ID to the extension section 66 via an upper controller 62. The extension section 66 having received the transmission generates a random number $R_A$ anew, encrypts $R_A$, $R_B$ and $ID_B$ using a key $K_{AB}$ in a CBC mode of DES, and returns them to the encryption processing section 65 via the upper controller 62.

The CBC mode of DES is a method for applying exclusive OR to immediately preceding output and input and encrypting them when conducting encryption. In this example, X=DES ($K_{AB}$, $R_A$+IV) IV=initial value, +: exclusive OR
Y=DES ($K_{AB}$, $R_B$+X)
Z=DES ($K_{AB}$, $ID_B$+Y)

and outputs are X, Y, Z. In these equations, DES ($K_{AB}$, $R_A$+IV) represents encrypting data $R_A$+IV with DES using a key $K_{AB}$, Y=DES ($K_{AB}$, $R_B$+X) represents encrypting data $R_B$+X with DES using the key $K_{AB}$, and Z=DES ($K_{AB}$, $ID_B$+Y) represents encrypting data $ID_B$+Y with DES using the key $K_{AB}$.

The encryption processing section 65 having received the data decrypts the received data with the key $K_{AB}$, and inspects whether $R_B$ and $ID_B$ match transmitted data. When the data passes the inspection, the extension section 66 is authenticated as a legal one. Subsequently, a session key (i.e., a temporary key $K_{temp}$, which is generated by a random number) $SK_{AB}$, $R_B$, $R_A$ and $SK_{AB}$ are encrypted using the key $K_{AB}$ in a CBC mode of DES and transmitted to the extension section 66 via the upper controller 62. The extension section 66 having received the transmission decrypts the received data with the key $K_{AB}$, and inspects whether $R_B$ and $R_A$ match the one transmitted by the extension section 66. When the data passes the inspection, the encryption processing section 65 is authenticated as a legal one, and the data $SK_{AB}$ is used for subsequent communications as a session key. Further, in examining the received data, if illegality or mismatching is found, mutual authentication is deemed failed and the processing is terminated.

Figure 52:
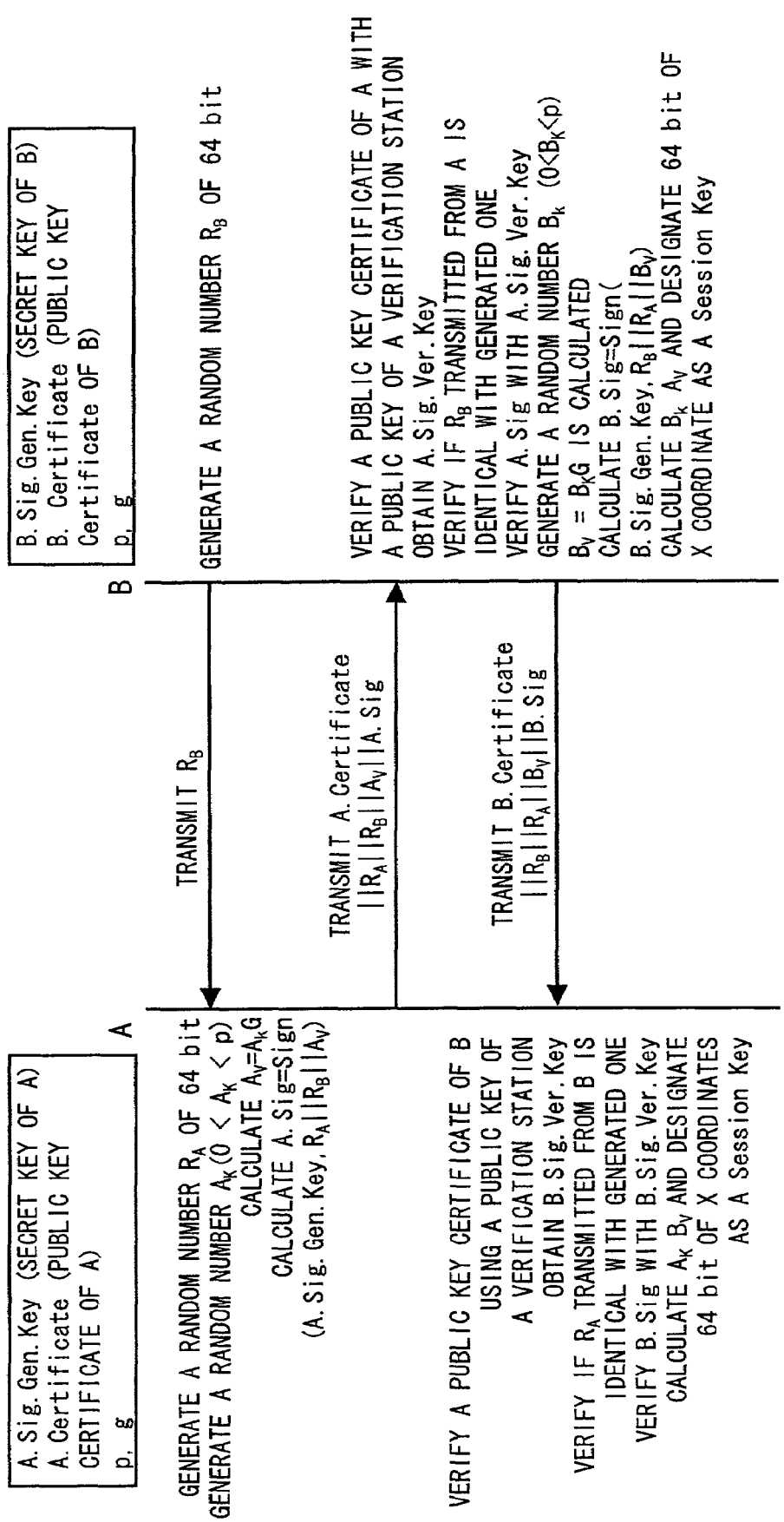
FIG. 52 is a timing chart showing a mutual authentication process using asymmetrical key technology.

FIG. 52 illustrates operation of mutual authentication between a mutual authentication module 95 in an encryption processing section 65 of a home server 51 and a mutual authentication module (not shown) in an encryption processing section 73 of a fixed apparatus 52 using an elliptical curve encryption of 160 bit length that is a public key encryption. In FIG. 52, given that A is an encryption processing section 73 and B is an encryption processing section 65, the encryption processing section 65 generates a random number $R_B$ of 64 bits, and transmits it to a fixed apparatus 52 via an upper controller 62 and a transmission section 61. The fixed apparatus 52 having received the random number generates a random number $R_A$ of 64 bits anew and a random number $A_K$ smaller than a sample number p in the encryption processing section 73. Then, the fixed apparatus 52 finds a point $A_V$ that is a base point G multiplied by $A_K$, connects $R_A$, $R_B$, $A_V$ (x coordinates and Y coordinates) (64 bits+64 bits+160 bits+160 bits=448 bits), and generates signature data A.Sig with a secret key held by itself with respect to the data. Further, since scalar times of a base point is the same as the method described in the generation of a signature of FIG. 10, its description is omitted. Connection of data is such data of 32 bits which, when data A of 16 bits and data B of 16 bits are connected, data of upper 16 bits is A and data of lower 16 bits is B. Since generation of a signature is the same as the method described in the generation of a signature of FIG. 10, its description is omitted.

Then, the encryption processing section 73 transfers $R_A$, $R_B$ and $A_V$ as well as the signature data A.Sig to the upper controller 72, and the upper controller 72 adds a public key certificate for the fixed apparatus 52 (stored in a small storage section 75), and transmits them to a home server 51 via a communication section 71. Since the public key certificate is illustrated in FIG. 32, its detailed description is omitted. The home server 51 having received this verifies a signature of the public key certificate of the fixed apparatus 52 in the encryption processing section 65. Since the verification of the signature is the same as the method described in the verification of the signature of FIG. 11, its description is omitted. Then, the encryption processing section 73 inspects whether the random number $R_B$ among the transmitted data is identical with the one transmitted by the encryption processing section 65, and if it is identical, verifies the signature data A.Sig. When the verification is successful, the encryption processing section 65 authenticates the encryption processing section 73. Further, since the verification of the signature is the same as the method described in the verification of the signature of FIG. 11, its description is omitted. Then, the encryption processing section 65 generates a random number $B_K$ smaller than the sample number p, finds a point $B_V$ that is the base point G times $B_K$, connects $R_B$, $R_A$ and $B_V$ (x coordinates and Y coordinates), and generates signature data B.Sig with a secret key held by itself with respect to the data. Finally, the encryption processing section 65 transfers $R_B$, $R_A$ and $B_V$ as well as the signature data B.Sig to the upper controller 62, and the upper controller 62 adds a public key certificate for the home server 51 (stored in a mass storage section 68) and transmits them to the fixed apparatus 52 via the communication section 61.

The fixed apparatus 52 having received this verifies the signature of the public key certificate of the home server 51 in the encryption processing section 73. Then, the fixed apparatus 52 inspects whether the random number $R_A$ among the transmitted data is identical with the one transmitted by the encryption processing section 73, and if it is identical, verifies the signature data B.Sig. When the verification is successful, the encryption processing section 73 authenticates the encryption processing section 65.

When both the data was successful in verification, the encryption processing section 65 calculates $B_K A_V$ (although $B_K$ is a random number, since $A_V$ is a point on an elliptic curve, scalar times calculation of a point on an elliptic curve is necessary), the encryption processing section 73 calculates $A_K B_V$, and the lower 64 bits of X coordinates of these points are used for subsequent communications as a session key (a temporary key $K_{temp}$) (if the common key encryption is the common key encryption of the 64 bit key length). Incidentally, the session key to be used for communication is not limited to the lower 64 bit of the X coordinates, but the lower 64 bits of the Y coordinates may be used. Further, in secret communication after mutual authentication, data is not only encrypted with the temporary key $K_{temp}$, but also a signature may be added to the encrypted transmission data.

In verifying a signature and received data, if illegality or mismatching is found, mutual authentication is deemed failed and the processing is terminated.

Figure 53:
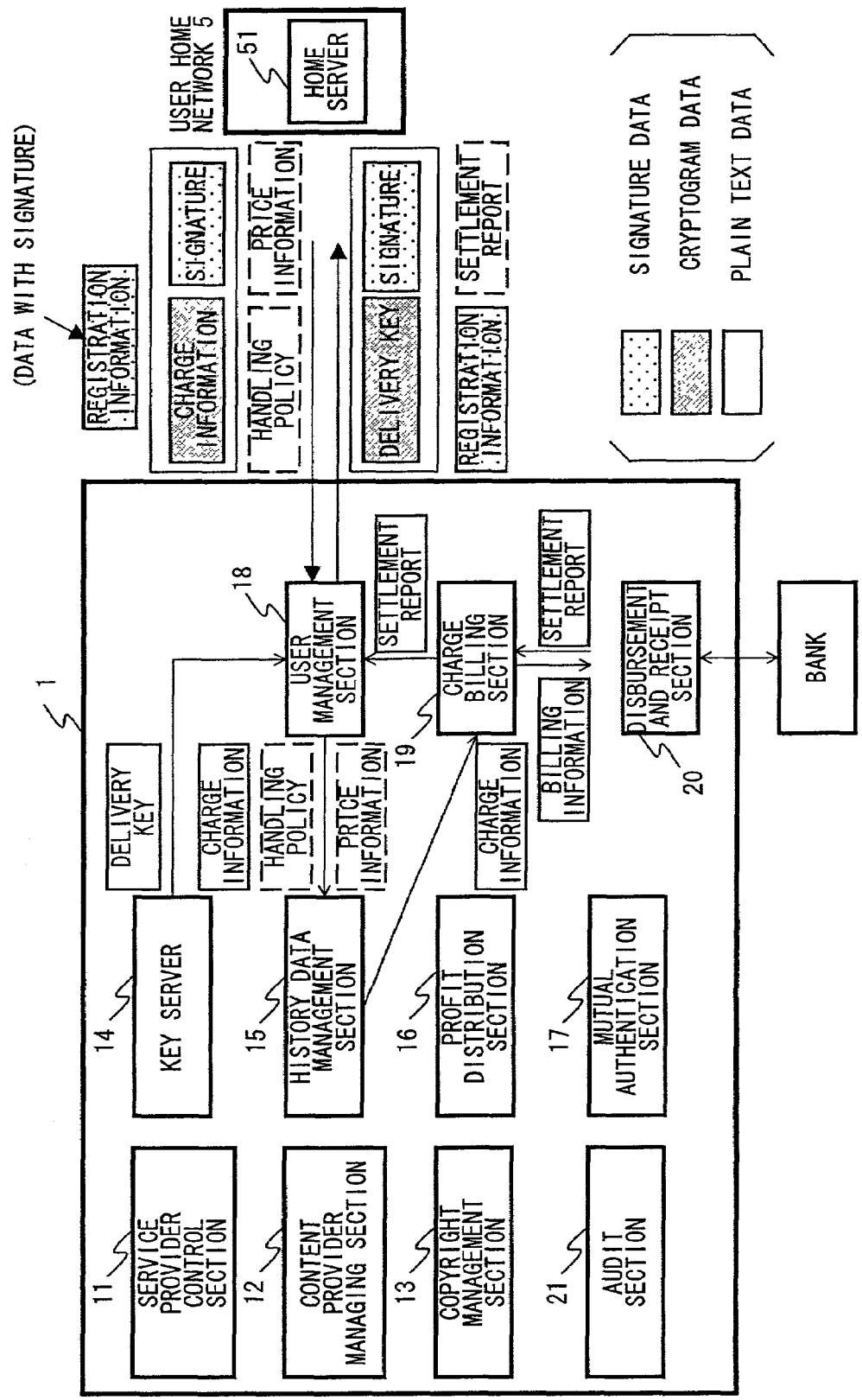
FIG. 53 is a skeleton block diagram showing transmitting operation of accounting information.

FIG. 53 illustrates operations when a settlement available apparatus in the user home network 5 transmits charge information to the electronic distribution service center 1. The settlement available apparatus in the user home network 5 retrieves an object apparatus that it should settle on behalf of the network from registration information, conducts mutual authentication, and has the charge information encrypted with the shared temporary key $K_{temp}$ (which is different for each mutual authentication) sharing the charge information and sent (a signature is attached to the data then). After finishing processing for all the apparatuses, the settlement available apparatus mutually authenticates with the electronic distribution service center 1, encrypts all the charge information with the shared temporary key, attaches signature data to these, and transmits them to the electronic distribution service center 1 together with a handling policy and price information, if necessary. Further, since an ID of a handling policy, an ID of price information and the like that are necessary for distribution of an amount are included in the charge information to be transmitted to the electronic service center 1 from the user home network 5, a handling policy or price information with large information amount is not necessarily transmitted. The user management section 18 receives this. The user management section 18 verifies signature data with respect to the received charge information, registration information, handling policy and price information. Since the verification of a signature is the same as the method described in FIG. 11, details are omitted. Then, the user management section 18 decrypts the charge information with the temporary key $K_{temp}$ that is shared for mutual authentication, and transmits the charge information to the history data management section 15 together with the handling policy and the price information.

Incidentally, in this embodiment, data to be transmitted after mutual authentication is encrypted with the temporary key $K_{temp}$, if necessary. For example, since, if contents of a content key $K_{co}$ and a handling key $K_d$ are seen, data is illegally utilized, it is necessary to encrypt them with the temporary key $K_{temp}$ and makes them invisible from outside. On the other hand, since, even if contents of charge information and license conditions information are seen, data cannot be illegally utilized, it is not always necessary to encrypt them with the temporary key $K_{temp}$, but damages to parties relating to receipt of an amount are generated if, for example, an amount of charge information is tampered or usage conditions of license conditions information is tampered to be loose. Therefore, tamper is prevented by attaching a signature to the charge information or the license conditions information. However, a signature may be attached if a content key $K_{co}$ or a delivery key $K_d$ is transmitted.

Then, a transmitting side generates a signature to data to be transmitted or data that is the data encrypted by the temporary key $K_{temp}$, and transmits the data and the signature. The receiving side obtains data by verifying the signature if the transmitted data is not encrypted by the temporary key $K_{temp}$, or obtains data by decrypting the data with the temporary key $K_{temp}$ after verifying the signature if the transmitted data is encrypted by the temporary key $K_{temp}$. In this embodiment, data to be transmitted after mutual authentication may be applied encryption by a signature or a temporary key $K_{temp}$, if necessary.

The user management section 18 receives a delivery key $K_d$ from the key server 14, encrypts it with a shared temporary key $K_{temp}$ to add signature data, prepares registration information from the user registration database, and transmits the delivery key $K_d$, the signature data and the registration information encrypted by the temporary key $K_{temp}$ to a settlement available apparatus in the user home network 5. Since a method of preparing registration information is just as described in FIG. 8, its detailed description is omitted here.

When executing settlement, the chart billing section 19 receives charge information, a handling policy, if necessary, and price information from the history data management section 15, calculates a charge amount billed to a user, and transmits billing information to the user. The receipt and disbursement section 20 communicates with a bank, or the like, and executes settlement processing. On that occasion, if there is information such as outstanding fees or the like of the user, the information is transmitted to the charge billing section 19 and the user management section 18 in the form of a settlement report, reflected on the user registration database, and referred to upon subsequent user registration processing or settlement processing.

The settlement available in the user home network 5 having received the delivery key $K_d$, the signature data and the registration data encrypted by the temporary key $K_{temp}$ updates stored registration information, at the same time, inspects the registration information, and if registration is made, encrypts the delivery key $K_d$ with the temporary key $K_{temp}$ after verifying the signature data, updates a delivery key $K_d$ stored in the storage module in the encryption processing section, and deletes charge information in the storage module. Subsequently, the settlement available apparatus retrieves an object apparatus that it should settle on behalf of the network from the registration information, conducts mutual authentication for each apparatus found by the retrieval, encrypts the delivery key $K_d$ read out from the storage module of the encryption processing section with a temporary key $K_{temp}$ that is different for each apparatus found by the retrieval, and attaches a signature for each apparatus to send it to each apparatus together with the registration information. The processing ends when all the object apparatuses that the apparatus should settle on behalf of the network are finishes.

The object apparatus having received the data inspects the registration information as the settlement available apparatus did, decrypts the delivery key $K_d$ with the temporary key $K_{temp}$ after verifying the signature data, updates the delivery key $K_d$ in the storage module, and deletes charge information.

Further, for an apparatus marked "registration unavailable" in the registration item of the registration information, since fee is not charged, update of the delivery key $K_d$ and deletion of the charge information are not conducted (contents of the registration items may be various cases that are not described such as stoppage of every actions including use, stoppage of purchase processing, state in which processing was conducted normally).

Figure 54:
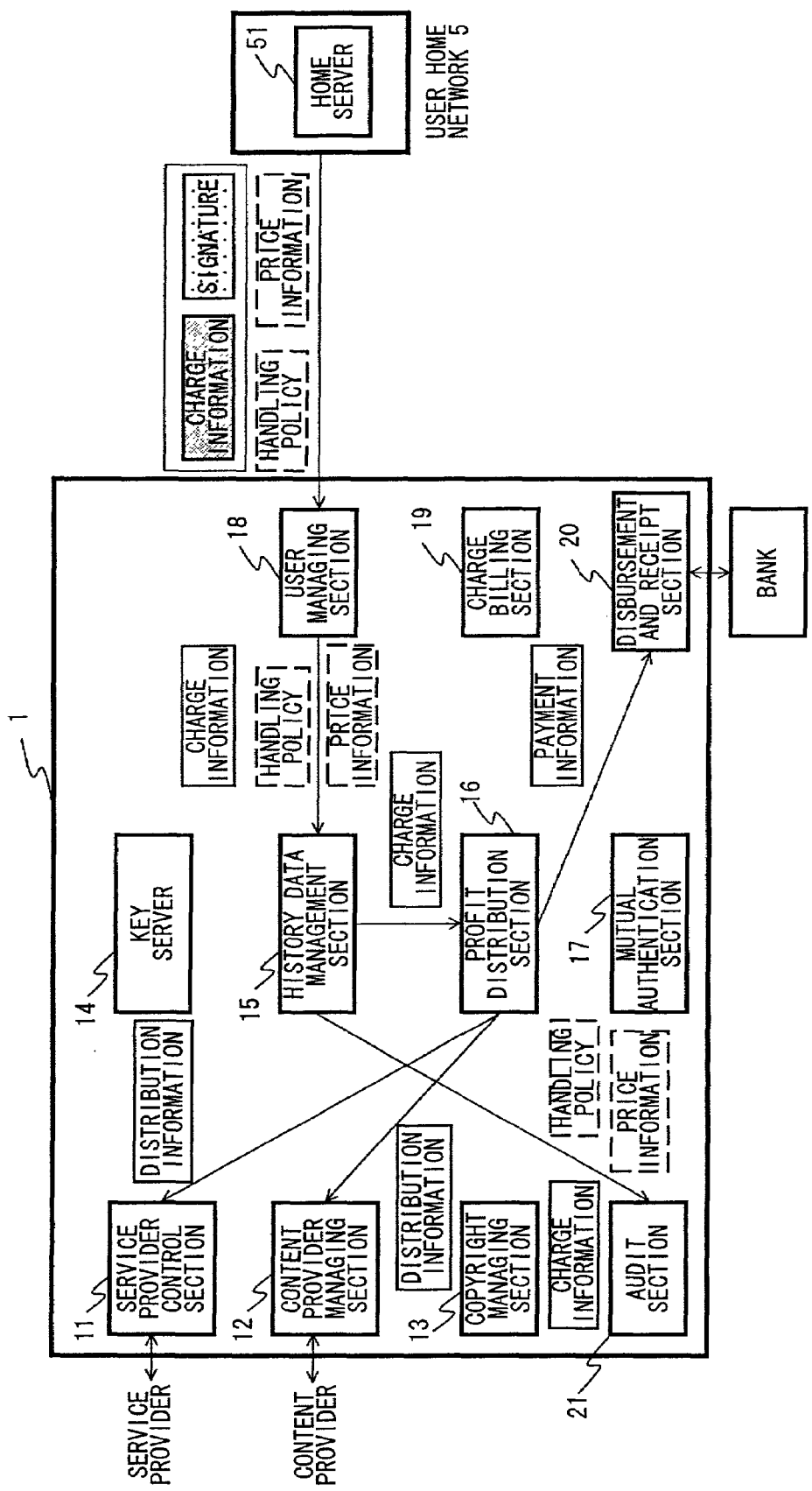
FIG. 54 is a skeleton block diagram showing profit distribution processing operation.

FIG. 54 illustrates operations of profit distribution processing of the electronic distribution service center 1. The history data management section 15 maintains and manages charge information transmitted from the user management section 18, a handling policy, if necessary, and price information. The profit distribution section 16 calculates profit for each of the content provider 2, the service provider 3 and the electronic distribution service center 1 from the charge information, the handling policy, if necessary, and the price information transmitted from the history data management section 15, and transmits the results to the service provider management section 11, the content provider management section 12 and the receipt and disbursement section 20. The receipt and disbursement section 20 communicates with a bank or the like, and conducts settlement. The service provider management section 11 transmits distribution information received from the profit distribution section 16 to the service provider 2. The content provider management section 12 transmits the distribution information received from the profit distribution section 16 to the content provider 3.

The audit section 21 receives charge information, a handling policy and price information from the history data management section 15, and audits if there is any inconsistency in data. For example, the audit section 21 audit if a price in the charge information coincides with data of the price information, if a distribution ratio is coincides, or the like, and audits if the handling policy and the price information coincide each other. In addition, as processing of the audit section 21, there are processing for auditing the coincidence between an amount received from the user home network 5 and a total amount of a distributed profit or an amount transferred to the service provider 3, and processing for auditing whether or not, for example, a content ID or a service provider ID that could not exist or an impossible share, price or the like is included in data in the charge information supplied from an apparatus in the user home network 5.

Figure 55:
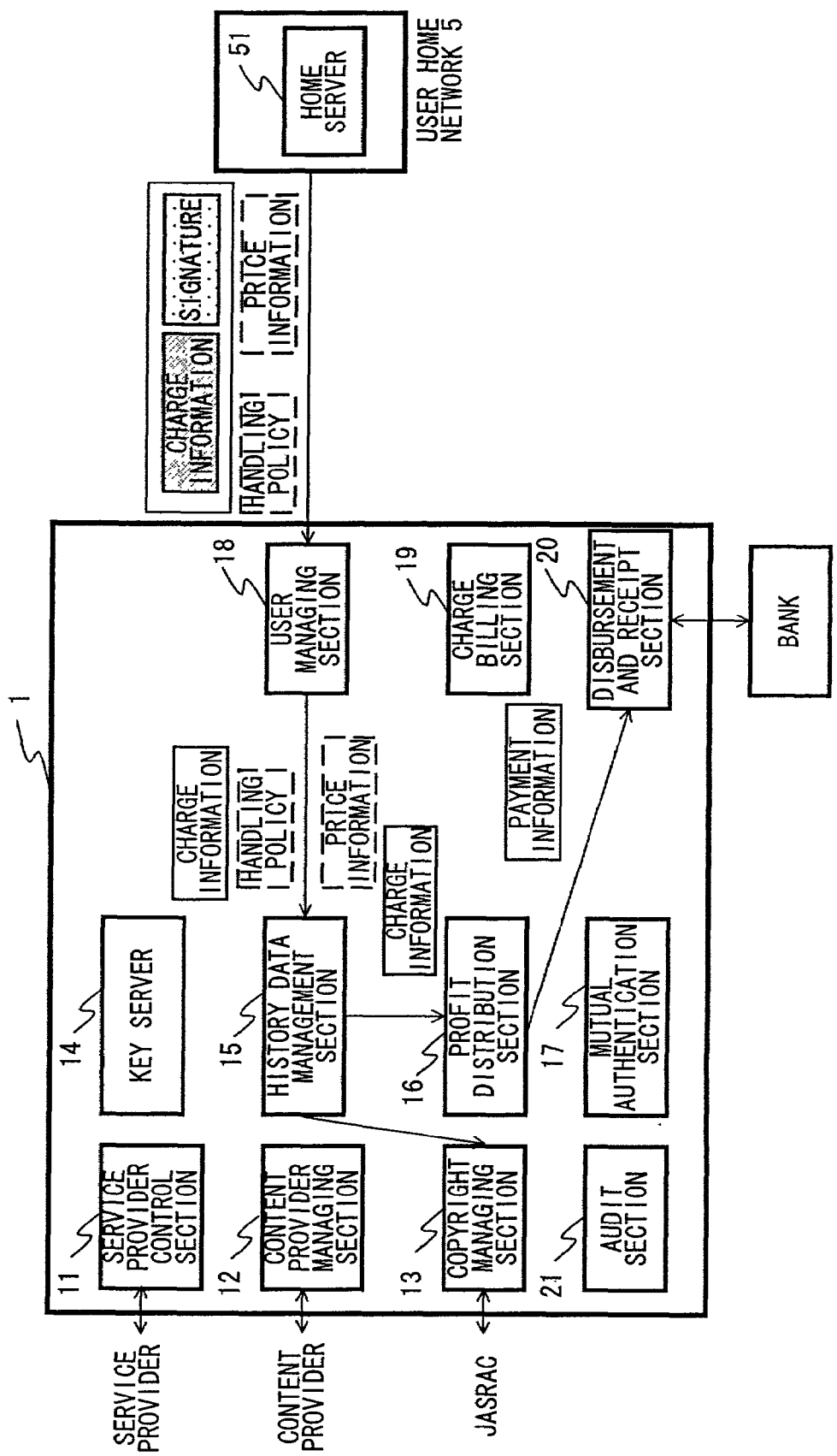
FIG. 55 is a skeleton block diagram showing transmitting operation of a track record of contents utilization.

FIG. 55 illustrates operations of processing in the electronic distribution service center 1 for transmitting utilization results of contents to JASRAC. The history data management section 15 transmits charge information indicating utilization results of contents by a user to the copyright management section 13 and the profit distribution section 16. The profit distribution section 16 calculates a billing amount to JASRAC and a payment amount from the charge information, and transmits payment information to the receipt and disbursement section 20. The receipt and disbursement section 20 communicates with a bank or the like, and executes settlement processing. The copyright management section 13 transmits the utilization results of contents by the user to JASRAC.

Figure 56:
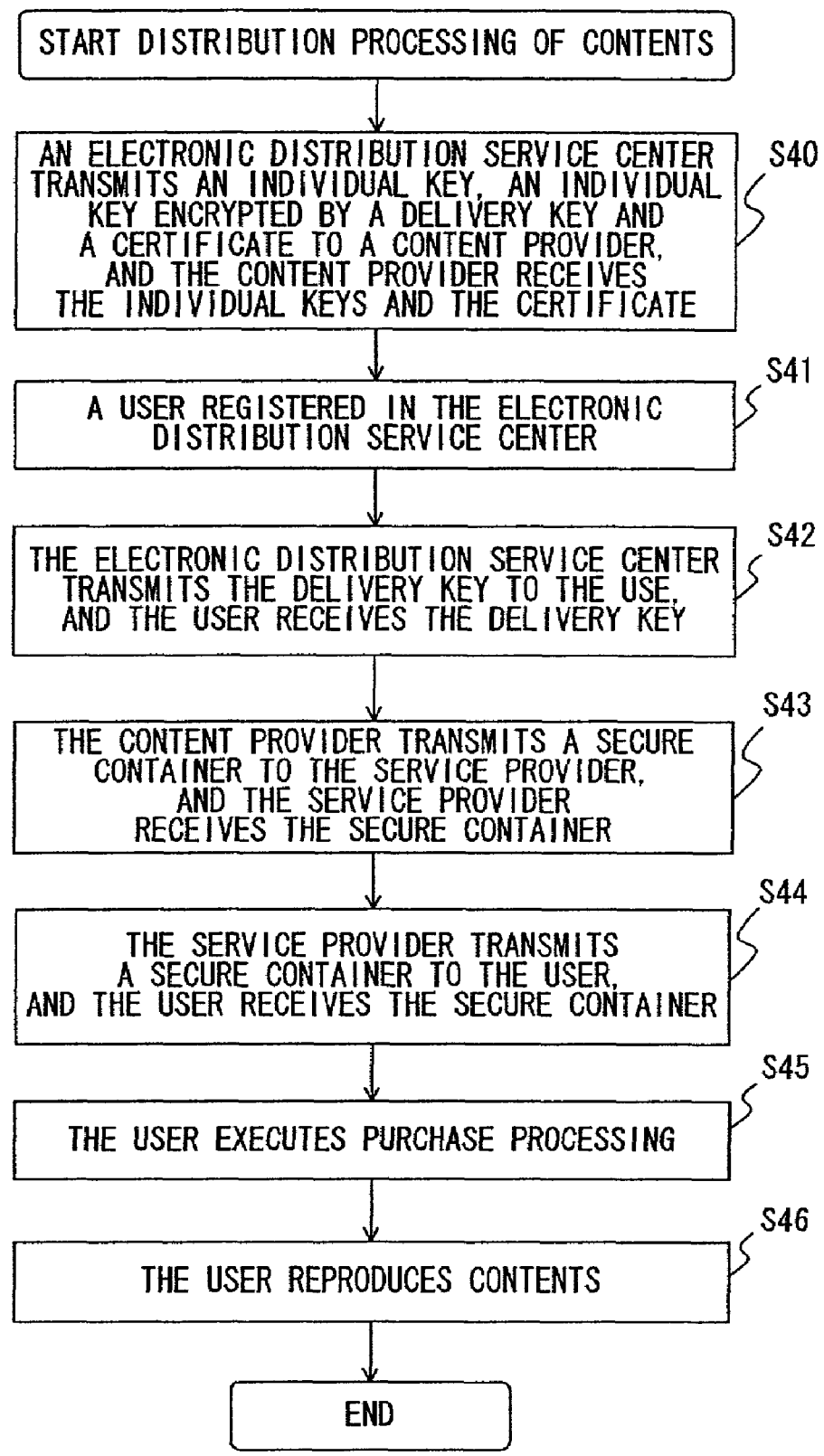
FIG. 56 is a flowchart showing a procedure for distributing and reproducing contents.

Processing of the EMD system will now be described. FIG. 56 is a flow chart illustrating processing of distribution and reproduction of contents of this system. In step S40, the content provider management section 12 of the electronic distribution service center 1 transmits an individual key $K_i$ encrypted by a delivery key $K_d$ and a public key certificate of the content provider 2 to the content provider 2, and the content provider 2 receives this. Details of the processing will be described later with reference to a flow chart of FIG. 57. In step S41, a user operates an apparatus (e.g., the home server 51 of FIG. 15) of the user home network 5, and registers the apparatus of the user home network 5 in the user management section 18 of the electronic distribution service center 1. Details of this registration processing will be described later with reference to a flow chart of FIG. 59. In step S42, the user management section 18 of the electronic service center 1, after mutually authenticating with the user home network 5 as described above with reference to FIG. 52, transmits the delivery key $K_d$ to the apparatus of the user home network 5. The user home network 5 receives the key. Details of this processing will be described with reference to a flow chart of FIG. 62.

In step S43, the signature generation section 38 of the content provider 2 generates a content provider secure container, and transmits it to the service provider 3. Details of this processing will be described later with reference to a flow chart of FIG. 65. In step S44, the signature generation section 45 of the service provider 3 generates a service provider secure container, and transmits it to the user home network 5 via the network 4. Details of this transmission processing will be described later with reference to a flow chart of FIG. 66. In step S45, the purchase module 94 of the user home network 5 executes purchase processing. Details of the purchase processing will be described later with reference to a flow chart of FIG. 67. In step S46, a user reproduces contents in an apparatus of the user home network 5. Details of the reproduction processing will be described later with reference to a flow chart of FIG. 72.

Figure 57:
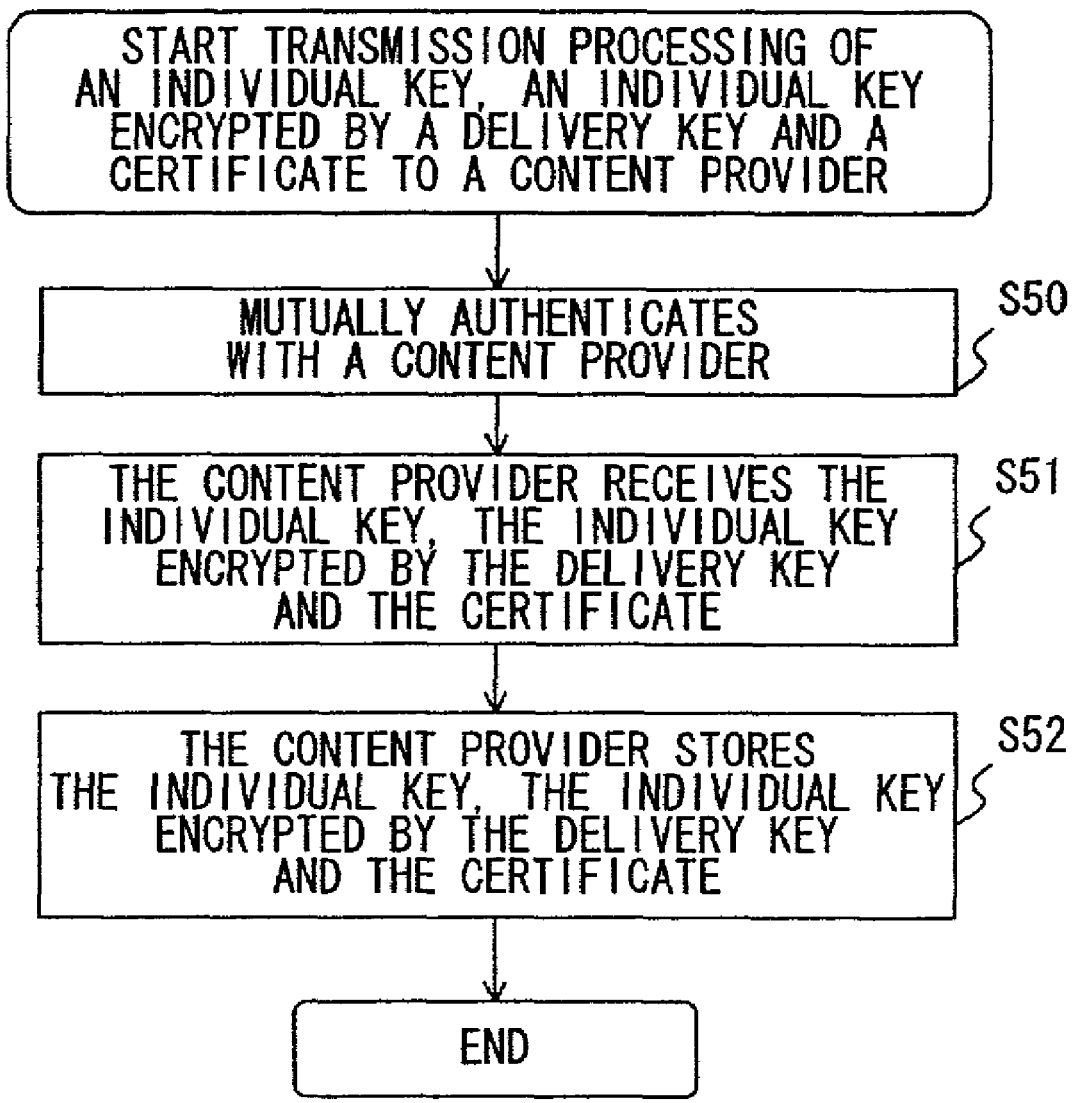
FIG. 57 is a flowchart showing a procedure of transmission to a contents provider.

FIG. 57 is a flow chart illustrating details of processing, which corresponds to S40 of FIG. 56, in which the electronic distribution service center 1 transmits an individual key $K_i$, an individual key $K_i$ encrypted by a delivery key $K_d$ and a public key certificate to the content provider 2, and the content provider 2 receives these. In step S50, the mutual authentication section 17 of the electronic distribution service center 1 mutually authenticates with the mutual authentication section 39 of the content provider 2. Since the mutual authentication processing was described in FIG. 52, its details are omitted. When it is confirmed that the content provider 2 is a legal provider with the mutual authentication, in step S51, the content provider 2 receives the individual key $K_i$, the individual key $K_i$ encrypted by the delivery key $K_d$ and the certificate transmitted from the content provider management section 12 of the electronic distribution service center 1. In step S52, the content provider 2 stores the received individual key $K_i$ in the tamper resistant memory 40A, and stores the individual key $K_i$ encrypted by the delivery key $K_d$ and the certificate in the memory 40B.

In this way, the content provider 2 receives an individual key $K_i$, an individual key $K_i$ encrypted by a delivery key $K_d$ and a certificated from the electronic distribution service center 1. Similarly, in an example in which processing of the flow chart shown in FIG. 56 is conducted, the service provider 3, in addition to the content provider 2, receives an individual key $K_i$ (which is different from the individual key $K_i$ of the content provider 2), an individual key $K_i$ encrypted by a delivery key $K_d$ and a certificate from the electronic distribution service center 1 with similar processing as that in FIG. 57.

Further, the memory 40A is desirably a tamper resistant memory whose data is not read out by a third party because it maintains an individual key $K_i$ that should be maintained secretly by the content provider 2, but hardware limitation is not necessary (e.g., a hard disk in a room to which entry is controlled, a hard disk of a personal computer whose password is controlled, or the like may suffice). In addition, the memory 40B may be any apparatus such as an ordinary storage apparatus or the like because it only stores an individual key $K_i$ encrypted by a delivery key $K_d$ and a certificate of the content provider 2 (does not need to be kept secret). Further, the memories 40A and 40B may be united.

Figure 58:
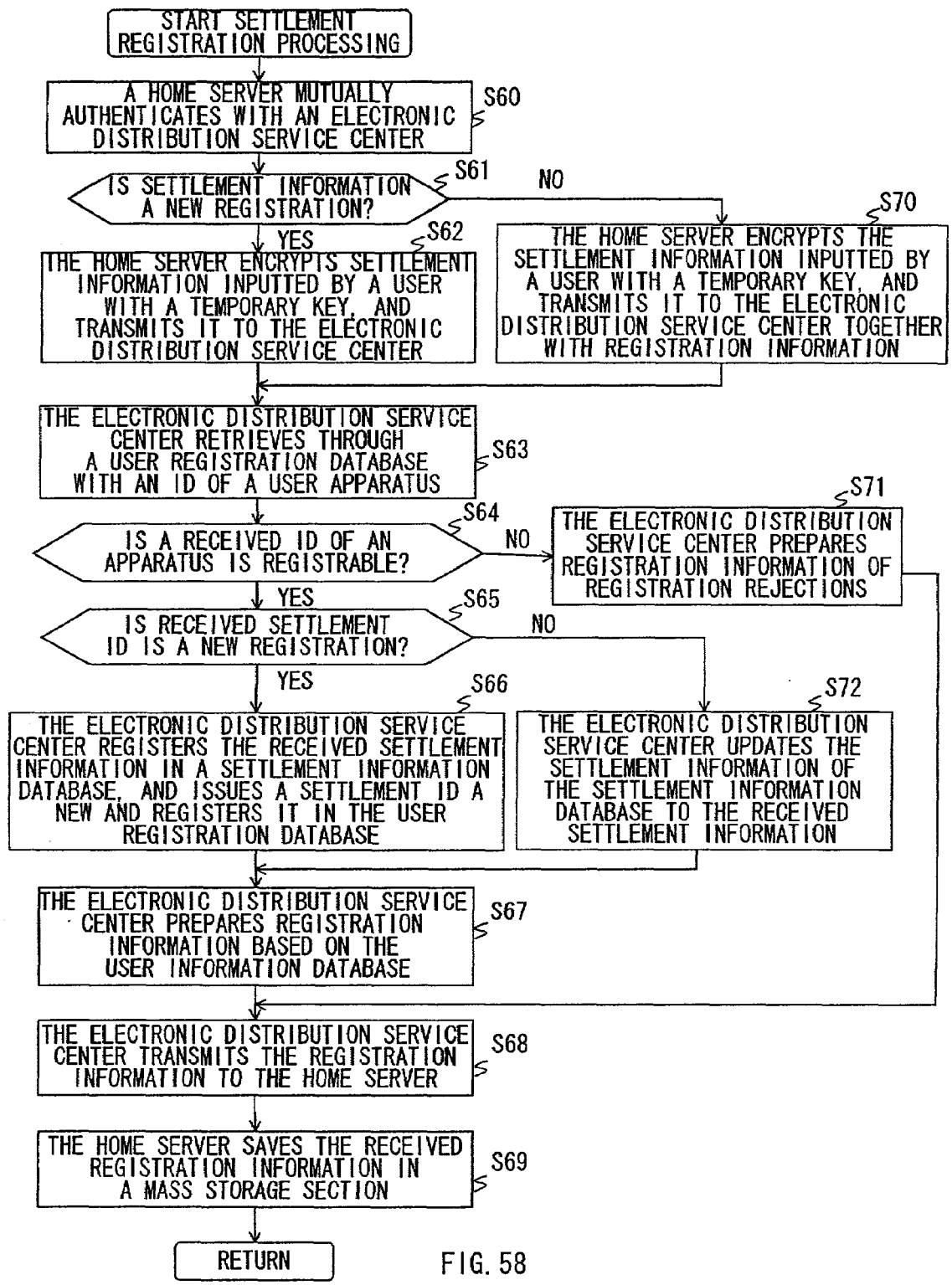
FIG. 58 is a flowchart showing a registration procedure of settlement information.

FIG. 58 is a flow chart illustrating processing in which the home server 51 registers settlement information in the user management section 18 of the electronic distribution service center 1. In step S60, the home server 51 mutually authenticates a public key certificate stored in the mass storage section 68 with the mutual authentication section 17 of the electronic distribution service center 1 in the mutual authentication module 95 of the encryption processing section 65. Since this authentication processing is similar to that described with reference to FIG. 52, description is omitted here. A certificate that the home server 51 transmits to the user management section 18 of the electronic distribution service center 1 in step S60 includes data (a public key certificate of a user apparatus) shown in FIG. 32.

In step S61, the home server decides whether or not a registration of an individual's settlement information (such as a user's credit card number, a settlement organization's account number, or the like) is a new registration, and if it is decided that it is a new registration, the processing proceeds to step S62. In step S62, a user input the individual's settlement information using the inputting means 63. The data is encrypted in the encryption unit 112 using a temporary key $K_{temp}$, and is transmitted to the user management section 18 of the electronic distribution service center 1 via the communication section 61.

In step S63, the user management section 18 of the electronic distribution service center 1 takes out an ID of an apparatus from the received certificate, and retrieves through the user registration database shown in FIG. 7 based on the ID of an apparatus. In step S64, the user management section 18 of the electronic distribution service center 1 decides whether or not registration of an apparatus having the received ID is possible, and if it is decided that the registration of an apparatus having the received ID is possible, the processing proceeds to step S65, and the user management section 18 decides whether or not the apparatus having the received ID is a new registration. In step S65, if it is decided that the apparatus having the received ID is a new registration, the processing proceeds to step S66.

In step S66, the user management section 18 of the electronic distribution service center 1 issues a settlement ID anew, and at the same time, decrypts the settlement information encrypted by the temporary key, registers the settlement ID and settlement information by associating them with an ID of the apparatus in the settlement information database that stores an apparatus ID, a settlement ID, settlement information (an account number, a credit card number or the like), transaction suspension information, and the like, and registers a settlement ID in the user registration database. In step S67, the user management section 18 prepares registration information based on data registered in the user registration database. Since this registration information is described in FIG. 8, its details are omitted.

In step S68, the user management section 18 of the electronic distribution service center 1 transmits the prepared registration information to the home server 51. In step S69, the upper controller 62 of the home server 51 stores the received registration information in the mass storage section 68.

In step S61, if it is decided that the registration of the settlement information is an updated registration, the processing proceeds to step S70, and the user inputs the individual's settlement information using the inputting means 63. The data is encrypted in the encryption unit 112 using a temporary key $K_{temp}$, and transmitted to the user management section 18 of the electronic distribution service center 1 via the communication section 61 together with the registration information already issued upon settlement registration.

In step S64, if it is decided that registration of an apparatus having a received ID is indispensable, the processing proceeds to step S71, where the user management section 18 of the electronic distribution service center 1 prepares registration information of registration rejection, and the processing proceeds to step S68.

In step S65, if it is determined that the apparatus having the received ID is not a new registration, the processing proceeds to step S72, where the user management section 18 of the electronic distribution service center 1 decrypts the settlement information encrypted by the temporary key, and updates and registers it in the settlement information registration database by associating it with the ID of the apparatus, and the processing proceeds to step S67.

In this way, the home server 51 is registered in the electronic distribution service center 1.

Figure 59:
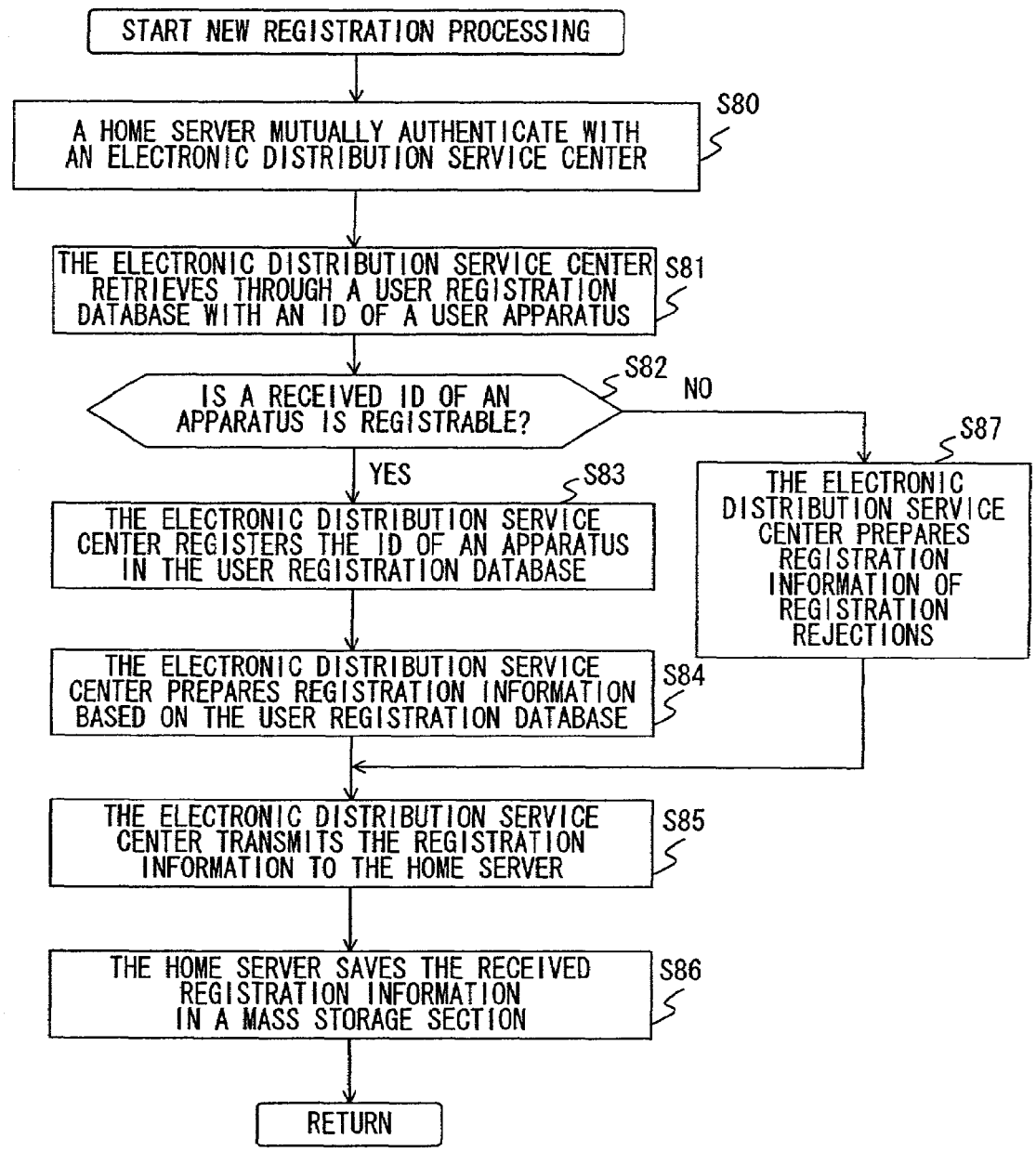
FIG. 59 is a flowchart showing a procedure for newly registering an equipment ID.

FIG. 59 is a flow chart illustrating processing for registering an ID of an apparatus in registration information anew. Since mutual authentication processing in step S80 is similar to the processing described in FIG. 52, details are omitted. Since step S81 is the same as step S63 of FIG. 58, its description is omitted. Since step S82 is the same as step S64 of FIG. 58, its description is omitted. In step S83, the user management section 18 of the electronic distribution service center 1 sets a registration item corresponding to an apparatus ID in the user registration database as "registration," and registers the apparatus ID. In step S84, the user management section 18 of the electronic distribution service center 1 prepares registration information as shown in FIG. 8 based on the user registration database. Since step S85 is the same as step S68 of FIG. 58, its description is omitted. Since step S86 is the same as the step S69 of FIG. 58, its description is omitted.

In step S82, if it is decided that registration of an apparatus having a received ID is indispensable, the processing proceeds to step S87, where the user management section 18 of the electronic distribution service center 1 prepares registration information of registration rejection, and the processing proceeds to step S85.

In this way, the home server 51 is registered in the electronic distribution service center 1.

Figure 60:
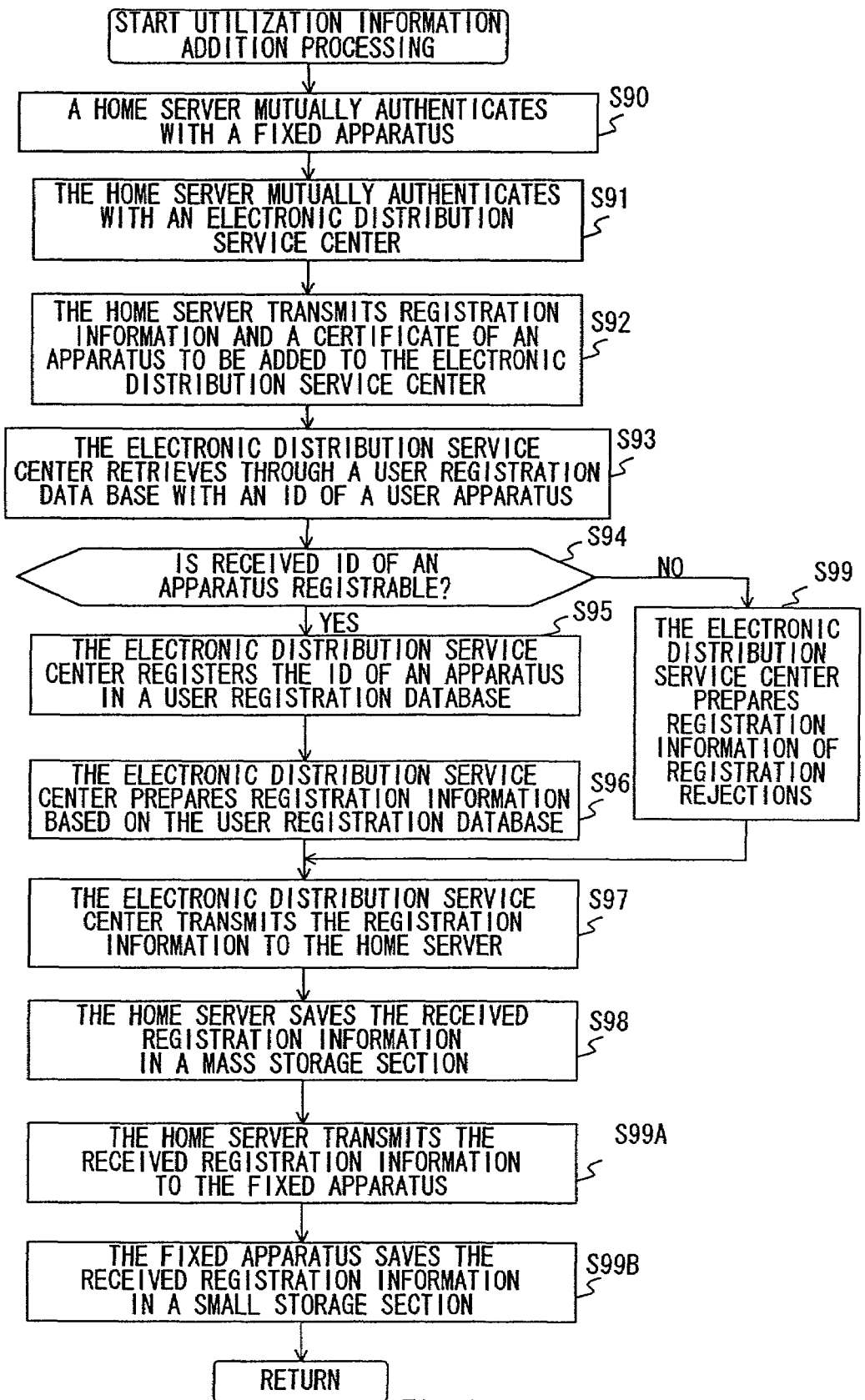
FIG. 60 is a flowchart showing a procedure of additional registration of equipment.

FIG. 60 is a flow chart illustrating processing in additionally registering another apparatus via an already registered apparatus. Here, an example in which the home server 51 is already registered and the fixed apparatus 52 is registered therein will be described. In step S90, the home server 51 mutually authenticates with the fixed apparatus 52. Since mutual authentication processing is similar to the processing described in FIG. 52, its description is omitted. In step S91, the home server 51 mutually authenticates with the electronic distribution service center 1. In step S92, the home server 51 transmits the registration information read out from the mass storage section 68 and the certificate of the fixed apparatus 52 obtain when mutually authenticating with the fixed apparatus 52 in step S90 to the electronic distribution service center 1. Since step S93 is the same as step S81 of FIG. 59, its description is omitted. Since step S94 is the same as step S82 of FIG. 59, its description is omitted. Since step S95 is the same as step S83 of FIG. 59, its description is omitted. In step S96, the user management section 18 of the electronic distribution service center 1 prepares registration information anew with information of the fixed apparatus 52 added in addition to the registration information received from the home server 51. Since step S97 is the same as step S85 of FIG. 59, its description is omitted. Since step S98 is the same as step S86 of FIG. 59, its description is omitted.

Then, in step S99A, the home server 51 transmits the received registration information to the fixed apparatus 52, and in step S99B, the fixed apparatus 52 stores the received registration information in the small storage section 75.

In step S94, if it is decided that registration of an apparatus having a received ID is indispensable, the processing proceeds to step S99, where the user management section 18 of the electronic distribution service center 1 prepares registration information indicating that only the fixed apparatus 52 is rejected registration (therefore, the home server 51 stays registered), and the processing proceeds to step S97 (the fact that the home server 51 has succeeded in mutual authentication with the electronic distribution service center 1 means that the home server 51 is registrable.)

In this way, the fixed apparatus 52 is additionally registered in the electronic distribution service center 1 by the processing procedures indicated in FIG. 60.

Figure 61:
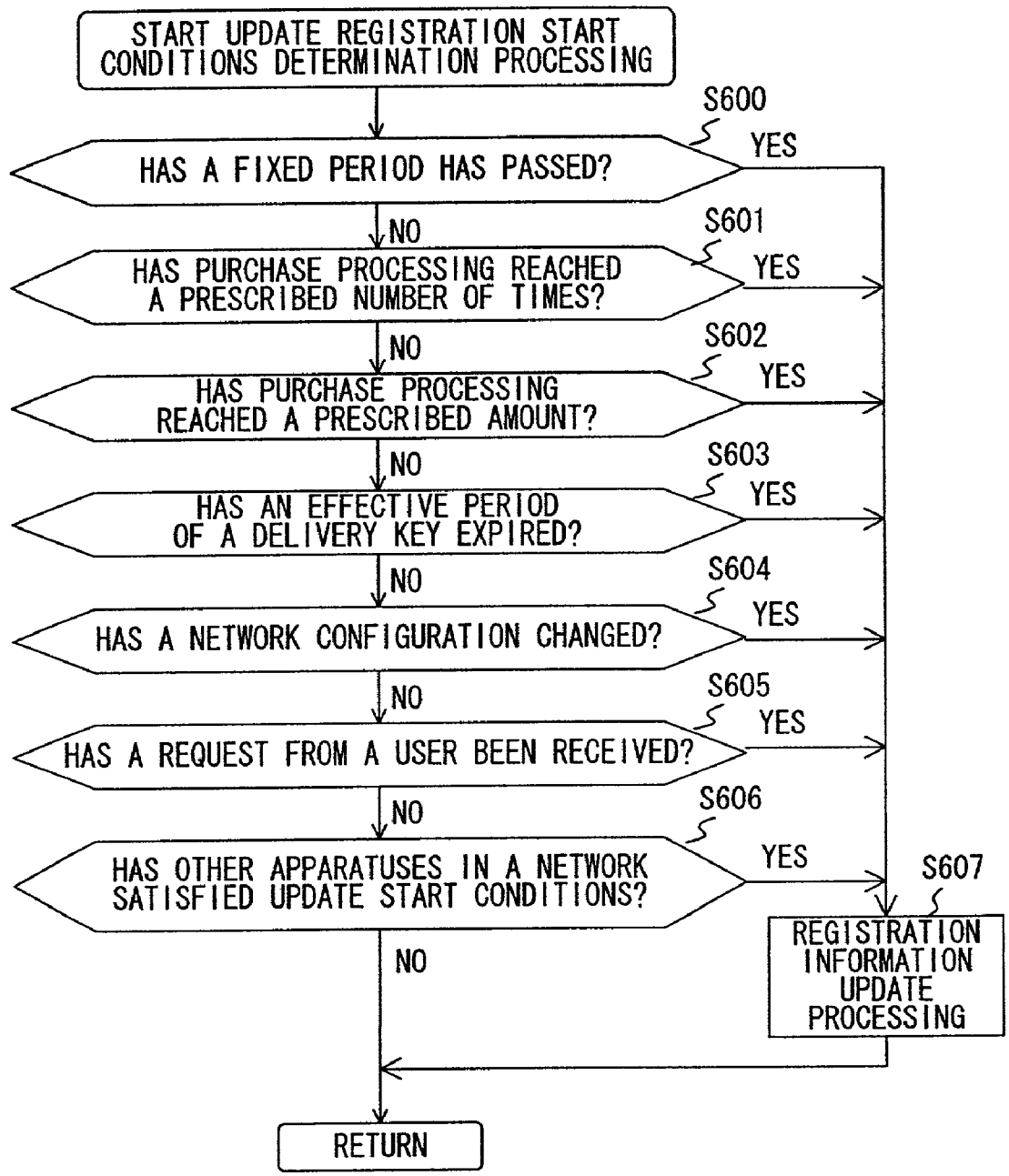
FIG. 61 is a flowchart showing a procedure for determining conditions for starting to change registration information.

Timing for a registered apparatus to conduct update of a registration (update of registered information) will now be described. FIG. 61 illustrates processing procedures for determining whether or not to conduct update of registered information based on various conditions, and in step S600, the home server 51 determines whether or not a predetermined period that is decided in advance has passed since obtaining a delivery key $K_d$, registration information or charge information by a clock (not shown) and a determination section (not shown). If a positive result is obtained here, this means that the predetermined period has passed since obtaining a delivery key $K_d$, registration information or charge information, then, the processing proceeds to step S607, where the home server 51 executes update processing of registration information. This processing will be described later in FIG. 62.

On the other hand, if a negative result is obtained in step S600, this means that a predetermined period has not passed since obtaining a delivery key or charge information, that is updating conditions of registration information with respect to passage of a period has not been met, and then, the processing proceeds to step S601.

In step S601, the home server 51 determines whether or not the number of times of purchasing contents has reached a prescribed number of times. If a positive result is obtained here, the processing moves to step S607, where the home server 51 executes registration information updating processing, whereas, if a negative result is obtained in step S601, this means that updating conditions of registration information has not been met with respect to the number of times of purchasing contents, thus, the processing proceeds to step S602.

In step S602, the home server 51 determines whether or not a purchase amount of contents has reached a prescribed amount. If a positive result is obtained here, the processing moves to step S607, where the home server 51 execute registration information updating processing, whereas, if a negative result is obtained in step S602, this means that updating conditions of registration information has not been met with respect to a purchase amount of contents, the processing proceeds to the following step S603.

In step S603, the home server 51 determines whether or not an effective period of a delivery key $K_d$ has expired. As means for determining whether or not an effective period of a delivery key $K_d$ has expired, whether or not a version of a delivery key $K_d$ of distributed data coincides with a version of any of three versions of delivery keys $K_d$ stored in the storage module 92, or whether or not a version of a delivery key $K_d$ of distributed data is older than a version of the latest delivery key $K_d$. If the versions does not coincide or if the version of the delivery key is older than the version of the latest delivery key $K_d$, this means that the effective period of the delivery key $K_d$ in the storage module 92 has expired, and the home server 51 obtains a positive result in step S603, thus the processing proceeds to step S603, where the home server 51 executes updating processing of registration information. On the other hand, if a negative result is obtained in step S603, this means that the updating conditions of registration information has not been met with respect to an effective period of a delivery key $K_d$, then the processing proceeds to the following step S604.

In step S604, the home server 51 determines if there is a change in a network configuration, such as whether or not another apparatus has been connected to the home server 51 anew, or whether or not another apparatus connected to the home server 51 has been disconnected. If a positive result is obtained here, this means that there has been a change in the network configuration, and then, the processing proceeds to step S607, where the home server 51 executes the updating processing of registration information. On the other hand, if a negative result is obtained in step S604, this means that the updating conditions of registration information is not met with respect to a network configuration, and the processing proceeds to the following step S605.

In step S605, the home server 51 determines whether or not there has been a registration information updating request from a user, and if there has been a registration information updating request, the processing proceeds to step S607, where the home server 51 executes the updating processing of registration information, and if there has been no registration information updating request, the processing proceeds to step S606.

In step S606, the home server 51 conducts the update determination in the above-mentioned steps S600 through S605 with respect to other apparatuses connected to the home server 51, if a determination result indicating that updating should be made is obtained, the processing proceeds to step S607, where the home server 51 executes the updating processing of registration information, whereas, if a determination result indicating that updating should be made is not obtained, the home server 51 repeats similar processing from the above-mentioned step S600. Thus, the home server 51 can obtain timing for executing the updating processing of registration information. Further, another apparatus may check its own update starting conditions and send a request to the home server 51 by itself instead of the home server 51 checking update starting conditions of another apparatus.

Figure 62:
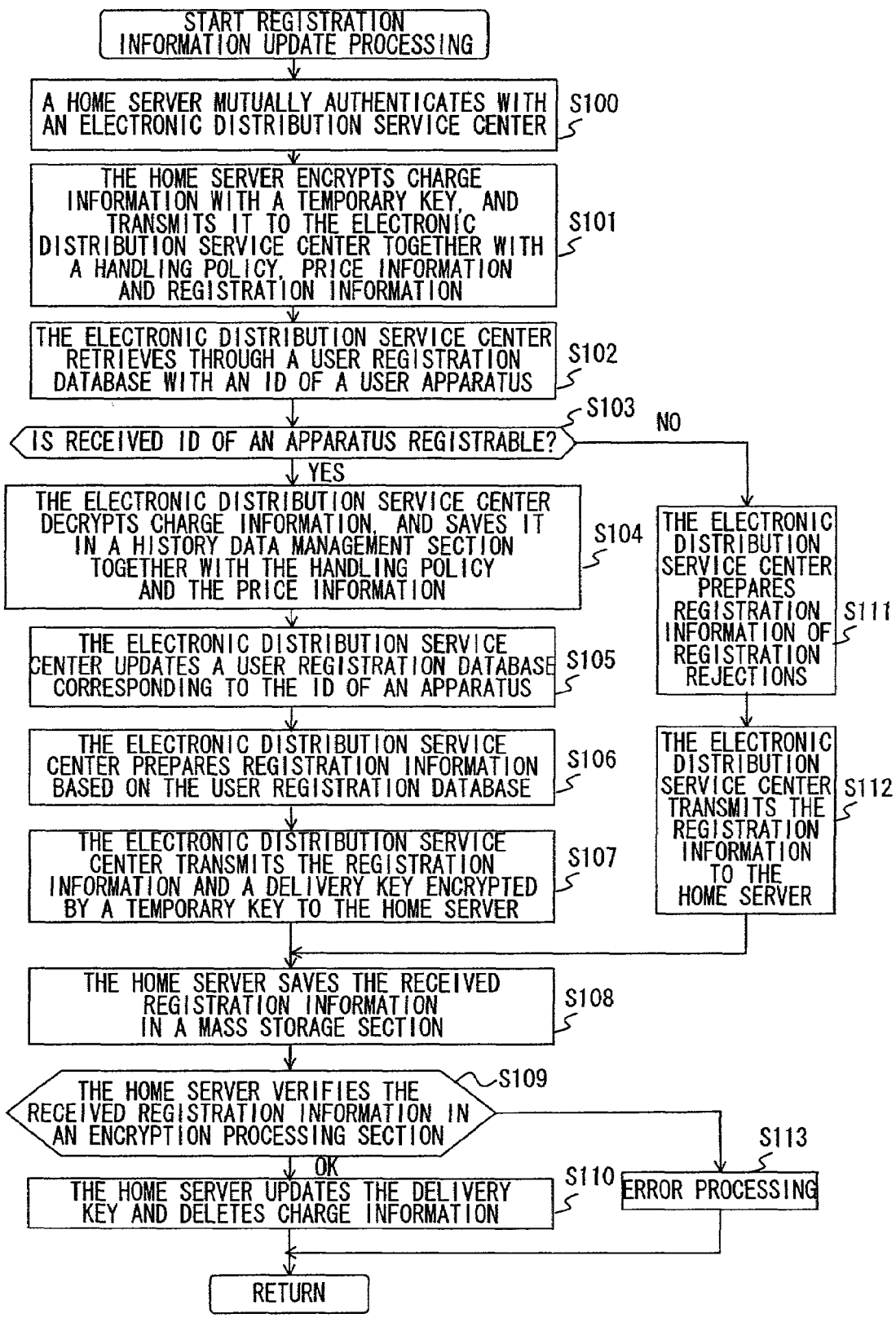
FIG. 62 is a flowchart showing a procedure for updating registration information.

FIG. 62 is a flow chart illustrating operations for a registered apparatus updating a registration (update of registered information), executing settlement processing, and receiving re-distribution of a delivery key $K_d$. Since mutual authentication processing in step S100 is similar to the processing described in FIG. 52, its description is committed. In step S101, the home server 51 encrypts charge information stored in the storage module 92 using a temporary key $K_{temp}$ in the encryption unit 112 of the encryption processing section 96, generates a signature by the signature generation unit 114, and adds a signature. Then, the home server 51 transmits the encrypted charge information and its signature to the electronic distribution service center 1 together with a handling policy, price information and registration information stored in the mass storage section 68. Further, at this moment, the handling policy and the price information may not be sent by a model. This is because, in some cases, the content provider 2 and the service provider 3 have transmitted them to the electronic distribution service center 1 in advance, or necessary information among the handling policy and the price information is included in the charge information.

Since step S102 is the same as step S81 of FIG. 59, its description is omitted. Since step S103 is the same as step S82 of FIG. 59, its description is omitted. In step S104, the user management section 18 of the electronic distribution service center 1 verifies a signature by the signature verification unit 115, decrypts received charge information by a temporary key $K_{temp}$ (if an electronic signature is attached to the received data, it is verified by the signature verification unit 115), and (if received) transmits the charge information to the history data management section 15 together with the handling policy and the price information. The history data management section 15 having received this maintains and manages the received data.

In step S105, the user management section 18 of the electronic distribution service center 1 verifies a registration item corresponding to an apparatus ID in the user registration database, and at the same time, updates data. For example, the data is such data as a registration date or a charge status (not shown). Since step S106 is the same as step S84 of FIG. 59, its description is omitted. In step S107, the user management section of the electronic distribution service center 1 encrypts a delivery key $K_d$ supplied from the key server 14 by a temporary key $K_{temp}$, and transmits the delivery key $K_d$ to the home server 51 together with registration information.

In step S108, the home server 51 stores the received registration information in the mass storage section 68. In step S109, the home server 51 inputs the received registration information in the encryption processing section 65, where the home server 51 verifies an electronic signature included in the registration information by the signature verification unit 115, and at the same time, causes the unit to confirm if an apparatus ID of the home server 51 is registered, and when the verification is successful and it is confirmed that the charge processing is completed, the processing proceeds to step S110. In step S110, the home server 51 input the received delivery key $K_d$ to the encryption processing section 65. In the encryption processing section 65, the home server 51 decrypts the received delivery key $K_d$ using a temporary key $K_{temp}$ by the decryption unit 111 of the encryption/decryption module 96, stores (updates) the delivery key $K_d$ in the storage module 92, and deletes charge information held in the storage module 92 (this makes settlement completed).

In step S103, if it is decided that registration of an apparatus having the received ID is impossible, the processing proceeds to step S111, where the user management section 18 of the electronic distribution service center 1 prepares registration information indicating that registration is rejected, and the processing proceeds to step S112. In step S112, which is different from step S107, only registration information is transmitted to the home server 51.

In step S109, if verification of a signature included in the registration information is failed, or if "registration possible" is not written in an item of "registration" (e.g., charge processing failed—purchase processing not available, registration rejected—functions of the encryption processing section including processing such as reproduction stopped, transaction temporarily stopped—charge processing successful, but purchase is stopped due to some reason, etc. are possible) included in the registration information, the processing proceeds to step S113, and a predetermined error processing is performed.

In this way, the home server 51 updates registration information, at the same time, transmits charge information to the electronic distribution service center 1, and receives supply of a delivery key $K_d$ in return.

Figure 63:
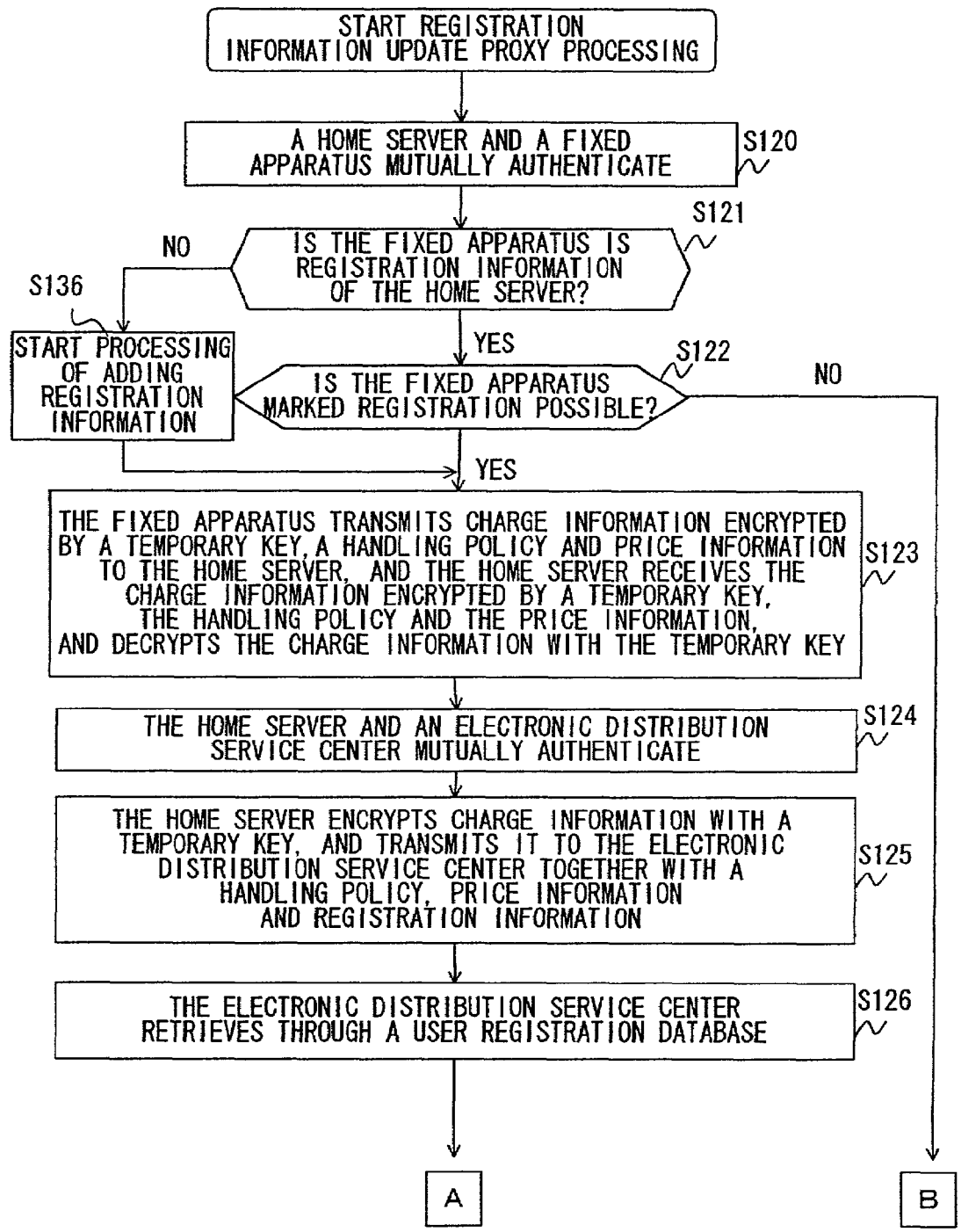
FIG. 63 is a flowchart showing a proxy procedure for updating registration information by a fixed apparatus.
Figure 64:
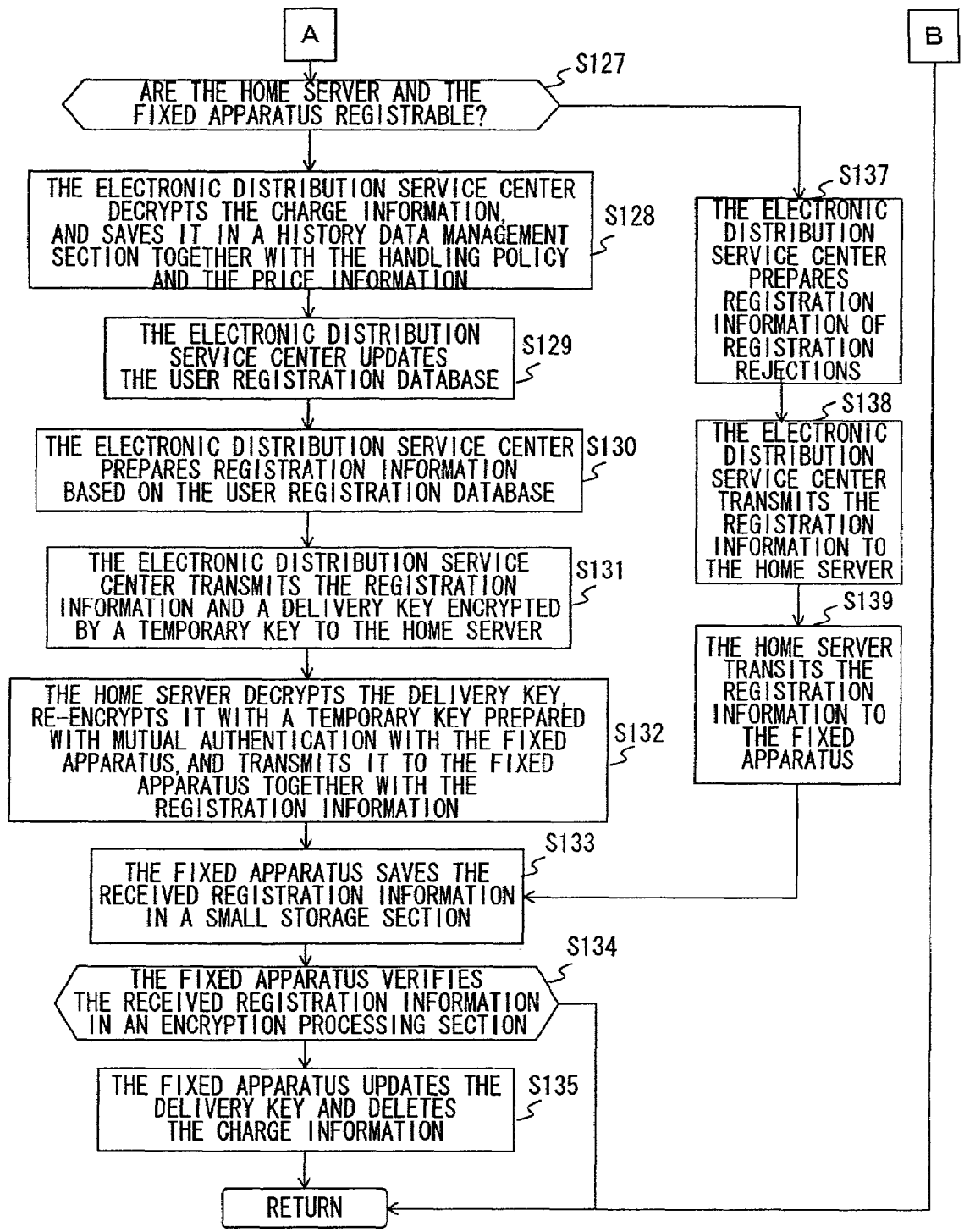
FIG. 64 is a flowchart showing a proxy procedure for updating registration information by a fixed apparatus.

FIGS. 63 and 64 illustrate flow charts describing processing for settlement, update of registration information, and update of a delivery key $K_d$. In step S120, the mutual authentication module 94 of the home server 51 and a mutual authentication module (not shown) of a fixed apparatus mutually authenticate. Since mutual authentication processing is the same as the processing described in FIG. 52, its description is omitted. Further, as described in the mutual authentication processing, since the home server 51 and the fixed apparatus 52 mutually exchange certificates, it is assumed that they know their IDs each other. In step S121, the upper controller 62 of the home server 51 reads out registration information of the mass storage section 68, and causes the encryption processing section 65 to inspect the information. The encryption processing section 65 having received the registration information from the upper controller 62 verifies a signature in the registration information, decides if the ID of the fixed apparatus exists, and if the ID of the fixed apparatus exists in the registration information, the processing proceed to step S122.

In step S122, the encryption processing section 65 decides whether or not the ID of the fixed apparatus 52 is registered in the registration information, and if the ID of the fixed apparatus 52 is registered, the processing proceeds to step S123. In step S123, the encryption processing section 73 of the fixed apparatus 52 reads out charge information stored in the storage module, and encrypts the information in the encryption unit using a temporary key $K_{temp}$. In addition, the encryption processing section 73 generates a signature corresponding to the charge information in the signature generation unit. Since the generation of an signature was described in FIG. 10, its description is omitted. The upper controller 72 having received the charge information encrypted by the temporary key $K_{temp}$ and its signature reads out a corresponding handling policy and price information from the small storage section 75, if necessary, and transmits the charge information encrypted by the temporary key $K_{temp}$ and its signature as well as the handling policy and the price information corresponding to the charge information, if necessary, to the home server 51.

The home server 51 having received the data stores the handling policy and the price information, if received, in the mass storage section 68, and at the same time, inputs the charge information encrypted by the temporary key $K_{temp}$ and its signature in the encryption processing section 65. The encryption processing section 65 having received the charge information encrypted by the temporary key $K_{temp}$ and its signature verifies the signature for the charge information encrypted by the temporary key $K_{temp}$ by the signature verification unit 115 of the encryption/decryption module 96. Since the verification of a signature is the same as the processing described in FIG. 11, its details are omitted. Then, the decryption unit 111 of the encryption/decryption module 96 decrypts the charge information encrypted by the temporary key $K_{temp}$.

In step S124, the home server 51 mutually authenticates with the mutual authentication section 17 of the electronic distribution service center 1, and shares a temporary key $K_{temp2}$. In step S125, the home server 51 encrypts the charge information transmitted from the fixed apparatus 52 by the encryption unit 112 of the encryption/decryption module 96 using the temporary key $K_{tepm2}$. At this moment, the home server 51 may encrypts the charge information of the home server 51 as well. In addition, the home server 51 generates a signature corresponding to the charge information encrypted by the temporary key $K_{tepm2}$ by the signature generation unit 114 of the encryption/decryption module 96. The upper controller 62 having received the charge information encrypted by the temporary key $K_{tepm2}$ and its signature reads out a handling policy, price information and registration information from the mass storage section 68, if necessary, and transmits the charge information encrypted by the temporary key $K_{tepm2}$ and its signature, as well as the handling policy, the price information and the registration information, if necessary, to the user management section 18 of the electronic distribution service center 1.

In step S126, the user management section 18 of the electronic distribution service center 1 retrieves through the user registration database. In step S127, the user management section 18 decides whether or not the home server 51 and the fixed apparatus 52 are registered as registrable in the item "registration" in the user registration database, and if it is decided that they are registered, the processing proceeds to step S128. In step S128, the user management section 18 of the electronic distribution service center 1 verifies a signature for the charge information encrypted by the temporary key $K_{temp2}$, and decrypts the charge information by the temporary key $K_{temp2}$. Then, the user management section 18 transmits the charge information as well as the handling policy and the price information, if received, to the history data management section 15. The history data management section 15 having received the charge information as well as the handling policy and the price information, if received, manages and stores the data.

In step S129, the user management section 18 of the electronic distribution service center 1 updates the user registration database (charge data receipt data and time, issued data and time of registration information, date and time of a delivery key, etc.). In step S130, the user management section 18 of the electronic distribution service center 1 prepares registration information (e.g., an example of FIG. 8). In step S131, the user management section 18 of the electronic distribution service center 1 encrypts the delivery key $K_d$ received from the key server 14 of the electronic distribution service center 1 by the temporary key $K_{temp2}$, and generates a signature for the delivery key $K_d$ encrypted by the temporary key $K_{temp2}$. Then, the user management section 18 transmits the delivery key $K_d$ encrypted by the temporary key $K_{temp2}$ and the signature for the delivery key $K_d$ encrypted by the temporary key $K_{temp2}$.

In step S132, the home server 51 receives the registration information, the delivery key $K_d$ encrypted by the temporary key $K_{temp2}$ and the signature for the delivery key $K_d$ encrypted by the temporary key $K_{temp2}$. The upper controller 62 of the home server 51 inputs the delivery key $K_d$ encrypted by the temporary key $K_{temp2}$ and the signature for the delivery key $K_d$ encrypted by the temporary key $K_{temp2}$ in the encryption processing section 65. In the encryption processing section 65, the signature verification unit 115 of the encryption/decryption module 96 verifies the signature for the delivery key $K_d$ encrypted by the temporary key $K_{temp2}$, the decryption unit 111 of the encryption/decryption module 96 decrypts the delivery key $K_d$ using the temporary key $K_{temp2}$, and the encryption unit 112 of the encryption/decryption module 96 re-encrypts the encrypted delivery key $K_d$ using the temporary key $K_{temp}$ shared with the fixed apparatus 52. Finally, the signature generation unit 114 of the encryption/decryption module 96 generates a signature corresponding to the delivery key $K_d$ encrypted using the temporary key $K_{temp}$, and returns the delivery key $K_d$ encrypted by the temporary key $K_{temp}$, and the signature for the delivery key $K_d$ encrypted by the temporary key $K_{temp}$. The upper controller 62 having received the delivery key $K_d$ encrypted by the temporary key $K_{temp}$ and the signature for the delivery key $K_d$ encrypted by the temporary key $K_{temp}$, transmits them to the fixed apparatus 52 together with the registration information transmitted from the electronic distribution service center 1.

In step S133, the upper controller 72 of the fixed apparatus 52 overwrites and stores the received registration information in the small storage section 75. In step S134, the encryption processing section 73 of the fixed apparatus 52 verifies a signature of the received registration information, decides whether or not the item with respect to "registration" in the ID of the fixed apparatus 52 is marked "registration possible," and if it is marked "registration possible," the processing proceeds to step S135. In step S135, the upper controller of the fixed apparatus 52 inputs the delivery key $K_d$ encrypted by the temporary key $K_{temp}$ and the signature for the delivery key $K_d$ encrypted by the temporary key $K_{temp}$ in the encryption processing section 73. The encryption processing section 73 verifies the signature for the delivery key $K_d$ encrypted by the temporary key $K_{temp}$, decrypts the delivery key $K_d$ using the temporary key $K_{temp}$, updates the delivery key $K_d$ in the storage module of the encryption processing section 73, and at the same time, deletes the charge information (further, in some case, the charge information is not deleted, but is attached a mark indicating it is settled).

In step S121, if the ID of the fixed apparatus 52 is not included in the registration information, the processing proceeds to step S136, the registration information addition processing described in FIG. 60 is started, and the processing proceeds to step S123.

In step S127, if the ID of the home server 51 and the ID of the fixed apparatus 52 are not marked "registration possible" with respect to the item "registration" in the user registration database, the processing proceeds to step S137. Since the step S137 is the same as step S130, its details are omitted. In step S138, the user management section 18 of the electronic distribution service center 1 transmits the registration information to the home server 51. In step S139, the home server 51 transmits the registration information to the fixed apparatus 52.

In step S122, the item "registration" with respect to the ID of the fixed apparatus 52 in the registration information is not marked "registration possible," or in step S134, the item "registration" with respect to the ID of the fixed apparatus 52 in the registration information is not marked "registration possible," the processing ends.

Further, processing on behalf of the network according to this system is described as only for processing of the fixed apparatus 52, all pieces of charge information of all the apparatuses connected to the home server 51 and the home server 51 itself may be collected and processed altogether. Then, registration information and delivery keys $K_d$ of all the apparatuses are updated. (In this embodiment, received registration information and a delivery key $K_d$ are not checked at all in the home server 51. If processing of the home server 51 itself is performed altogether, they should be checked and updated.)

Figure 65:
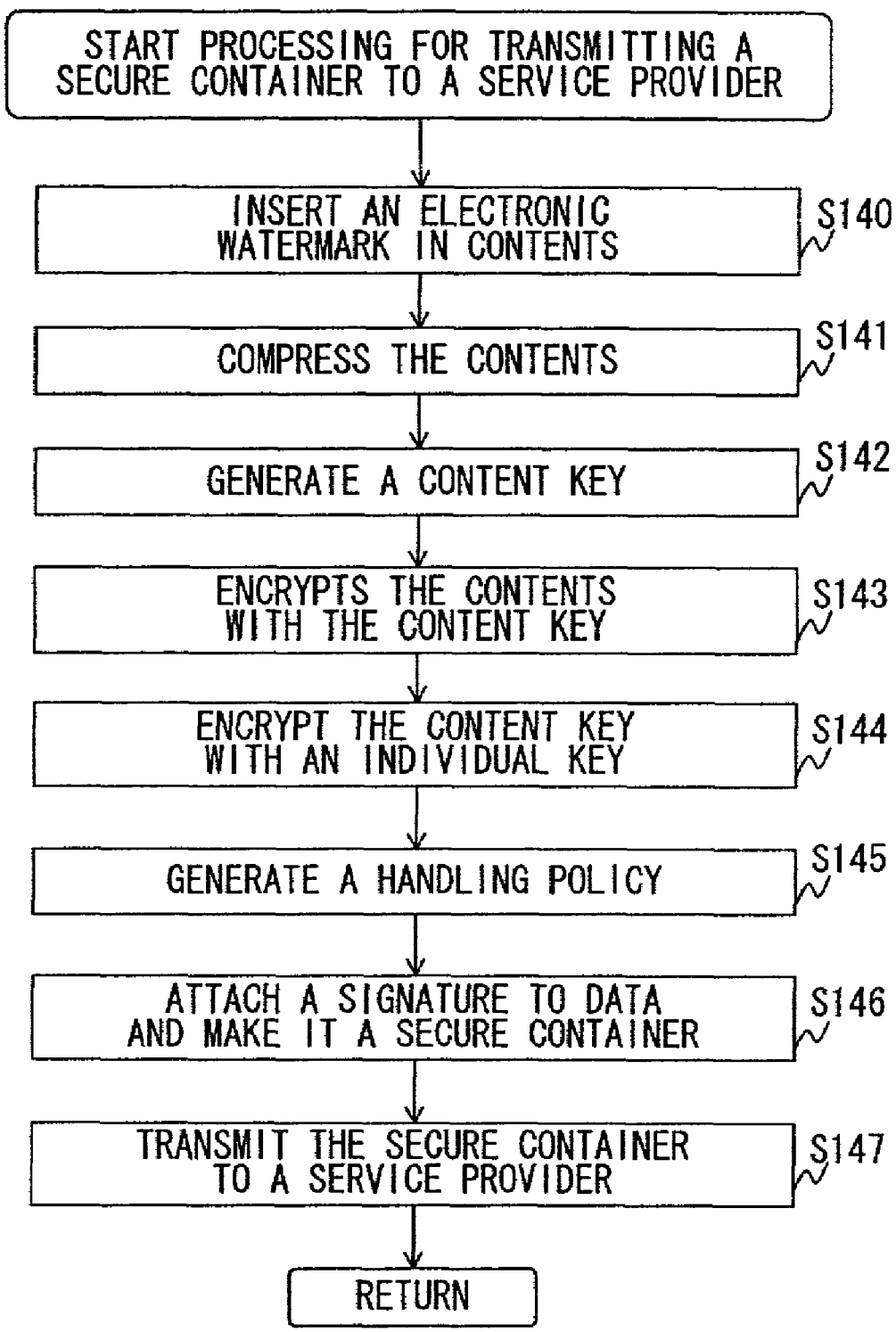
FIG. 65 is a flowchart showing a transmission procedure of a secure container.

Processing in which the content provider 2 transmits a content provider secure container to the service provider 3, which corresponds to step S43 of FIG. 56, will be described with reference to a flow chart of FIG. 65. In step S140, the electronic watermark adding section 32 of the content provider 2 inserts predetermined data indicating the content provider 2, for example, a content provider ID, in the contents read out from the content server 31 in the form of an electronic watermark, and supplies it to the compression section 33. In step S141, the compression section 33 of the content provider 2 compresses the contents in which the electronic watermark is inserted by a predetermined method such as ATRAC, and supplies to the content encryption section 34. In step S142, the content key generation section 35 generates a key to be used as a content key $K_{co}$, and supplies it to the content encryption section 34 and the content key encryption section 36. In step S143, the content encryption section 34 of the content provider 2 encrypts the compressed contents in which the electronic watermark is inserted by a predetermined method such as DES using the content key $K_{co}$.

In step S144, the content key encryption section 36 encrypts the content key $K_{co}$ with the individual key $K_i$ supplied from the electronic distribution service center 1 by the processing of step S40 of FIG. 56 by a predetermined method such as DES. In step S145, the handling policy generation section 37 provides for a handling policy of the contents, and generates a handling policy indicated in FIGS. 33 and 34. In step S146, the signature generation section 38 of the content provider 2 generates signatures for the encrypted contents, the encrypted content key $K_{co}$, the encrypted individual key $K_i$, and the handling policy supplied from the handling policy generation section 37. Since the generation of a signature was described with reference to FIG. 10, its description is omitted here. In step S147, the content provider 2 transmits the encrypted contents and its signature, the encrypted content key $K_{co}$ and its signature, the encrypted individual key $K_i$ and its signature, the handling policy and its signature (these four data with signatures will be hereinafter referred to as a content provider secure container), the certificate of the content provider 2 obtained from the authentication station in advance to the service provider 3 using a transmission section (not shown).

As described above, the content provider 2 transmits the content provider secure container to the service provider 3.

Figure 66:
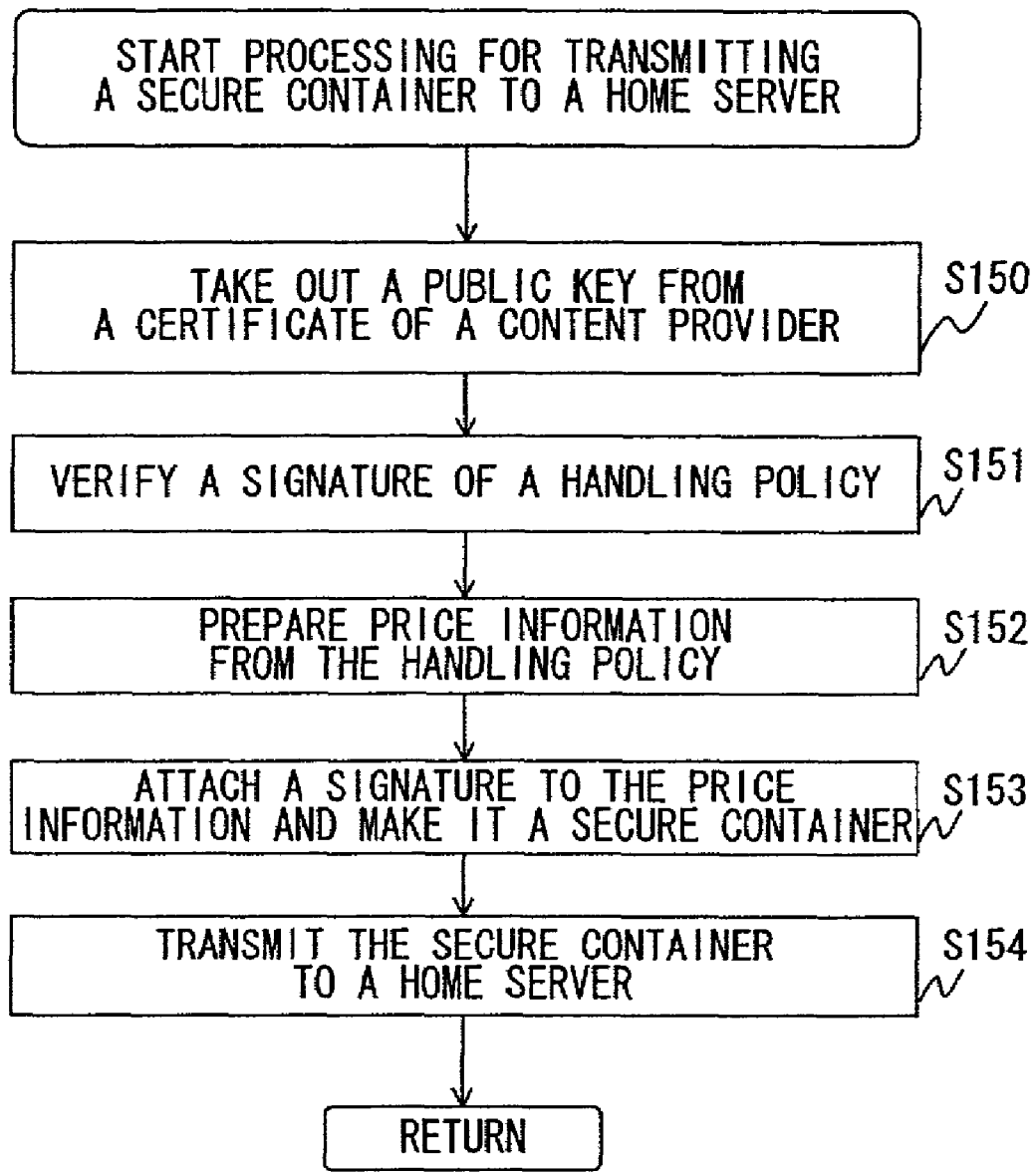
FIG. 66 is a flowchart showing a transmission procedure of a secure container.

Processing in which the service provider 3 transmits a service provider secure container to the home server 51 will now be described with reference to a flow chart of FIG. 66. Further, description is made assuming that the service provider 3 stores the data transmitted from the content provider 2 in the content server 41 in advance. In step S150, the certificate verification section 42 of the service provider 3 reads out the certificate of the content provider 2 from the content server 41, and verifies the signature in the certificate. Since the verification of a signature is the same as the method described with reference to FIG. 11, its details are omitted. If there is no tamper in the certificate, the public key $K_{pcp}$ of the content provider 2 is taken out.

In step S151, the signature verification section 43 of the service provider 3 verifies the signature of the content provider secure container transmitted from the transmission section of the content provider 2 with the public key $K_{pcp}$ of the content provider 2. (In some cases, only the signature of the handling policy is verified.) If the verification of the signature is failed and tamper is found, the processing is terminated. Further, since the verification of a signature is the same as the method described with reference to FIG. 11, its details are omitted.

If there is no tamper in the content provider secure container, in step S152, the pricing section 44 of the service provider 3 prepares price information described in FIGS. 37 and 38 based on the handling policy. In step S153, the signature generation section 45 of the service provider 3 generates a signature corresponding to the price information, and prepares a service provider secure container by combining the content provider secure container, the price information and the signature of the price information.

In step S154, the transmission section (not shown) of the service provider 3 transmits the certificate of the service provider 3, the certificate of the content provider 2 and the service provider secure container to the transmission section 61 of the home server 51, and completes the processing.

In this way, the service provider 3 transmits the service provider secure container to the home server 51.

Details of the purchase processing of the home server 51 after receiving the proper service provider secure container corresponding to step S45 of FIG. 56 will be described with reference to the flow chart of FIG. 67. After the home server executes the registration information update processing described above with reference to FIGS. 61 and 62 in step S161, in step S162, the upper controller 62 of the home server 51 inputs the registration information read out from the mass storage section 68 of the home server 51 in the encryption processing section 65 of the home server 51. After verifying the signature of the registration information by the signature verification unit 115 of the encryption/decryption module 96, the encryption processing section 65 having received the registration information decides if the item "purchase processing" for the ID of the home server 51 is marked "purchase possible," and at the same time, inspects if the item of registration is marked "registration possible," and in case of "purchase possible" and "registration possible," the processing proceeds to step S163. Further, the signature verification and inspection of "registration possible" and "purchase possible" may be performed in the registration information inspection module 93. In step S163, the upper controller 62 of the home server 51 inputs the public key certificate of the content provider 2 read out from the mass storage section 68 of the home server 51 in the encryption processing section 65 of the home server 51.

After verifying the signature of the certificate of the content provider 2 by the signature verification unit 115 of the encryption/decryption module 96, the encryption processing section 65 having received the public key certificate of the content provider 2 takes out the public key of the content provider 2 from the public key certificate. If it is confirmed that there is not tamper as a result of the verification of the signature, the processing proceeds to step S164. In step S164, the upper controller 62 of the home server 51 inputs the contents read out from the mass storage section 68 of the home server 51 in the encryption processing section 65 of the home server 51. The encryption processing section 65 having received the contents verifies the signature of the contents by the signature verification unit 115 of the encryption/decryption module 96, and if it is confirmed that no tamper is made, the processing proceeds to step S165. In step S165, the upper controller 62 of the home server 51 inputs the content key $K_{co}$ read out from the mass storage section 68 of the home server 51 in the encryption processing section 65 of the home server 51.

The encryption processing section 65 having received the content key $K_{co}$ verifies the signature of the content key $K_{co}$ by the signature verification unit 115 of the encryption/decryption module 96, and if it is confirmed that tamper is not made, the processing proceeds to step S166. In step S166, the upper controller 62 of the home server 51 inputs the individual key $K_I$ read out from the mass storage section 68 of the home server 51 in the encryption processing section 65 of the home server 51. The encryption processing section 65 having received the individual key $K_I$ verifies the signature of the individual key $K_I$ by the signature verification unit 115 of the encryption/decryption module 96, and if it is confirmed that tamper is not made, the processing proceeds to step S167.

In step S167, the upper controller 62 of the home server 51 inputs the handling policy read out from the mass storage section 68 of the home server 51 in the encryption processing section 65 of the home server 51. The encryption processing section 65 having received the handling policy verifies the signature of the handling policy by the signature verification unit 115 of the encryption/decryption module 96, and if it is confirmed that tamper is not made, the processing proceeds to step S168. In step S168, the upper controller 62 of the home server 51 inputs the public key certificate of the service provider 3 read out from the mass storage section 68 of the home server 51 in the encryption processing section 65 of the home server 51.

After verifying the signature of the certificate of the service provider 3 by the signature verification unit 115 of the encryption/decryption module 96, the encryption processing section 65 having received the public key certificate of the service provider 3 takes out the public key of the service provider 3 from the public key certificate. If it is confirmed that tamper is not made as a result of the verification of the signature, the processing proceeds to step S169. In step S169, the upper controller 62 of the home server 51 inputs the price information read out from the mass storage section 68 of the home server 51 in the encryption processing section 65 of the home server 51. The encryption processing section 65 having received the price information verifies the signature of the price information by the signature verification unit 115 of the encryption/decryption module 96, and if it is confirmed that tamper is not made, the processing proceeds to step S170.

In step S170, the upper controller 62 of the home server 51 displays information of purchasable contents (e.g., a purchasable utilization form, a price, or the like) using the displaying means 64, and a user selects a purchase item using the inputting means 63. A signal inputted from the inputting means 63 is transmitted to the upper controller 62 of the home server 51, and the upper controller 62 generates a purchase command based on the signal and inputs the purchase command in the encryption processing section 65 of the home server 51. Further, the input processing may be performed upon starting the purchase processing. The encryption processing section 65 having received this generates charge information and license conditions information from the handling policy inputted in step S167 and the price information inputted in step S169. Since the charge was described in FIG. 42, its details are omitted. Since the license conditions information was described in FIG. 41, its details are omitted.

In step S171, the control section 91 of the encryption processing section 65 stores the charge information generated in step S170 in the storage module 92. In step S172, the control section 91 of the encryption processing section 65 transmits the license conditions information generated in step S170 to the external memory control section 97 of the encryption processing section 65. After checking tamper of the external memory 67, the external memory control section 97 having received the license conditions information writes the license conditions information in the external memory 67. Tamper check in writing the license conditions information will be described latter with reference to FIG. 69. In step S173, the control section 91 of the encryption processing section 65 decrypts the individual key $K_I$ inputted in step S166 by the decryption unit 111 of the encryption/decryption module 96 using the delivery key $K_d$ supplied from the storage module 92. Then, the control section 91 of the encryption processing section 65 decrypts the content key $K_{co}$ inputted in step S165 by the decryption unit 111 of the encryption/decryption module 96 using the previously decrypted individual key $K_I$. Finally, the control section 91 of the encryption processing section 65 decrypts the content key $K_{co}$ by the decryption unit 112 of the encryption/decryption module 96 using the save key $K_{save}$ supplied from the storage module 92. In step S174, the content key $K_{co}$ encrypted by the save key $K_{save}$ is stored in the external memory 67 via the external memory control section 97 of the encryption processing section 65.

If it is determined that the home server 51 is an apparatus that cannot perform purchase processing in step S162, if it is determined that the signature of the public key certificate of the content provider 2 is not correct in step S163, if it is determined that the signature of the contents encrypted by the content key $K_{co}$ is not correct in step S164, if it is determined that the signature of the individual key $K_I$ encrypted by the delivery key $K_d$ is not correct, if it is determined that the signature of the handling policy is not correct in step S167, if it is determined that the signature of the certificate of the service provider 3 is not correct in step S168, or if it is determined that the signature of the price information is not correct in step S169, the processing proceeds to step S176, where the home server 51 performs error processing. Further, only a signature for the content key $K_{co}$ and the individual key $K_I$ may be verified by uniting the processing of step S165 and step S166.

As described above, the home server 51 stores the charge information in the storage module 92, and at the same time, after decrypting the content key $K_{co}$ by the individual key $K_I$, encrypts the content key $K_{co}$ by the save key $K_{save}$ and causes the external memory 67 to store it.

The fixed apparatus 52 also stores the charge information in the storage module of the encryption processing section 73 by the similar processing, and at the same time, decrypts the content key $K_{co}$ by the individual key $K_I$, encrypts the content key $K_{co}$ by the save key $K_{save2}$ (which is different from the key of the home sever 51), and causes the external memory 79 to store it.

Figure 68:
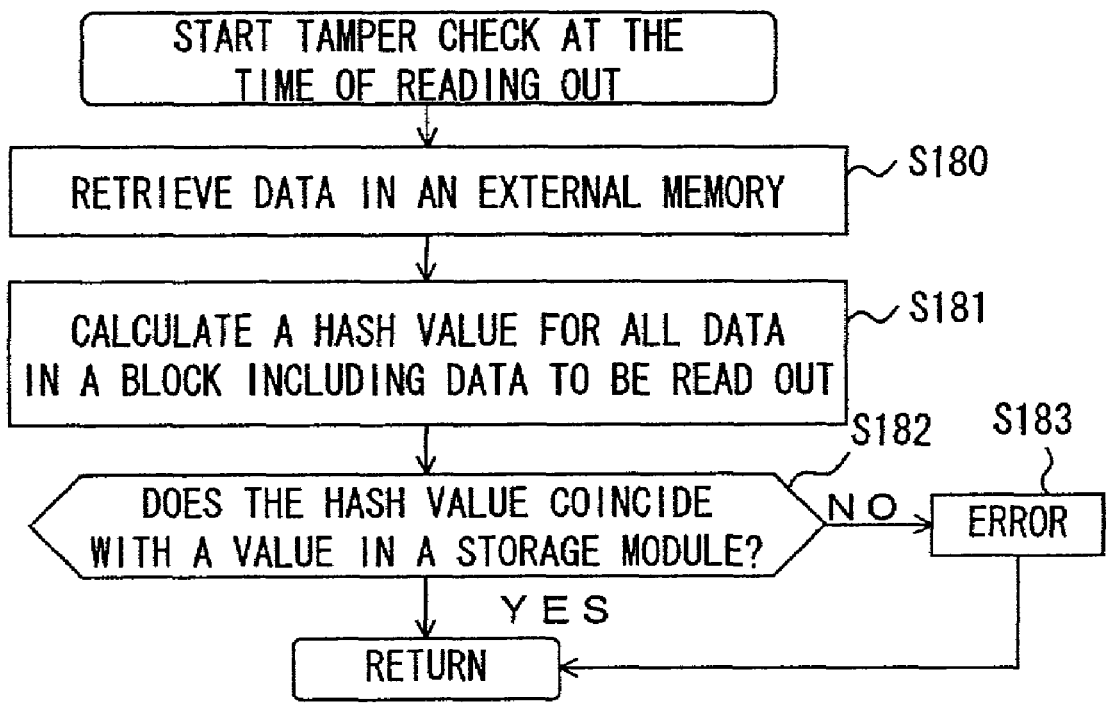
FIG. 68 is a flowchart showing a procedure of tampering check when reading data.

FIG. 68 is a flow chart describing a method of tamper check that the external memory control section 97 of the encryption processing section 65 performs when reading out data from the external memory 67. In step S180 of FIG. 68, the external memory control section 97 of the encryption processing section 65 retrieves a position of data to be read out from the external memory 67 (e.g., first data of the first block of FIG. 16). In step S181, the external memory section 97 of the encryption processing section 65 calculates a hash value (a hash value of the entire first block of FIG. 16) with respect to all data in an identical block including data that is planned to be read out in the external memory 67. At this moment, data other than the data that is planned to be read out (e.g., a content key 1 and license conditions information 1) is destroyed after used for the hash value calculation. In step S182, the hash value calculated in step S181 and a hash value ($ICV_1$) stored in the storage module 92 of the encryption processing section 65 are compared. If the hash values coincide, the memory control section 97 transits the data read out in step S181 to the control section 91 via the external memory control section 97, and if the hash values do not coincide, the processing proceeds to step S183, where the external memory control section 97 prohibits writing thereafter assuming that the memory block is tampered (wrong block). For example, given that the external memory is a flash memory of 4 MB, it is assumed that the memory is divided into 64 blocks. Therefore, 64 hash values are stored in the storage module. In case of reading out data, a location where the data is first retrieved, and a hash value with respect to all data in an identical block including the data is calculated. Tamper is checked by determining whether or not the hash value coincides with the hash value corresponding to the block in the storage module (see FIG. 16).

In this way, the external memory control section 97 of the encryption processing section 65 performs tamper check of the external memory 67, and reads out data.

Figure 69:
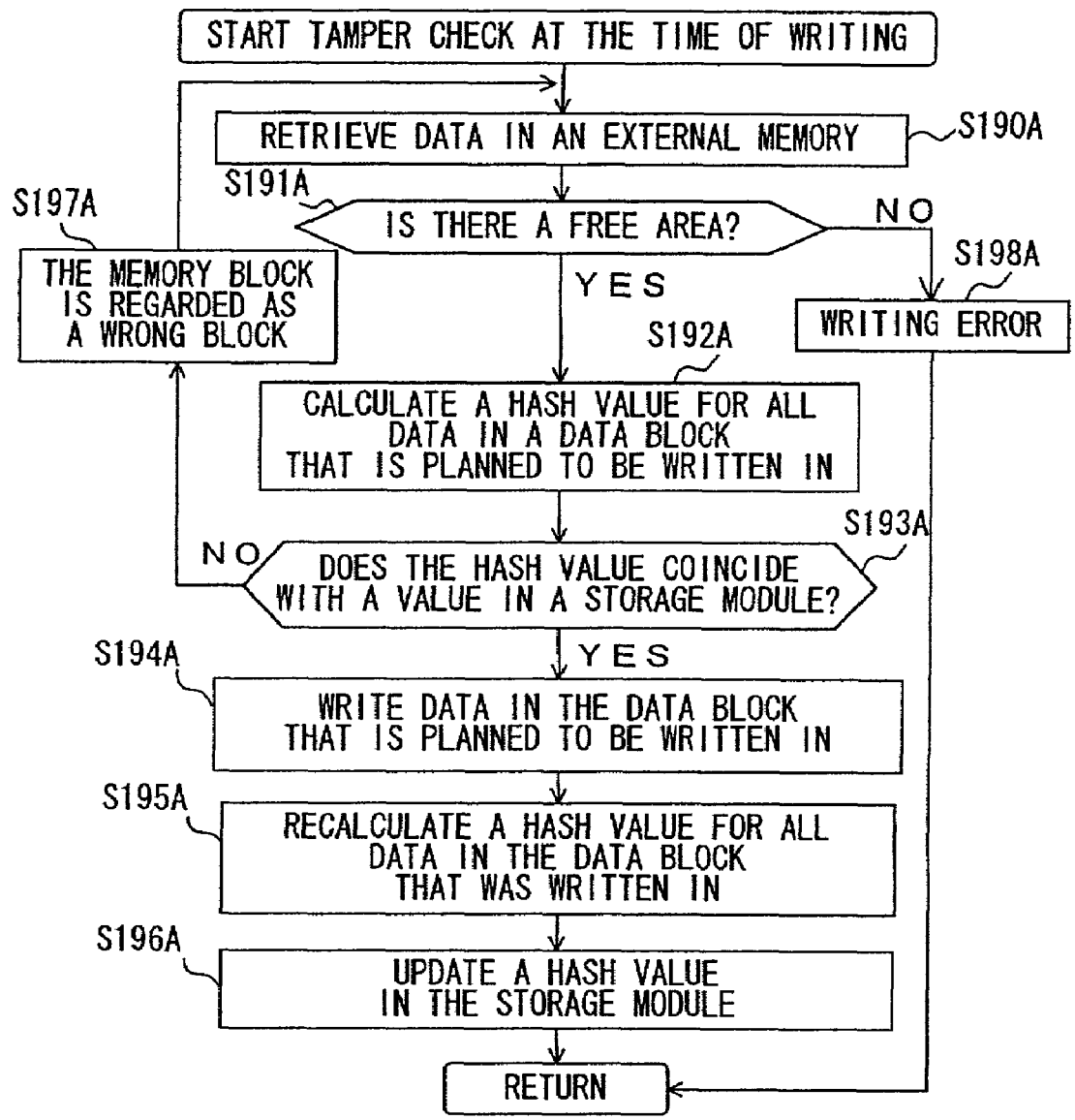
FIG. 69 is a flowchart showing a procedure of tampering check when writing data.

FIG. 69 is a flow chart describing a method of tamper check that the external memory control section 97 of the encryption processing section 65 performs when writing data in the external memory 67. In step S190A of FIG. 69, the external memory control section 97 of the encryption processing section 65 retrieves a location in the external memory 67 in which data can be written. In step S191A, the external memory control section 97 of the encryption processing section 65 determines whether or not there is a vacant area in the external memory 67, and if it is determined that there is a vacant area, the processing proceeds to step S192A. In step S193A, the external memory control section 97 compares the hash value calculated in step S192A and the hash value stored in the storage module 92 of the encryption processing section 65, and if the hash values coincide, the processing proceeds to step S194A. In step S194A, the external memory control section 97 writes data in a region in which data is planned to be written. In step S195A, the external memory control section 97 of the encryption processing section 65 recalculates a hash value with respect to all data in the data block in which the data is written. In step S196A, the control section 91 updates the hash value in the storage module 92 of the encryption processing section 65 to the hash value calculated in step S195A.

In step S193A, if the calculated hash value is different from the hash value in the storage module 92, the control section 91 regards the memory block as a wrong block (e.g., changes the hash value to a value indicating a wrong block), and the processing proceeds to step S190A.

If it is determined that there is no vacant area in the external memory 67 in step S191A, the processing proceeds to step S198A, and in step S198A, the external memory control section 97 returns a writing error to the control section 91, and terminates the processing.

Figure 70:
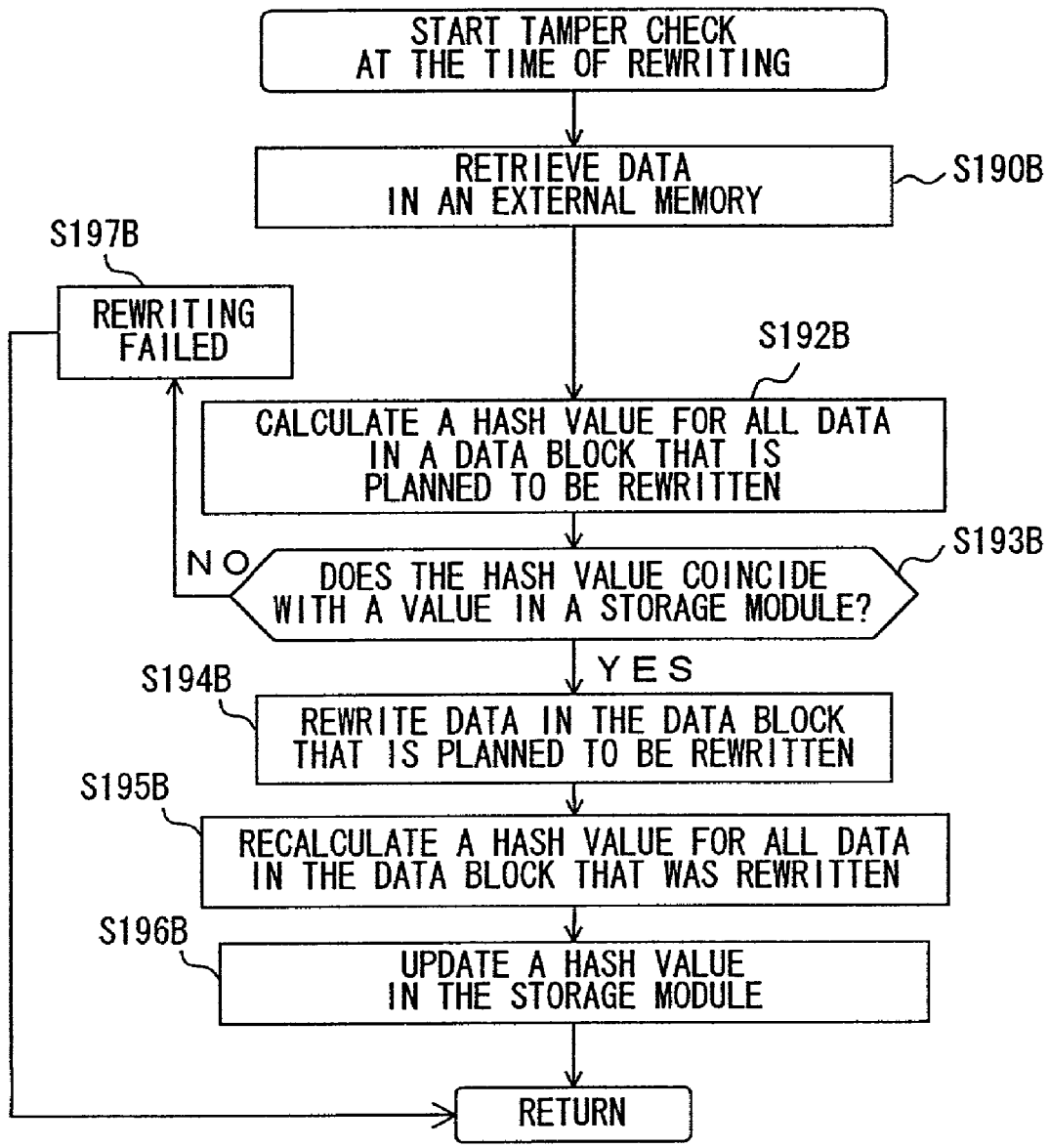
FIG. 70 is a flowchart showing a procedure of tampering check when rewriting data.

In a method for renewing (updating) the external memory control section 97 to the external memory 67, as shown in FIG. 70, the external memory control section 97 of the encryption processing section 65 retrieves a location to which data n the external memory 67 is to be renewed. In step S192B, the external memory control section 97 of the encryption processing section 65 calculates a hash value with respect to all data in a data block that is planned to be renewed. In step S193B, the external memory control section 97 compares the hash value calculated in step S192B and the hash value stored in the storage module 92 of the encryption processing section 65, and if the hash values coincide, the processing proceeds to step S194B. In step S194B, the external memory control section 97 renews data in a region that is planned to be renewed. In step S195B, the external memory control section 97 of the encryption processing section 65 calculates a hash value with respect to all data in the data block to which the data is written. In step S196B, the control section 91 updates the hash value in the storage module 92 of the encryption processing section 65 to the hash value calculated in step S195B.

In step S193B, if he calculated hash value is different from the hash value in the storage module 92, the control section 91 regards the memory block as a wrong block (e.g., changes the hash value to a value indicating a wrong block), and considers that the renewal is failed.

Figure 71:
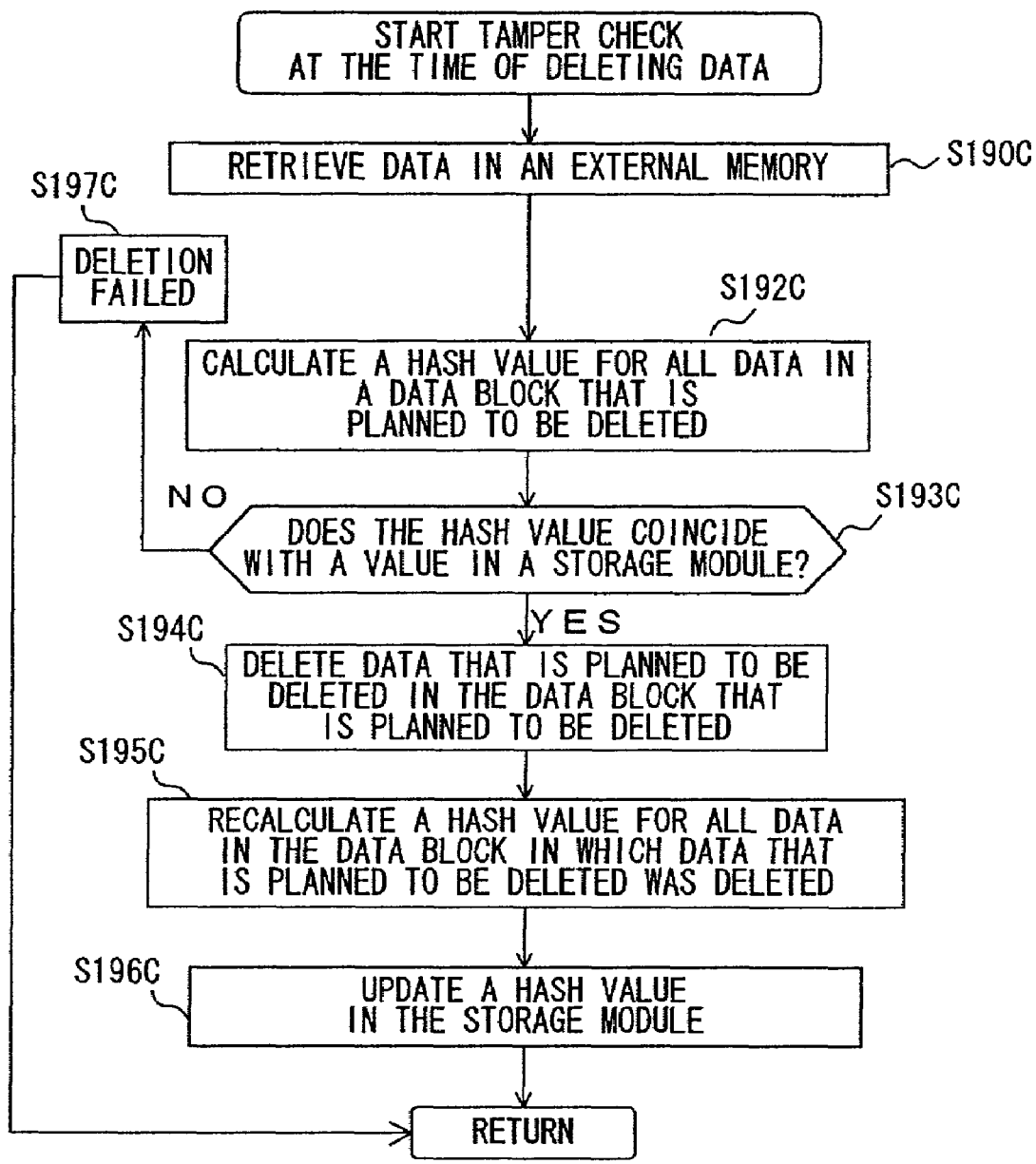
FIG. 71 is a flowchart showing a procedure of tampering check when deleting data.

Method for deleting data of the external memory 79 will be described with reference to FIG. 71. In step S190C, the external memory control section of the encryption processing section 73 retrieves a location in which data of the external memory 79 will be deleted. In step S192C, the external memory control section of the encryption processing section 73 calculates a hash value with respect to all data in a data block that is planned to be deleted. In step S193C, the external memory control section compares the hash value calculated in step S192C and the hash value stored in the storage module (not shown) of the encryption processing section 73, and if the hash values coincides, the processing proceeds to step S194C. In step S194C, the external memory control section deletes data that is planned to be deleted in the region that is planned to be deleted. In step S195C, the external memory control section of the encryption processing section 73 recalculates a hash value with respect to all the data in the data block in which the data that is planned to be deleted is deleted. In step S196C, the encryption processing section 73 updates the hash value in the storage module to the hash value calculated in step S195C.

In step S193C, if the calculated hash value is different from the hash value in the storage module, the encryption processing section 73 regards the memory block as a wrong block (e.g., changes the hash value to a value indicating a wrong block), and considers that the deletion is failed.

Figure 72:
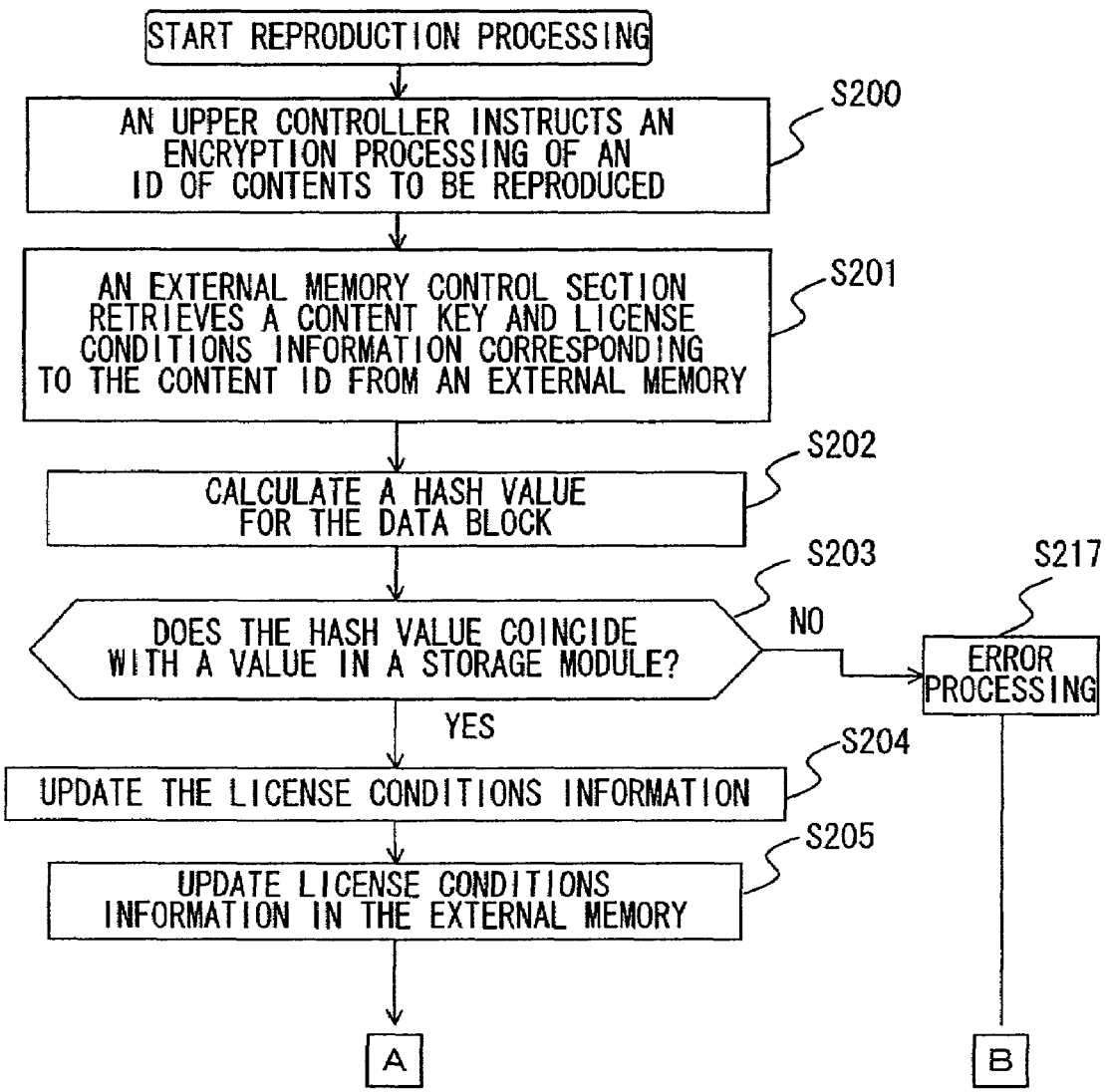
FIG. 72 is a flowchart showing a procedure for reproducing contents by a home server.
Figure 73:
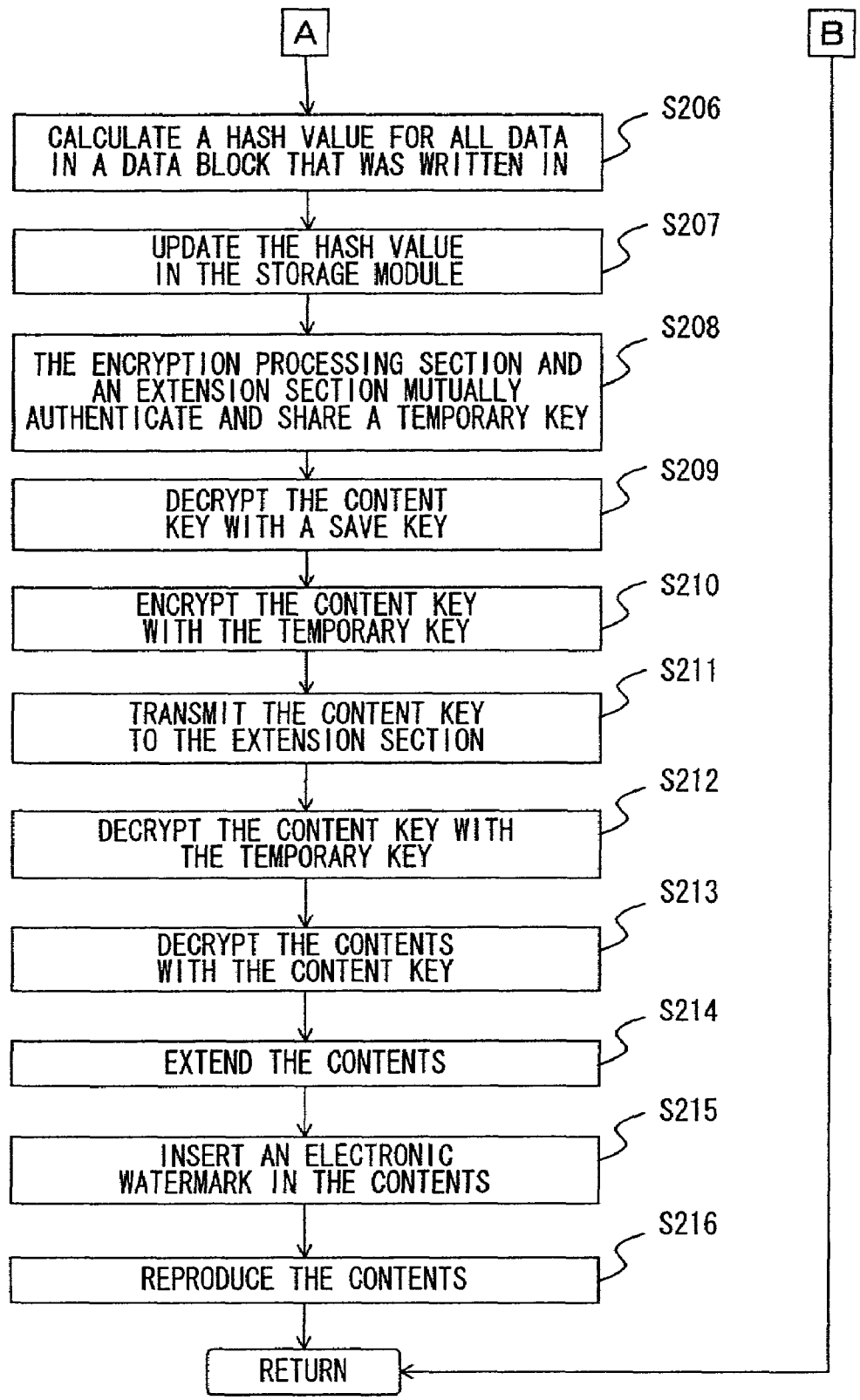
FIG. 73 is a flowchart showing a procedure for reproducing contents by a home server.

Details of processing in which the homes server 51 reproduces contents corresponding to step S46 of FIG. 56 will be described with reference to flow charts of FIGS. 72 and 73. In step S200, the upper controller 62 of the home server 51 inputs an ID corresponding to contents that the upper controller 62 is instructed by the inputting means 63 of the home server 51 to reproduce in the encryption processing section 65 of the home server 51. In step S201, the control section 91 of the encryption processing section 65 that has received the ID of the contents to be reproduced transmits the content ID to the external memory control section 97 of the encryption processing section 65, and causes the external memory control section 97 to retrieve a content key $K_{co}$ and license conditions information corresponding to the content ID. At this moment, the control section 91 confirms that the license conditions information is a right that can be reproduced. In step S202, the external memory control section 97 of the encryption processing section 65 calculates a hash value of a data block including the content key $K_{co}$ and the license conditions information, and transmits the hash value to the control section 91 of the encryption processing section 65. In step S203, the control section 91 of the encryption processing section 65 determines whether or not the hash value stored in the storage module 92 of the encryption processing section 65 and the hash value received in step S202 coincide, and if the hash values coincide, the processing proceeds to step S204.

In step S204, the control section 91 of the encryption processing section 65 updates license conditions information, if necessary. For example, if a utilization right in the license conditions information is a commutation ticket, the control section 91 performs processing such as for subtracting the number of times. Therefore, in case of a buy only right or the like that does not need to be updated, the processing jumps to step S208 (not shown). In step S205, the external memory control section 97 rewrites the updated license conditions information transmitted from the control section 91 to the external memory 67 and updates it. In step S206, the external memory control section 97 recalculates a hash value with respect to all the data in the rewritten data block, and transmits it to the control section 91 of the encryption processing section 65. In step S207, the control section 91 of the encryption processing section 65 rewrites the hash value stored in the storage module 92 of the encryption processing section 65 to the hash value calculated in step S206.

In step S208, the encryption processing section 65 and the extension section 66 mutually authenticates, and shares the temporary key $K_{temp}$. Since the mutual authentication processing was described with reference to FIG. 51, its details are omitted. In step S209, the decryption unit 111 of the encryption/decryption module 96 decrypts the content key $K_{co}$ read out from the external memory 97 by the save key $K_{save}$ supplied form the storage module 92. In step S210, the encryption unit 112 of the encryption/decryption module 96 re-encrypts the content key $K_{co}$ by the temporary key $K_{temp}$ previously shared with the extension section 66. In step S211, the control section 91 of the encryption processing section 65 transmits the content key $K_{co}$ encrypted by the temporary key $K_{temp}$ to the extension section 66 via the upper controller 62.

In step S212, the key decryption module 102 of the extension section 66 decrypts the content key $K_{co}$ by the temporary key $K_{temp}$ supplied from the mutual authentication module 101. In step S213, the upper controller 62 reads out contents from the mass storage section 68, and supplies them to the extension section 66. The encryption module 103 of the extension section 66 having received the contents decrypts the contents using the content key $K_{co}$ supplied from the key decryption module 102. In step S214, the extension module 104 of the extension section 66 extends the contents with a predetermined method, for example, such a method as ATRAC. In step S215, the electronic watermark addition module 105 inserts the data instructed by the encryption processing section 65 in the contents in the form of a watermark (the data handed to the extension section from the encryption processing section is not limited to the content key $K_{co}$, but includes reproduction conditions (an analogue output, a digital output, an output with copy control signal (SCMS)), an apparatus ID that purchased the content utilization right and the like. Data to be inserted is an ID of an apparatus that purchased the content utilization right (i.e., an apparatus ID in the license conditions information) or the like. In step S216, the extension section 66 reproduces music via a speaker (not shown).

In this way, the home server 51 reproduces contents.

Figure 74:
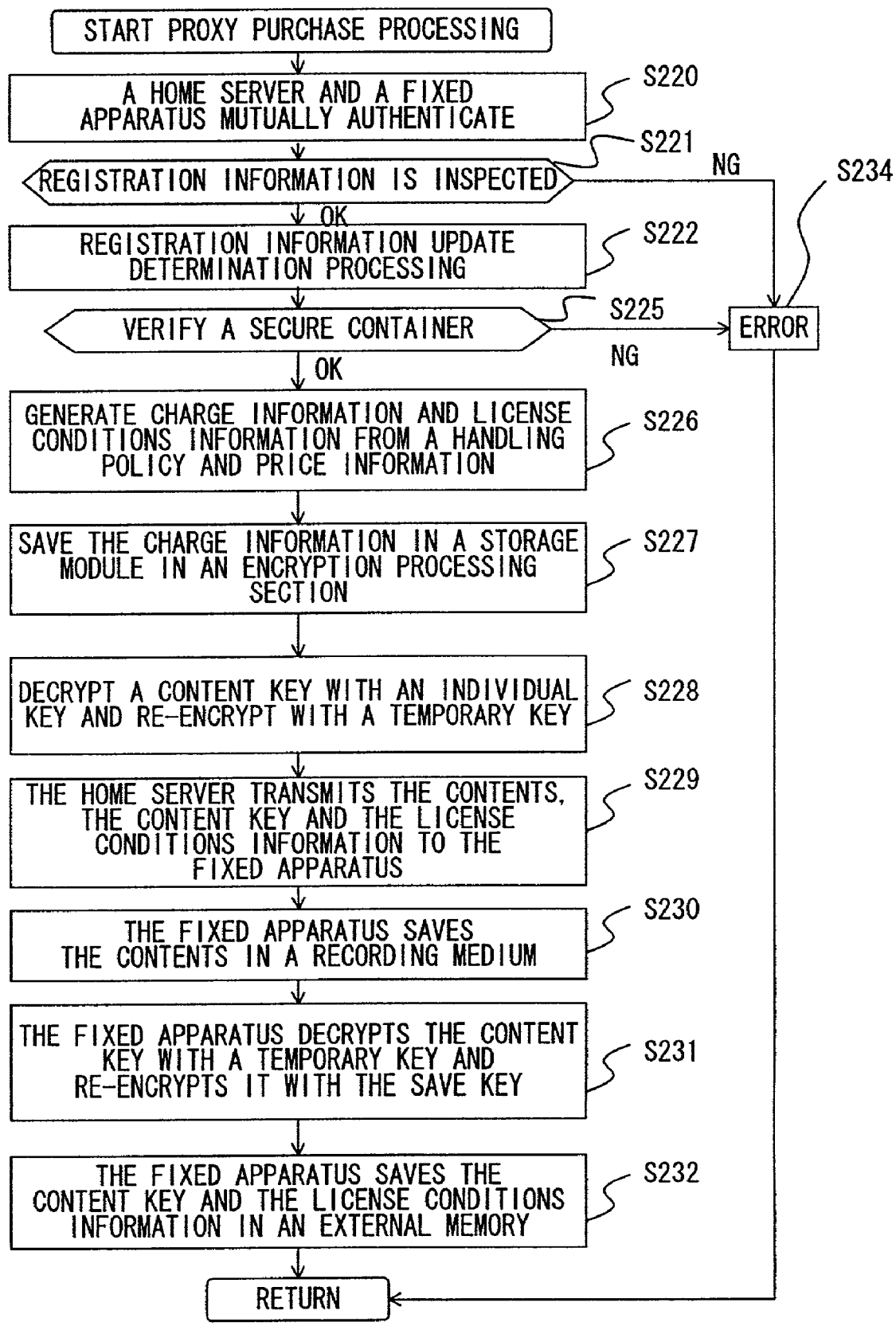
FIG. 74 is a flowchart showing a proxy purchasing procedure of contents utilization rights by a home server.

FIG. 74 is a flow chart illustrating details of processing in which the home server 51 purchases a content utilization right on behalf of the fixed apparatus 52. In step S220, the home server 51 and the fixed apparatus 52 mutually authenticates. Since the mutual authentication processing is similar to the processing described in FIG. 52, its description is omitted. In step S221, the upper controller 62 of the home server 51 causes the encryption processing section 65 of the home server 51 to inspect registration information read out from the mass storage section 68 of the home server 51. The encryption processing section 65 having received the registration information from the upper controller 62 causes the signature verification unit 115 of the encryption/decryption module 96 to verify a signature attached to the registration information by a public key of the electronic distribution service center 1 supplied form the storage module 92 of the encryption processing section 65. After successful verification of the signature, the control section 91 of the encryption processing section 65 decides if an ID of the fixed apparatus is registered in the registration information and the items of "registration" and "purchase" are marked "registration possible" and "purchase possible," and if it is decided that the item is marked "registration possible," the processing proceeds to step S222 (Further, the fixed apparatus 52 also inspects the registration information and decides that the home server is "registration possible.") Since steps S225 to S227 are similar to steps S160 to S171 of FIG. 67, their details are omitted.

In step S228, the control section 91 of the encryption processing section 65 decrypts the individual key $K_i$ encrypted by the delivery key $K_d$ inputted in step S225 by the decryption unit 111 of the encryption/decryption module 96 using the delivery key $K_d$ supplied from the storage module 92. Then, the control section 91 of the encryption processing section 65 decrypts the content key $K_{co}$ encrypted by the individual key $K_i$ inputted in step S225 by the decryption unit 111 of the encryption/decryption module 96 using the individual key $K_i$. Then, the control section 91 of the encryption processing section 65 re-encrypts the content key $K_{co}$ by the encryption unit 112 of the encryption/decryption module 96 using the temporary key $K_{temp}$ that was shared with the fixed apparatus 52 at the time of the mutual authentication of step S220. In step S229, the control section 91 of the encryption processing section 65 generates signatures using the signature generation unit 114 of the encryption/decryption module 96 with respect to the content key $K_{co}$ encrypted by the temporary key $K_{temp}$ and the license conditions information generated in step S226, and transmits them to the upper controller 62. The upper controller 62 of the homes server 51 having received the content key $K_{co}$ encrypted by the temporary key $K_{temp}$, the license conditions information and their signatures reads out the contents (including a signature; hereinafter the same) encrypted by the content key $K_{co}$ from the mass storage section 68, and transmits the content key $K_{co}$ encrypted by the temporary key $K_{temp}$, the license conditions information, their signatures and the contents encrypted by the content key $K_{co}$ to the fixed apparatus 52.

In step S230, the fixed apparatus 52 having received the content key $K_{co}$ encrypted by the temporary key $K_{temp}$, the license conditions information, their signatures and the contents encrypted by the content key $K_{co}$ outputs the contents encrypted by the contents key $K_{co}$ to the record reproduction section 76 after verifying the signature. The record reproduction section 76 of the fixed apparatus 52 having received the contents encrypted by the content key $K_{co}$ stores the contents encrypted by the content key $K_{co}$ in the recording medium 80.

In step S231, the encryption processing section 73 of the fixed apparatus 52 decrypts the content key $K_{co}$ encrypted by the temporary key $K_{temp}$ by the decryption unit of the encryption/decryption module using the temporary key $K_{temp}$ that was shared with the homes server 51 at the time of the mutual authentication in step S220. Then, the control section of the encryption processing section 73 re-encrypts the content key $K_{co}$ by the encryption unit of the encryption/decryption module using the save key $K_{save2}$ supplied from the storage module of the encryption processing section 73.

In step S232, the encryption processing section 73 of the fixed apparatus 52 transmits the content key $K_{co}$ encrypted by the save key $K_{save2}$ and the license conditions information received in step S230 to the external memory control section of the encryption processing section 73, and causes the external memory 79 to save them. Since processing in which the external memory control section writes data in the external memory was described in FIG. 69, details are omitted.

In this way, the home sever 51 purchases a content utilization right, charge information is stored in the home server 51 side, and a utilization right is transferred to the fixed apparatus 52.

Figure 75:
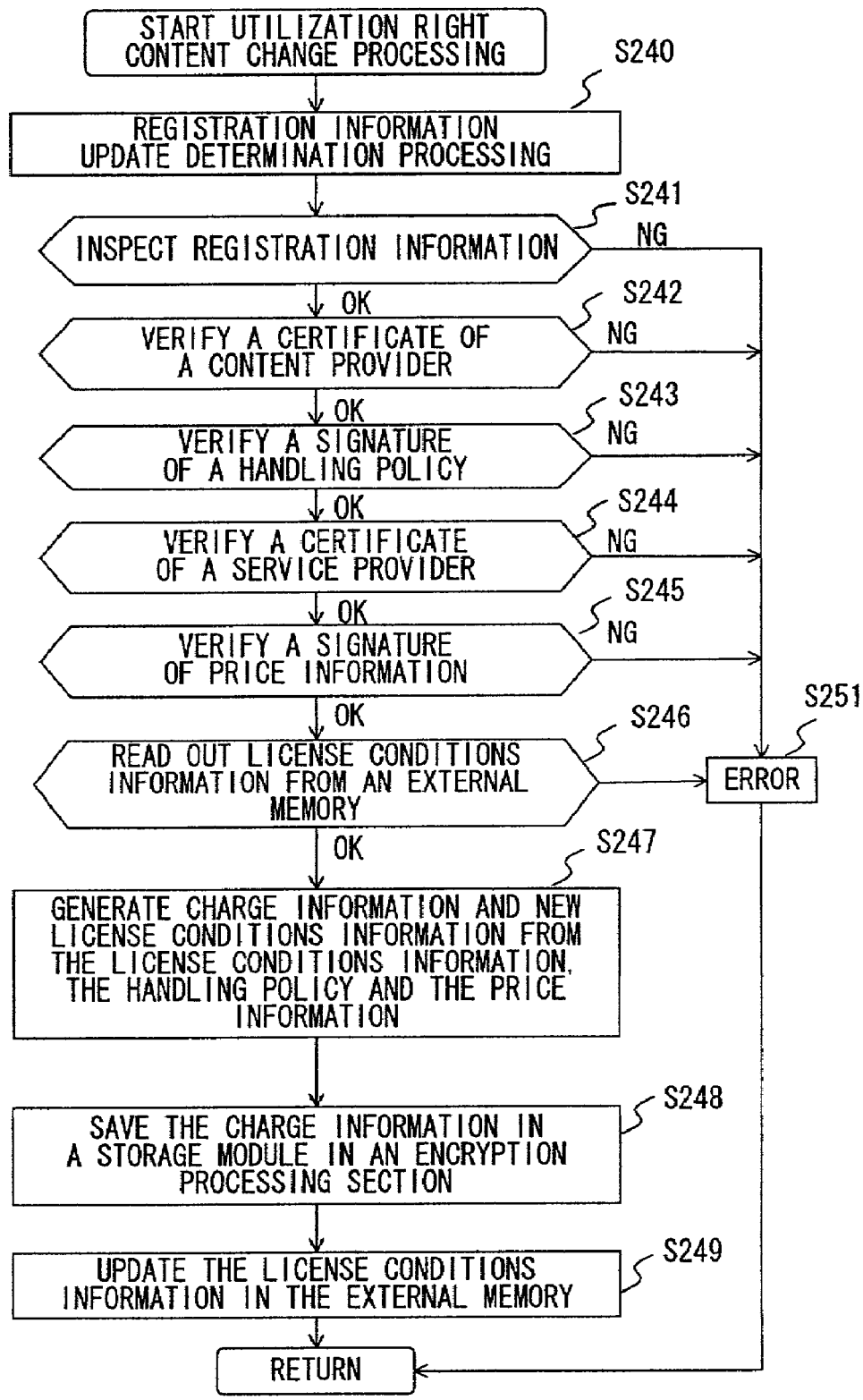
FIG. 75 is a flowchart showing a contents change procedure of a purchased user.

FIG. 75 is a flow chart illustrating processing for changing a purchased content utilization right to another utilization form to purchase it. Since steps S240 to S245 are similar to the processing described in FIG. 67, its description is omitted. In step S246, the encryption processing section 65 of the home server 51 causes the external memory control section 97 of the encryption processing section 65 to read out license conditions information of contents whose utilization right is changed. Since reading out of data from the external memory 67 was described with reference to FIG. 68, its details are omitted. If the license conditions information is correctly read out in step S246, the processing proceeds to step S247.

In step S247, the upper controller 62 of the home server 51 displays information of content whose utilization right contents can be changed (e.g., a utilization form or a price whose utilization right contents can be changed) using the display means 64, and a user selects utilization right contents update conditions using the inputting means 63. The signal inputted from the inputting means 63 is transmitted to the upper controller 62 of the home server 51, and the upper controller 62 generates a utilization right content change command based on the signal and inputs the utilization right contents change command in the encryption processing section 65 of the home server 51. The encryption processing section 65 having received this generates charge information and new license conditions information from the handling policy received in step S243, the price information received in step S245 and the license conditions information read out in step S247.

Figure 67:
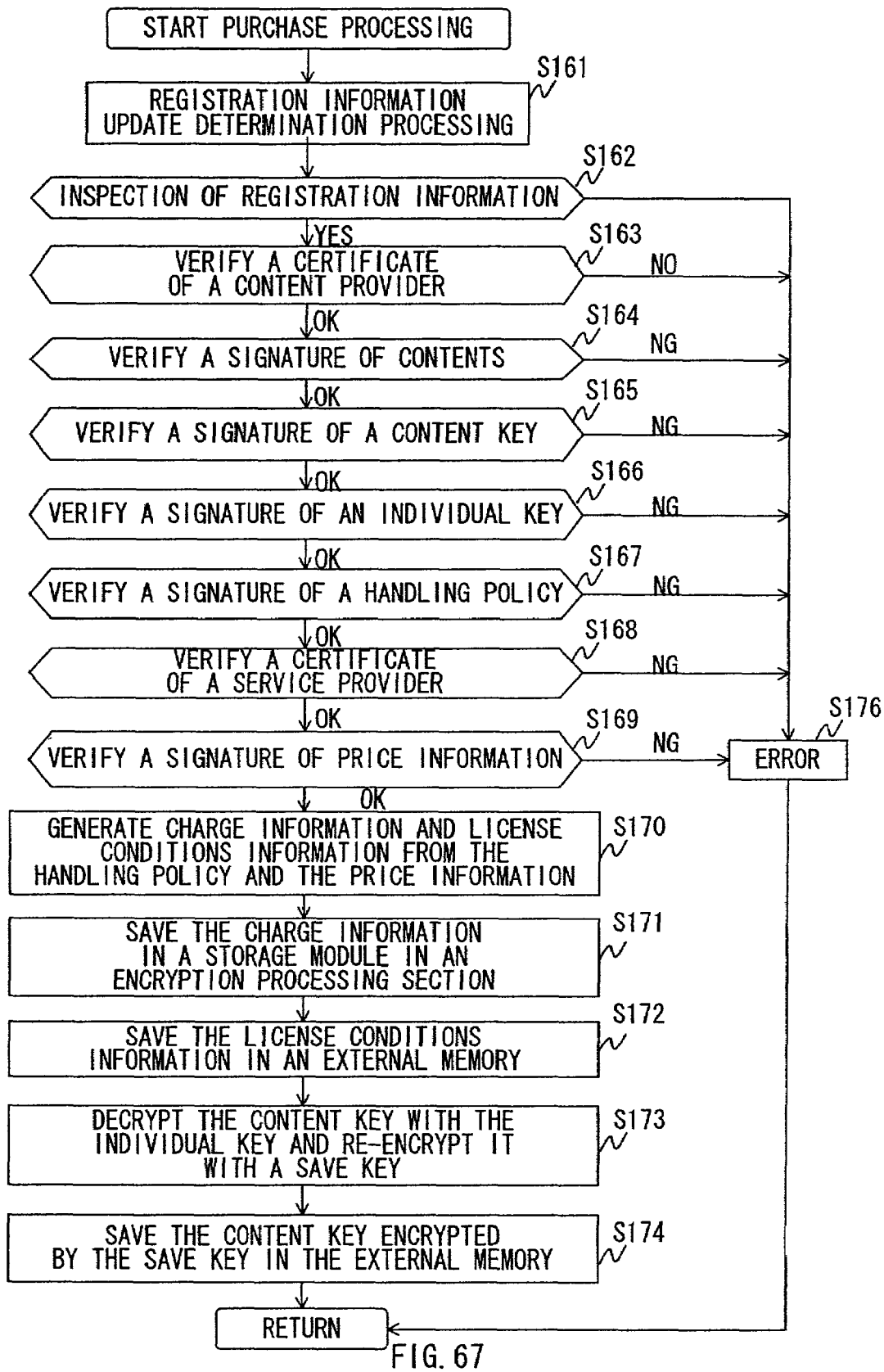
FIG. 67 is a flowchart showing a purchasing procedure of a home server.

Since step S248 is similar to step S171 of FIG. 67, its detailed description is omitted. In step S249, the control section 91 of the encryption processing section 65 outputs the license conditions information generated in step S247 to the external memory control section 97 of the encryption processing section 65. The external memory control section 97 overwrites the received license conditions information in the external memory 67 and updates it. Since the method of rewriting (updating) method to the external memory 67 of the external memory control section 97 was described in FIG. 70, its details are omitted.

In step S246, if license conditions information corresponding to the content ID attached to the right contents change command was not found in the external memory 67, or if tamper was found in a storage block of the external memory in which the license conditions information is stored (which has been described with reference to FIG. 68), the processing proceeds to step S251, and predetermined error processing is performed.

In this way, the home server 51 can purchase a new right using an already purchased right (described in the license conditions information), a handling policy and price information, and change utilization right contents.

FIGS. 76 and 77 illustrate concrete examples of a rule portion of a handling policy and price information. In FIG. 76, the handling policy is composed of a rule number attached to each utilization right as a serial number, a utilization contents number indicating utilization right contents, its parameter, a minimum sales price, and a profit ratio of a content provider, in which, for example, five rules are written. Since a rule 1 has a utilization right contents number 1 as a right item, it is seen from FIG. 44 that the right is a right without a reproduction right, time and number of times limitations. In addition, it is seen that there is no specific description in the item of a parameter. The minimum sales price is ¥350, and a share of the content provider 2 is 30% of the price. Since a rule 2 has a utilization right contents number 2 as the right item, it is seen from FIG. 44 that the right is a right with a reproduction right and time limitation and without number of times limitation. In addition, it is seen from the item of a parameter that a utilization possible period is one hour. The minimum sales price is ¥100, and the share of the content provider 2 is 30% of the price. Since a rule 3 has a utilization right contents number 6 as the right item, it is seen from FIG. 44 that the right is a right without a reproduction right (without a copy control signal), without time limitation and with number of times limitation. In addition, it is seen from the item of a parameter that the utilization possible number of times is one. The minimum sales price is ¥30, and the share of the content provider 2 is 30% of the price.

Since a rule 4 has a utilization right contents number 13 as the right item, it is seen from FIG. 44 that the right is utilization contents change. It is seen from the item of a parameter that a changeable rule number from #2 (with a reproduction right, with time limitation and without number of times limitation) to #1 (without a reproduction right, time and number of times limitation). The minimum price is ¥200, and the share of the content provider 2 is 20% of the price. The minimum sales price is presented lower than that of the rule 1 because it is considered that an already purchased right it traded in and repurchased, and the share of the content provider 2 is presented lower than that of the rules 1 in order to increase the share of the electronic distribution service center 1 that performs actual work (since the content provider 2 has no work at the time of right contents change).

Since a rule 5 has a utilization right contents number 14 as the right item, it is seen from FIG. 44 that the right is redistribution.

It is seen from the item of a parameter that redistribution possible conditions is that an apparatus having the rule number #1 (without a reproduction right, time and number of times limitation) purchases and redistribute the rules number #1 (without a reproduction right, time and number of times limitation). The minimum sales price is ¥250, and the share of the content provider 2 is 20% of the price. The minimum sales price is lower than that of the rule 1 because it is considered that an apparatus having an already purchased right repurchases identical contents, and the share of the content provider 2 is presented lower than that of the rule 1 in order to increase the share of the electronic distribution service center 1 that performs actual work (since the content provider 2 does not have work at the time of redistribution).

In FIG. 77, the price information is composes of a rule number attached to each utilization right as a serial number, a parameter and price information. Five rules are also described in this price information. A rule 1 is price information corresponding to the rule #1 of the handling policy, and indicates that a price is ¥500 and a share of the service provider 3 is 30% when the utilization contents number #1 is purchased. Therefore, out of ¥500 paid by a user, the content provider 2 takes ¥150, the service provider 3 takes ¥150, and the electronic distribution service center 1 takes ¥200. Since rules 2 to 5 are similar, their details are omitted.

Further, in rules 4 and 5, the share of the service provider 2 is fewer than that of the rule 1 because a user apparatus performs distribution work on behalf of the service provider 2, and the electronic distribution service center 1 performs collection of prices.

In addition, although the rule numbers are serial numbers from #1 to #5 in this example, this is not necessarily the case. Since a person preparing price information sets a utilization contents number and a number for each rule number, and arranges ones extracted from the numbers, the rule numbers are not generally serial numbers.

FIG. 78 illustrates a specific example when the right contents change described in FIG. 75 is performed. The handling policy is composed of a rule number attached to each utilization right as a serial number, a utilization contents number indicating utilization right contents, it parameter, a minimum sales price, and a profit ratio of a content provider, the price information is composes of a rule number attached to each utilization right as a serial number, a parameter and price information, and the license conditions information is composed of a rule number attached to each utilization right as a serial number, a utilization right contents number indicating utilization right contents, and its parameter. The home server 51 has already purchased a right with a reproduction right with the rule number #2 and time limitation, and the rule number #2 is described in the license conditions information indicating right contents, which indicates that remaining utilization possible time is thirty minutes, and accumulated two hours of purchase has been performed so far. If it is tried to change the right from with time limitation to without time limitation now, it is seen from a rule 3 of the handling policy, a rule 3 of the price information and the license conditions information that the right can be changed to without a reproduction right, time and number of times limitation with ¥200, and the license conditions information changes to without a reproduction right, time and number of times limitation of the rule number #1 and the utilization right contents number (a parameter in case of the utilization right contents number #1 will be described later. In addition, in this example, changing the right contents once after buying a right with time limitation is cheaper than directly buying a right without a reproduction right, time and number of times limitation. Thus, it is better to put a discount considering accumulated utilization time.

Figure 79:
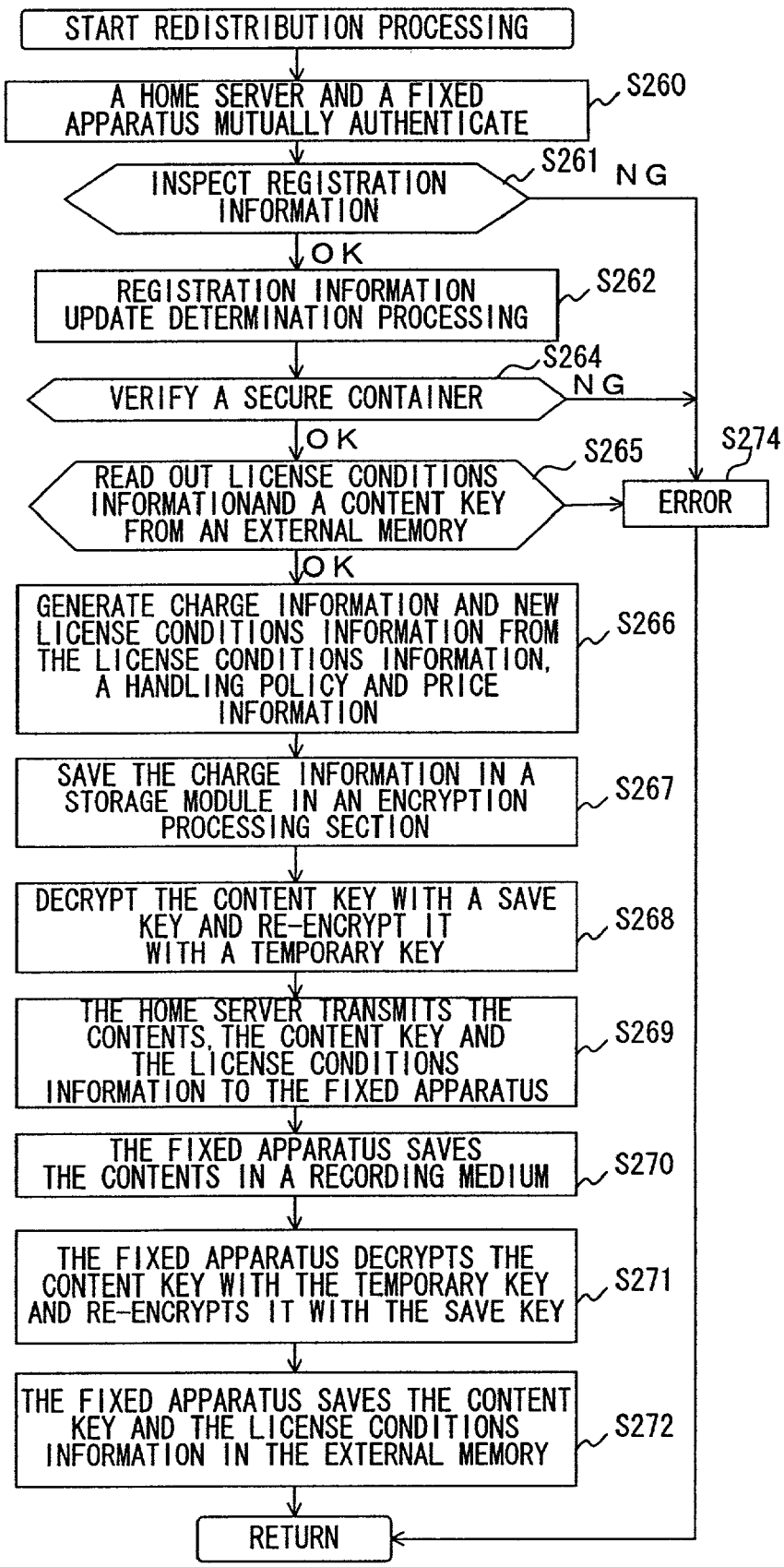
FIG. 79 is a flowchart showing a redistributing procedure of contents utilization rights.

FIG. 79 is a flow chart illustrating details of processing in which the home server 51 purchases a content utilization right for the fixed apparatus 52 and redistributes the utilization right. Since steps S260 to S264 are similar to steps S220 to S225 of FIG. 74, their detailed description is omitted. In step S265, the encryption processing section 65 of the home server 51 causes the external memory control section 97 of the encryption processing section 65 to read out from the external memory 67 license conditions information and the content key $K_{co}$ encrypted by the save key $K_{save}$ corresponding to contents that is tried to be redistributed. Since a method of reading out from the external memory 67 by the external memory control section 97 was described in FIG. 68, its details are omitted. If successfully read out, the processing proceeds to step S266.

In step S266, the upper controller 62 of the home server 51 displays information whose contents can be redistributed (e.g., a utilization form or a price whose contents can be redistributed) using the display means 64, and a user selects redistribution contents conditions using the inputting means 63. Further, this selection processing may be performed at the time of starting the redistribution processing in advance. The signal inputted from the inputting means 63 is transmitted to the upper controller 62 of the home server 51, and the upper controller 62 generates a redistribution command based on the signal and inputs the redistribution command in the encryption processing section 65 of the home server 51. The encryption processing section 65 having received this generates charge information and new license conditions information from the handling policy and the price information received in step S264, and the license conditions information read out in step S265.

Since step S267 is similar to step S171 of FIG. 67, its detailed description is omitted. In step S268, the control section 91 of the encryption processing section 65 decrypts the content key $K_{co}$ encrypted by the save key $K_{save}$ read out in step S265 by the decryption unit 111 of the encryption/decryption module 96 using the save key $K_{save}$ supplied from the storage module 92. Then, the control section 91 of the encryption processing section 65 re-encrypts the content key $K_{co}$ by the encryption unit 112 of the encryption/decryption module 96 using the temporary key $K_{temp}$ that was shared with at the time of mutual authentication in step S260. Finally, the signature generation unit 114 of the encryption/decryption module 96 generates signatures corresponding to the content key $K_{co}$ encrypted by the temporary key $K_{temp}$ and the new license conditions information generated in step S266, and returns it to the control section 91 of the encryption processing section 65.

Since processing of steps S269 to S272 is similar to steps S229 to S232 of FIG. 74, its details are omitted.

In this way, the home server 51 can perform redistribution of contents by creating new license conditions information from a utilization right (license conditions information) it owns and a handling policy, price information, and transmitting the information to the fixed apparatus 52 together with the content key $K_{co}$ and contents it owns.

Figure 80:
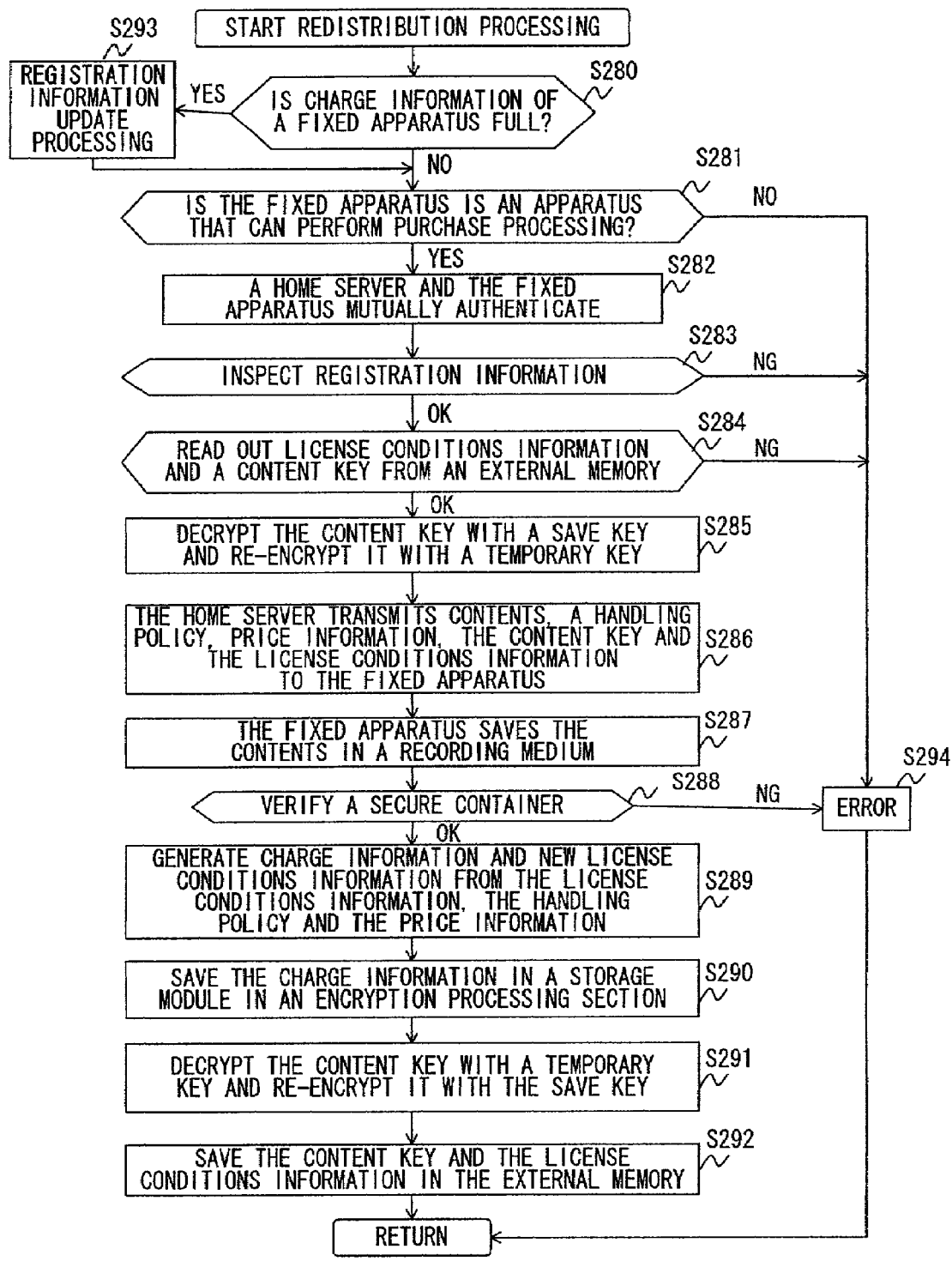
FIG. 80 is a flowchart showing a purchasing procedure of contents utilization rights by a fixed apparatus.

FIG. 80 is a flow chart illustrating details of processing in which the home server 51 transmits license conditions information and content key $K_{co}$ to the fixed apparatus 52 and the fixed apparatus 52 purchases a content utilization right. In step S280, the encryption processing section 73 of the fixed apparatus 52 decides whether or not a total of charges of charge information stored in the storage module of the encryption processing section 73 has reached an upper limit, and if it has not reached the upper limit, the processing proceeds to step S281 (Further, the decision may be made by an upper limit of the number of charge processing instead of the upper limit of charges).

In step S281, the upper controller 72 of the fixed apparatus 52 inputs the registration information read out from the small storage section 75 of the fixed apparatus 52 in the encryption processing section 73 of the fixed apparatus 52. The encryption processing section 73 having received the registration information decides if the item of "purchase processing" for the ID of the fixed apparatus 52 is marked "purchase possible" after verifying a signature of the registration information by a signature verification unit of an encryption/decryption module (not shown), and if it is "purchase possible," the processing proceeds to step S282.

Since step S282 is similar to step S220 of FIG. 74, its details are omitted. Since step S283 is similar to step S221 of FIG. 74, its details are omitted (the home server 51 decides whether or not the fixed apparatus 52 is registered, and the fixed apparatus 52 decides whether or not the home server 51 is registered). Since step S284 is similar to step S265 of FIG. 79, its details are omitted. Since step S285 is similar to step S268 of FIG. 79, its details are omitted. In step S286, the control section 91 of the encryption processing section 65 generates signatures with respect to the content key $K_{co}$ encrypted by the temporary key $K_{temp}$ and the license conditions information read out in step S284 using the signature generation unit 114 of the encryption/decryption module 96, and transmits them to the upper controller 62. The upper controller 62 of the home server 51 having received the content key $K_{co}$ encrypted by the temporary key $K_{temp}$ and the license conditions information and their signatures reads out the contents encrypted by the content key $K_{co}$, the handling policy and its signature, if necessary, and the price information and its signature from the mass storage section 68, and transmits the content key $K_{co}$ encrypted by the temporary key $K_{temp}$ and the license conditions information, the contents encrypted by the content key $K_{co}$, the handling policy and its signature, and the price information and its signature to the fixed apparatus 52.

Since step S287 is similar to step S230 of FIG. 74, its details are omitted. Since step S288 is similar to step S225 of FIG. 74, its details are omitted. In step S289, the upper controller 72 of the fixed apparatus 52 displays information whose contents can be redistributed (e.g., a utilization form or a price whose contents can be redistributed) using the display means 78, and a user selects redistribution contents conditions using the inputting means 77. Further, this selection processing may be performed at the time of starting the redistribution processing in advance. The signal inputted from the inputting means 77 is transmitted to the upper controller 72 of the fixed apparatus 52, and the upper controller 72 generates a redistribution command based on the signal and inputs the redistribution command in the encryption processing section 73 of the fixed apparatus 52. The encryption processing section 73 having received this generates charge information and new license conditions information from the handling policy, the price information and the license conditions information received in step S286.

In step S290, the encryption processing section 73 of the fixed apparatus 52 stores the charge information generated in step S289 in a storage module (not shown) of the encryption processing section 73. In step S291, the encryption processing section 73 of the fixed apparatus 52 decrypts the content key $K_{co}$ encrypted by the temporary key $K_{temp}$ received in step S286 by a decryption unit (not shown) of the encryption processing section 73 using the temporary key $K_{temp}$ shared in step S282. Then, the encryption processing section 73 of the fixed apparatus 52 encrypts the content key $K_{co}$ by an encryption unit (not shown) of the encryption processing section 73 using the save key $K_{save2}$ supplied form a storage module (not shown) of the encryption processing section 73.

In step S292, the encryption processing section 73 of the fixed apparatus 52 transmits the license conditions information generated in step S289 and the content key $K_{co}$ encrypted by the save key $K_{save2}$ generated in step S291 to an external memory control section (not shown) of the encryption processing section 73. The external memory control section having received the license conditions information and the content key $K_{co}$ encrypted by the save key $K_{save2}$ writes the license conditions information and the content key $K_{co}$ encrypted by the save key $K_{save2}$ in the external memory 79. Since the tamper check in writing was described with reference to FIG. 69, its details are omitted.

In this way, the fixed apparatus 52 can receive redistribution of contents by receiving a utilization right (license conditions information) owned by the home server 51, a handling policy, price information, a content key $K_{co}$, and contents from the home server 51, and creating new license conditions information in the fixed apparatus 52.

FIG. 81 illustrates a managed transfer right. Managed transfer means an operation capable of transferring a reproduction right from an apparatus 1 to an apparatus 2, which is the same as normal transfer in that the right is transferred from the apparatus 1 to the apparatus 2, but is different from normal transfer in that the apparatus 2 cannot retransfer the received reproduction right (the apparatus 1 after transferring a reproduction right cannot retransfer the reproduction right as in the normal transfer). The apparatus 2 having received the reproduction right by the managed transfer can return the reproduction right to the apparatus 1, and after returning the reproduction right, the apparatus 1 can transfer the reproduction right again and the apparatus 2 cannot continue to transfer the reproduction right. In order to realize these, a purchaser of the managed transfer right and a current holder of the managed transfer right are managed in the license conditions information (here, it is assumed that the managed transfer can only be performed if the utilization content number #1 is held, but this can be extended to the utilization right content number #2).

In FIG. 81, since the rule 1 of the handling policy was described in FIG. 78, its details are omitted. Since a right item of the rule 2 is the utilization right content number 16, it is seen from FIG. 44 that the right is the managed transfer right. In addition, it is seen that there is no specific description in the item of a parameter. The minimum sales price is ¥100, and the share of the content provider 2 is 50% of the price. The share of the content provide 2 is presented higher than that of the rule 1 because, since the service provider 3 does not perform actual work at all, its share is transferred to the share of the content provider 2.

In FIG. 81, since the rule 1 of price information was described in FIG. 78, its details are omitted. The rule 2 is price information of the rule #2 of a handling policy, and indicates that the price is ¥100 and the share of the service provider 3 is 0% when the utilization right content number #16 is purchased. Therefore, out of ¥100 paid by a user, the content provider 2 takes ¥50, the service provider 3 takes ¥0, and the electronic distribution service center 1 takes ¥50.

In FIG. 81, the user first purchases the rule number #1 (without a reproduction right, time and number of times limitation). However, the user does not have the managed transfer right then (the state of a in FIG. 81). Then, the user purchases the managed transfer right (since these operations happens in an instance, it looks as if the user purchased all at a time). Concerning the rule number of the license conditions, an ID of an encryption processing section indicating a purchase (hereinafter referred to as a purchaser) is ID1 (e.g., an ID of the home server 51), and an ID of an encryption processing section holding the reproduction right (hereinafter referred to as a holder) is ID2 (the state of b in FIG. 81). If this is transferred to the fixed apparatus 52 by performing the managed transfer, in the rule section of the license conditions information held by the home server 51, the purchase is still ID1, but the holder is changed to ID2. In addition, in the rule section of the license conditions information held by the fixed apparatus 52 having received the reproduction right by the managed transfer, the purchase is ID1 and the holder is ID2, which is the same as the license conditions information of the home server 51.

Figure 82:
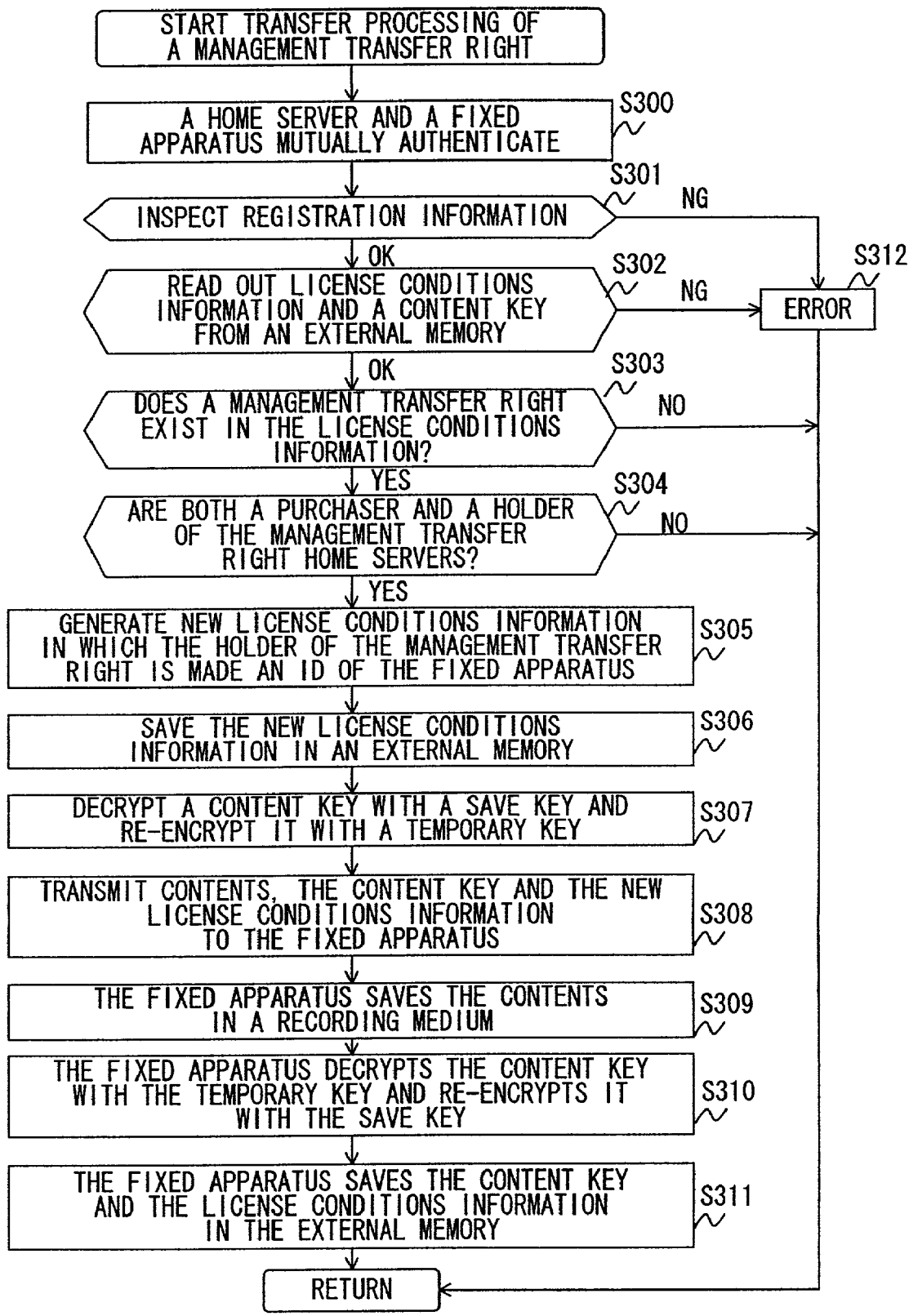
FIG. 82 is a flowchart showing a moving procedure of management movement rights.

FIG. 82 is a flow chart illustrating details of the transfer processing of the managed transfer right. In FIG. 82, since step S300 is similar to step S220 of FIG. 74, its details are omitted. In addition, since step S301 is similar to step S221 of FIG. 74, its details are omitted. Since step S302 is similar to step S246 of FIG. 75, its details are omitted. In step S303, the encryption processing section 65 of the home server 51 inspects the rule section of the read out license conditions information, and decides if the use right is without the reproduction right, time and number of times limitation and with the managed transfer right. If it is decided that there is the managed transfer right, the processing proceeds to step S304.

In step S304, the control section 91 of the encryption processing section 65 decides if both the purchaser and the holder of the managed transfer right are the ID of the home server 51. If it is decided that both the purchase and the holder of the managed transfer right is the ID of the home server 51, the processing proceeds to step S305. In step S305, the control section 91 of the encryption processing section 65 rewrites the holder of the managed transfer right of the license conditions information to the ID of the fixed apparatus 52. In step S306, the control section 91 of the encryption processing section 65 outputs the license conditions information rewritten in step S305 to the external memory control section 97 of the encryption processing section 65. The external memory control section 97 of the encryption processing section 65 having received the license conditions information overwrites the license conditions information on the external memory 67. Since the method of rewriting and storing data of the external memory 67 was described in FIG. 70, their details are omitted. Since steps S307 to S311 are similar to steps S268 to S272 of FIG. 79, their details are omitted.

If the managed transfer right was not included in the license conditions information in step S303, or if the purchase or the holder of the managed transfer right was not the home server 51 in step S304, the processing is terminated.

In this way, the right for reproducing contents from the home server 51 to the fixed apparatus 52 can be transferred.

Figure 83:
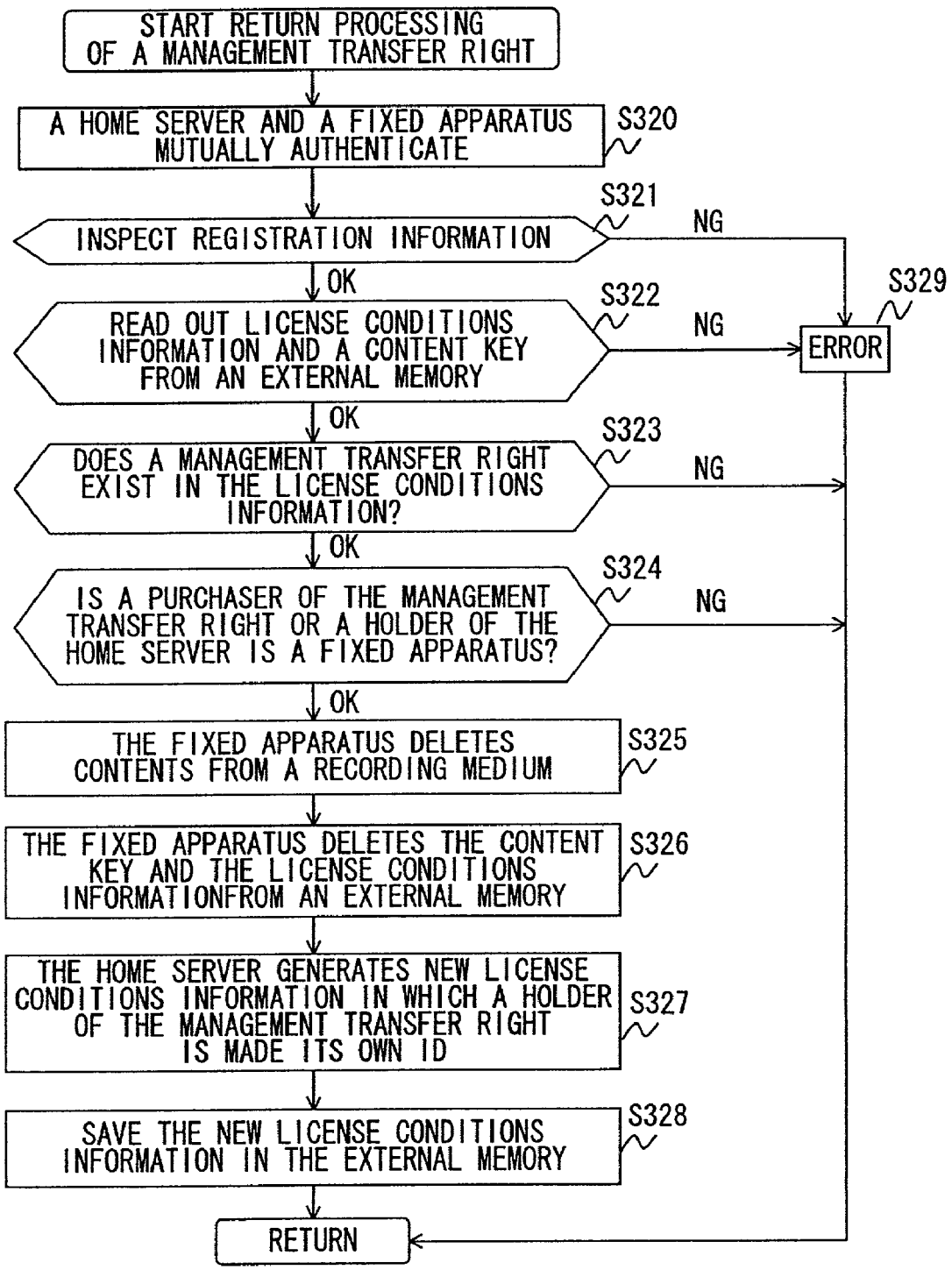
FIG. 83 is a flowchart showing a returning procedure of management movement rights.

FIG. 83 is a flow chart illustrating processing for returning the managed transfer right from the fixed apparatus 52 currently holding the managed transfer right to the home server 51 that is the purchaser of the managed transfer right. In FIG. 83, since step S320 is similar to step S220 of FIG. 74, its details are omitted. Since step S321 is similar to step S221 of FIG. 74, its details are omitted, but it is inspected if the other's ID is registered in each of the home server 51 and the fixed apparatus 52. If it is decided that the IDs are registered, the processing proceeds to step S322. Since step S322 is similar to step S246 of FIG. 75, its details are omitted, but data of an identical content ID is read out in both the home server 51 and the fixed apparatus 52. If data is correctly read from the external memory, the processing proceeds to step S323. Since step S323 is similar to step S303 of FIG. 82, its details are omitted, but it is decided that both the home server 51 and the fixed apparatus 52 have the managed transfer right. If it is decided that there is the managed transfer right, the processing proceeds to step S324.

In step S324, the encryption processing section 65 of the home server 51 decides if the purchaser of the managed transfer right is the ID of the homes server 51 and the holder is the ID of the fixed apparatus 52. If it is decided that the purchaser of the managed transfer right is the ID of the home server 51 and the holder is the ID of the fixed apparatus 52, the processing proceeds to step S325. Similarly, the encryption processing section 73 of the fixed apparatus 52 decides if the purchaser of the managed transfer right is the ID of the home server 51 and the holder is the ID of the fixed apparatus 52. If it is decided that the purchaser of the managed transfer right is the ID of the home server 51 and the holder is the ID of the fixed apparatus 52, the processing proceeds to step S325.

In step S325, the record reproduction section 76 of the fixed apparatus 52 deletes contents from the recording medium 80 (however, since encrypted data simply remains, the contents needs not be deleted by force). In step S326, the encryption processing section 73 of the fixed apparatus 52 causes an external memory control section (not shown) of the encryption processing section 73 to delete the content key $K_{co}$ encrypted by the save key $K_{save2}$ stored in the external memory 79 and the license conditions information. Since the deletion method of data of the external memory 79 was described in FIG. 71, its details are omitted.

In step S327, the control section 91 of the encryption processing section 65 generates license conditions information in which the holder of the managed transfer right of the license conditions information to the ID of the home server 51. In step S328, the control section 91 of the encryption processing section 65 outputs the license conditions information generated in step S327 to the external memory control section 97 of the encryption processing section 65. The external memory control section 97 of the encryption processing section 65 having received the license conditions information overwrites and stores the license conditions information in the external memory 67. Since the method for rewriting and storing in the external memory 67 was described in FIG. 70, its details are omitted.

If the registration information was tampered or the ID of the other apparatus was not registered in the homes server 51 or the fixed apparatus 52 in step S321, or if the content key or the license conditions information with respect to predetermined contents was not found in the external memory or the memory block including these was tampered in the home server 51 or the fixed apparatus 52 in step S322, the processing proceeds to step S329 and error processing is performed.

If the managed transfer right did not exist in the license conditions information in the home server 51 or the fixed apparatus 52 in step S323, or if the purchase was the home server 51 and the holder was not the fixed apparatus 52 in the home server 51 or the fixed apparatus 52 in step S324, the processing is terminated.

In this way, a right for reproducing contents can be returned from the fixed apparatus 52 to the home server 51.

Further, although contents and the content key $K_{co}$ or the like are described as one, these may exist in plural if necessary.

In addition, although the content provider 2 and the service provider 3 is handled separately, they may be united as one. Moreover, the method of the content provider 2 may be applied to the service provider 3 as it is.

(2) Encryption Processing by Using an Individual key

The content provider 2 encrypts contents a content key that the content provider 2 itself prepared as described above with reference to FIG. 9. In addition, the content provider 2 receives an individual key peculiar to a content provider from the electronic distribution service center 1 and an individual key encrypted by a delivery key, and encrypts the content key by the individual key. Thus, the content provider 2 supplies the contents encrypted by the content key, the content key encrypted by the individual key, and the individual key encrypted by the delivery key to the user home network 5 via the service provider 3.

The user home network 5 decrypts the individual key peculiar to a content provider using the delivery key received from the electronic distribution service center 1. Thus, the user home network 5 can decrypts the content key that is encrypted by the individual key peculiar to a content provider and supplied from the content provider 2. The user home network 5 having obtained the content key can decrypt contents by the content key.

Here, while an individual key is peculiar to each content server, a delivery key is only one kind. Therefore, the user home network 5 can decrypt an individual key from each content provider if it has one kind of delivery key. Accordingly, the user home network 5 does not need to have an individual key peculiar to each content provider, and can purchase contents of all content providers simply by having a delivery key.

In addition, each content provider cannot decrypt individual keys (encrypted by a delivery key) peculiar to other content providers by not having a delivery key. Thus, stealing of contents among content providers can be prevented.

Here, in order to clarify the above-mentioned configurations of the embodiments and each means of the inventions described in the claims, characteristics of the present invention will be described as follows by adding the embodiment (only one example) corresponding to each means in parenthesis following each means. However, this description does not mean that each means is limited to the described examples of course.

Figure 84:
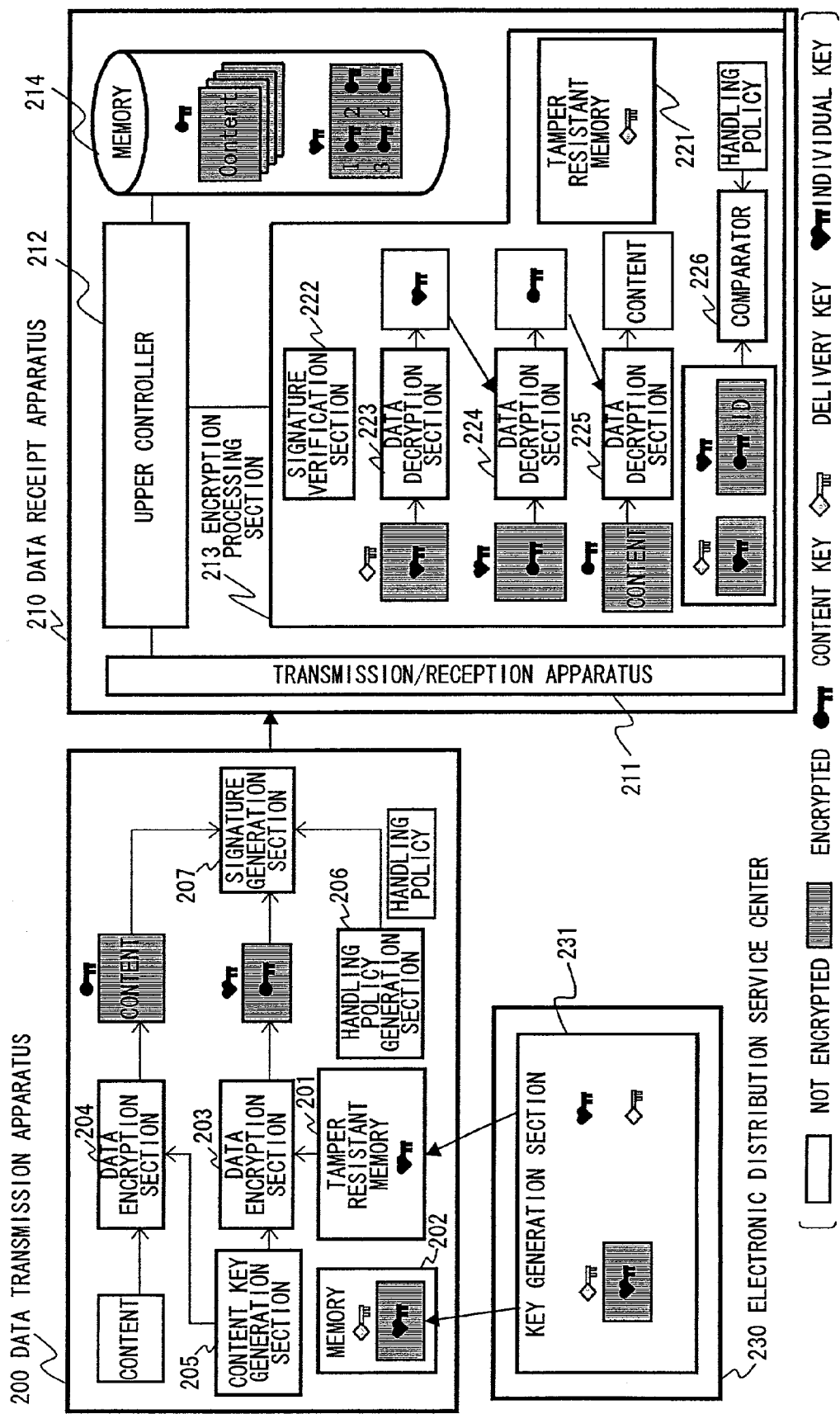
FIG. 84 is a block diagram showing information sending system according to the present invention.

That is, in the information transmission system of the present invention is provided with a memory for saving individual key (e.g., a tamper resistant memory 201 of FIG. 84) held by a content provider or a content seller transmitting information such as contents (e.g., a content transmission apparatus 200 of FIG. 84), means for encrypting a content key $K_{co}$ by an individual key $K_i$ (e.g., a data encryption section 203 of FIG. 84), means for generating a handling policy in which use conditions or the like of the content key $K_{co}$ are described (e.g., a handling policy generation section 206 of FIG. 84), means for generating a digital signature with respect to various kinds of data (e.g., a signature generation section 207 of FIG. 84), means for verifying signature data generated with respect to various kinds of data (e.g., a signature verification section 222 of FIG. 84) held by a user purchasing contents (e.g., a content receiving apparatus 210 of FIG. 84), means for comparing an ID indicating a generator of the content key $K_{co}$ and an ID of a generator of the handling policy (e.g., a comparator 226 of FIG. 84), and means for saving a delivery key (e.g., a tamper resistant memory 221 of FIG. 84).

Figure 85:
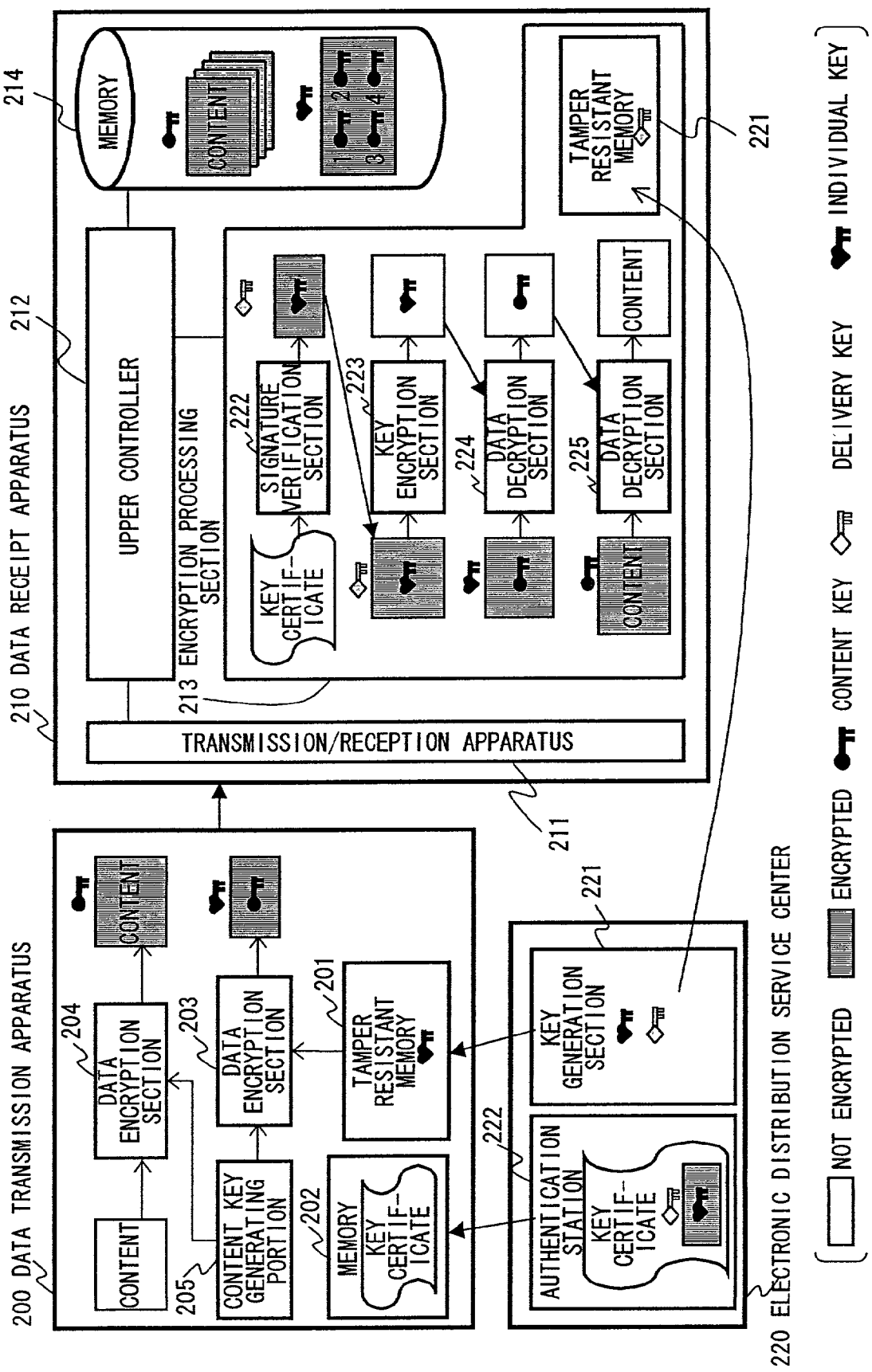
FIG. 85 is a block diagram showing information sending system according to the present invention.

In addition, the information transmission system of the present invention is provided with a memory for saving an individual key (e.g., a tamper resistant memory 201 of FIG. 85) held by a content provider or a content seller transmitting information such as contents (e.g., a content transmission apparatus 200 of FIG. 85), a memory for saving a key certificate (e.g., a memory 202 of FIG. 85), means for encryption a content key $K_{co}$ by an individual key $K_i$ (e.g., a data encryption section 203 of FIG. 85), means for verifying signature data generated with respect to various kinds of data (e.g., a signature verification section 222 of FIG. 85) held by a user purchasing contents (e.g., a content receiving apparatus 210 of FIG. 85), and means for saving a delivery key (e.g., a tamper resistant 221 of FIG. 85).

(3) Remote Reproduction Processing

Remote reproduction processing for receiving a reproduction command from an apparatus holding contents (e.g., the homes server 51) by an apparatus that does not hold a reproduction right of contents (e.g., the fixed apparatus 52) and reproducing the contents will be described.

Figure 86:
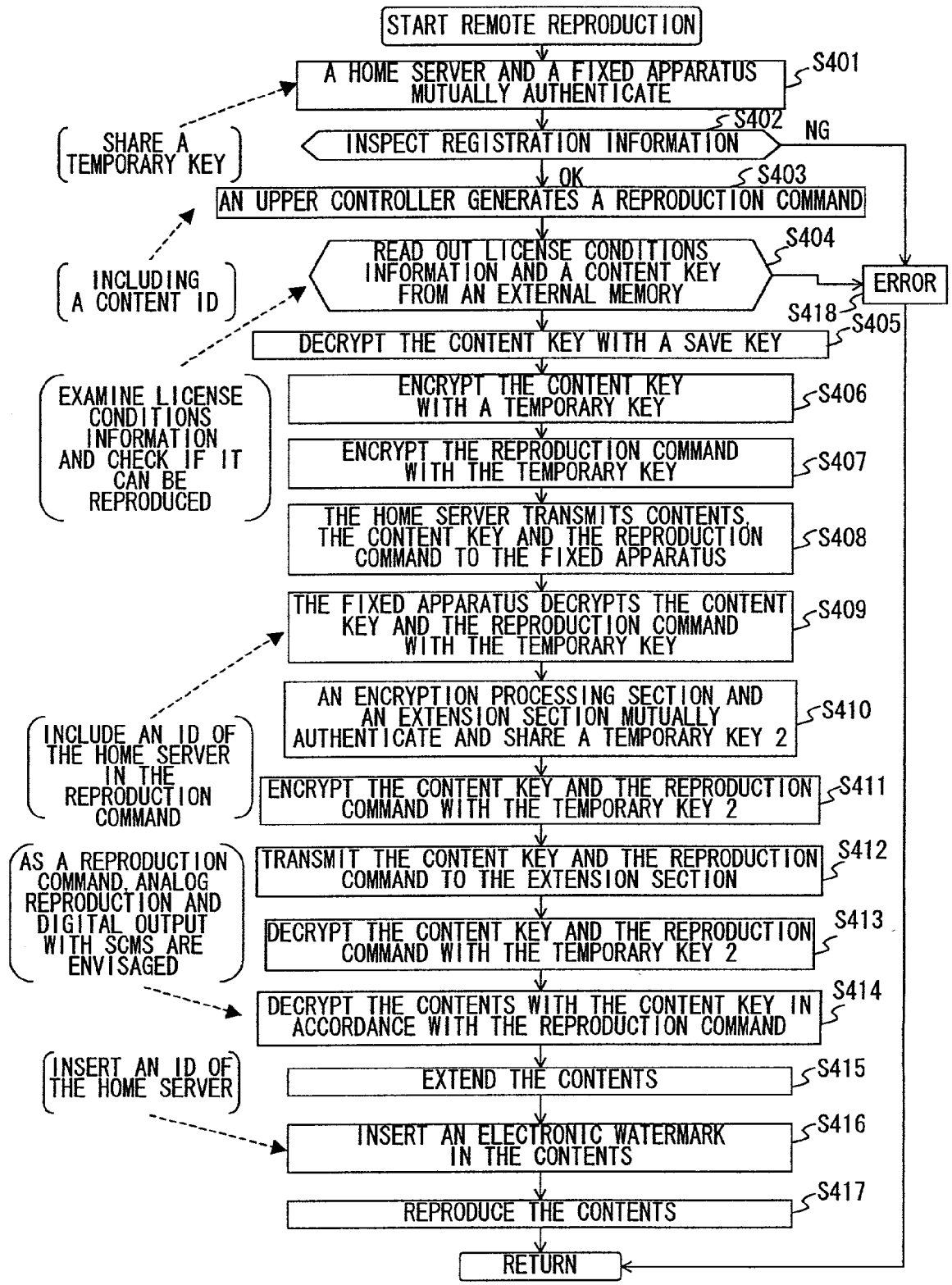
FIG. 86 is a flowchart showing a remote reproduction procedure.

FIG. 86 shows remote reproduction processing procedures, and first, in step S401, the home server 51 and the fixed apparatus 52 mutually authenticate after a content ID of contents that are to be remotely reproduced by an input operation of a user is inputted in the upper controller 62. Since the mutual authentication processing is similar to the processing described in FIG. 52, its description is omitted. In step S402, the upper controller 62 of the home server 51 causes the encryption processing section 65 of the home server 51 to inspect registration information read out from the mass storage section 68 of the home server 51. The encryption processing section 65 having received the registration information from the upper controller 62 causes the signature verification unit 115 of the encryption/decryption module 96 to verify a signature attached to the registration information by a public key of the authentication station 22 supplied form the storage module 92 of the encryption processing section 65. After successful verification of the signature, the encryption processing section 65 decides if the item of "registration" is marked "registration possible," and if it is decided that the item is marked "registration possible," the processing proceeds to step S403. Further, the fixed apparatus 52 side also inspects the registration information, and decides that the home server 51 is marked "registration possible." In step S403, the upper controller 62 generates a reproduction command including a content ID of contents to be remotely reproduced, and in subsequent step S404, the encryption processing section 65 of the home server 51 causes the external memory control section 97 of the encryption processing section 65 to read out a content key $K_{co}$ encrypted by a save key $K_{save}$ and license conditions information corresponding to the contents to be remotely reproduced from the external memory 67. Since a method for reading out data from the external memory 67 by the external memory control section 97 is as described in FIG. 68, its details are omitted. If succeeded in reading out, the processing proceeds to step S405.

In step S405, the decryption unit 111 of the encryption/decryption module 96 decrypts the content key $K_{co}$ read out from the external memory 67 by the save key $K_{save}$ supplied from the storage module 92. After encrypting the content key $K_{co}$ by the temporary key $K_{temp}$ in step S406, the encryption unit 112 of the encryption/decryption module 96 encrypts the reproduction command by the temporary key $K_{temp}$ in step S407.

In the subsequent step S408, the home server 51 reads out the contents (encrypted by the content key $K_{co}$) to be remotely reproduced from the mass storage section 68, and transmits the contents to the fixed apparatus 52 together with the content key and the reproduction command encrypted by the temporary key $K_{temp}$ in the above-mentioned steps S406 and S407.

In step S409, the fixed apparatus 52 decrypts the content key and the reproduction command received from the home server 51 by the temporary key $K_{temp}$, and in step S410, the encryption processing section 73 and the extension section 74 mutually authenticate and share the temporary key $K_{temp2}$. Then, in step S411, the encryption processing section 73 encrypts the content key $K_{co}$ and the reproduction command by the temporary key $K_{temp2}$ shared with the extension section 74 in the above-mentioned step S410. In step S412, the encryption processing section 73 transmits the content key $K_{co}$ and the reproduction command encrypted by the temporary key $K_{temp2}$ to the extension section 74, and in step S413, the extension section 74 decrypts the content key $K_{co}$ and the reproduction command by the temporary key $K_{temp2}$.

In step S414, the extension section 74 decrypts the contents received from the home server 51 in the above-mentioned step S408 by the content key $K_{co}$ decrypted in the above-mentioned step S413 in accordance with the reproduction command decrypted in the above-mentioned step S413. Then, in step S415, the extension section 74 extends the decrypted contents by a predetermined method such as the ATRAC. In step S416, the upper controller 72 inserts data instructed by the encryption processing section 73 in the contents in the form of an electronic watermark. Incidentally, the data handed from the encryption processing section 73 to the extension section 74 is not limited to the content key $K_{co}$ and the reproduction command, but includes reproduction conditions (an analog output, a digital output, an output with copy control signal (SCMS)), an ID of an apparatus that has purchased a content utilization right, or the like. The data to be inserted is the ID of the apparatus that has purchased the content utilization right, i.e., an ID of an apparatus in the license conditions information. In step S417, the extension section 74 reproduces music via a speaker (not shown).

In the above-described configuration, since the home server 51 transmits the contents and the reproduction command of the contents as well as the content key $K_{co}$ to the fixed apparatus 52, the fixed apparatus 52 that does not hold the reproduction right of the contents can reproduce the contents using the reproduction command and the content key $K_{co}$. Therefore, according to the above-described configuration, the contents can be reproduced in a plurality of apparatuses (a fixed apparatus, etc) connected to an apparatus holding the contents (an apparatus having the reproduction right of the contents).

(4) Reservation Purchase Processing

Reservation purchase processing for performing a purchase reservation of contents by performing key conversion of the contents in advance before an effective period of a delivery key is expired will be described. In step S451 of reservation purchase processing procedures indicated in FIG. 87, the home server 51 performs registration information update decision processing, and the processing proceeds to step S452. Since the registration information update decision processing is as described in FIGS. 61 and 62, its detailed description is omitted. However, in the reservation purchase processing, decision of a registration information update timing based on a number of purchase and a purchase price described in steps S601 and S602 of FIG. 61 may not be performed.

In step S452, the upper controller 62 of the home server 51 inputs the registration information read out from the mass storage section 68 of the home server 51 in the encryption processing section 65 of the home server 51. After verifying a signature of the registration information by the signature verification unit 115 of the encryption/decryption module 96, the encryption processing section 65 having received the registration information decides whether or not the items of "purchase processing" and "registration" with respect to the ID of the home server 51 are marked "purchase possible" and "registration possible," and if they are marked "purchase possible" and "registration possible," the processing proceeds to step S453. In step S453, the upper controller 62 of the home server 51 inputs the public key certificate of the content provider 2 read out from the mass storage section 68 of the home server 51 in the encryption processing section 65 of the home server 51. After verifying a signature of the public key certificate of the content provider 2 by the signature verification unit 115 of the encryption/decryption module 96, the encryption processing section 65 having received the public key certificate of the content provider 2 takes out a public key of the content provider 2 from the public key certificate. If it is confirmed that no tamper is made as a result of the verification of the signature, the upper controller 62 proceeds to step S454.

In step S454, the upper controller 62 of the home server 51 inputs the content key $K_{co}$ read out from the mass storage section 68 of the home server 51 in the encryption processing section 65 of the home server 51. The encryption processing section 65 having received the content key $K_{co}$ verifies a signature of the content key $K_{co}$ by the signature verification unit 115 of the encryption/decryption module 96, and if it is confirmed that no tamper is made, the processing proceeds to step S455.

In step S455, the upper controller 62 of the home server 51 inputs the individual key $K_i$ read out from the mass storage 68 of the home server 51 in the encryption processing section 65 of the home server 51. The encryption processing section 65 having received the individual key $K_i$ verifies a signature of the individual key $K_i$ by the signature verification unit 115 of the encryption/decryption module 96, and if it is confirmed that no tamper is made, the processing proceeds to step S456.

Here, if one signature is attached to the entirety of the content key $K_{co}$ encrypted by the individual key $K_i$ and the individual key $K_I$ encrypted by the delivery key $K_d$, steps S454 and S455 can be united and the signature verification processing can be simplified.

In step S456, the control section 91 of the encryption processing section 65 decrypts the individual key $K_i$ inputted in step S455 by the decryption unit 111 of the encryption/decryption module 96 using the delivery key $K_d$ supplied from the storage module 92. Then, the control section 91 of the encryption processing section 65 decrypts the content key $K_{co}$ inputted in step S454 using the individual key $K_i$ previously decrypted. Finally, the control section 91 of the encryption processing section 65 encrypts the content key $K_{co}$ by the encryption unit 112 of the encryption/decryption module 96 using the save key $K_{save}$ supplied from the storage module 92.

In step S457, the content key $K_{co}$ encrypted by the save key $K_{save}$ is saved in the external memory 67 via the external memory control section 97 of the encryption processing section 65.

In addition, if it is decided in step S452 that the home server 51 is an apparatus that cannot perform purchase processing, or it is decided in step S453 that the signature of the public key certificate of the content provider 2 is not correct, or if it is decided in step S454 that the signature of the content key $K_{co}$ encrypted by the individual key $K_i$ is not correct, or if its is decided in step S455 that the signature of the individual key $K_i$ encrypted by the delivery key $K_d$ is not correct, the processing proceeds to step S458, where the home server 51 performs error processing.

As described above, after decrypting the content key $K_{co}$ by the individual key $K_I$, the home server 51 re-encrypts the content key $K_{co}$ by the save key $K_{save}$, and causes the external memory 67 to store it. Since this reservation purchase processing does not actually purchase contents, among the purchase processing described above with reference to FIG. 67, processing for charge information in the registration information update determination processing of step S161, processing for purchased contents corresponding to step S164, processing for a handling policy corresponding to step S167, processing for public key verification of a service provider corresponding to step S168, processing for signature verification of price information corresponding to step S169, and save processing of charge information and license conditions information corresponding to steps S170 through S172 may not be performed.

Figure 87:
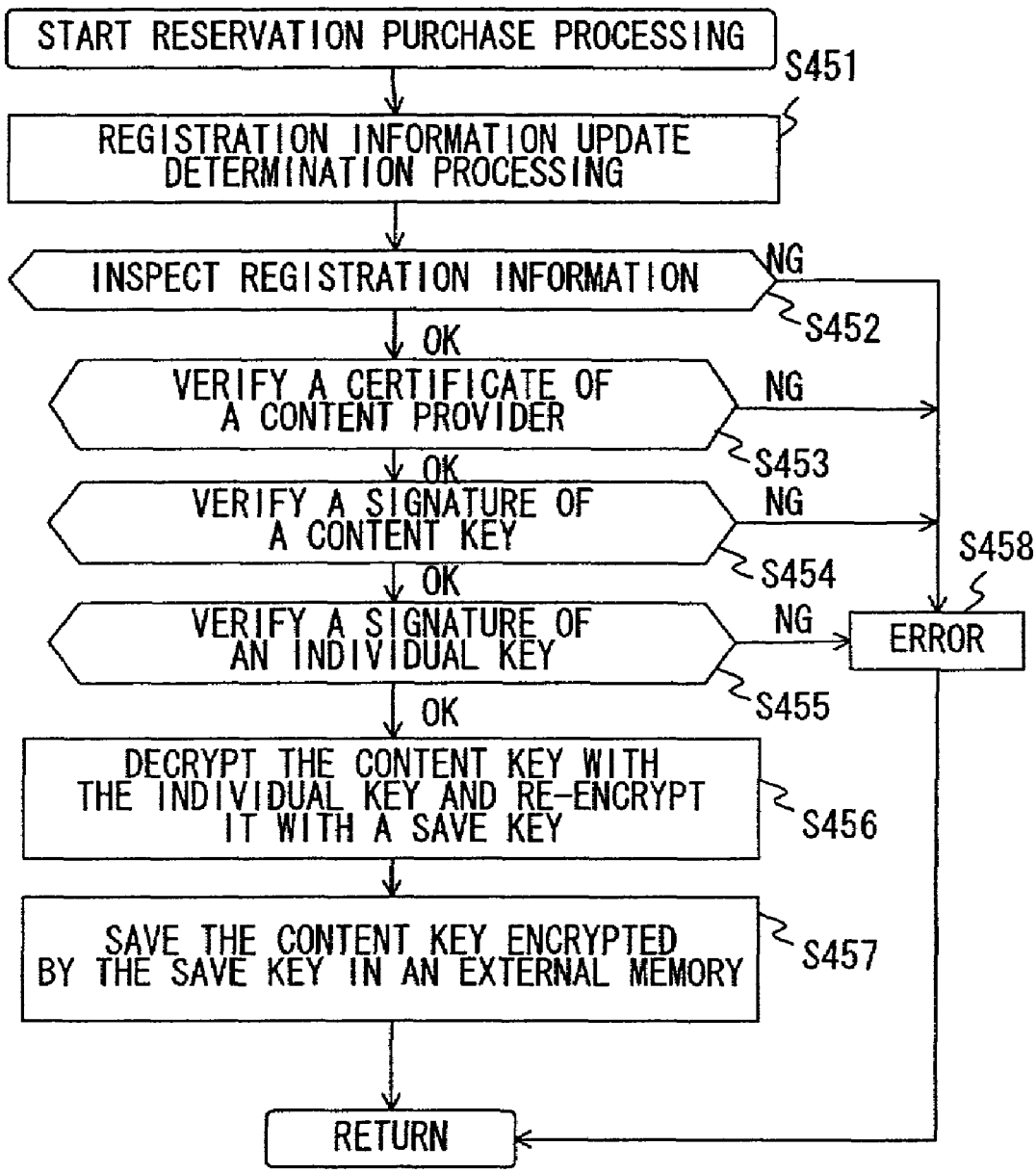
FIG. 87 is a flowchart showing a reserved purchase procedure.

Incidentally, in the case of the reservation purchase processing of FIG. 87, although the home server 51 did not prepare license conditions information, the home server 51 may prepare license conditions information and set its utilization right content number (i.e., a right item) in a state without a right such as an initial value (e.g., #0 that does not exist), or the like.

In this way, in the reservation purchase processing, by saving the content key $K_{co}$ in the external memory 67 before an effective period of the delivery key $K_d$ expires, the home server 51 can purchase contents encrypted by the saved content key $K_{co}$ regardless of a period of the delivery key $K_d$.

Figure 88:
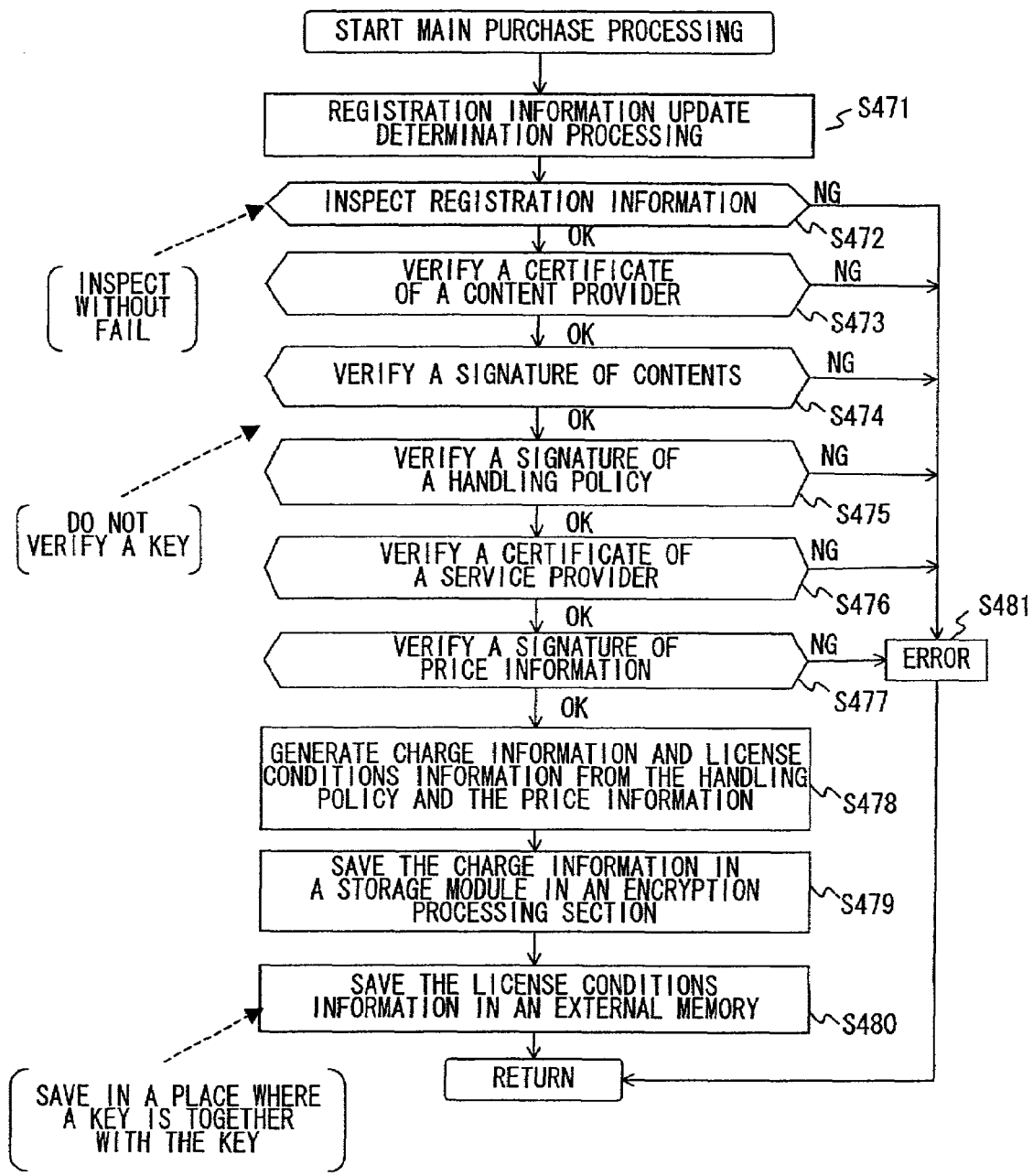
FIG. 88 is a flowchart showing a real purchase procedure after a reserved purchase.

Here, the purchase processing of contents for which purchase reservation is made by saving the content key $K_{co}$ in the external memory 67 in the home server 51 will be described. In step S471 of the purchase processing procedures shown in FIG. 88, the home server 51 performs the registration information update determination processing, and the processing proceeds to step S472. Since the registration information update determination processing is as described in FIGS. 61 and 62, its details are omitted. However, in the purchase processing, determination of a registration information update timing based on the delivery key $K_d$ described in step S603 of FIG. 61 may no be performed.

In step S472, the upper controller 62 of the home server 51 inputs the registration information read out from the mass storage section 68 of the home server 51 in the encryption processing section 65 of the home server 51. After verifying a signature of the registration information by the signature verification unit 115 of the encryption/decryption module 96, the encryption processing section 65 having received the registration information decides if the items of "purchase processing" and "registration" are marked "purchase possible" and "registration possible," if they are marked "purchase possible" and "registration possible," the processing proceeds to step S473. In step S473, the upper controller 62 of the home server 51 inputs the public key certificate of the content provider 2 read out from the mass storage section 68 of the home server 51 in the encryption processing section 65 of the home server 51. After verifying a signature of the public key certificate of the content provider 2 by the signature verification unit 115 of the encryption/decryption module 96, the encryption processing section 65 having received the public key certificate of the content provider 2 takes out a public key of the content provider 2 from the public key certificate. If it is confirmed that no tamper is made as a result of the verification of the signature, the processing proceeds to step S474.

In step S474, the upper controller 62 of the home server 51 inputs the contents read out from the mass storage section 68 of the home server 51 in the encryption processing section 65 of the home server 51. The encryption processing section 65 having received the contents verifies a signature of the contents by the signature verification unit 115 of the encryption/decryption module 96, and if it is confirmed that no tamper is made, the processing proceeds to step S475.

In step S475, the upper controller 62 of the home server 51 inputs the handling policy read out from the mass storage section 68 of the home server 51 in the encryption processing section 65 of the home server 51. The encryption processing section 65 having received the handling policy verifies a signature of the handling policy by the signature verification unit 115 of the encryption/decryption module 96, and if it is confirmed that no tamper is made, the processing proceeds to step S476. In step S476, the upper controller 62 of the home server 51 inputs the public key certificate of the service provider 3 read out from the mass storage section 68 of the home server 51 in the encryption processing section 65 of the home server 51. After verifying a signature of the public key certificate of the service provider 3 by the signature verification unit 115 of the encryption/decryption module 96, the encryption processing section 65 having received the public key certificate of the service provider 3 takes out a public key of the service provider 3 from the public key certificate. If it is confirmed that no tamper is made as a result of the verification of the signature, the processing proceeds to step S477.

In step S477, the upper controller 62 of the home server 51 inputs the price information read out from the mass storage section 68 of the home server 51 in the encryption processing section 65 of the home server 51. The encryption processing section 65 having received the price information verifies a signature of the price information by the signature verification unit 115 of the encryption/decryption module 96, and if it is confirmed that no tamper is made, the processing proceeds to step S478.

In step S478, the upper controller 62 of the home server 51 displays information of purchasable contents (e.g., a purchasable utilization form, a price or the like) using the display means 64, and a user selects a purchase item using the inputting means 63. Further, selection processing of a purchase item may be performed prior to the purchase processing. A signal inputted from the inputting means 63 transmitted to the upper controller 62 of the home server 51, and the upper controller 62 generates a purchase command based on the signal and inputs the purchase command in the encryption processing section 65 of the home server 51. The encryption processing section 65 having received this generates charge information and license conditions information from the handling policy inputted in step S475 and the price information inputted in step S477. Since the charge information is as descried in FIG. 42, its details are omitted. In addition, since the license conditions information is as described in FIG. 41, its details are omitted.

In step S479, the control section 91 of the encryption processing section 65 saves the charge information generated in step S478 in the storage module 92. Then, in step S480, the control section 91 of the encryption processing section 65 transmits the license conditions information generated in step S478 to the external memory control section 97 of the encryption processing section 65. After checking tamper of the external memory 67, the external memory control section 97 having received the license conditions information writes the license conditions information in the external memory 67. Since the tamper check in writing is as described in FIG. 69, its detailed description is omitted. (Further, if license conditions information without a right is already written, the license conditions information is rewritten and updated by the rewriting processing described in FIG. 70.)

Incidentally, if it is decided in step 472 that the home server 51 is an apparatus that cannot perform purchase processing or is not registered, or if it is decided in step S473 that a signature of the public key certificate is not correct, or if it is decided in step S474 that a signature of the contents encrypted by the content key $K_{co}$ is not correct, or if it is decided in step S475 that a signature of the handling policy is not correct, or if it is decided in step S476 that a signature of the price information is not correct, the processing proceeds to step S481, where the home server 51 performs error processing.

As described above, the home server 51 completes the purchase processing of contents by storing the charge information of the contents that a user selected to purchase in the storage module 92 and, at the same time, storing the license conditions information in the external memory 67. In the purchase processing, the signature verification of the content key $K_{co}$ (step S454) and the signature verification of the individual key $K_i$ (step S455) as well as the substitute processing of the content key $K_{co}$ that have already been performed in the purchase processing described with reference to FIG. 87 are not performed.

With the above-described configuration, as the home server 51 saves the content key $K_{co}$ in the external memory 67 by the reservation purchase processing before the delivery key $K_d$ is updated, even if the delivery key $K_d$ required when decrypting the content key $K_{co}$ is updated, the contents can be purchased when an effective period of the delivery key $K_d$ is expired because the content key $K_{co}$ is already saved in the external memory 67.

(5) Proxy Purchase Processing

Proxy purchase processing for giving and receiving contents between apparatuses having different registration information, i.e., apparatuses belonging to different groups will be described. In this proxy purchase processing, when contents are given and received between the home server 51 and a portable apparatus or the like that is an apparatus external to a group of the home server 51, the case in which the home server 51 side is charged and the case in which the apparatus external to a group is charged will be respectively described. In this case, the fixed apparatus 52 described with reference to FIG. 15 will be described as the apparatus external to a group.

Figure 89:
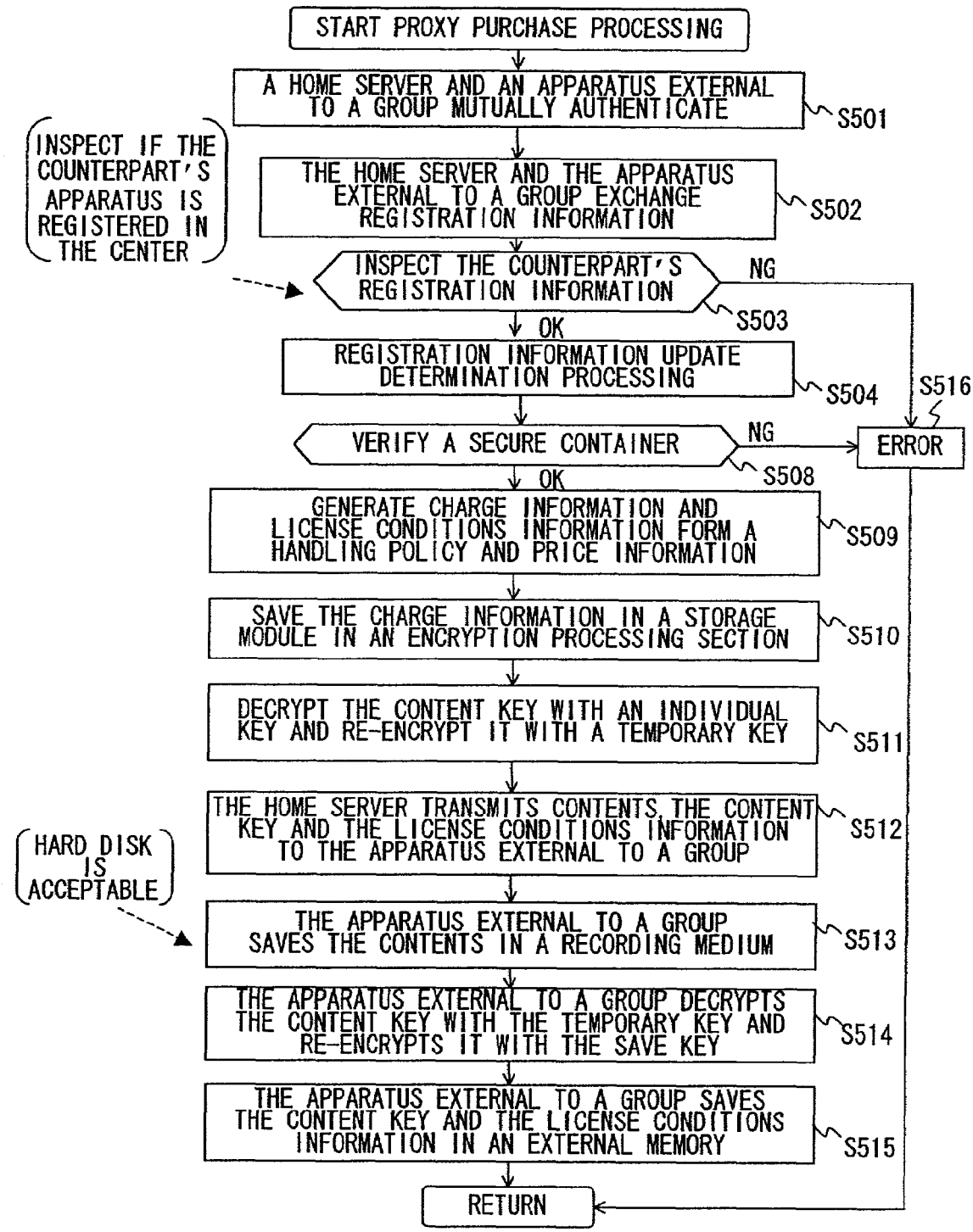
FIG. 89 is a flowchart showing a proxy purchasing procedure in the case where a home server charges.

FIG. 89 shows processing procedures in which the home server 51 passes contents to an apparatus external to a group and performs charge processing, and in step S501, the home server 51 and the apparatus external to a group mutually authenticate. In step S502, the home server 51 and the apparatus external to a group exchange registration information each other, and inspects the other's registration information in the subsequent step S503.

That is, the home server 51 causes the encryption processing section 65 to inspect the registration information received from the apparatus external to a group. The encryption processing section 65 having received the registration information from the apparatus external to a group causes the signature verification unit 115 of the encryption/decryption module 96 to inspect a signature attached to the registration information by a public key supplied from the storage module 92 of the encryption processing section 65. After successful verification of the signature, the control section 91 of the encryption processing section 65 decides whether or not an ID of the apparatus external to a group is registered in the registration information and the items of "purchase processing" and "registration" is marked "purchase possible" and "registration possible." In addition, the apparatus external to a group having received the registration information of the home server 51 also decides in the similar manner whether or not an ID of the home server 51 is registered in the registration information of the home server 51, and the item of "registration" is marked "registration possible." Then, when each confirms that the other apparatus is registered, the processing proceeds to step S504.

Since steps S504 to S510 are the processing similar to that of steps S161 to S171 of FIG. 67, its details are omitted.

In step S511, the control section 91 of the encryption processing section 65 decrypts the individual key $K_i$ encrypted by the delivery key $K_d$ inputted in step S508 by the decryption unit 111 of the encryption/decryption module 96 using the delivery key $K_d$ supplied from the storage module 92. Then, the control section 91 of the encryption processing section 65 decrypts the content key $K_{co}$ encrypted by the individual key $K_i$ inputted in step S508 by the decryption unit 111 of the encryption/decryption module 96 using the previously decrypted individual key $K_i$. Then, the control section 91 of the encryption processing section 65 re-encrypts the content key $K_{co}$ by the encryption unit 112 of the encryption/decryption module 96 using the temporary key $K_{temp}$ that was shared by the apparatus external to a group at the time of mutual authentication of step S501. In step S512, the control section 91 of the encryption processing section 65 generates signatures for the content key $K_{co}$ encrypted by the temporary key $K_{temp}$ and the license conditions information generated in step S509 using the signature generation unit 114 of the encryption/decryption module 96, and transmits them to the upper controller 62. The upper controller 62 of the home server 51 having received the content key $K_{co}$ encrypted by the temporary Key $K_{temp}$, the license conditions information and their signatures reads out the contents encrypted by the content key $K_{co}$ from the mass storage section 68, and transmits the content key $K_{co}$ encrypted by the temporary key $K_{temp}$, the license conditions information, their signatures and the contents encrypted by the content key $K_{co}$ to the apparatus external to a group.

In step S513, the apparatus external to a group having received the content key $K_{co}$ encrypted by the temporary key $K_{temp}$, the license conditions information, their signatures and the contents encrypted by the content key $K_{co}$ outputs the contents encrypted by the content key $K_{co}$ to the record reproduction section 76 of the apparatus external to a group. The record reproduction section 76 of the apparatus external to a group having received the contents encrypted by the content key $K_{co}$ saves the contents encrypted by the content key $K_{co}$ in the recording medium 80.

In step S514, the encryption processing section 73 of the apparatus external to a group verifies the signature received from the home server 51 in the above-mentioned step S512, and at the same time, decrypts content key $K_{co}$ encrypted by the temporary key $K_{temp}$ decrypts by the decryption unit of the encryption/decryption module using the temporary key $K_{temp}$ that was shared with the home server 51 at the time of authentication of step S501. Then, the control section of the encryption processing section 73 re-encrypts the content key $K_{co}$ by the encryption unit of the encryption/decryption module using the save key $K_{save2}$ supplied from the storage module of the encryption processing section 73.

In step S515, the encryption processing section 73 of the apparatus external to a group transmits the content key $K_{co}$ encrypted by the save key $K_{save2}$ and the license conditions information received in step S513 to the external memory control section of the encryption processing section 73, and causes the external memory 79 to save them. Since the processing in which the external memory control section writes data in the external memory was described in FIG. 69, its details are omitted.

In this way, the home server 51 purchases a content utilization right, charge information is saved in the home server 51 side, and a utilization right is transferred to the apparatus external to a group. Thus, the home server 51 makes payment for the content utilization right transferred to the apparatus external to a group.

Figure 90:
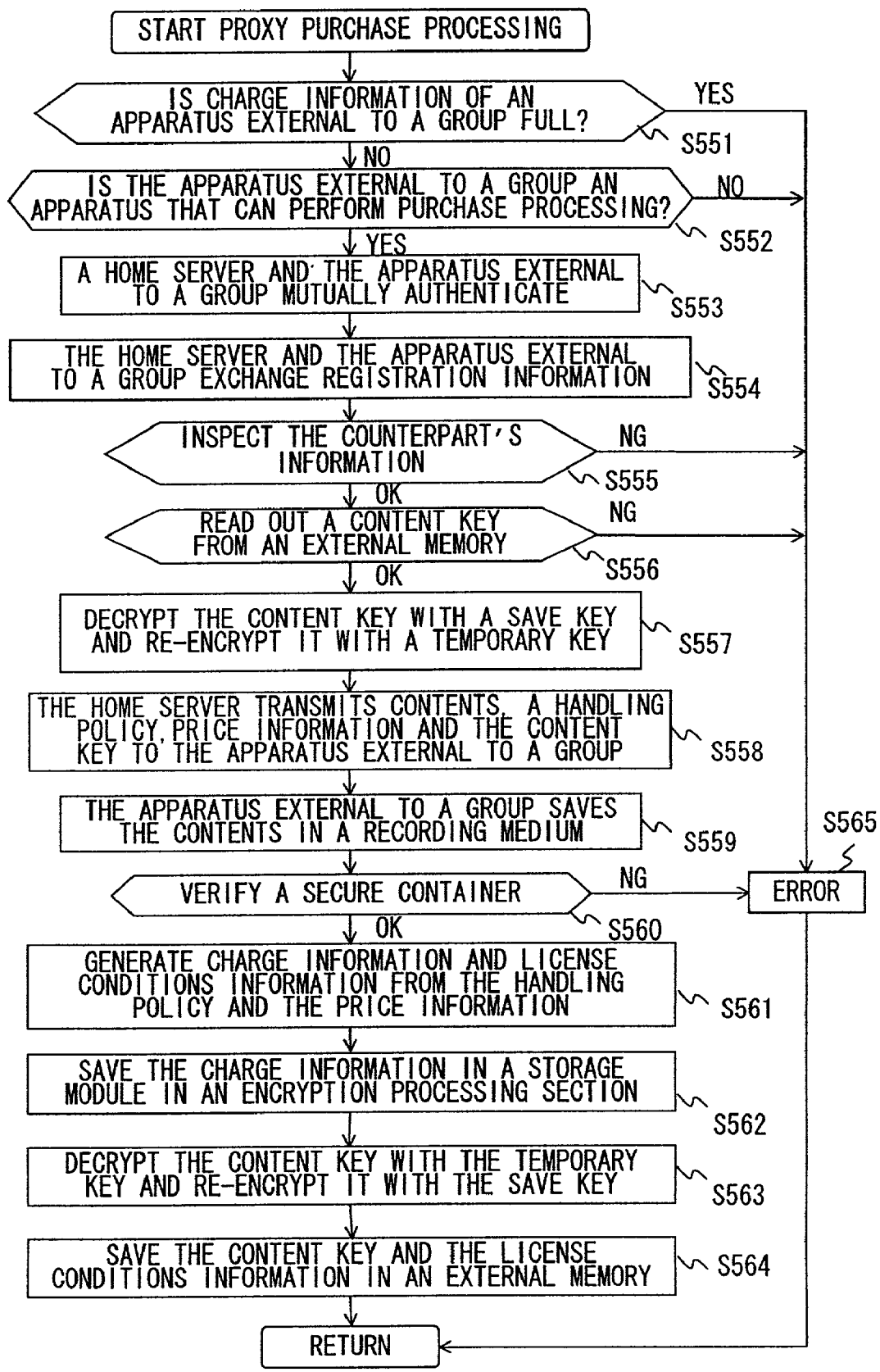
FIG. 90 is a flowchart showing a proxy purchasing procedure in the case where equipment outside the group charges.

FIG. 90 shows processing procedures in which the home server 51 passes contents to the apparatus external to a group and the apparatus external to a group performs charge processing, and in step S551, the apparatus external to a group decides whether or not a total of charges of the charge information stored in the encryption processing section 73 (FIG. 15) has reached an upper limit, and if it has not reached the upper limit, the processing proceeds to step S552. (Further, decision may be made by an upper limit of the number of charge processing rather than the upper limit of the total charges.)

In step S552, the upper controller 72 of the apparatus external to a group inputs the registration information read out from the external memory 79 in the encryption processing section 73. After verifying a signature of the registration information by the signature verification unit of the encryption/decryption module provided it inside, the encryption processing section 73 having received the registration information decides whether or not the item of "purchase processing" for an ID of the apparatus external to a group (the fixed apparatus 52) is marked "purchase possible," and if it is marked "purchase possible," the processing proceeds to step S553.

In step S553, the home server 51 and the apparatus external to a group mutually authenticates. Since the mutual authentication processing is similar to the processing described in FIG. 52, its description is omitted. In step S554, the home server 51 and the apparatus external to a group exchange information each other, and inspect the other's registration information each other in the subsequent step S555.

That is, the home server 51 causes the encryption processing section 65 to inspect the registration information received from the apparatus external to a group. The encryption processing section 65 having received the registration information from the apparatus external to a group causes the signature verification unit 115 of the encryption/decryption module 96 to verify a signature attached to the registration information by the public key supplied from the storage module 92 of the encryption processing section 65. After successful verification of the signature, the control section 91 of the encryption processing section 65 decides whether or not the ID of the apparatus external to a group is registered in the registration information, and the item of "registration" is marked "registration possible." In addition, the apparatus external to a group having received the registration information of the home server 51 also decides in the similar manner whether or not the ID of the home server 51 is registered in the registration information of the home server 51, and the item of "registration" is marked "registration possible." Further, similar processing is performed by the apparatus external to a group as well. Then, when each apparatus has confirmed that the other's apparatus is registered, the processing proceeds to step S556.

In step S556, the control section 91 of the home server 51 reads out the already purchased content key from the external memory 67 via the external memory control section 97, decrypts the content key $K_{co}$ by the save key $K_{save}$ in the subsequent step S557, and at the same time, re-encrypts it by the temporary key $K_{temp}$ to generates signatures for them.

In step S558, the home server 51 transmits the content key encrypted by the save key $K_{temp}$ generated in step S557, and the contents, the handling policy and the price information read out from the mass storage section 68 to the apparatus external to a group. In step S559, the apparatus external to a group saves the contents received from the home server 51 in the recording medium 80.

After the apparatus external to a group (the fixed apparatus 52) verifies the signatures of the handling policy, the price information and the like in step S560, in step S561, the upper controller 72 of the apparatus external to a group displays information of purchasable contents (e.g., a purchasable utilization form, a price or the like) using the displaying means 78, and a user selects a purchase item using the inputting means 77. Further, selection processing of a purchase item may be performed prior to the proxy purchase processing. The signal inputted from the inputting means 77 is transmitted to the upper controller 72, and the upper controller 72 generates a purchase command based on the signal and inputs the purchase command in the encryption processing section 73. The encryption processing section 73 having received this generates charge information and license conditions information from the handling policy and the price information inputted in step S560. Since the charge information was described in FIG. 42, its details are omitted. Since the license conditions information was described in FIG. 41, its details are omitted.

In step S562, the encryption processing section 73 saves the charge information generated in step S561 in the storage module in the encryption processing section 73. In step S563, with respect to the content key encrypted in step S557, the encryption processing section 73 verifies a signature, and at the same time, decrypts the signature by the temporary key $K_{temp}$, and re-encrypts it by the save key $K_{save2}$. Then, in step S564, the content key $K_{co}$ encrypted by the save key $K_{save2}$ is saved in the external memory 79 from the encryption processing section 73.

In this way, since the home server 51 transfers the already purchased content utilization right to the apparatus external to a group and the apparatus external to a group saves the charge information, the apparatus external to a group makes payment for the content utilization right transferred from the home server 51.

In the above-described configuration, by exchanging the registration information each other between the apparatuses having different registration information as described in the above-mentioned steps S502 and S554, contents held by one apparatus can be transferred to the other apparatus after confirming that the other apparatus is a registered apparatus. Therefore, according to the above-described configuration, contents can be given and received between apparatuses belonging to different groups.

Further, although a signature of contents was verified in performing purchase processing in the above-mentioned embodiment, the processing is sometimes omitted because it takes time. In addition, whether or not verification is sometimes necessary is described in a handling policy or price information, and operations are performed in accordance with it.

(6) Data Format of Various Kinds of Data

The electronic distribution service center 1 adds an ID of the content provider 2 in an individual key $K_i$ for each content provider 2, encrypts the entirety of the individual key $K_i$ and the ID of the content provider 2 using the delivery key $K_d$, and delivers the obtained data to a corresponding content provider 2 as the encrypted individual key $K_i$.

The content provider 2 stores the encrypted individual key $K_i$ given by the electronic distribution service center 1 in this way in key data for single contents as it is, and delivers it to an apparatus in the user home network 5 via the service provider 3. Then, in the electronic music distribution system 10, the deliver key $K_d$ for decrypting the encrypted individual key $K_i$ included in the key data is held only by the apparatus in the user home network 5, thereby substantially certainly preventing the ID of the content provider 2 that is encrypted together with the individual key $K_i$ to be tampered between the content provider 2 and the apparatus in the user home network 5 that purchases the contents.

Therefore, the apparatus in the user home network 5 can easily and certainly check whether or not single contents and album contents as well as a handling policy are legal data by comparing an ID of the content provider 2 included in the single contents and album contents as well as a handling policy and an ID of the content provider 2 that is included in the key data and encrypted together with the individual key $K_i$, even if signatures of single contents and album contents are tampered during delivery and illegal contents are supplied, or a signature of a handling policy of the like is tampered during delivery.

Thus, in the electronic music distribution system 10, for example, purchase processing of illegal contents or generation of charge information for distributing profit illegally to a third party based on an illegal handling policy can be substantially certainly prevented, thereby preventing content data to be illegally utilized.

Incidentally, in such an electronic music distribution system 10, an ID of the service provider 3 may be encrypted and delivered in the same manner as an ID of the content provider 2, in which case, for example, even if an ID of the service provider 3 included in charge information is tampered (i.e., a signature of price information is tampered) to illegally obtain profit, this can be easily and certainly prevented.

Figure 91:
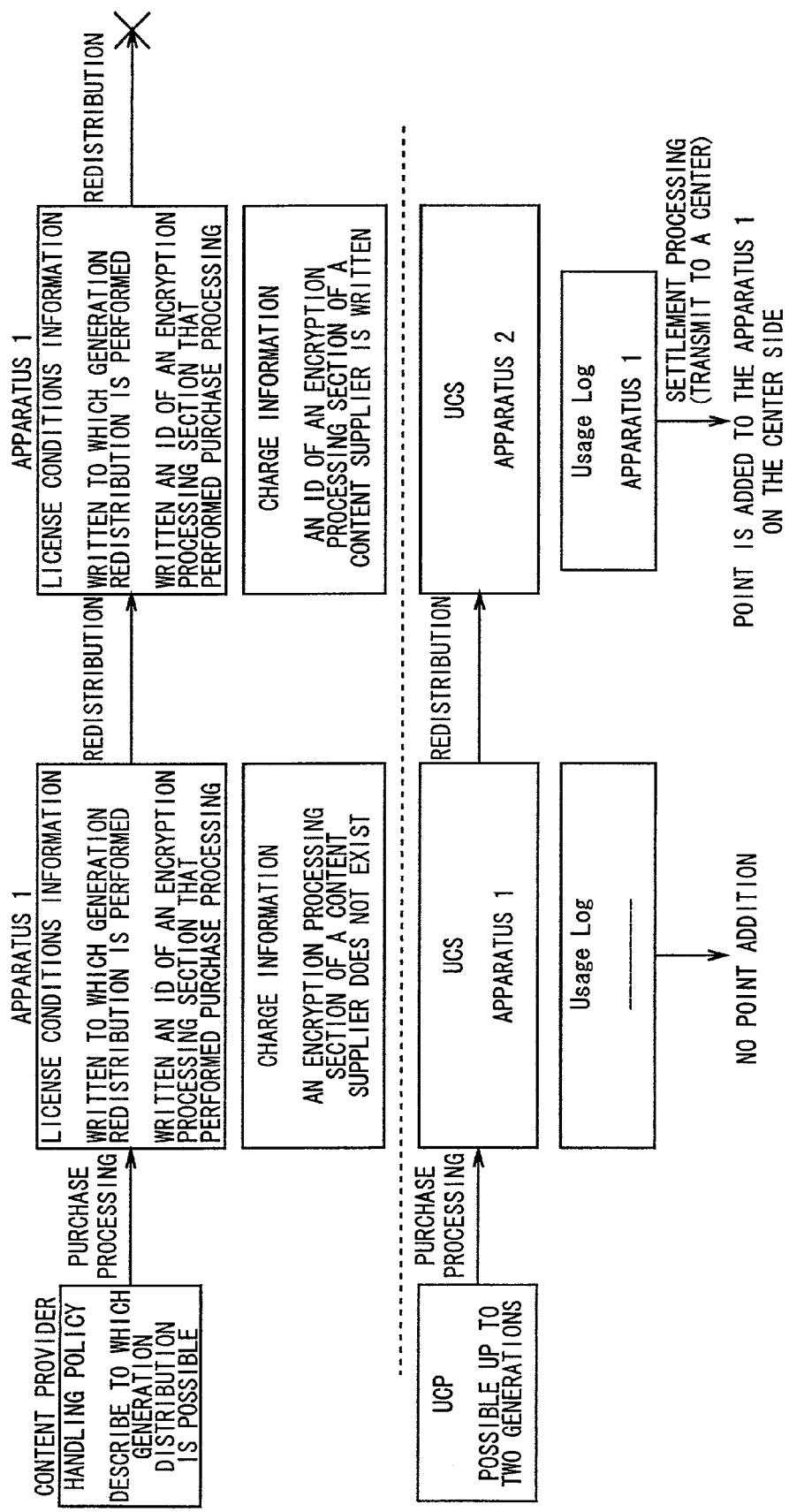
FIG. 91 is a conceptual diagram served for explanation of generation management in a movement procedure of management movement rights.

In addition, FIG. 91 shows generation management by transfer processing of a managed transfer right. As described above with reference to FIGS. 33 and 34, how many generations of reproduction rights can be transferred at the most is stored in a handling policy as generation management information. Therefore, when the handling policy is given to a predetermined first apparatus in the user home network 5 from the content provider 2 via the service provider 3 and purchase processing is executed in the encryption processing section in the first apparatus, the encryption processing section detects generation management information included in the handling policy, and detects a maximum number of time the contents indicated by the generation management information can be repurchased.

Then, when purchase processing of contents to which the handling policy is attached according to the detected maximum number of times contents can be repurchased, the encryption processing section prepares license conditions information based on the handling policy, stores the ID of the encryption processing section in the license conditions information, and at the same time, stores a number of times found by deducting one from the maximum number of times contents can be repurchased (i.e., a remaining number of time contents can be repurchased) as generation management information.

In addition, when the purchased contents are supplied from a content provider 2 in which the encryption processing section is not provided, although the encryption processing section prepares charge information based on a handling policy, the encryption processing section stores a predetermined value set in advance that indicates neither encryption processing section as an ID of a supplier in the charge information.

Then, when the contents to which purchase processing was applied can be redistributed by the generation management information included in the license conditions information, a first apparatus redelivers the contents from the first apparatus to a second apparatus in the user home network 5 together with the license conditions information, if necessary. In the second apparatus, when executing purchase processing to the redelivered contents, the encryption processing section inside the second apparatus prepares the license conditions information attached to the contents again, stores the ID of the encryption processing section in the license conditions information prepared again, and at the same time, stores a number of times found by deducting one from the remaining number of times content can be repurchased stored in the first apparatus (i.e., a new remaining number of times contents can be repurchased) as generation management information. In addition, the encryption processing section stores the ID of the encryption processing section in the first apparatus as an ID of a supplier in the charge information prepared along the purchase processing.

Then, thereafter, if the contents to which the purchase processing is applied by the generation management information included in the license conditions information has been repurchased for the maximum number of times the purchase processing is possible set in advance, the second apparatus determines that redelivery is impossible and does not redeliver the contents.

Thus, in the electronic music distribution system 10, by providing for the maximum number of times contents can be repurchased in the handling policy in advance by the generation management information as described above, and managing a remaining number of times the contents can be repurchased in the license conditions information for each purchase processing of the contents, illegal repurchase can be prevented.

In addition, in the electronic music distribution system 10, by accumulating and storing an ID of a supplier of the contents by charge information upon repurchasing the contents, a supply route of the contents can be specified from the ID of the supplier of the charge information, if necessary, and, when illegal contents flows into the system, a supplier of the illegal contents can be retrieved and eliminated.

Incidentally, in the electronic music distribution system 10, since an apparatus in the user home network 5 provides the contents on behalf of the content provider 2 or the service provider 3 upon repurchasing the contents, for example, in the electronic distribution service center 1, profits can be returned to the apparatus by adding a discount point that can be used upon purchasing contents to a user having the apparatus of a supplier of repurchase of the contents based on an ID of the supplier included in the charge information.

In above-described configuration, in the electronic music distribution system 10, in the case in which contents is provided to an apparatus in the user home network 5 via from the content provider 2 via the service provider 3, the content provider 2 generates single contents and album contents in which the contents encrypted by the content key $K_{co}$ and the ID of the content provider 2 are stored, and at the same time, generates handling policies of the single contents and the album contents in which the ID of the content provider 2 is stored, and also generates key data for the single contents and the album contents in which the content key $K_{co}$ encrypted by the individual key $K_i$, the individual key $K_i$ encrypted by the delivery key $K_d$ or the like are stored.

Then, the content provider 2 transmits the single contents and the album contents, the handling policies of the single contents and the album contents, and the key data for the single contents and the album contents as a content provider secure container.

Here, the content provider 2 then uses the individual key $K_i$ supplied from the electronic distribution service center 1 as an individual key $K_i$ encrypted by the delivery key $K_d$, whereas the electronic distribution service center 1 adds an ID of the content provider 2 to the individual key $K_i$ and encrypts the entirety of these using the delivery key $K_d$. Then, the delivery key $K_d$ used for this encryption is held only by an apparatus in the user home network 5 other than the electronic distribution service center 1.

Therefore, in the electronic music distribution system 10, the individual key $K_i$ encrypted by the delivery key $K_d$ can be provided from the content provider 2 to an apparatus in the user home network 5 via the service provider 3 while preventing tampering, thus, in the apparatus, by comparing the ID of the content provider 2 obtained by decrypting the individual key $K_I$ encrypted by the delivery key $K_d$ and the IDs of the content provider 2 included in the single contents and the album contents as well as the handling policies of the single contents and the album contents respectively, whether or not signatures of the handling policies of the single contents and the album contents as well as the handling policies of the single contents and the album contents can be easily and certainly detected.

As a result, in the electronic music distribution system 10, provision of illegal contents to a user or generation of charge information for a third party to illegally obtain profit using a handling policy can be prevented, thus, illegal utilization of contents by a third party can be prevented.

In addition, in the electronic music distribution system 10, a maximum number of times contents can be repurchased is stored in a handling policy provided from the content provider 2, and at the same time, a remaining number of times contents can be repurchased is stored in the license conditions information in the apparatus each time the contents are repurchased between apparatuses in the user home network 5.

Therefore, in the electronic music distribution system 10, an apparatus in the user home network 5 can manage a remaining number of times contents can be repurchased by the license conditions information, thus, illegal repurchase exceeding the maximum number of times contents can be repurchased can be prevented.

According to the above-described configuration, by directly attaching an ID of the content provider 2 to contents encrypted from the content provider 2 (i.e., storing an ID of the content provider 2 in data of single contents and album contents) or indirectly attaching it (i.e., attaching a handling policy in which an ID of the content provider 2 is stored), providing an ID of the content provider 2 encrypted together with the individual key $K_i$ using the delivery key $K_d$ together with the content to which the ID of the content provider 2 is attached to an apparatus in the user home network 5, decrypting the encrypted ID of the content provider 2 in the apparatus, and comparing the obtained ID of the content provider 2 and the ID of the content provider 2 attached to the contents, whether or not the contents can be legally utilized can be easily and certainly determined, thus, an electronic music distribution system that can prevent contents from illegally utilized.

In addition, by storing a maximum number of times contents can be repurchased in a handling policy provided form the content provider 2, and at the same time, storing a remaining number of times the contents can be repurchased in the license conditions information in the apparatus to manage the number of times the contents can be repurchased, illegal repurchase exceeding the maximum number of times the contents can be repurchased can be prevented.

(7) Configuration of a Record Reproduction Apparatus

Figure 92:
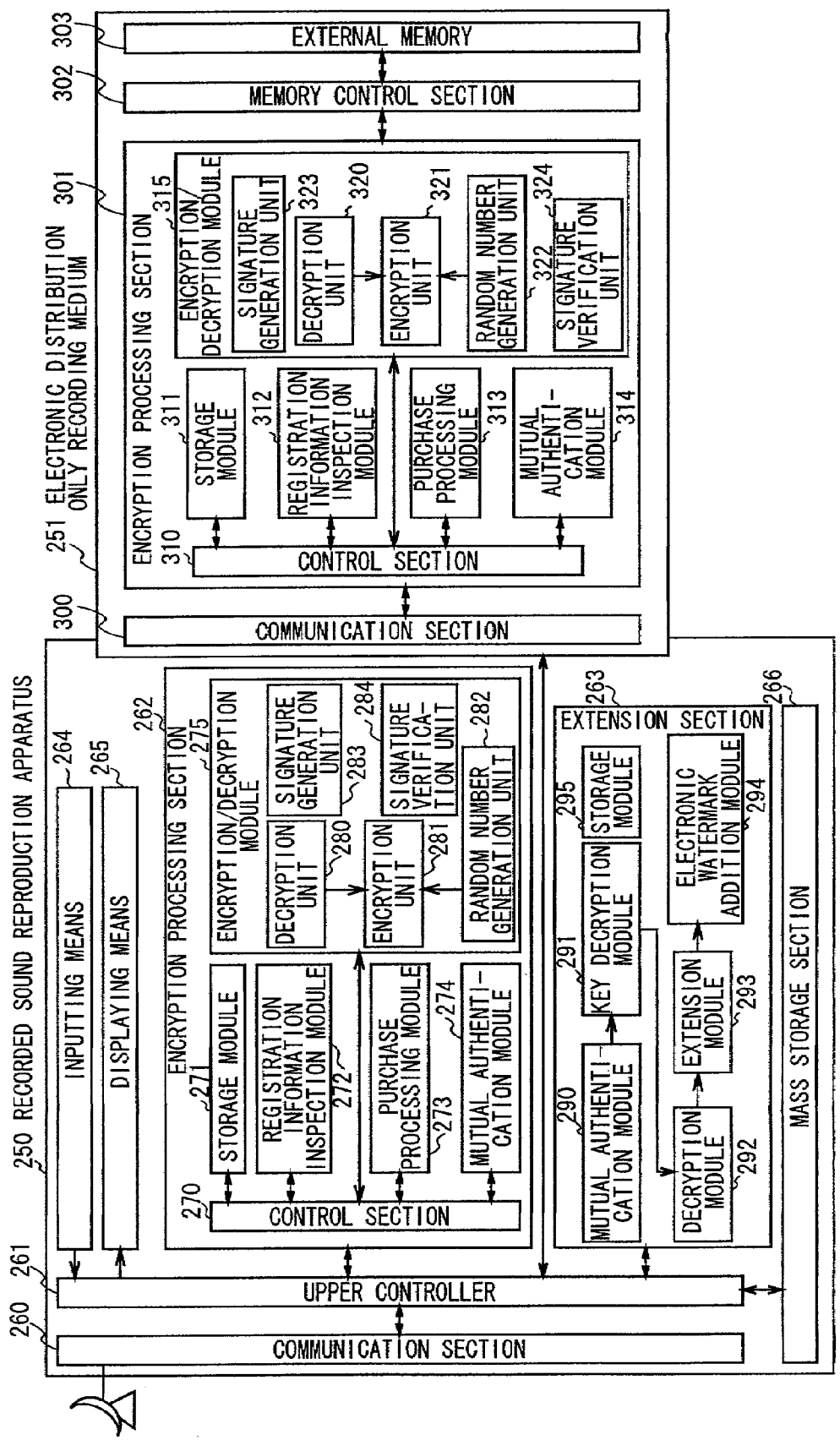
FIG. 92 is a block diagram showing configuration of a recording and reproducing apparatus.

In the electronic music distribution system 10, a record reproduction apparatus 250 shown in FIG. 92 is provided as an apparatus in the user home network 5. In the record reproduction apparatus 250, an electronic distribution only recording medium 251 that is a data storage apparatus is detachably provided.

The record reproduction apparatus 250 can record contents electronically distributed from the service provider 3 via the network 4 in the electronic distribution only recording medium 251 and reproduce the contents from the electronic distribution only recording medium 251.

Actually, the record reproduction apparatus 250 is composed of a communication section 260 that is receiving means, an upper controller 261 that is record reproduction controlling means, an encryption processing section 262, an extension section 263 that is content decrypting means, inputting means 264, displaying means 265, and a mass storage section 266. The communication section 260 communicates with the electronic distribution service center 1, and at the same time, communicates with the service provider 3 via the network 4.

The upper controller 261 once hold a content provider secure container and a service provider secure container received by the communication section 260 in the mass storage section 266 by controlling the record reproduction apparatus 250 and the electronic distribution only recording medium 251 based on an operation instruction inputted via the inputting means 264 at the time of purchase processing.

Then, the upper controller 261 causes the electronic distribution only recording medium 251 to execute purchase processing, thereby reads out contents encrypted by a corresponding content key $K_{co}$, a content key $K_{co}$ encrypted by an individual key $K_i$, and an individual key $K_i$ encrypted by a delivery key $K_d$ from the mass storage section 266, decrypts the individual key $K_I$ encrypted by the delivery key $K_d$ by a delivery key $K_d$ read out from the storage module 311 of the encryption processing section 301 in the electronic distribution only recording medium 251, decrypts the content key $K_{co}$ encrypted by the individual key $K_i$ by the decrypted individual key $K_i$, encrypts the obtained content key $K_{co}$ by a save key $K_{save}$ read out from the storage module 311 of the encryption processing section 301, and records the contents encrypted by the read out content key $K_{co}$ and the content key $K_{co}$ encrypted by the save key $K_{save}$ in the electronic distribution only recording medium 251.

In addition, the upper controller 261 reads out a content key $K_{co}$ encrypted by a temporary key $K_{temp1}$ (shared by the encryption processing section 262 and the encryption processing section 301 by mutual authentication) from the electronic distribution only recording medium 251, and supplies a content key $K_{co}$ encrypted by a temporary key $K_{temp2}$ (shared by the encryption processing section 262 and the extension section 263 by mutual authentication) and contents encrypted by the content key $K_{co}$ to the extension section 263 to decrypt the contents encrypted by the content key $K_{co}$ using the content key $K_{co}$ by controlling the record reproduction apparatus 250 and the electronic distribution only recording medium 251 based on an operation instruction inputted via the inputting means 264 at the time of reproduction processing.

Incidentally, since the inputting means 264 and the displaying means 265 have functions similar to those of the inputting means 63 and the displaying means 64 respectively, their descriptions are omitted.

The encryption processing section 262 is composed of a control section 270, a storage module 271, a registration information inspection module 272, a purchase processing module 273, a mutual authentication module 274, and an encryption/decryption module 275. Incidentally, the encryption processing section 262 is composed of an encryption processing only IC of a single chip in the same manner as the encryption processing section 65, and has a characteristic that illegally reading out data from outside is difficult (tamper resistant feature).

In the encryption processing section 262, since the control section 270, the storage module 271, the registration information inspection module 272, the purchase processing module 273, and the encryption/decryption module 275 have functions similar to those of the control section 91, the storage module 92, the registration information inspection module 93, the purchase processing module 94, and the encryption/decryption module 96 of the homes server 51, their descriptions are omitted.

In addition, the mutual authentication module 274 executes mutual authentication with the extension section 263 and the electronic distribution only recording medium 251, and generates a temporary key $K_{temp}$ (session key) to be shared with the extension section 263 and the electronic distribution only recording medium 251, if necessary.

The encryption/decryption module 275 is composed of a decryption unit 280, an encryption unit 281, a random number generation unit 282, a signature generation unit 283, and a signature verification unit 284. Since the decryption unit 280, the encryption unit 281, the random number generation unit 282, the signature generation unit 283, and the signature verification unit 284 have functions similar to those of the decryption unit 111, the encryption unit 112, the random number generation unit 113, the signature generation unit 114, and the signature verification unit 115 of the home server 51 respectively, their descriptions are omitted.

The extension section 263 is composed of a mutual authentication module 290, a key encryption module 291, a decryption module 292, an extension module 293, an electronic watermark addition module 294, and a storage module 295. Since the mutual authentication module 290, the key decryption module 291, the decryption module 292, the extension module 293, the electronic watermark addition module 294, and the storage module 295 have functions similar to those of the mutual authentication module 101, the key decryption module 102, the decryption module 103, the extension module 104, the electronic watermark addition module 105, and the storage module 106 of the home server 51 respectively, their descriptions are omitted.

In addition, the electronic distribution only recording medium 251 is made to execute purchase processing to prepare charge information, and hold the prepared charge information, and is composed of a communication section 300 that is communicating means, an encryption processing section 301 that is content key encryption means and content key decryption means, an external memory control section 302 that is record reproducing means, and an external memory 303 that is recording medium.

The communication section 300 transmits and receives data between the upper controller 261 of the record reproduction apparatus 250. The encryption processing section 301 is made up of a circuit configuration similar to the encryption processing section 65 of the home server 51, and has a characteristic that illegal read out of data from outside is difficult (tamper resistant feature). In addition, the encryption processing section 301 is composed of a control section 310, a storage module 311 that is save key holding means, a registration information inspection module 312, a purchase processing module 313, a mutual authentication module 314, and an encryption/decryption module 315.

Since the control section 310, the storage module 311, the registration information inspection module 312, the purchase processing module 313, the mutual authentication module 314, and the encryption/decryption module 315 have functions similar to those of the control section 91, the storage module 92, the registration information inspection module 93, the purchase processing module 94, the mutual authentication module 95, and the encryption/decryption module 96 of the home server 51 respectively, their descriptions are omitted. Incidentally, the encryption/decryption module 315 is composed of a decryption unit 320, an encryption unit 321, a random number generation unit 322, a signature generation unit 323, and a signature verification unit 324.

The external memory control section 302 performs tamper check, if necessary, in addition to reading and writing data in and from the external memory 303. Various kinds of recording media such as a writable optical disk, a hard disk, or a semiconductor memory can be applied as the external memory 303. Therefore, a structure that can read out data from these recording media is necessary as the external memory control section 302, which performs reading and writing by adding a recording medium control section (not shown), if necessary. Further, since details of the tamper check processing were described in FIGS. 68 to 71, their descriptions are omitted.

Here, in such an electronic distribution only recording medium 251, a save key $K_{save}$ peculiar to the electronic distribution only recording medium 251 is held by the storage module 311 of the encryption processing section 301. In the electronic distribution only recording medium 251, when the content key $K_{co}$ is recorded in the external memory 303, the content key $K_{co}$ is encrypted by the save key $K_{save}$, and when the encrypted content key $K_{co}$ is reproduced from the external memory 303, the content key $K_{co}$ is decrypted by the storage key $K_{save}$ and transmitted to the record reproduction apparatus 250.

Therefore, contents recorded in a recording medium by a conventional record reproduction apparatus cannot be reproduced by an apparatus (i.e., an apparatus holding a save key $K_{save}$ different from a save key $K_{save}$ that has encrypted the contents) other than an apparatus that has recorded the contents in the recording medium (i.e., an apparatus holding a save key $K_{save}$ peculiar to an encryption processing section that has encrypted a content key $K_{co}$ to be recorded in the recording medium), whereas the contents recorded in the electronic distribution only recording medium 251 can be reproduced by any apparatus as far as it has a configuration similar to that of the above-mentioned record reproduction apparatus 250 even if it does not hold a save key $K_{save}$.

Incidentally, in such a record reproduction apparatus 250, since contents are recorded in the electronic distribution only recording medium 251 together with the content key $K_{co}$ by executing purchase processing, the record reproduction apparatus 250 can be configured without using the encryption processing section 262 and the extension section 263 for the purpose of only recording the contents.

In addition, in such a record reproduction apparatus 250, since the electronic distribution only recording medium 251 is detachably provided, and contents can be reproduced from the electronic distribution only recording medium 251 that has recorded the contents and the content key $K_{co}$ in another apparatus, the record reproduction apparatus 250 can be used without connecting to the electronic distribution service center 1 and the network 4 by having a reproduction function only.

However, in the user home network 5, when contents and a content key $K_{co}$ are recorded in the electronic distribution recording medium 251 in the record reproduction apparatus 250 connected to the network 4 as described above, and the electronic distribution only recording medium 251 is used for reproducing the contents in a record reproduction not connected to the electronic distribution service center 1 or the network 4, it is possible that collection of charge information held by the electronic distribution only recording medium 251 is difficult in the electronic distribution service center 1.

Thus, in the electronic distribution only recording medium 251, for example, charge information in the storage module 311 is periodically retrieved from the control section 310 in the encryption processing section 301, and if there is uncollected charge information in the electronic distribution service center 1, contents can only be reproduced only one from purchase processing until the charge information is collected by applying reproduction limitation to corresponding contents, and at the same time, managed transfer of the contents is not performed as well.

In this way, in the electronic music distribution system 10, a user owning the electronic distribution only recording medium 251 is prevented from reproducing contents illegally. Incidentally, as a reproduction limitation due to uncollected charge information, for example, by setting a number of times contents can be reproduced from purchase processing until charge information is collected in advance, counting the number of times of reproducing contents from the point of the purchase processing, and when the system detects that the charge information is uncollected, the reproduction limitation can be effectively functioned. That is, when it is detected that the charge information is uncollected, the number of times corresponding contents have already been reproduced at this point and the number of times of the reproduction limitation set in advance, and when the number of times the contents have already been reproduced has reached the set number of times of reproduction limitation, the contents cannot be reproduced.

In addition, as such a reproduction limitation, a period (time) may be used. That is, by setting time during which contents can be reproduced, if charge information is uncollected after the set time has passed since purchase processing, the contents cannot be reproduced. Further, in the electronic distribution only recording medium 251, limitation contents of the reproduction limitation may be held by associating it with charge information in the storage module 311 of the encryption processing section 301, or may be held by associating it with the license conditions information in the external memory 303. In addition, by storing reproduction limitation (the number of times or a period) in a handling policy and/or price information, at the time of purchase processing, the electronic distribution only recording medium 251 may take out information of the reproduction limitation from the handling policy and/or the price information, prepare license conditions information including this, and hold the prepared license conditions information in the external memory 303.

Figure 93:
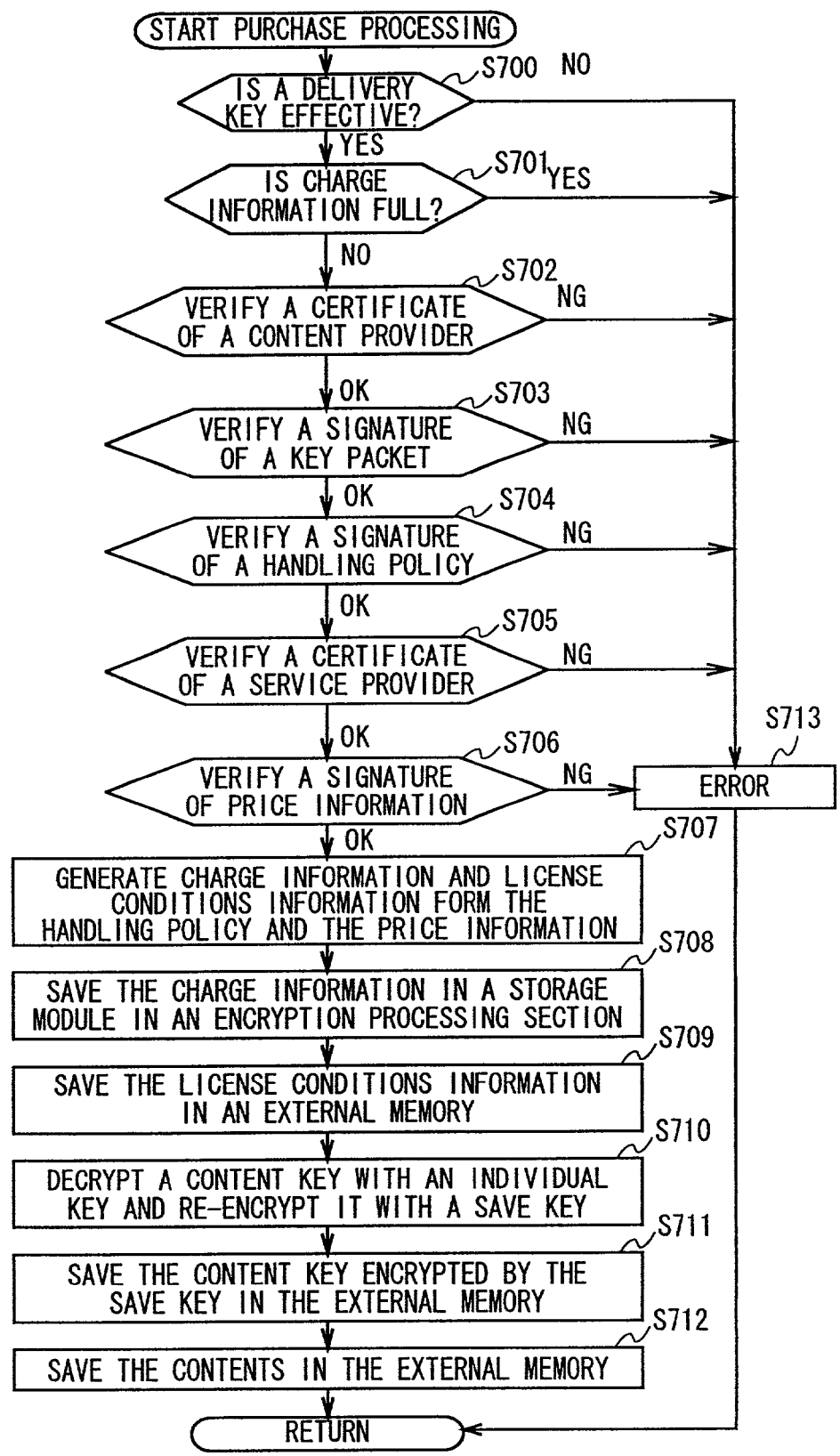
FIG. 93 is a flowchart showing a purchasing procedure of a recording and reproducing apparatus.

Here, purchase processing executed in the record reproduction apparatus 250 will be described using a flow chart shown in FIG. 93. In step S700, in the state in which a content provide secure container and a service provider secure container distributed from the service provider 3 via the network 4 are once held in the mass storage section 266, the upper controller 261 in the record reproduction apparatus 250 decides an effective period (version) of a delivery key $K_d$ stored in the storage module 311 in the encryption processing section 301 via the control section 310 of the encryption processing section 301 in the electronic distribution only recording medium 251, and if the delivery key $K_d$ is effective, the processing proceeds to step S701.

In step S701, the upper controller 261 determines whether or not a total of charges of charge information stored in the storage module 311 in the encryption processing section 301 via the control section 310 of the encryption processing section 301 in the electronic distribution only recording medium 251 has reached an upper limit set in advance, and if the total of the charges has not reached the upper limit, the processing proceeds to step S702. Incidentally, in step S701, instead of determining whether or not the total of charges has reached the upper limit, for example, the upper controller 261 may determine whether or not there is any room the a storage area of charge information in the storage module 311, and if there is room in the storage area, the processing may proceed to step S702. In addition, in step S701, the upper controller 261 may determine whether or not a number of charge information (i.e., a number of times of purchases) stored in the storage module 311 has reached a number (of upper limit) set in advance.

In step S702, the upper controller 261 reads out a public key certificate of the content provider 2 included in the content provider secure container in the mass storage section 266, and transmits the read out public key certificate of the content provider 2 to the encryption processing section 301 in the electronic distribution only recording medium 251. Thus, in the encryption processing section 301 in the electronic distribution only recording medium 251, the control section 310 verifies a signature of the public key certificate of the content provider 2 in the signature verification unit 324 in the encryption/decryption module 315, and if it is confirmed that not tamper is made to the public key certificate as a result of the verification of the signature, takes out a public key of the content provider 2 included in the public key certificate, and the processing proceeds to step S703.

In step S703, the upper controller 261 reads out key data of the contents included in the content provider secure container in the mass storage section 266, and transmits the read out key data to the encryption processing section 301 in the electronic distribution only recording medium 251. Thus, in the encryption processing section 301 in the electronic distribution only recording medium 251, the upper controller 261 verifies a signature of the key data in the signature verification unit 324 in the encryption/decryption module 315, and if it is confirmed that no tamper is made to the key data as a result of the verification of the signature, the processing proceeds to step S704.

In step S704, the upper controller 261 read out a handling policy of the contents included in the content provider secure container in the mass storage section 266, and transmits the read out handling policy to the encryption processing section 301 in the electronic distribution only recording medium 251. Thus, in the encryption processing section 301 in the electronic distribution only recording medium 251, the control section 310 verifies a signature of the handling policy in the signature verification unit 324 in the encryption/decryption module 315, and if it is confirmed that no tamper is made to the handling policy as a result of the verification of the signature, the processing proceeds to step S705.

In step S705, the upper controller 261 reads out a public key certificate of the service provider 3 included in the service provider secure container in the mass storage section 266, and forwards the read out public key certificate of the service provider 3 to the encryption processing section 301 in the electronic distribution only recording medium 251. Thus, in the encryption processing section 301 in the electronic distribution only recording medium 251, the control section 310 verifies a signature of the public key certificate of the service provider 3 in the signature verification unit 324 in the encryption/decryption module 315, and if it is confirmed that no tamper is made to the key data as a result of the verification of the signature, the processing proceeds to step S706.

In step S706, the upper controller 261 reads out price information of the contents included in the service provider secure container in the mass storage section 266, and transmits the read out price information to the encryption processing section 301 in the electronic distribution only recording medium 251. Thus, in the encryption processing section 301 in the electronic distribution only recording medium 251, the control section 310 verifies a signature of the price information in the signature verification unit 324 in the encryption/decryption module 315, and if it is confirmed that no tamper is made to the handling policy as a result of the verification of the signature, the processing proceeds to step S707.

In step S707, the upper controller 261 displays information of purchasable contents in the displaying means 265, and when a user selects and designates desired contents via the inputting means 264, generates a purchase command corresponding to the selected and designated contents, and sends it to the encryption processing section 301 in the electronic distribution only recording medium 251. Thus, the control section 310 of the encryption processing section 301 generates charge information and license conditions information based on the handling policy (the handling policy whose signature was verified in step S704) and the price information (the price information whose signature was verified in step S706) in the purchase processing module 313, and the processing proceeds to step S708. Incidentally, selection and designation of desired contents by a user via the inputting means 264 may be performed in advance prior to the purchase processing.

In step S708, the control section 310 in the encryption processing section in the electronic distribution only recording medium 251 saves the charge information (the charge information generated in step S707) in the storage module 311, and in the subsequent step S709, forwards the license conditions information (the license conditions information generated in step S707) to the external memory 303 via the external memory control section 302, thereby writing the license conditions information in the external memory 303. In addition, the license conditions information may be written in a tamper prevention region (as in the external memory of FIG. 16) in the same manner as writing the data described above in FIG. 69. Incidentally, the license conditions information may be saved in the storage module 311 of the encryption processing section 301 in the electronic distribution only recording medium 251.

In step S710, the control section 310 of the encryption processing section 301 in the electronic distribution only recording medium 251 decrypts the encrypted individual key $K_i$ included in the key data (the key data whose signature ware verified in the above-mentioned step S703) using the delivery key $K_d$ (the delivery key $K_d$ that was confirmed effective in the above-mentioned step S700) in the decryption unit 320 of the encryption/decryption module 315.

Then, in the decryption unit 320, the control section 310 decrypts the encrypted content key $K_{co}$ included in the key data using the individual key $K_i$ that was previously decrypted. Subsequently, the control section 310 gives the decrypted content key $K_{co}$ and the save key $K_{save}$ stored in the storage module 311 to the encryption unit 321, and encrypts the content key $K_{co}$ using the save key $K_{save}$ in the encryption unit 321.

In step S711, the control section 310 of the encryption processing section 301 in the electronic distribution only recording medium 251 forwards the content key $K_{co}$ encrypted by the save key $K_{save}$ in step S710 to the external memory 303 via the external memory control section 302, and saves the encrypted content key $K_{co}$ in the external memory 303, and the processing proceeds to step S712. In addition, the content key $K_{co}$ encrypted by the save key $K_{save}$ may be written in a tamper prevention region (as in the external memory of FIG. 16) in the similar manner as at the time of writing data described above in FIG. 69). Incidentally, the content key $K_{co}$ encrypted by the save key $K_{save}$ may be saved in the storage module 311 of the encryption processing section 301 in the electronic distribution only recording medium 251.

In step S712, the upper controller 261 in the record reproduction apparatus 250 reads out the encrypted contents included in the content provider secure container in the mass storage section 266, and forwards the read out encrypted contents to the electronic distribution only recording medium 251, thereby storing the encrypted contents in the external memory 303 in the electronic distribution only recording medium 251.

Incidentally, in the step S712, the upper controller 261 may save the handling policy whose signature was verified in corresponding step S704 and the price information whose signature was verified in step S706 in the external memory 303 together with the encrypted contents. In addition, the encrypted contents (or, the contents and the handling policy as well as the price information) may not be saved in the external memory 303 in the step S712, and may be saved in the external memory 303 in a step prior to the step S712.

In such purchase processing, if an effective period of the delivery key $K_d$ is expired in step S700, if the total of charges of the charge information has reached the upper limit in step S701, if it is decided in step S702 that the public key certificate of the content provider 2 is not correct, if it is decided in step S703 that the signature of the key data is not correct, if it is decided in step S704 that the signature of the handling policy is not correct, if it is decided in step S705 that the public key certificate of the service provider 3 is not correct, and if it is decided in step S706 that the signature of the price information is not correct, the processing proceeds to step S713 in each case, where error processing is executed. Incidentally, in such purchase processing, although a case in which a signature of contents is not verified is shown, the signature of the contents may be verified in any of the steps prior to saving the contents in the external memory 303.

Incidentally, if data is transmitted and received between the record reproduction apparatus 250 and the electronic distribution only recording medium 251, a signature is attached to the data on the transmission side, and the signature is verified on the receiving side.

As described above, the record reproduction apparatus 250 executes the purchase processing in the electronic distribution only recording medium 251, thereby recording the contents encrypted by the content key $K_{co}$ in the external memory 303 of the electronic distribution only recording medium 251 and the content key $K_{co}$ encrypted by the save key $K_{save}$ peculiar to the encryption processing section 301 of the electronic distribution only recording medium 251.

Figure 94:
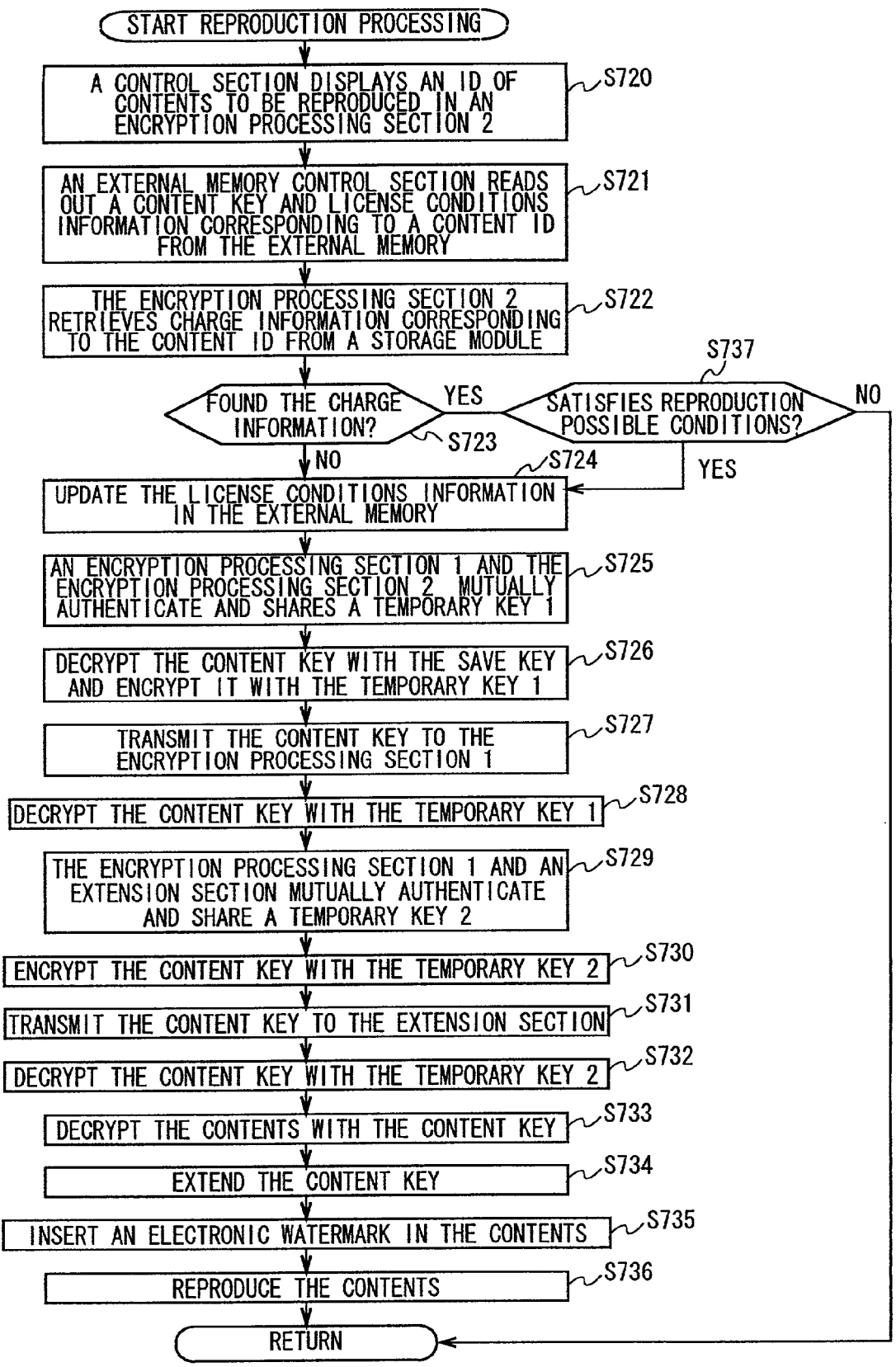
FIG. 94 is a flowchart showing a reproducing procedure of a recording and reproducing apparatus.

In addition, reproduction processing executed in the record reproduction apparatus 250 will be described with reference to a flow chart shown in FIG. 94. In step S720, the upper controller 261 in the record reproduction apparatus 250 forwards an ID of the contents that is instructed by a user via the inputting means 264 to be reproduced to the encryption processing section 301 in the electronic distribution only recording medium 251.

In step S721, by forwarding an ID of the contents given from the upper controller 261 to the external memory control section 302, the control section 310 of the encryption processing section 301 in the electronic distribution only recording medium 251 reads out the encrypted content key $K_{co}$ and license conditions information corresponding to the ID from the external memory 303 via the external memory control section 302, and forwards the read out encrypted content key $K_{co}$ to the decryption unit 320 of the encryption/decryption module 315, and at the same time, forwards the license information to the control section 310. Further, the external memory control section 302 may perform tamper check in the similar manner as at the time of reading out data described above for FIG. 68 when reading out the encrypted content key $K_{co}$ and license conditions information from the external memory 303. Incidentally, in the electronic distribution only recording medium 251, the encrypted content key $K_{co}$ and the license conditions information may be held in the storage module 311 of the encryption processing section 301 and may be read out from the storage module 311.

In addition to this, the control section 310 of the encryption processing section 301 retrieves charge information in the storage module 311 based on an ID of the contents in step S722, and in the subsequent step S723, determines whether or not there is charge information corresponding to the ID of the contents in the storage module 311, and if the charge information corresponding to the ID has already been collected by the electronic distribution service center 1 and does not exist in the storage module 311, the processing proceeds to step S724.

In step S724, the control section 310 of the encryption processing section 301 updates the license conditions information, if necessary. That is, if utilization right contents included in the license conditions information is, for example, a number of times right, the control section 310 indicates to subtract the number of times of reproduction indicated by the number of times right. Then, the encryption processing section 301 saves the updated license conditions information in the external memory 303 via the external memory control section 302. At this point, the external memory control section 302 may perform tamper check as at the time of rewriting data described above for FIG. 70. Incidentally, the license conditions information may be updated and saves in the storage module 311 of the encryption processing section 301.

Subsequently, in step S725, the control section 310 of the encryption processing section 301 in the electronic distribution only recording medium 251 performs mutual authentication with the encryption processing section 262 of the record reproduction apparatus 250 using each other's mutual authentication modules 314 and 274, and shares the temporary key $K_{temp1}$, and the processing proceeds to step S726. Incidentally, since the mutual authentication processing procedures were described above for FIG. 51, their detailed description are omitted.

In step S726, the control section 310 of the encryption processing section 301 in the electronic distribution only recording medium 251 decrypts the encrypted content key $K_{co}$ by the save key $K_{save}$ stored in the storage module 311 in the decryption unit 320, and forwards the decrypted content key $K_{co}$ to the encryption unit 321. Then, the control section 310 encrypts the content key $K_{co}$ in the encryption unit 321 using the temporary key $K_{temp1}$ shared with the mutual authentication module 274 in step S625, and the processing proceeds to step S727.

In step S727, the control section 310 of the encryption processing section 301 in the electronic distribution only recording media 251 transmits the content key $K_{co}$ encrypted by the temporary key $K_{temp1}$ to the encryption processing section 262 of the record reproduction apparatus 250.

In step S728, the control section 270 of the encryption processing section 262 in the record reproduction apparatus 250 takes the encrypted content key $K_{co}$ transmitted from the electronic distribution only recording medium 251 in the decryption processing unit 280 of the encryption/decryption module 275, in step S725, decrypts the encrypted content key $K_{co}$ using the temporary key $K_{temp1}$ shared with the mutual authentication module 314 in the decryption unit 280, and forwards the decrypted content key $K_{co}$ to the encryption unit 281.

Then, in step S729, the control section 270 of the encryption processing section 262 in the record reproduction apparatus 250 performs mutual authentication with the extension section 263 using each other's mutual authentication modules 274 and 290, and shares the temporary key $K_{temp2}$. Incidentally, since the mutual authentication processing procedures was described above for FIG. 51, their detailed description is omitted.

Thus, in step S730, the control section 270 of the encryption processing section 262 in the record reproduction apparatus 250 encrypts the content key $K_{co}$ using the temporary key $K_{temp2}$ shared with the extension section 263 by the encryption unit 281, thereby forwarding the encrypted content key $K_{co}$ to the extension section 263 in the subsequent step S731.

In step S732, the key decryption module 291 of the extension section 263 takes in the encrypted content key $K_{co}$ given by the encryption processing section 262, decrypts the encrypted content key $K_{co}$ using the temporary key $K_{temp2}$ shared with the encryption processing section 262, and forwards the decrypted content key $K_{co}$ to the decryption module 292.

In step S733, the decryption module 292 of the extension section 263 is at this point given the encrypted contents read out from the external memory 303 in the electronic distribution only recording medium 251 by the upper controller 261, decrypts the encrypted contents using the content key $K_{co}$ given by the key decryption module 291, and forwards the decrypted contents to the extension module 293.

In step S734, the extension module 293 of the extension section 263 extends the contents given by the decryption module 292 by a predetermined method such as ATRAC, and forwards the extended contents to the electronic watermark addition module 294. In step S735, the electronic watermark module 294 of the extension section 263 inserts predetermined data such as an ID of the encryption processing section 301 of the electronic distribution only recording medium 251 instructed by the control section 270 of the encryption processing section 262 in the form of an electronic watermark in the extended contents given by the extension module 293.

Then, in step S736, by forwarding the contents obtained in the extension section 263 to, for example, a speaker (not shown), the upper controller 261 of the record reproduction apparatus 250 generates music based on the contents via the speaker. Thus, the record reproduction apparatus 250 can reproduce contents in this way.

Here, if charge information corresponding to the ID of the contents is stored in the storage module 311 in step S723, the control section 310 of the encryption processing section 301 in the electronic distribution only recording medium 251 refers to the reproduction limitation at the time when charge information is uncollected in step S737, and determines whether or not the contents whose charge information is uncollected satisfy reproduction available conditions.

Then, if the contents do not satisfy the reproduction available conditions (i.e., if the contents have already been reproduced for the number of times defined in the reproduction limitation, or if a reproduction available period has lapsed), the control section 310 of the encryption processing section 301 terminates this reproduction processing. On the other hand, if the contents satisfy the reproduction available conditions (i.e., if the number of times of reproduction of the contents is less than the number of times defined by the reproduction limitation), the processing proceeds to step S724, where the control section 310 updates the license conditions information, if necessary. Incidentally, the reproduction limitation to be used when chare information is uncollected may be held in the storage module 311 of the encryption processing section 301 in the electronic distribution only recording medium 251 or the external memory 303, or may be stored in data of a handling policy or price information, or the like.

Incidentally, the electronic distribution only recording medium 251 may be provided in the home server 51 described above for FIG. 15 or the fixed apparatus 52.

As described above, although, in the record reproduction apparatus 250, the contents encrypted by the content key $K_{co}$ and the content key $K_{co}$ can be generated from the electronic distribution only recording medium 251 and the contents encrypted by the content key $K_{co}$ can be decrypted by the content key $K_{co}$, until charge information is collected, the content can be utilized in accordance with the reproduction limitation set in advance, and after the charge information is collected, the content can be utilized in accordance with utilization right contents purchased by the purchase processing.

In the above-mentioned configuration, the electronic music distribution system 10 is provided with the record reproduction apparatus 250 to which the electronic distribution only recording medium 251 is detachably inserted as an apparatus in the user home network 5, and when the contents encrypted by the content key $K_{co}$, the content key $K_{co}$ encrypted by the individual key $K_i$ and the individual key $K_i$ encrypted by the delivery key $K_d$ (i.e., a content provider secure container and a service provider secure container) are transmitted from the service provider 3, controls the electronic distribution only recording medium 251 by the record reproduction apparatus 250 to execute purchase processing, records the contents encrypted by the content key $K_{co}$ in the electronic distribution only recording medium 251 in the external memory 303, and at the same time, decrypts the individual key $K_i$ encrypted by the delivery key $K_d$ by the delivery key $K_d$, decrypts the content key $K_{co}$ encrypted by the individual key $K_i$ by the individual key $K_i$, and encrypts the decrypted content key $K_{co}$ by the save key $K_{save}$ peculiar to the electronic distribution only recording medium 251 to record in the external memory 303. Incidentally, in the electronic distribution only recording medium 251, the save key $K_{save}$ is saved in the storage module 311 of the encryption processing section 301 having tamper resistant feature in the electronic distribution only recording medium 251.

In addition, by controlling the electronic distribution only recording medium 251 at the time of reproduction processing, the record reproduction apparatus 250 reads out the contents encrypted by the contents key $K_{co}$ and the content key $K_{co}$ encrypted by the save key $K_{save}$ from external memory 303, decrypts the content key $K_{co}$ encrypted by the save key $K_{save}$ by the save key $K_{save}$, thereby taking out the contents encrypted by the content key $K_{co}$ and the decrypted content key $K_{co}$ in the electronic distribution only recording medium 251. Then, the record reproduction apparatus 250 decrypts the contents encrypted by the content key $K_{co}$ using the content key $K_{co}$ using the encryption processing section 262 and the extension section 263.

Therefore, in the electronic music distribution system 10, although the contents encrypted by the content key $K_{co}$ and the content key $K_{co}$ encrypted by the save key $K_{save}$ are recorded in the external memory 303 by the record reproduction apparatus 250 in the electronic distribution only recording medium 251, since the contents encrypted by the content key $K_{co}$ and the decrypted content key $K_{co}$ are read out from the electronic distribution only recording medium 251, it is not necessary to save a save key peculiar to the encryption processing section 262 in the record reproduction apparatus 250. Thus, in the electronic music distribution system 10, since other apparatuses different from the record reproduction apparatus 250 in which the electronic distribution only recording medium 251 records contents can reproduce the contents using the electronic distribution only recording medium 251 if the apparatuses have the encryption processing section 262 and the extension section 263 similar to those of the record reproduction apparatus 250, generality of the electronic distribution only recording medium 251 can be dramatically improved.

In addition, in the electronic distribution only recording medium 251, even if contents or a content key $K_{co}$ is illegally read out from the external memory 303, by holding the save key $K_{save}$ used in encrypting the content key $K_{co}$ for decrypting contents in the storage module 311 in the encryption processing section 301 having tamper resistant feature, the save key $K_{save}$ can be prevented from being illegally read out, thereby enabling to prevent the contents from being illegally utilized.

Moreover, in the electronic music distribution system 10, due to the increased generality of the electronic distribution only recording medium 251, until charge information for contents recorded in the electronic distribution only recording medium 251, by limiting utilization of the contents (limiting a number of times and a period of reproduction and copying), illegal utilization of the contents can be prevented while the charge information is uncollected.

According to the above-mentioned configuration, a save key $K_{save}$ peculiar to the electronic distribution only recording medium 251 detachably inserted in the record reproduction apparatus 250 is held in the electronic distribution only recording medium 251, the record reproduction apparatus 250 transmits the contents encrypted by the content key $K_{co}$, the content key $K_{co}$ encrypted by the individual key $K_i$, and the individual key $K_i$ encrypted by the delivery key $K_d$ to the electronic distribution only recording medium 251 at the time of purchase processing, and in the electronic distribution only recording medium 251, after recording the contents encrypted by the content key $K_{co}$ in the external memory 303 and decrypting the encrypted individual key $K_i$ by the delivery key $K_d$, decrypts the encrypted content key $K_{co}$ by the individual key $K_i$, encrypts the obtained content key $K_{co}$ by the save key $K_{save}$ to record in the external memory 303, and takes out the contents encrypted by the content key $K_{co}$ and the content key $K_{co}$ decrypted by the save key $K_{save}$ from the electronic distribution only recording medium 251 at the time of reproduction processing to decrypt the contents, thereby enabling reproduction of the contents from the electronic distribution only recording medium 251 even if the electronic distribution only recording medium 251 is inserted in another record reproduction apparatus 250 different from the record reproduction apparatus 250 used for recording the contents, thus an electronic music distribution system that can dramatically increase generality of the electronic distribution only recording medium 251 can be realized.

Incidentally, in such an electronic music distribution system 10, the delivery key $K_d$ is not held in the electronic distribution only recording medium 251, or the delivery key $K_d$ is not used even if it is held, and after decrypting the content key $K_{co}$ encrypted by the individual key $K_i$ by the individual key $K_i$ at the time of recording contents by the record reproduction apparatus 250, the content key $K_{co}$ may be encrypted using the temporary key $K_{temp}$ mutually authentication and shared with the electronic distribution only recording medium 251, and the content key $K_{co}$ encrypted by the temporary key $K_{temp}$ may be transmitted to the electronic distribution only recording medium 251 together with the contents encrypted by the content key $K_{co}$.

In addition, although the content provider 2 is applied as an information transmission apparatus in the present invention, the content provider 2 and the service provider 3 may be applied as the information transmission apparatus.

(8) Proxy Processing of Charge Information and Managed Transfer Processing of a Utilization Right The electronic distribution only recording medium 251 described above for FIG. 92, for example, when inserted in the home server 51 that is a management apparatus in the user home network 5 that is the data management system described above for FIG. 15 as an apparatus to be connected to the electronic distribution service center 1, can transmit charge information held in the storage module 311 of the encryption processing section 301 to the home server 5, thus can cause the electronic distribution service center 1 to collect the charge information from the home server 51.

Thus, in the electronic distribution only recording medium 251, although, when holding charge information, for preventing illegal utilization of contents, a utilization right of the contents (a right for reproducing the contents) cannot be transferred to another apparatus (transfer with limitation, managed transfer) together with the contents, or deleted (deletion cannot be executed unless the charge processing is completed), when transmitting the charge information to the home server 51 in this way, the utilization right of the contents can be transferred to another apparatus (transfer with limitation, managed transfer) together with the contents corresponding to the charge information in accordance with the transfer processing procedures of the managed transfer right described above for FIG. 82.

Incidentally, when a utilization right of contents is transferred to another apparatus together with the contents from the electronic distribution only recording medium 251, an apparatus having obtained the contents and their utilization right can return the contents and their utilization right only to the electronic distribution only recording medium 251, if necessary. However, since the electronic distribution only recording medium 251 can be carried freely, it is sometimes difficult to easily return the contents and their utilization right from another apparatus.

Therefore, for example, the home server 51 (FIG. 15) as an apparatus in the user home network 5 connected to the electronic distribution service center 1, when taking in charge information held in the electronic distribution only recording medium 251, takes in corresponding contents and their utilization right altogether from the electronic distribution only recording medium 251, and manages the taken in contents and their utilization right on behalf of the electronic distribution only recording medium 251.

Figure 95:
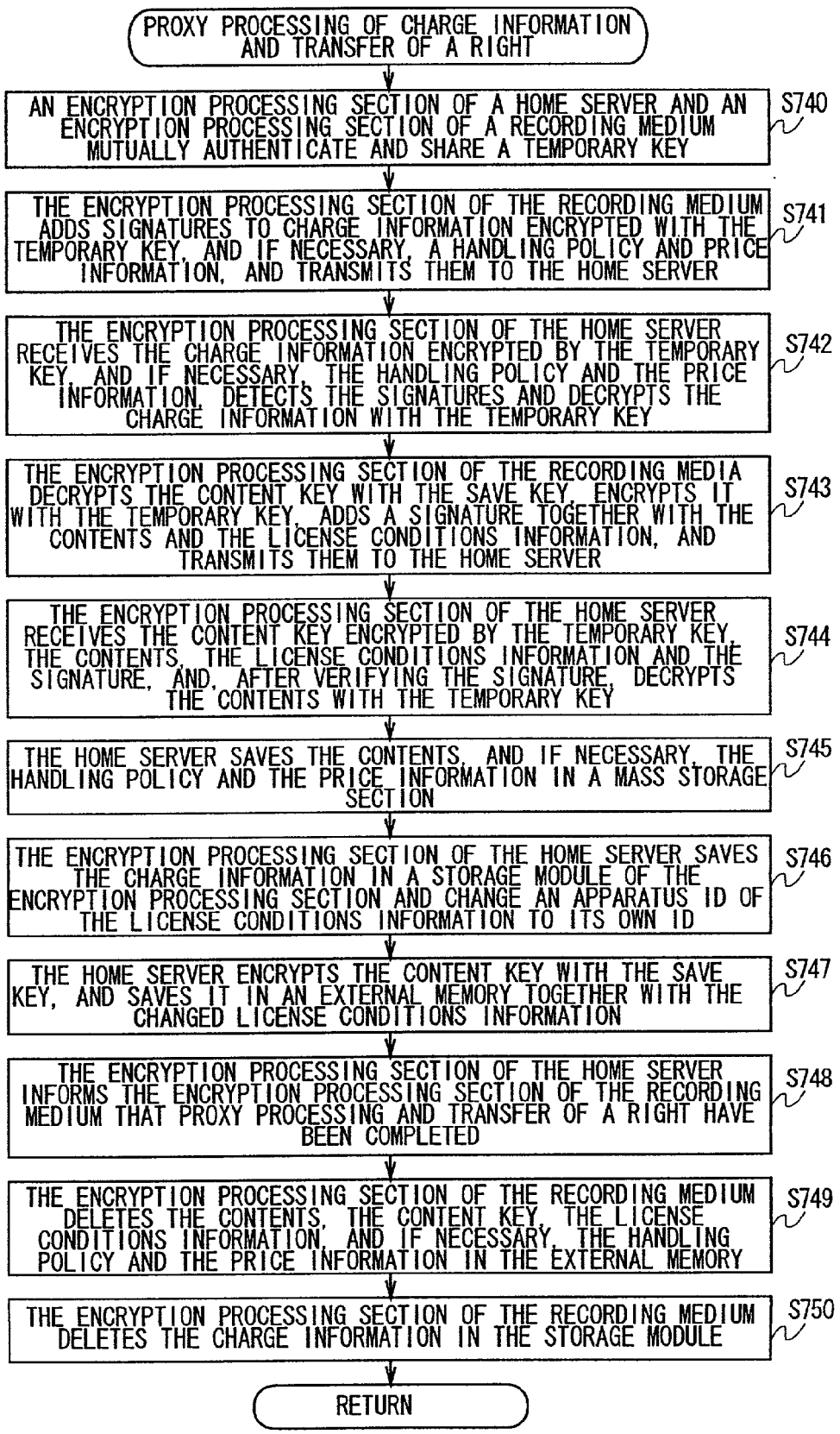
FIG. 95 is a flowchart showing a proxy procedure of accounting information and a movement procedure of rights.

Actually, proxy processing of charge information executed in the home server 51 and transfer (transfer with limitation, managed transfer) of a right (utilization right) for reproducing contents will be described with reference to a flow chart shown in FIG. 95. In step S740, the electronic distribution only recording medium 251 is inserted in the home server 51, and when a user inputs an execution instruction of proxy processing of charge information and transfer processing of a utilization right via the inputting means 63 in this state, with the upper controller 62 controlling the home server 51 and the electronic distribution only recording medium 251, the control section 91 of the encryption processing section 65 in the home server 51 mutually authenticates with the encryption processing section 301 in the electronic distribution only recording medium 251 using each other's mutual authentication modules 95 and 314 and shares the temporary key $K_{temp}$.

Then, in step S741, the control section 310 of the encryption processing section 301 in the electronic distribution only recording medium 251 forward the charge information held in the storage module 311 to the encryption unit 321 in the encryption/decryption module 315, encrypts the charge information by the temporary key $K_{temp}$ in the encryption unit 321, and forwards the encrypted charge information to the signature generation unit 323.

In addition, the control section 310 of the encryption processing 301 reads out in ID of a content provider, an ID of a handling policy and a handling policy corresponding to a version of the handling policy included in the charge information, and an ID of a service provider, an ID of price information and price information corresponding to a version of the price information from the external memory 303 via the external memory control section 302, and forwards the read out handling policy and price information to the signature generation unit 323. Thus, the control section 310 of the encryption processing section 301 attach signatures to the charge information and the handling policy encrypted by the temporary $K_{temp}$ as well as the entire price information (or individually) in the signature generation unit 323, and transmits the charge information and the handling policy as well as the price information to which the signatures are attached to the upper controller 62 of the home server 51 via the communication section 300.

Incidentally, in the electronic distribution only recording medium 251, since a third party illegal obtains profit if charge information is tampered during transmission, a signature is always attached to the charge information and whether or not tamper is made is checked. In addition, since there is no specific hindrance even if contents of the charge information are seen, the charge information may be sent without encryption. In the home server 51, proxy processing of charge information and transfer processing of a utilization right can be executed without using a handling policy and price information. Therefore, in the electronic distribution only recording medium 251, the handling policy and the price information may be transmitted to the home server 51, if necessary.

In step S742, the upper controller 62 of the home server 51 forwards the charge information and the handling policy as well as the price information transmitted from the electronic distribution only recording medium 251 to the control section 91 of the encryption processing section 65. Thus, the control section 91 verifies the signatures attached to the charge information and the handling policy as well as the price information in the signature verification unit 115 in the encryption/decryption module 96, and if these are not tampered, decrypts the charge information encrypted by the temporary key $K_{temp}$ by the temporary key $K_{temp}$.

Then, in step S743, the control section 310 of the encryption processing section 301 in the electronic distribution only recording medium 251 retrieves an ID of contents indicated by the charge information (the charge information transmitted to the home server 51 in step S741, which remains as it is unless deleted in the storage module 311) held in the storage module 311 at this point in step S742, and reads out all corresponding license conditions information and contents encrypted by the content key $K_{co}$ from the external memory 303 via the external memory control section 302 based on the retrieved ID of the contents.

By forwarding the read out content key $K_{co}$ to the decryption unit 320 of the encryption/decryption module 315, the control section 310 of the encryption processing section 301 decrypts the content key $K_{co}$ encrypted by the wave key $K_{save}$ by the save key $K_{save}$ held in the storage module 311 in the decryption unit 320, and then encrypts the decrypted content key $K_{co}$ by the temporary key $K_{temp}$ in the encryption unit 321. Then, after attaching signatures to the content key $K_{co}$ together with the license conditions information and the encrypted contents read out from the external memory 303 in the signature generation unit 323, the control section 310 transmits them to the homes server 51 via the communication section 300. Incidentally, signatures may be attached to the license conditions information, the contents and the content key $K_{co}$ individually, or may be attached to the entirety of the license conditions information, the contents and the content key $K_{co}$. Moreover, a signature may be attached to contents.

Subsequently, in step S744, the control section 91 of the encryption processing section 65 in the home server 51 takes in the license conditions information and the encrypted contents transmitted form the electronic distribution only recording medium 251 as well as the content key $K_{co}$ encrypted by the temporary key $K_{temp}$ via the upper controller 62, and after verifying the signatures attached to the license conditions information and the encrypted contents as well as the content key $K_{co}$ encrypted by the temporary key $K_{temp}$ in the signature verification unit 115, if these are not tampered, decrypts the content key $K_{co}$ encrypted by the temporary key $K_{temp}$ by the temporary key $K_{temp}$.

Thus, in step S745, the upper controller 62 in the home server 51 saves in the mass storage section 68 the contents encrypted by the content key $K_{co}$ obtained from the encryption processing section 65 (the contents whose signature was verified in step S744) and the handling policy and the price information obtained if necessary (the handling policy and the price information whose signatures were verified in step S742). Incidentally, in step S745, recording processing in the mass storage section 68 to be executed may be executed immediately after data is transmitted in steps S741 and S743.

In addition, in step S746, the control section 91 of the encryption processing section 65 in the home server 51 saves the charge information (the charge information whose signature was verified in step S742) in the storage module 92, and at the same time, changes the ID of the encryption section (the ID of the encryption section of the apparatus that applied purchase processing to the contents) stored in the license conditions information (the license conditions information whose signature was verified in step S744) to its own ID (i.e., the ID of the encryption processing section 65 in the home server 51) to update the license conditions information.

Then, in step S747, the control section 91 of the encryption processing section 65 in the home server 51 encrypts the content key $K_{co}$ (the content key $K_{co}$ decrypted in step S744) by the save key $K_{save}$ held in the storage module 92 in the encryption unit 112 in the encryption/decryption module 96, and saves the license conditions information (the license conditions information updated in step S746) in the external memory 67 together with the encrypted content key $K_{co}$ via the external memory control section 97. Incidentally, since the tamper check upon writing data in the external memory 67 is executed in the similar manner as in the processing procedures described above for FIG. 69, its description is omitted.

Then, in step S748, the control section 91 of the encryption processing section 65 in the home server 51 saves the chare information, the encrypted contents, the content key $K_{co}$, the license conditions information, the handling policy and the price information transmitted form the electronic distribution only recording medium 251 respectively in this way, and transmits processing completion data indicating that the proxy processing of the charge information and the transfer of the utilization right have been completed to the electronic distribution only recording medium 251 via the upper controller 62.

Thus, in step S749, when receiving the processing completion data transmitted from the home server 51, the control section 310 of the encryption processing section 301 in the electronic distribution only recording medium 251 deletes the contents encrypted by the content key $K_{co}$, the content key $K_{co}$ encrypted by the save key $K_{save}$, the license conditions information (i.e., the license conditions information transmitted to the home server 51 in step S743), and the handling policy and the price information (i.e., those transmitted to the home server 51 in step S742), if necessary, in the external memory 303 respectively via the external memory control section 302. Incidentally, since the tamper check at the time of deleting data in the external memory 303 is executed in the similar manner as in the processing procedures described above for FIG. 71, its description is omitted.

In addition to this, in step S750, the control section 310 of the encryption processing section 301 in the electronic distribution only recording medium 251 deletes the charge information (i.e., the charge information transmitted to the home server 51 in step S741) in the storage module 311, thereby completing the processing procedures.

As described above, in the electronic distribution only recording medium 251, by transmitting the charge information held in the storage module 311 in the encryption processing section 301 to the home server 51 together with the corresponding contents and the content key $K_{co}$, as well as the license conditions information to the home server 51, and at this point, deleting the charge information, the contents, the content key $K_{co}$ and the license conditions information transmitted to the home server 51 from the inside storage module 311 and the external memory 303, the contents are managed by the home server 51.

Then, in the home server 51, when the contents were taken in from the electronic distribution only recording medium 251, since the ID of the encryption processing section of the license conditions information taken in together with the contents was changed and the home server 51 itself was made an owner of the contents, the contents can be transferred to another apparatus in accordance with the transfer processing procedures of the managed transfer right described above for FIG. 82, and the contents returned from each apparatus can be taken in accordance with the return processing procedures of the managed transfer right described above for FIG. 83.

In the above-mentioned configuration, the electronic music distribution system 10 caused the electronic distribution only recording medium 251 to execute purchase processing using the record reproduction apparatus 250 that is a recording apparatus, and causes the electronic distribution only recording medium 251 to hold a right for reproducing contents, license conditions information and charge information together with the contents. Then, in order to cause the electronic distribution service center 1 to collect the charge information held by the electronic distribution only recording medium 251, when the electronic distribution only recording medium 251 is inserted in the home server 51 in the user home network 5, the home server 51 takes in the charge information held in the electronic distribution only recording medium 251 together with the corresponding contents, utilization right and license conditions information to manage the contents in stead of the electronic distribution only recording medium 251.

Therefore, in the electronic music distribution system 10, contents of which the home server 51 takes up management from the electronic distribution only recording medium 251 in the user home network 5 and its utilization right can be managed and transferred to another apparatus, recording medium or electronic distribution recording medium 251, and the same time, these apparatuses, recording medium and electronic distribution only recording medium 251 can return the contents to the home server 51, thus the contents obtained by purchase processing in the electronic distribution only recording medium 251 can be easily utilized for another apparatus, recording medium and the electronic distribution only recording medium 251 in the user home network 5 under the management of the home server 51.

In addition, in the electronic distribution only recording medium 251, since limitation is attached to a purchased utilization right if charge information is held, the charge information needs to be collected by the home server 51 connected to the electronic distribution service center 1. Then, in the electronic distribution only recording medium 251, if management of the corresponding contents is transferred to the home server 51, free regions is easily secured in the external memory 302, thus unnecessary deletion of already held contents can be prevented in the purchase processing of contents.

Moreover, in the user home network 5, since the contents that is applied purchase processing and obtained in the electronic distribution only recording medium 251 is stored and managed in this way by the home server 51, contents more than the volume that can be held in the electronic distribution only recording medium 251 (i.e., depending on a storage volume of the external memory 303) can be easily owned.

According to the above-mentioned configuration, by moving the contents that is applied purchase processing and held in the electronic distribution only recording medium 251 using the record reproduction apparatus to the home server 51 in the user home network 5 together with their charge information, and managing and concurrently storing the contents in the home server 51, the contents whose management is taken up from the electronic distribution only recording medium 251 can be managed and transferred to another apparatus, recording medium or electronic distribution only recording medium 251 in the user home network 5, thus an electronic music distribution system in which the contents recorded in the electronic distribution only recording medium 251 can be easily utilized by various kinds of apparatuses such as another apparatus and recording medium in the user home network 5 can be realized.

(9) Online Charge Purchase Processing

In such an electronic music distribution system 10, a system can be constructed by connecting online the electronic distribution service center 1 that is an information control apparatus and the service provider 3 that is an information transmission apparatus via a network, and at the same time, connecting online the service provider 3 and the home network 5 (actually, the home server 51 that is an information receiving apparatus).

Figure 96:
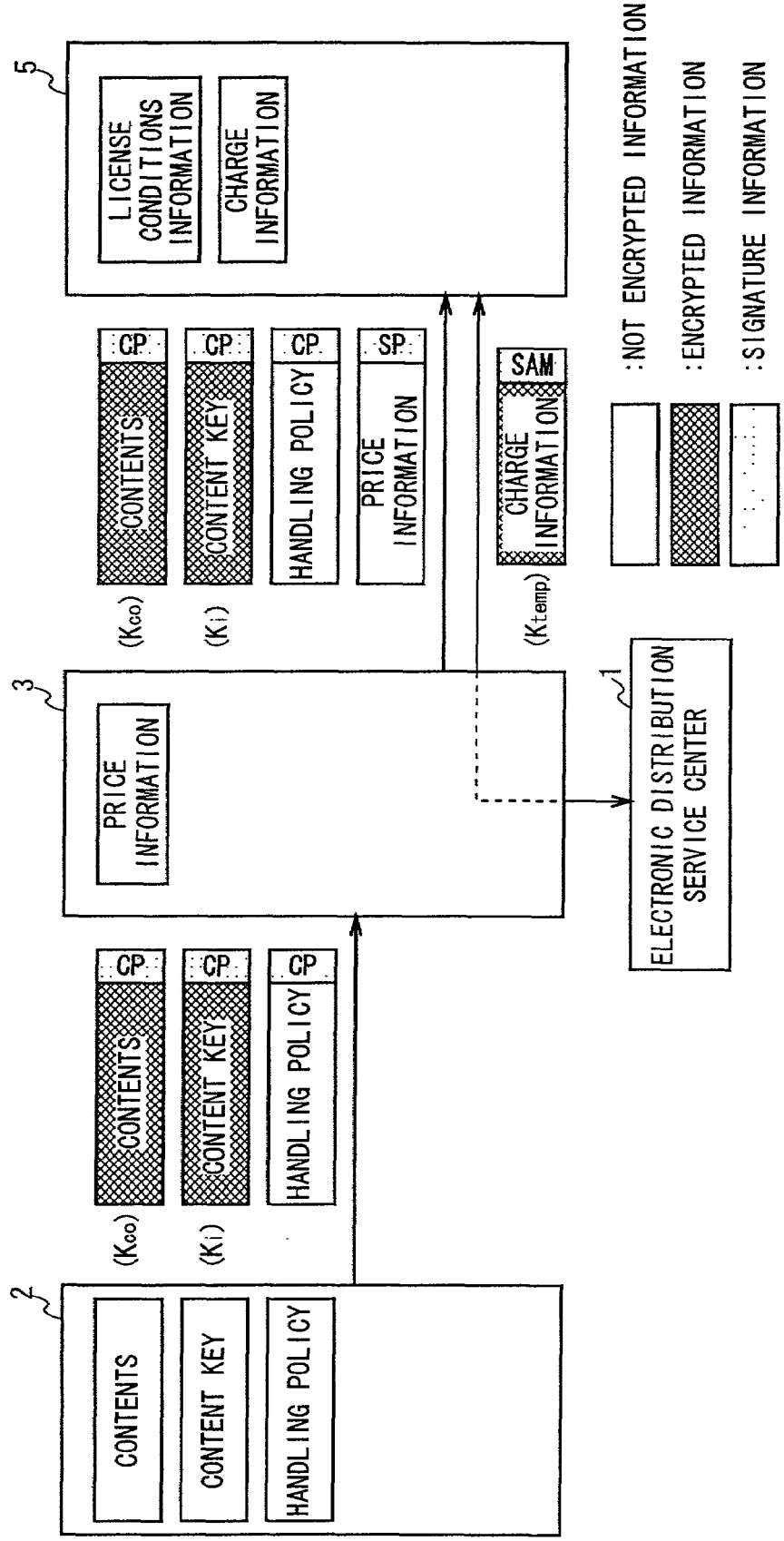
FIG. 96 is a block diagram showing data flow of an entire electronic music distribution system.

A flow of data through the entire electronic music distribution system 10, when constructed, is shown in FIG. 96. Since the transmission of data from the content provider 2 to the service provider 3, and the transmission of data from the service provider 3 to the user home network 5 are similar to the data flow described above for FIG. 20, their detailed descriptions are omitted.

The user home network 5 (the home server 51) encrypts charge information, attaches a signature to the encrypted charge information, and transmits it to the electronic distribution service center 1 via the service provider 3. Incidentally, although information required in the electronic distribution service center 1 such as information required for settlement is included in the handling policy and the price information used for purchase processing, since such various kinds of information is also included in the charge information, the user home network 5 (the home server 51) is made not to transmit handling policy and price information to the electronic distribution service center 1 at the time of purchase processing.

In addition, update of a delivery key $K_d$ and registration information (not shown) is also performed between the electronic distribution service center 1 and the user home network 5 via the service provider 3. Thus, the user home network 5 does not need to switch a communication route to be used in communicating data with the service provider 3 and the electronic distribution service center 1 and can reduce processing of a communication section compared with the example of an establishment of a system described for FIG. 1.

Incidentally, in the case in which transmission and reception of data are performed between the user home network 5 (the home server 51) and the electronic distribution service center 1, the service provider 3 is used as a communication route between the user home network 5 (the home server 51) and the electronic distribution service center 1, and the data cannot be tampered.

Here, in the home server 51 in the user home network 5, in some case, charge information generated by purchase processing is saved in the storage module 92 in the encryption processing section 65 and the saved charge information (which may be plurality of pieces) are transmitted to the electronic distribution service center 1 altogether at a predetermined timing, and in other cases, the generated charge information is transmitted to the electronic distribution service center 1 while performing purchase processing. Incidentally, in some cases, in online charge purchase processing for transmitting the generated charge information to the electronic distribution service center 1 while performing purchase processing, whether or not to execute the online charge purchase processing is described in the handling policy or the price information.

Figure 97:
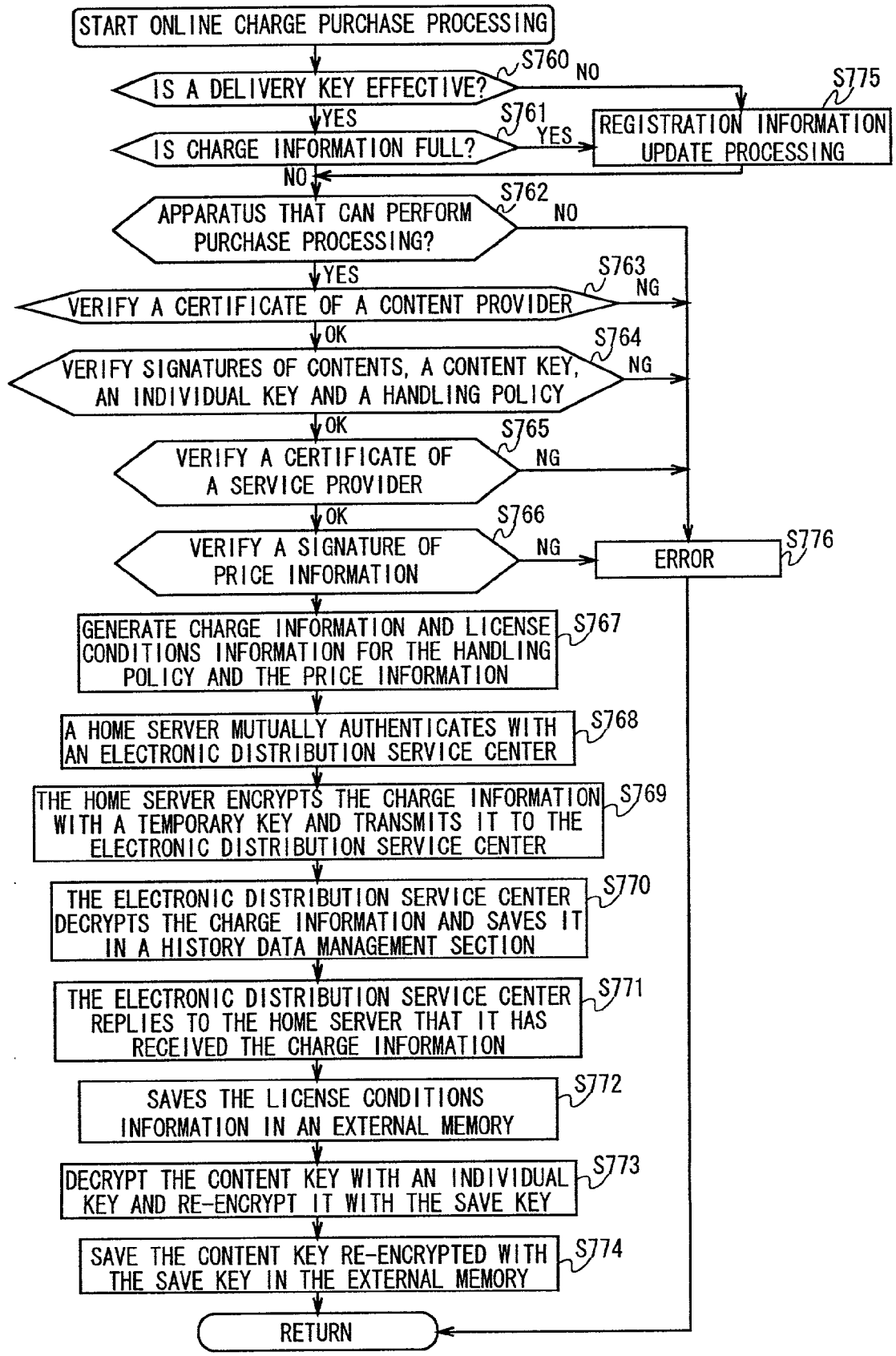
FIG. 97 is a flowchart showing an online accounting purchasing procedure.

The online charge purchase processing to be executed in the home server 51 will be described with reference to a flow chart shown in FIG. 97. In step S760, the control section 91 of the encryption processing section 65 in the home server 51 decides an effective period (version) of the delivery key $K_d$ stored in the storage module 92 under the control of the upper controller 62, and if the delivery key $K_d$ is effective, the processing proceeds to step S761.

In step S761, the control section 91 of the encryption processing section 65 determines whether or not a total of charges of the charge information stored in the storage module 92 has reached an upper limit set in advance, and if the total of the charges has not reached the upper limit, the processing proceeds to step S762. Incidentally, since the charge information is not saved in the storage module 92 if the charge information generated at this point is transmitted to the electronic distribution service center 1 while performing purchase processing, the control section 91 of the encryption processing section 65 does not execute the processing of step S761, and the processing proceeds to step S762.

Since steps S762 through S766 execute processing similar to steps S162 through S169 described above for FIG. 67, respectively, their detailed descriptions are omitted. In step S767, the upper controller 62 of the home server 51 displays information (e.g., a purchasable utilization form, price or the like) of purchasable contents using the displaying means 64, thus, a user can select a purchase item using the inputting means 63. Then, a signal inputted from the inputting means 63 is forwarded to the upper controller 62 of the home server 51, and the upper controller 62 generates a purchase command based on the signal and forwards the purchase command to the control section 91 of the encryption processing section 65. Incidentally, such input processing may be performed at the start of online charge purchase processing.

When the purchase command is given by the upper controller 62, the control section 91 of the encryption processing section 65 generates charge information and license conditions information based on the handling policy whose signature was verified in step S764 and the price information whose signature was verified in step S766. Incidentally, at this point, the control section 91 generates charge information and license conditions information using an RAM (Random Access Memory) for executing data processing provided in the encryption processing section 65, and holds the generated charge information and the license conditions information in the RAM as they are.

Then, in step S768, the control section 91 of the encryption processing section 65 in the home server 51 mutually authenticates with the mutual authentication section 17 of the electronic distribution service center 1 using the mutual authentication module 95, and shares the temporary key $K_{temp}$ with the electronic distribution service center 1.

Subsequently, in step S769, after encrypting the charge information by the temporary key $K_{temp}$ using the encryption unit 112 of the encryption/decryption module 96, the control section 91 of the encryption processing section 65 in the home server 51 attaches a signature using the signature generation unit 114, and transmits the charge information to the electronic distribution service center 1 via the service provider 3. Incidentally, the home server 51 encrypts the charge information by the temporary key $K_{temp}$ prior to the transmission to the electronic distribution service center 1. This is for the purpose of protecting privacy of a user purchasing the contents. In addition, the home server 51 sometimes transmits unencrypted charge information to the electronic distribution service center 1 with a signature attached.

In step S770, when receiving the charge information encrypted by the temporary key $K_{temp}$ transmitted from the home server 51, the electronic distribution service center 1 verifies a signature attached to the charge information, and if no tamper is made, decrypts the charge information encrypted by the temporary key $K_{temp}$ using the temporary key $K_{temp}$ shared with the home server 51, thereby storing the decrypted charge information in the history data management section 15.

Then, in step S771, upon saving the charge information in this way, the electronic distribution service center 1 generates receipt data indicating that the charge information is received, attaches a signature to the generated receipt data, and transmits the data to the home server 51 via the service provider 3. Thus, the control section 91 of the encryption processing section 65 in the home server 51 takes in the receipt data transmitted from the electronic distribution service center 1 sequentially via the communication section 61 and the upper controller 62, verifies a signature attached to the receipt data by the signature verification unit 115, and if the receipt data is not tampered, deletes the charge information held in the RAM, and the processing proceeds to step S772.

Since steps S772 through S774 sequentially executes processing similar to steps S172 through S174 described above for FIG. 67, their detailed description is omitted. Incidentally, steps S772 through S774 may be executed in any order. In addition, since registration information update processing executed in step S775 is similar to the registration information update processing described above for FIGS. 61 and 62, its detailed description is omitted. Moreover, since step S776 executes error processing in the similar manner as in step S176 described above for FIG. 67, its detailed description is omitted. Incidentally, in such online charge purchase processing, contents, a handling policy and price information encrypted by the content key $K_{co}$ are held in the external memory 67 via the external memory control section 97 in any of the steps after signatures attached to these are verified.

Further, in step S770, when determining that illegal data exists due to tampering of charge information, or the like as a result of verifying a signature of the charge information, the electronic distribution service center 1 does not save the charge information in a history data management section. Then, in step S771, the electronic distribution service center 1 generates receipt rejection data indicating that the charge information is not received because it is illegal data, and transmits the data to the homes server 51 via the service provider 3. At this point, when the receipt rejection data transmitted from the electronic distribution service center 1 is received by the communication section 61, the upper controller 62 of the home server 51 causes the control section 91 of the encryption processing section 65 to terminate purchase processing based on the receipt rejection data, and at the same time, notifies a user via the displaying means 64 that contents the user is trying to purchase cannot be purchased.

As described above, in the online charge purchase processing executed in the home server 51, contents can be purchased only when the electronic distribution service center 1 permits purchase processing during the purchase processing. Further, although the electronic distribution service center 1 transmits receipt data and receipt rejection data as they are in this embodiment, the data may be transmitted with a signature added after the data is encrypted by the temporary key $K_{temp}$, and in the home server 51, after verifying the signature attached to the encrypted receipt data and receipt rejection data, the encrypted receipt data and receipt rejection data is decrypted by the temporary key $K_{temp}$, and whether or not the charge information has been collected may be confirmed based on the decrypted receipt data and receipt rejection data.

In the above-described configuration, in the electronic music distribution system 10, if online charge purchase processing is executed in the home server 51, the electronic distribution service center 1 receives charge information transmitted from the home server 51 during the purchase processing, determines whether or not the charge information is illegal data by verifying a signature attached to the charge information, and when it is determined that the charge information is legal data as a result (i.e., when the home server 51 receives receipt data), causes the home server 51 to execute purchase processing continuously and purchase contents.

On the other hand, in the electronic music distribution system 10, when the electronic distribution service center 1 determines that charge information is illegal data during purchase processing executed in the home server 51 (i.e., when the home server 51 receives receipt rejection data), the electronic distribution service center 1 causes the home server 51 to terminate the purchase processing and prohibits purchasing contents.

Therefore, in the electronic music distribution system 10, even if charge information transmitted from the home server 51 to the electronic distribution service center 1 is tampered (charge information is tampered outside the encryption processing section 65, or on a communication route between the home server 51 and the electronic distribution service center 1), for example, object of purchase contents are changed to other contents, or a utilization right of contents is changed to other utilization rights, these illegal contents and illegal utilization right can be prevented from being purchased.

In addition, even if charge information transmitted from the home server 51 to the electronic distribution service center 1 is tampered, or price of contents, or a distributed party of profit from purchase of contents is changed, purchasing the contents for an illegal price or a third party's gaining illegal profit can be prevented.

According to the above-described configuration, by connecting online the electronic distribution service center 1 and the user home network 5, transmitting charge information generated at this time to the electronic distribution service center 1 while the home server 51 executes purchase processing, determining whether or not the charge information is legal data by the electronic distribution service center 1, and when it is determined that the charge information is illegal data, causing the home server 51 to terminate the purchase processing to prevent the contents from buying, illegal purchase of the contents and their utilization right due to tamper of the charge information can be prevented, thus an electronic music distribution system that can prevent contents from being illegally utilized can be realized.

Incidentally, although the electronic distribution service center 1 determines whether or not to permit purchase of contents based on charge information transmitted from the home server 51, utilization permission data describing contents that a user tries to purchase or a utilization right is transmitted from the home server 51 like license conditions information, and the electronic distribution service center 1 may determine whether or not to permit purchase or utilization of the contents based on the utilization permission data.

(10) Configuration of an Information Provision Apparatus

Figure 98:
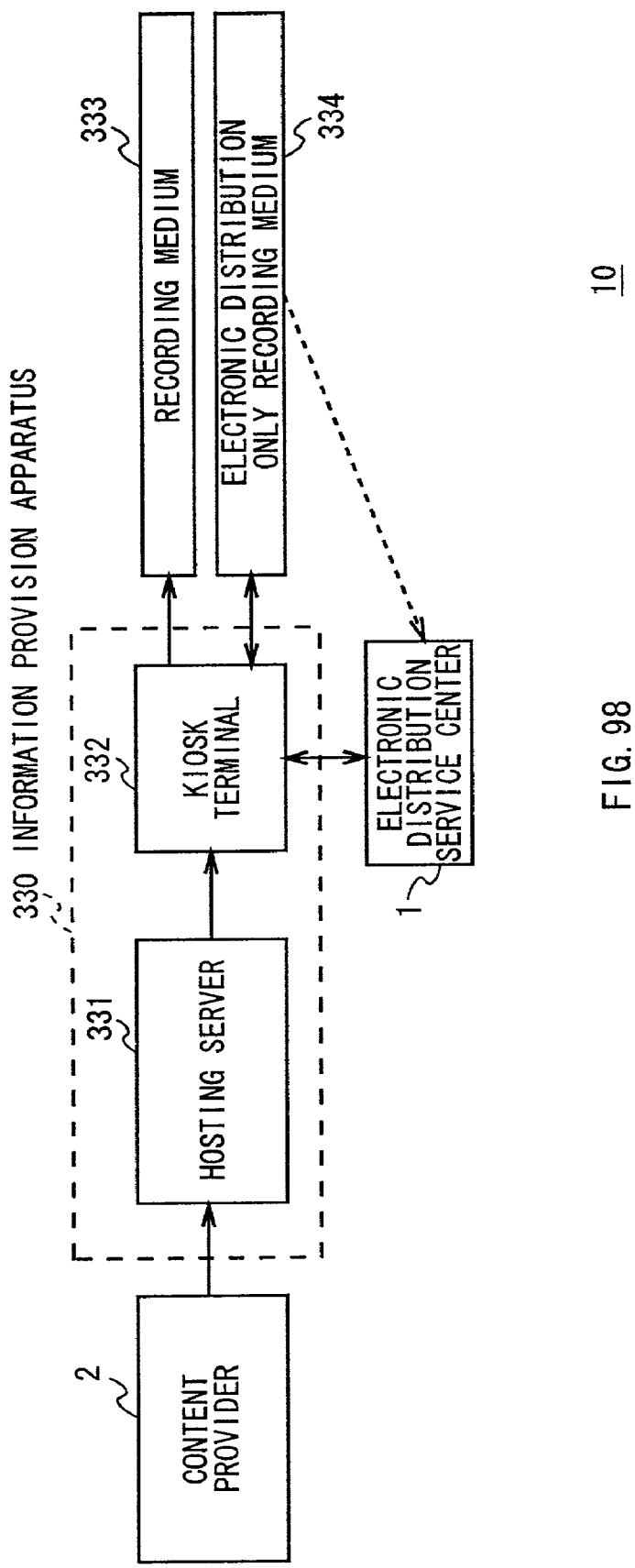
FIG. 98 is a block diagram showing configuration of an electronic music distribution system.

In FIG. 98 in which parts corresponding to FIG. 1 are shown by identical symbols, the electronic music distribution system 10 with such a configuration is provided with an information provision apparatus 330. The information provision apparatus 330 is composed of a hosting server 331 holding an encrypted multiplicity of contents supplied from the content provider 2 and an information provision terminal (hereinafter referred to as a KIOSK terminal) 332 set in, for example, a simple retailing shop (i.e., KIOSK).

In the KIOSK terminal 332, a recording medium 333 that is a recording medium consisting of, for example, an MD (trademark) or an electronic distribution only recording medium 334 described above for FIG. 17 can be inserted detachably. The KIOSK terminal 332 holds price information prepared on an information provider side that manages the KIOSK terminal 332, reads out contents desired by a customer who is an information user from the hosting server 331 via a private cable or a satellite communication, and, by executing purchase processing as the home server 51 in the user home network 5 does, records the contents desired by the customer in a recording medium 333 the customer has or an electronic distribution only recording medium 334.

Incidentally, the KIOSK terminal 332 receives a public key certificate, a delivery key $K_d$, registration information or the like transmitted from the electronic distribution service center 1, and in return transmits charge information, license conditions information, or the like according to a utilization right of contents to the electronic distribution only recording medium 334. Thus, the electronic distribution service center 1 performs processing of profit distribution on the content provider 2, an information supplier (the service provider 3 in FIG. 1) or the like based on the charge information given by the KIOSK terminal 332. In addition, the electronic distribution only recording medium 334 sometimes performs purchase processing in the electronic distribution only recording medium 334 when purchasing a utilization right from the KIOSK terminal 332, in which case, it is necessary to transmit the charge information to the electronic distribution service center 1 via an apparatus in the user home network 5.

Figure 99:
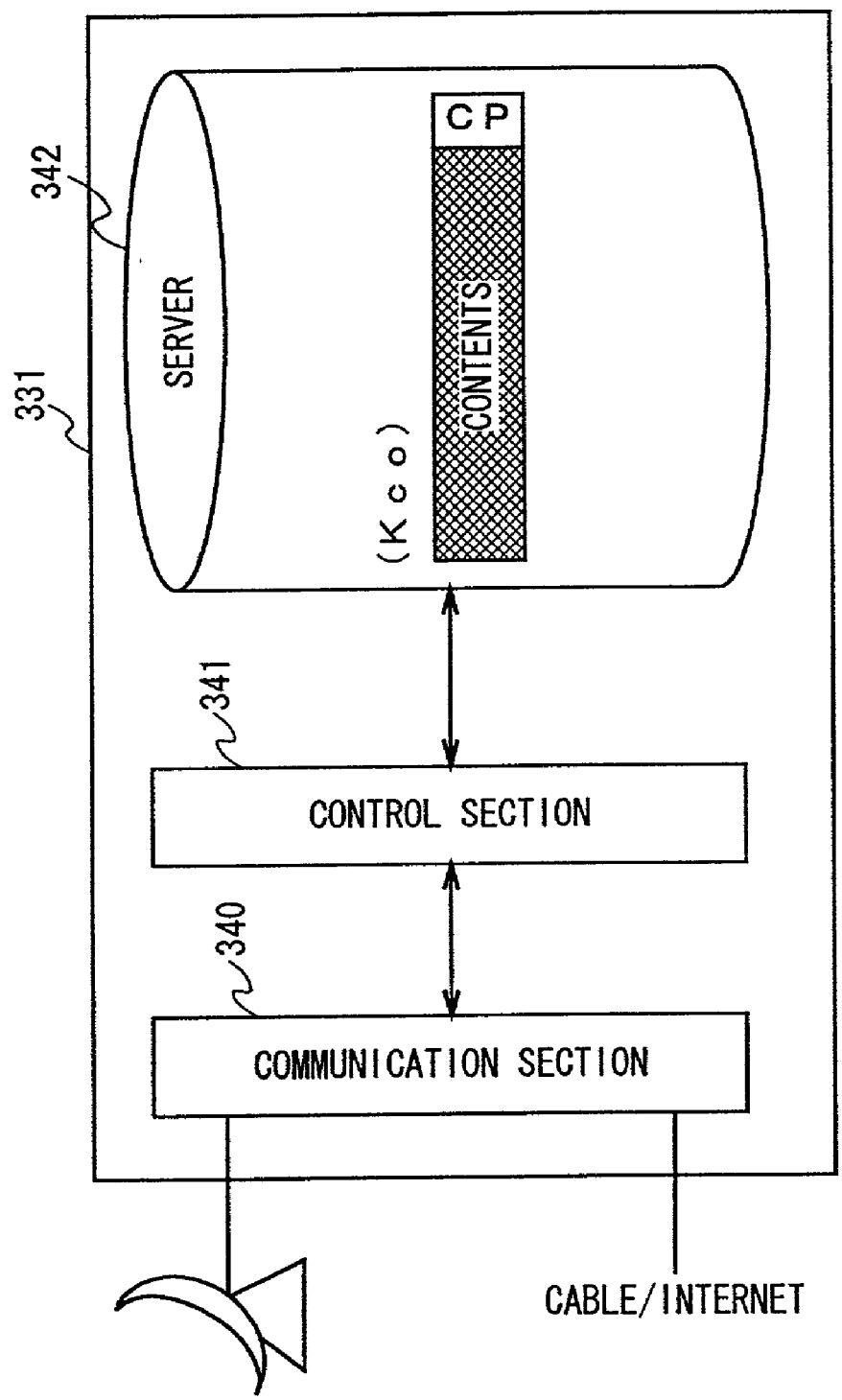
FIG. 99 is a block diagram showing configuration of a hosting server.

Here, FIG. 99 shows a configuration of the hosting server 331. The hosting server 331 is composed of a communication section 340, a control section 341 and a server 342. The communication section 340 communicates with the content provider 2 and the KIOSK terminal 332, and transmits and receives predetermined information. When a content provider secure container is transmitted from the content provider 2 by controlling the communication section 340 and the server 342, the control section 341 holds encrypted contents included in the content provider secure container in the server 342, and at the same time, transmits key data, a handling policy or the like included in the content provider secure container to the KIOSK terminal 332 via the communication section 340.

In addition, when given a read out request command from the KIOSK terminal 332, the control section 341 reads out corresponding contents from the server 342, and transmits the read out contents to the KIOSK terminal 332 via the communication section 340. Incidentally, a communication route of a read out request command of contents and a route of contents may be different.

Figure 100:
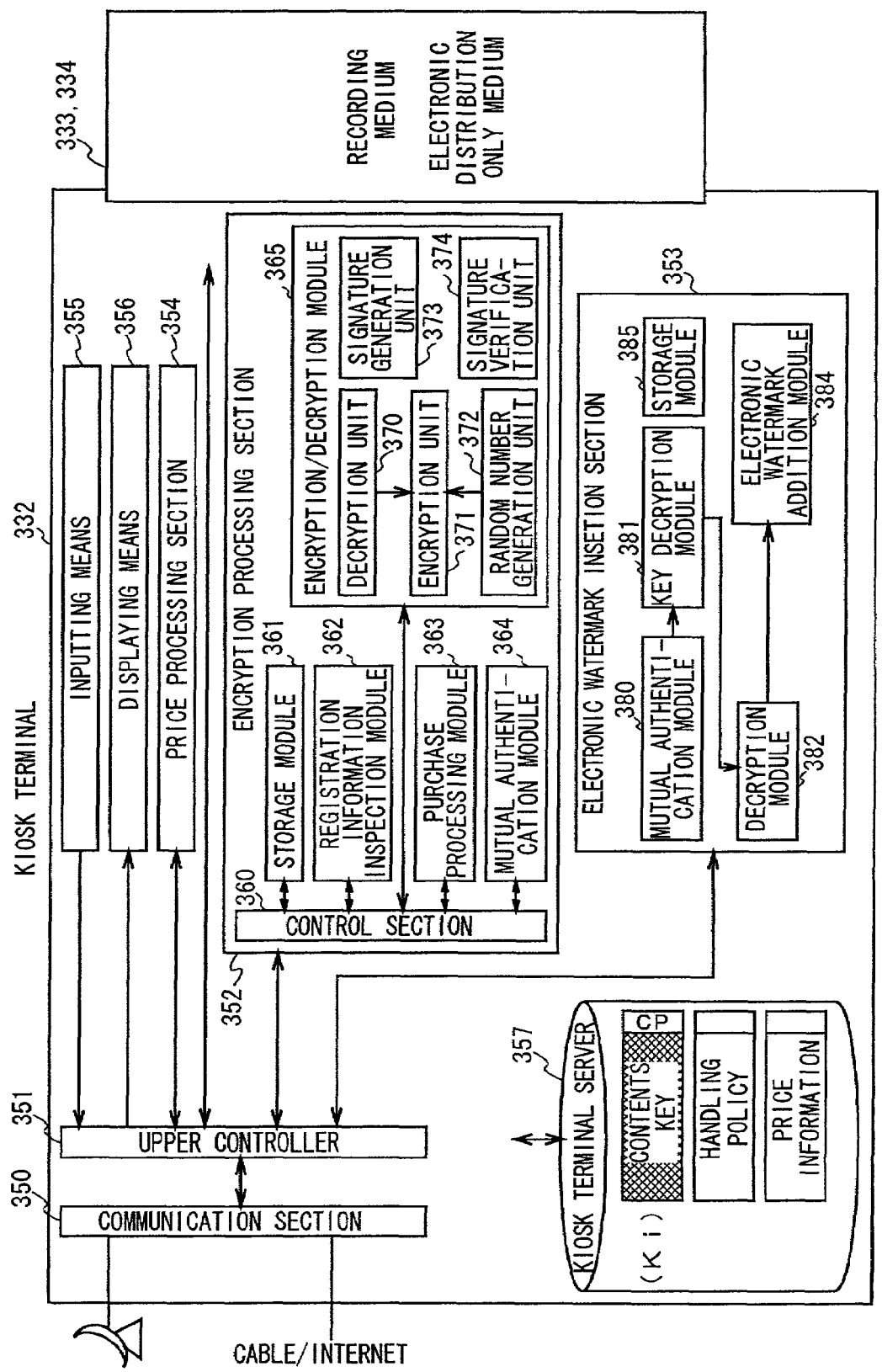
FIG. 100 is a block diagram showing configuration of a KIOSK terminal.

FIG. 100 shows a configuration of the KIOSK terminal 332, and the KIOSK terminal 332 is composed of a communication section 350 that is receiving means, an upper controller 351 that is storing means for controlling the KIOSK terminal 332, an encryption processing section 352 that is license conditions information preparing means, an electronic watermark insertion section 353 that is electronic watermark inserting means, a price processing section 354, inputting means 355, displaying means 356, and a KIOSK terminal sever 357.

The communication section 350 communicates with the hosting server 331 and the electronic distribution service center 1, and transmits and receives predetermined information. Since the upper controller 351 has a function similar to that of the upper controller 62 of the home server 51, its description is omitted. The encryption processing section 352 is composed of a control section 360, a storage module 361, a registration information inspection module 362, a purchase processing module 363, a mutual authentication module 364 and an encryption/decryption module 365. Since the control section 360, the storage module 361, the registration information inspection module 362, the purchase processing module 363 and the mutual authentication module 364 have functions similar to those of the corresponding control section 91, storage module 92, registration information inspection module 93, purchase processing module 94 and mutual authentication module 95 in the home server 51 respectively, their descriptions are omitted.

The encryption/decryption module 365 is composed of a decryption unit 370, an encryption unit 371, a random number generation unit 372, a signature generation unit 373 and a signature verification unit 374. Since the decryption unit 370, the encryption unit 371, the random number generation unit 372, the signature generation unit 373 and the signature verification unit 374 have functions similar to those of the corresponding decryption unit 111, encryption unit 112, random number generation unit 113, signature generation unit 114 and signature verification unit 115 in the home server 51 respectively, their descriptions are omitted.

The electronic watermark insertion section 353 is composed of a mutual authentication module 380, a key decryption module 381, a decryption module 382, an electronic watermark addition module 383 and a storage module 384. In the electronic watermark insertion section 353, although the mutual authentication module 380, the key decryption module 381, the decryption module 382, the electronic watermark addition module 383 and the storage module 384 have functions similar to those of the corresponding mutual authentication module 101, key decryption module 102, decryption module 103, electronic watermark addition module 105 and storage module 106 in the extension section 62 of the home server 51 respectively, contents decrypted by a content key are not extended, but, for example, with an ID of a holder of the KIOSK terminal 332 inserted in the contents, are forwarded to the recording medium 333 and the electronic distribution only recording medium 334 as they are (as digital data). However, in the electronic watermark insertion section 353, in some cases, contents that are an output of the decryption module 382 are extended, if necessary, recompressed using another compression algorithm, and the output is forwarded to the electronic watermark addition module 383.

The price processing section 354 displays on the displaying means 356 information of price with respect to a utilization right of contents a customer has purchased upon purchase processing, and when price is inserted from a price insertion opening provided in the KIOSK terminal 332, determines whether or not the inserted price is insufficient, and if the price is insufficient, notifies the customer of information of insufficient amount via the displaying means 356, or if the price is too much, notifies the customer of information of an amount of change via the displaying means 356, and returns the change from a price return opening.

The inputting means 355 forwards to the upper controller 351 various kinds of information such as selection information of contents or the like inputted via an operation button. The displaying means 356 is composed of a predetermined display device such as a liquid crystal display, issues an instruction to a customer, and displays information. Incidentally, the inputting means 355 and the display means 356 can be configured by uniting them by a touch panel type liquid crystal display or the like.

The KIOSK terminal server 357 has a function similar to the mass storage section 68 of the home server 51, and holds key data (an encrypted content key $K_{co}$, an encrypted individual key $K_i$ (not shown)) transmitted from the hosting server 331, a handling policy, and price information prepared on the KIOSK side, or the like. Incidentally, the KIOSK terminal server 357 may hold encrypted contents.

Then, when a customer inserts the recording medium 333 or the electronic distribution only recording medium 334 in a media insertion opening provided in the KIOSK terminal 332, the KIOSK terminal 332 displays a purchase guide, information of purchasable contents, or the like via the display means 356, and as a result, if a customer selects and designates desired contents via the inputting means 355, reads out the selected and designated contents from the hosting server 331 to apply purchase processing, and records the contents in the recording medium 333 or the electronic distribution only recording medium 334.

Figure 101:
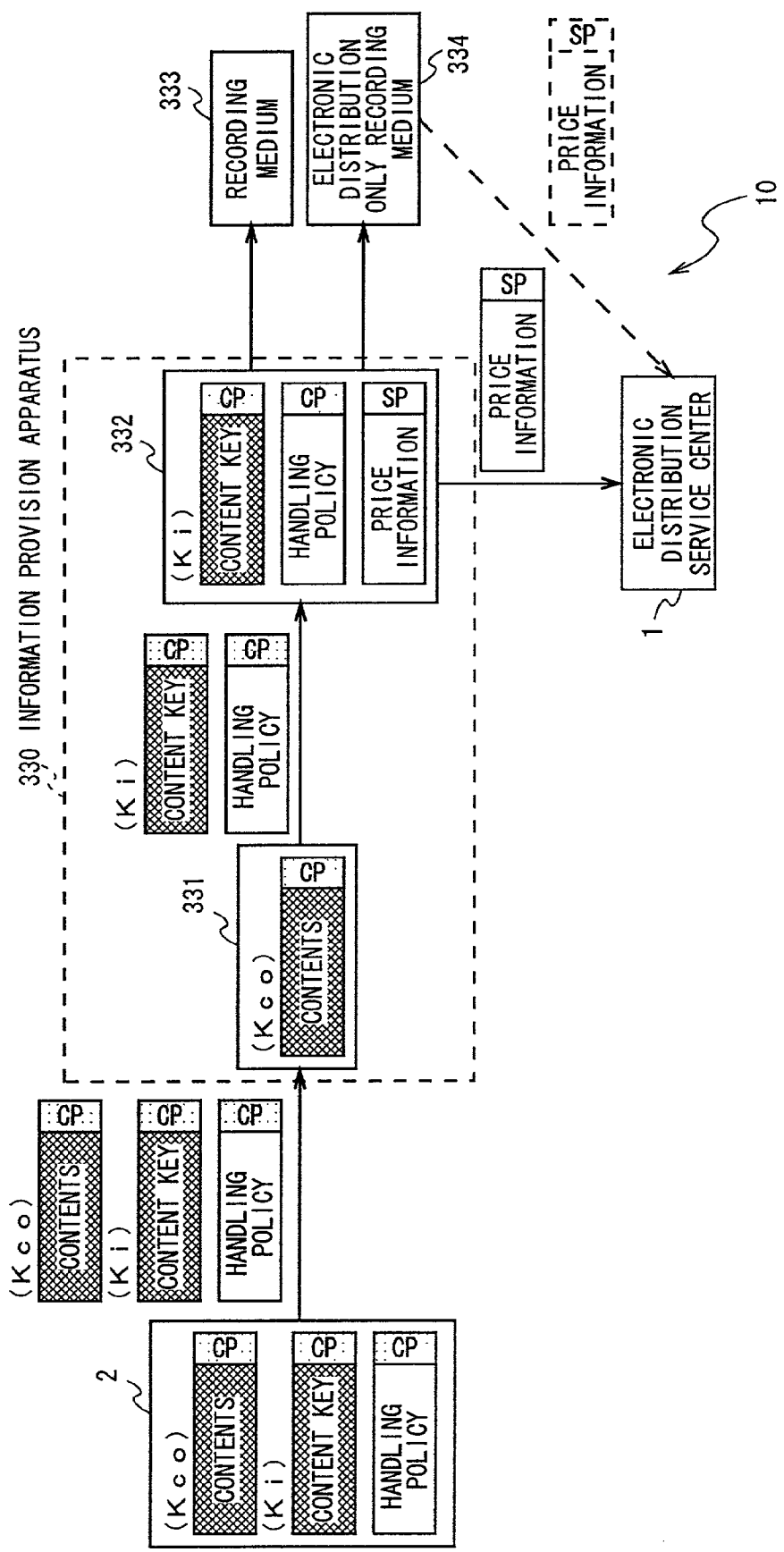
FIG. 101 is a skeleton block diagram showing data flow.

Incidentally, FIG. 101 illustrates information transmitted among the content provider 2, the hosting server 331 and the KIOSK terminal 332. The content provider 2 attaches a public key certificate of the content provider to a content provider secure container, and sends the content provider secure container to the hosting server 331.

The hosting server 331 verifies a public key certificate of the content provider 2, obtains a public key of the content provider 2, and verifies a signature of the received content provider secure container using the obtained public key. After succeeding in verifying the signature, the hosting server 331 takes out encrypted contents from the content provider secure container, holds the taken out encrypted contents in the server 342, and at the same time, transmits the remaining key data (an encrypted content key $K_{co}$ or an encrypted individual key $K_i$ (not shown)), a handling policy and the like to the KIOSK terminal 332.

The KIOSK terminal 332 holds the received key data (an encrypted content key $K_{co}$ or an encrypted individual key $K_i$ (not shown)), a handling policy and the like, and at the same time, holds price information prepared on an information provider side that manages the KIOSK terminal 332.

Here, purchase processing that is actually executed in the KIOSK terminal 332 will be described with reference to flow charts shown in FIGS. 102 through 105. In step S780, when a customer inserts a medium (the recording medium 333 or the electronic distribution only recording medium 334) in the KIOSK terminal 332, in step S781, the upper controller 351 of the KIOSK terminal 332 determines whether or not the inserted medium is the recording medium 333 (in this embodiment, for example, an MD (trademark)), and if the inserted medium is the recording medium 333, the processing proceeds to step S782.

In step S782, the upper controller 351 causes the displaying means 356 to display information such as purchasable contents (i.e., a tune), price and the like, and in this sate, the customer selects and designates desired contents and inserts money in the price insertion opening, the processing proceeds to step S783. In step S783, the upper controller 351 checks whether or not the money inserted by the customer is insufficient compared with charged price, and if it is not insufficient (money inserted by the customer may be more than the price), the processing proceeds to step S785. Incidentally, in step S783, if the money inserted by the customer is insufficient compared with the charged price, the processing proceeds to step S784, where the upper controller 351 instructs the customer via the displaying means 356 to insert an insufficient portion of money in the price insertion opening.

In step S785, the upper controller 351 reads out from KIOSK terminal 357 a handling policy, price information and key data corresponding to the contents selected and designated by the customer, and forward them to the encryption processing section 352 to instruct the control section 360 to execute the purchase processing.

Then, in step S786, the control section 360 of the encryption processing section 352 executes purchase processing of, for example, a copying right with copy management information (SCMS) in which a number of times of copying is limited to one (i.e., copying from the KIOSK terminal 332 to the recording medium 333) with respect to the contents selected and designated by the customer based on the handling policy and the price information given by the upper controller 351. As a result, the charge information is held in the storage module 361.

Incidentally, after recording contents in the recording medium 333, in order to prevent the contents from being illegally copied from the recording medium 333 to another recording medium 333, the KIOSK terminal 332 executes purchase processing of the copying right with copy management information. However, although a copying right without copy control information with a number of times limitation or the recording medium 333 in this embodiment is an MD (trademark) as long as it can prevent illegal copying, purchase processing of a copying right and the like with limitation according to various kinds of medium such as a memory stick (trademark) may be executed.

Then, in step S787, in the decryption unit 370 of the encryption/decryption module 365, the control section 360 of the encryption processing section 352 takes out an encrypted individual key $K_i$ and an encrypted content key $K_{co}$ included in key data given by the upper controller 351, decrypts the encrypted individual key $K_i$ using the delivery key $K_d$ stored in the storage module 361, and decrypts the encrypted content key $K_{co}$ using the obtained individual key $K_i$.

Subsequently, in step S788, the control section 360 of the encryption processing section 352 mutually authenticates with the electronic watermark insertion section 353 using each other's mutual authentication modules 364 and 380, and shares the temporary key $K_{temp}$, and the processing proceeds to step S789. In step S789, the control section 360 of the encryption processing section 352 encrypts the decrypted content key $K_{co}$ using the temporary key $K_{temp}$ in the encryption unit 371 of the encryption/decryption module 365. Then, in step S790, the control section 360 of the encryption processing section 352 forwards the content key $K_{co}$ encrypted by the temporary key $K_{temp}$ to the electronic watermark insertion section 353.

In step S791, in the key decryption module 381, the electronic watermark insertion section 353 decrypts the encrypted content key $K_{co}$ given by the encryption processing section 352 using the temporary key $K_{temp}$ (shared with the encryption processing section 352) given by the mutual authentication module 380.

Then, in step S792, the upper controller 351 transmits a read out request of contents selected and designated by a customer (e.g., including an ID of contents) to the hosting server 331 via the communication section 350, reads out encrypted contents selected and designated by the customer from the hosting server 331, and forwards the contents to the electronic watermark insertion section 353. Incidentally, when having read out the encrypted contents from the hosting server 331 in this way, since the encrypted contents can be saved in the KIOSK terminal server 357, if the customer selects and designates contents, the upper controller 351 may first retrieve contents held by the KIOSK terminal server 357, and if there is not corresponding contents in the KIOSK terminal server 357, read out the contents from the hosting server 331. In addition, read out of contents may be executed in steps before step S792.

In step S793, after decrypting the encrypted contents given by the upper controller 351 using the decrypted content key $K_{co}$ in the decryption module 382, the electronic watermark insertion section 353 inserts, for example, an ID of a holder of the KIOSK terminal 332 in the form of an electronic watermark in the decrypted contents in the electronic watermark addition module 383.

Incidentally, an ID of a holder of the KIOSK terminal 332 is used as data of the watermark attached to the contents in order to specify the KIOSK terminal 332 that provided the contents when the contents recorded in the recording medium 333 (or the electronic distribution only recording medium 334) are illegally copied.

Then, in step S794, the electronic watermark insertion section 353 forwards the contents in which the electronic watermark is inserted to the recording medium 333 as they are (in the form of digital data), thereby recording the contents designated by the customer in the recording medium 333.

Subsequently, in step S795, the upper controller 351 uses the price processing section 354 determines whether or not money inserted in the price insertion opening by the customer is more than a charged price, and if the money is more than the charged price, returns the balance as change from the price returning opening.

In this way, in step S796, the customer receives the change if there is change, and at the same time, receives the recording medium 333.

Incidentally, when the customer purchases a utilization right of contents in this way, the upper controller 351 of the KIOSK terminal 332 transmits the charge information prepared at the point to the electronic distribution service center 1. Thus, the electronic distribution service center 1 makes a settlement based on the charge information, thereby collecting a part of the price paid by the customer from the holder of the KIOSK terminal 332 according to the utilization right to which the purchase processing was applied.

On the other hand, when the customer inserted the electronic distribution only recording medium 334 in the KIOSK terminal 332 in step S800, in order to identify that the medium is the electronic distribution only recording medium 334 by identification processing of media in the subsequent step S801 (i.e., if the medium inserted in the KIOSK terminal 332 by the customer is identified as the electronic distribution only recording medium 334 by the identification processing of contents described above for step S781), the upper controller 351 proceeds to step S802. Incidentally, if the medium is identified as the recording medium 333 in this step S801, processing of step S782 and the subsequent steps are executed.

In step S802, the upper controller 351 sets a purchasable utilization right to contents (e.g., an unlimited reproduction right, a reproduction right with a period limited, a reproduction right with an accumulated time limited, a reproduction right with a number of times limited, an unlimited copying right, a copying right with a number of times limited, or the like) together with the purchasable contents (i.e., a name of a tune) and a price via the displaying means 356, and causes the displaying means 356 to display the information of the set contents of utilization right, and when the customer selects and designates desired contents via the inputting means 355 and, at the same time, selects and designates contents of a desired utilization right, the processing proceeds to step S803.

In steps S803, the upper controller 351 inquires whether or not the purchase price of the utilization right will be settled later via the displaying means 356. Then, when the customer selects to pay the price on the spot via the inputting means 355, the upper controller 351 in turn solicits the customer to insert money in the price insertion opening via the displaying means 356, and the processing proceeds to step S804. Incidentally, since step S804 executes processing similar to the processing described above for step S783, its description is omitted. In addition, since step S805 to which the processing can proceed from step S804 executes processing similar to the processing described above for step S784, its description is omitted.

Then, in step S806, the upper controller 351 inquires the customer whether or not the purchase processing may be executed by the KIOSK terminal 332 via the display means 356. If the customer selects that the KIOSK terminal 332 may execute the purchase processing via the inputting means 355, the processing proceeds to step S807.

Since processing similar to the processing described above for step S785 is executed in step S807, its description is omitted. Then, in step S808, the control section 360 of the encryption processing section 352 in the KIOSK terminal 332 executes the purchase processing of the utilization right selected and designated by the customer in the purchase processing module 363 based on the handling policy and the price information given by the upper controller 351, prepares license conditions information and charge information, and holds the charge information in the storage module 361, and then the processing proceeds to step S809. since processing similar to the processing described above for step S787 is executed in step S809, its description is omitted.

Incidentally, as an ID of an encryption processing section to be stored in data of license conditions information (i.e., an ID of the encryption processing section that prepared the license conditions information), an ID of the encryption processing section 122 in the electronic distribution only recording medium 334 is stored. (However, an ID of the encryption processing section 352 in the KIOSK terminal 332 may be stored. At this point, in some cases, an ID of the encryption processing section 122 in the electronic distribution only recording medium 334 to which the contents was transferred is saved in the KIOSK terminal server 357, and thereafter transmitted to the electronic distribution service center 1 and managed.)

Then, in step S810, the control section 360 of the encryption processing section 352 in the KIOSK terminal 332 mutually authenticates with the encryption processing section 122 of the electronic distribution only recording medium 334 using each other's mutual authentication modules 364 and 128, and shares the temporary key $K_{temp}$, and the processing proceeds to step S811.

In step S811, the control section 360 of the encryption processing section 352 in the KIOSK terminal 332 encrypts the decrypted content key $K_{co}$ and the license conditions information respectively in the encryption unit 371 of the encryption/decryption module 365 using the temporary key $K_{temp}$. Incidentally, since, among the content key $K_{co}$ and the license conditions information, even if contents of the license conditions information are seen, there is no specific problem, only the content key $K_{co}$ may be encrypted. Then, the control section 360 of the encryption processing section 352 in the KIOSK terminal 332 generates signatures for all of (or a part of) the content key $K_{co}$ encrypted (by the temporary key $K_{temp}$) and the license conditions information (in some cases, it is encrypted) in the signature generation unit 373, and returns them to the upper controller 351.

Then, in step S812, the upper controller 351 in the KIOSK terminal 332 reads out the encrypted contents selected and designated by the customer from the hosting server 331 or the KIOSK terminal server 357 as in step S792. (Incidentally, as a timing, reading out of the contents may be executed before step S812.) Then, the read out contents, the contents key $K_{co}$ encrypted (by the temporary key $K_{temp}$), and the license conditions information, the signatures for the content key $K_{co}$ encrypted (by the temporary key $K_{temp}$) and the license conditions information, as well as the handling information and the price information read out form the KIOSK terminal server 357 are transmitted to the electronic distribution only recording medium 334 via the upper controller 351.

In step S813, the control section 124 of the encryption processing section 122 in the electronic distribution only recording medium 334 verifies the signatures for the content key $K_{co}$ encrypted (by the temporary key $K_{temp}$), the handling information, the price information and the license conditions information given by the KIOSK terminal 332 in the signature verification unit 135, and thereafter decrypts the encrypted content key $K_{co}$ and the encrypted license conditions information, if necessary, respectively, using the temporary key $K_{temp}$ in the decryption unit 132. Then, the control section 124 decrypts the encrypted content key $K_{co}$ using the save key $K_{save}$ held in the storage module 125 in the encryption unit 132.

Then, in step S814, the control section 124 of the encryption processing section 122 in the electronic distribution only recording medium 334 saves the contents encrypted by the content key $K_{co}$, the content key $K_{co}$ encrypted by the save key $K_{save}$, the handling policy, the price information and the license conditions information in the external memory 123 via the external memory control section 130. Incidentally, the content key $K_{co}$ encrypted by the save key $K_{save}$ and the license conditions information are saved in a tamper checked region in the external memory 123 by the external memory control section 130.

Then, although processing for the upper controller 351 in the KIOSK terminal 332 proceeds to steps S815 and S816 in order, since steps S815 and S816 executes processing similar to the processing described above for steps S795 and S796 respectively, their descriptions are omitted.

Incidentally, since the upper controller 351 of the KIOSK terminal 332 transmits the encrypted contents, the encrypted content key $K_{co}$, the handling policy, the price information and the license conditions information to the electronic distribution only recording medium 334, but holds the charge information in the storage module 361 inside, the charge information is transmitted to the electronic distribution service center 1. Thus, the electronic distribution service center 1 makes a settlement based on the charge information, thereby collecting a part of the price paid by the customer from the holder of the KIOSK terminal 332 according to the utilization right to which the purchase processing was applied.

Here, in the settlement of the price described above for step S803, when the customer selects to make a settlement of the purchase price of the utilization right on a later date via the inputting means 355, processing for the upper controller 351 in the KIOSK terminal 332 proceeds to step S820. Incidentally, since processing from this step S820 to the subsequent step S823 is similar to the processing from step S807 to the subsequent step S810, their descriptions are omitted. However, the charge information generated in step S821 is not saved in the storage module 361 of the encryption processing section 352.

Then, in step S824, the control section 360 of the encryption processing section 352 in the KIOSK terminal 332 encrypts the decrypted content key $K_{co}$, the license conditions information and the charge information respectively in the encryption unit 371 of the encryption/decryption module 365 using the temporary key $K_{temp}$. Incidentally, since, even if contents of the license conditions and the charge information other than the content key $K_{co}$ are seen, there is no specific problem, only the content key $K_{co}$ may be encrypted. Then, the control section 360 of the encryption processing section 352 in the KIOSK terminal 332 generates signatures for all of (or each of) the content key $K_{co}$ encrypted (by the temporary key $K_{temp}$), the encrypted license conditions information and the encrypted charge information in the signature generation unit 373, and transmits the content key $K_{co}$ encrypted by the temporary key $K_{temp}$, the encrypted license conditions information, the encrypted charge information and their signatures to the upper controller 351.

Then, in step S825, the upper controller 351 in the KIOSK terminal 332 reads out the encrypted contents selected and designated by the customer from the hosting server 331 or the KIOSK terminal server 357 as in step S792. (Incidentally, as a timing, reading out of contents may be executed in steps before this step S812.)

Then, the encrypted content key, the content key $K_{co}$ encrypted (by the temporary key $K_{temp}$), the handling information, the price information, the encrypted license conditions information and the encrypted charge information, as well as the signatures generated for all of (or each of) the entirety of the content key $K_{co}$ encrypted (by the temporary key $K_{temp}$), the encrypted license conditions information and the encrypted charge information are transmitted to the electronic distribution only recording medium 334 via the upper controller 351. In addition, the handling policy and the price information may be transmitted from the KIOSK terminal 332 to the electronic distribution only recording medium 334, if necessary.

In step S826, the external memory control section 130 in the electronic distribution only recording medium 334 saves the encrypted contents in the external memory 123. Incidentally, the external memory control section 130 saves the handling information and the price information in the external memory 123, if necessary.

Then, in step S827, the control section 124 of the encryption processing section 122 in the electronic distribution only recording medium 334 performs verification of the signatures for the content key $K_{co}$ encrypted (by the temporary key $K_{temp}$), the encrypted license conditions information and the encrypted charge information given by the KIOSK terminal 332 in the signature verification unit 135, and decrypts the encrypted content key $K_{co}$, the encrypted license conditions information and the encrypted charge information respectively using the temporary key $K_{temp}$ in the decryption unit 132. (If the license conditions information and the charge information are not encrypted, it is unnecessary to decrypt them.) Then, the control section 124 encrypts the decrypted content key $K_{co}$ using the save key $K_{save}$ saved in the storage module 125 in the encryption unit 132.

Then, in step S828, the control section 124 of the encryption processing section 122 in the electronic distribution only recording medium 334 saves the charge information in the storage module 125. Subsequently, in step S829, the control section 124 of the encryption processing section 122 in the electronic distribution only recording medium 334 saves the encrypted content key $K_{co}$ and the license conditions information in the external memory 123 via the external memory control section 130. Incidentally, the content key $K_{co}$ and the license conditions information are saved in a region for which tamper checked was applied in the external memory 123.

Further, if contents are recorded in the electronic distribution only recording medium 334 with conditions of settlement in a later day as described above, and charge information is also saved in the electronic distribution only recording medium 334, the electronic distribution service center 1 thereafter cannot collect the charge information from the electronic distribution only recording medium 334 until the electronic distribution only recording medium 334 is inserted in an apparatus connected to the electronic distribution service center 1. Thus, the electronic distribution only recording medium 334 may be inserted in an apparatus not connected to the electronic distribution service center 1, and contents are likely to be illegally utilized with no payment of prices.

Therefore, in such an electronic distribution only recording medium 334, after recording contents, the control section 124 of the encryption processing section 122 in the electronic distribution only recording medium 334 retrieves charge information of the storage module 125 in a predetermined timing, and if uncollected charge information is saved, applies limitation of a number of times, time or the like to a corresponding utilization right of the contents until the charge information is collected, thereby allowing utilization of the contents within the limitation. In this way, illegal utilization of the contents is prevented.

In addition, in such purchase processing, since the charge information and the license conditions information that were generated in the purchase processing, and the handling policy that was used for the generation, or the like do not remain in the KIOSK terminal 332, the electronic distribution service center 1 collects prices from a customer holding the electronic distribution only recording medium 334 at this point, and distributes a part of the prices to a holding of the KIOSK terminal 332.

In addition, in the processing described above for step S806, if the customer selects that the purchase processing is executed by the electronic distribution only recording medium 334 via the inputting means 355, the processing proceeds to step S840, where the upper controller 351 in the KIOSK terminal 332 reads out contents selected and designated by the customer from the hosting server 331 and the KIOSK terminal server 357 as in step S792, and at the same time, reads out corresponding key data, a handling policy and price information from the KIOSK terminal server 357 and transmits these to the electronic distribution only recording medium 334.

Incidentally, after mutually authenticating with the electronic distribution only recording medium 334, the KIOSK terminal 332 may share the temporary key $K_{temp}$, encrypt the contents (encrypted by the content key $K_{co}$), the key data, the handling policy and the price information by the temporary key $K_{temp}$, if necessary, and attach signatures to entire or a part of the data.

In step S841, the control section 124 of the encryption processing section 122 in the electronic distribution only recording medium 334 saves the contents (encrypted by the content key $K_{co}$) in the external memory 123 via the external memory control section 130, and at the same time, saves the handling policy and the price information in the external memory 123 via the external memory control section 130, if necessary.

Then, in step S842, the control section 124 of the encryption processing section 122 in the electronic distribution only recording medium 334 executes purchase processing in the purchase processing module 127, and prepares license conditions information and charge information based on the handling policy and the price information. Incidentally, since the procedures of the purchase processing are the same as steps S163 to S170 described above for FIG. 67, their detailed description is omitted.

Subsequently, in step S843, after decrypting the encrypted individual key $K_i$ included key data using the delivery key $K_d$ held in the storage module 125 in the decryption unit 131, the control section 124 of the encryption processing section 122 in the electronic distribution only recording medium 334 decrypts the encrypted content key $K_{co}$ included in the key data using the decrypted individual key $K_i$. Then, the control section 124 encrypts the encrypted content key $K_{co}$ using the save key $K_{save}$ held in the storage module 125 in the encryption unit 132.

Then, in step S844, the control section 124 of the encryption processing section 122 in the electronic distribution only recording medium 334 mutually authenticates with the encryption processing section 352 in the KIOSK terminal 332 using each other's mutual authentication modules 128 and 364, and shares the temporary key $K_{temp}$.

Then, in step S845, the control section 124 of the encryption processing section 122 in the electronic distribution only recording medium 334 encrypts charge information using the temporary key $K_{temp}$ in the encryption unit 132, and after attaching a signature to the charge information in the signature generation unit 134, transmits the encrypted charge information and the signature to the KIOSK terminal 332 via the communication section 121. Incidentally, although a signature is attached to charge information so as not to be tampered, the charge information may be transmitted to the electronic distribution only recording medium 334 without encrypting. If the charge information is not encrypted, the temporary key $K_{temp}$ may not be shared between the electronic distribution only recording medium 334 and the KIOSK terminal 332.

In step S846, the upper controller 351 in the KIOSK terminal 332 forwards the charge information and the signature transmitted from the electronic distribution only recording medium 334 to the encryption processing section 352. Thus, in step S847, the signature verification unit 374 of the encryption processing section 352 in the KIOSK terminal 332 verifies the signature for the charge information, and after succeeding in verifying the signature, decrypts the charge information using the temporary key $K_{temp}$ and saves it in the storage module 361.

Then, in step S848, the control section 360 of the encryption processing section 352 in the KIOSK terminal 332 generates a charge processing completion notice indicating that the charge processing is completed, and attaches a signature to the charge processing completion notice in the signature generation unit 373, forward the charge processing completion notice with the signature attached to the upper controller 351, and at the same time, transmits it to the electronic distribution only recording medium 334 via the upper controller 351. Thus, the upper controller 351 simply determines whether or not the charge processing has been complete without specifically verifying the signature based on the charge processing completion notice. In addition, the control section 124 of the encryption processing section 122 in the electronic distribution only recording medium 334 verifies the signature of the charge processing completion notice in the signature verification unit 135, thereby recognizing the completion of the charge processing.

Then, in step S849, the control section 124 of the encryption processing section 122 in the electronic distribution only recording medium 334 saves the content key $K_{co}$ encrypted by the save key $K_{save}$ and the license conditions information in a region to which tamper check was applied in the external memory 123 via the external memory control section 130.

Subsequently, although the KIOSK terminal 332 sequentially executes processing of steps S850 and S851, since the processing is similar to the processing executed in steps S815 and S816, its description is omitted.

In this way, when purchase processing is performed in the electronic distribution only recording medium 334, charge information is held in the KIOSK terminal 332, and the charge information is transmitted to the electronic distribution service center 1 from the KIOSK terminal 332.

Incidentally, in step S803, if the customer selects that purchase price of the utilization right will be settled on a later date, in step S860 shown in FIG. 106, the upper controller 351 of the electronic distribution only recording medium 334 may transmits the encrypted contents, the key data, the handling policy and the price information to the electronic distribution only recording medium 334 in the state of the content provider secure container transmitted from the content provider 2. Then, if state data of the content provider secure container is transmitted to the electronic distribution only recording medium 334 from the KIOSK terminal 332 in this way, since a signature is already attached to the content provider secure container in the content provider 2, the KIOSK terminal 332 transmits the data to the electronic distribution only recording medium 334 without specifically attaching a signature.

Figure 107:
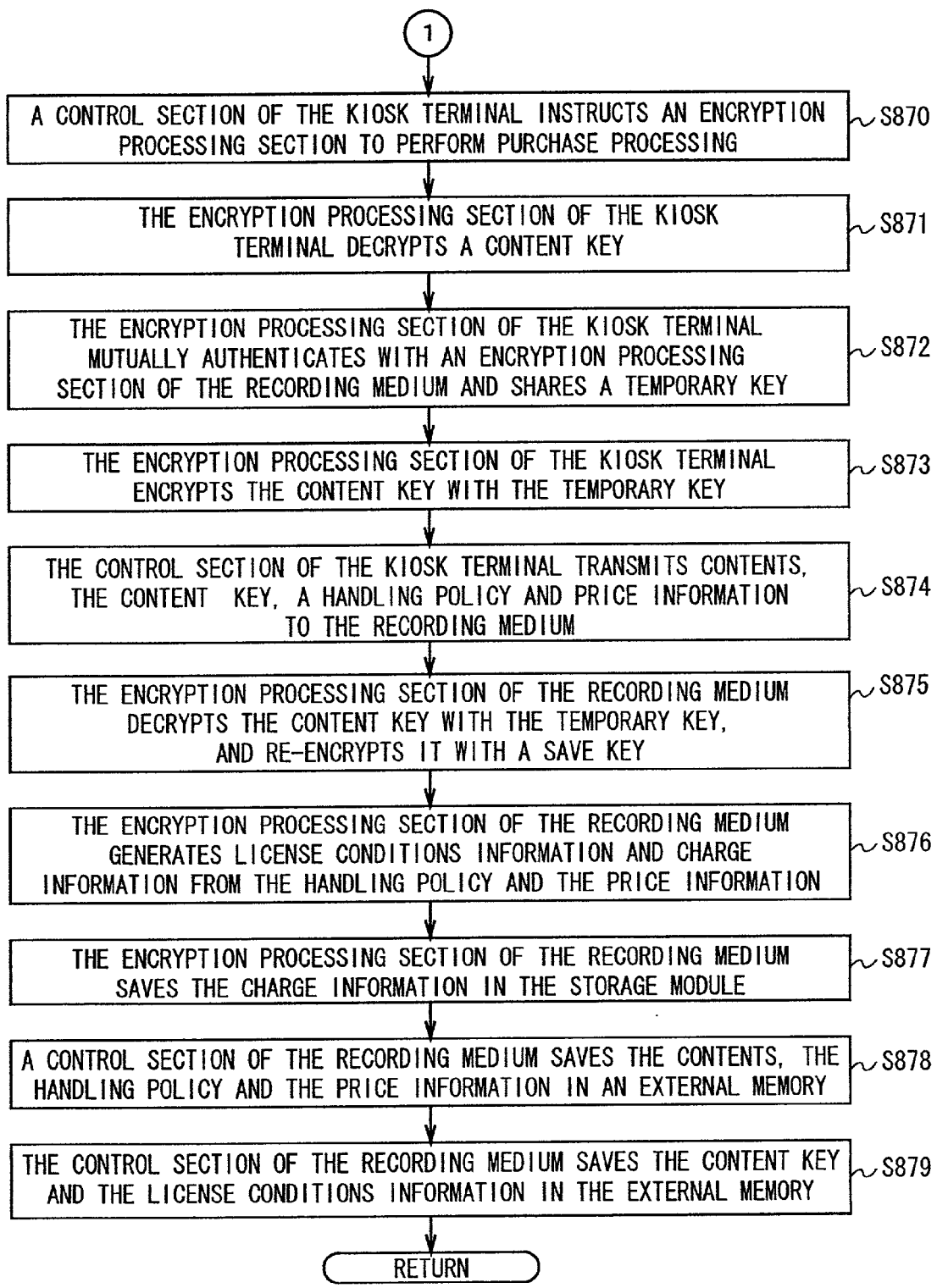
FIG. 107 is a flowchart showing another example of a purchasing procedure of a KIOSK terminal.

In addition, in step S803, if the customer selects that purchase price of the utilization right will be settled on a later date, the KIOSK terminal 332 may execute purchase processing to be described with reference to a flow chart shown in FIG. 107. That is, in step S870, the upper controller 351 in the KIOSK terminal 332 instructs the control section 360 of the encryption processing section 352 to execute the purchase processing. Incidentally, since the processing of this step S870 is similar to the processing of step S785, its detailed description is omitted.

Then, in step S871, in the decryption unit 370 after decrypting the encrypted individual key $K_i$ using the delivery key $K_d$ held in the storage module 361, the control section 360 of the encryption processing section 352 in the KIOSK terminal 332 decrypts the encrypted content key $K_{co}$ using the decrypted individual key $K_i$, and the processing proceeds to step S872. Incidentally, since the processing of step S872 is similar to the processing described above for step S810, its description is omitted.

Subsequently, in step S873, the control section 360 of the encryption processing section 352 in the KIOSK terminal 332 encrypts the decrypted content key $K_{co}$ using the temporary key $K_{temp}$ in the encryption unit 371, and generates a signature for the content key $K_{co}$ encrypted (by the temporary key $K_{temp}$) in the signature verification unit 373, if necessary, and the processing proceeds to step S874, and in this step S874, in the signature generation unit 373 the control section 360 transmits the encrypted contents, the content key $K_{co}$ encrypted (by the temporary key $K_{temp}$) and its signature, the handling policy and the price information to the electronic distribution only recording medium 334 via the upper controller 351.

In Step S875, after verifying the signature of the content key $K_{co}$ encrypted (by the temporary key $K_{temp}$) in the signature verification unit 135, the control section 124 of the encryption processing section 122 in the electronic distribution only recording medium 334 decrypts the encrypted content key $K_{co}$ using the temporary key $K_{temp}$ in the decryption unit 131. Then, the control section 124 encrypts the decrypted content key $K_{co}$ using the save key $K_{save}$ held in the storage module 125 in the encryption unit 132.

Then, in step S876, the control section 124 of the encryption processing section 122 in the electronic distribution only recording medium 334 executes purchase processing in the purchase processing module 127, and after preparing license conditions information and charge information based on a handling policy and price information, the processing proceeds to step S877, where the control section 124 saves the charge information in the storage module 125.

Subsequently, in step S878, the control section 124 of the encryption processing section 122 in the electronic distribution only recording medium 334 saves the encrypted contents, the handling policy and the price information n the external memory 123 via the external memory control section 130, and then in step S879, saves the encrypted content key $K_{co}$ and the license conditions information in a region to which tamper check was applied of the external memory 123 via the external memory control section 130. Incidentally, in step S878, since the control section 124 puts various kinds of information included in the handling policy and the price information in the license conditions information, the handling policy and the price information may be saved in the external memory 123, if necessary.

In this way, the KIOSK terminal 332 can execute purchase processing for a utilization right of contents with respect to the recording medium 333 and the electronic distribution only recording medium 334, and record the contents in the recording medium 333 and the electronic distribution only recording medium 344.

Incidentally, since decrypted contents are recorded in the recording medium 333, a customer holding the recording medium 333 can easily utilize the contents using a reproduction apparatus that does not have an extension section and an encryption section, and does not need to connect to the service provider 3 and the electronic distribution service center 1 according to the recording medium 333.

In addition, although a customer holding the electronic distribution only recording medium 334 cannot utilize contents unless the customer uses a reproduction apparatus provided with an extension section (or, alternatively an encryption processing section) as in the home server 51 described above for FIG. 15, since the reproduction apparatus does not need to be connected to the electronic distribution service center 1 or the service provider 3 either directly or indirectly, contents can be utilized with an apparatus such as a reproduction apparatus used for establishing the user home network 5.

In the above-mentioned configuration, in the electronic music distribution system 10, if the recording medium 333 is inserted in the KIOSK terminal 332, purchase processing is executed in the KIOSK terminal 332, thereby inserting data of an electronic watermark in decrypted contents to record in the recording medium 333.

In addition, if the electronic distribution only recording medium 334 is inserted in the KIOSK terminal 332, purchase processing is executed either in the KIOSK terminal 332 or the electronic distribution only recording medium 334, thereby recording encrypted contents and a content key $K_{co}$ as well as license conditions information in the electronic distribution only recording medium 334.

Therefore, in such an electronic music distribution system 10, even if a customer does not own an apparatus or the like for establishing the user home network 5 connected to the service provider 3 or the electronic distribution service center 1, the customer can secure safety to record contents in the recording medium 333 and the electronic distribution only recording medium 334 that the customer owns using the KIOSK terminal 332 installed in the simple retail store, respectively.

That is, since contents is recorded in the recording medium 333 in a state in which a copy control signal such as SCMS is attached or by managing copies by an electronic watermark (a copying right with copy management information), illegal copying of the contents can be prevented. Incidentally, as an electronic watermark signal, a copy control signal (a signal for controlling copy possible/impossible), a reproduction control signal (a signal for controlling reproduction possible/impossible), an ID of any apparatus (an ID of a KIOSK terminal or an ID of an electronic distribution only recording medium 334), or the like can be envisaged, and one or a plurality of them may be embedded.

In addition, since a utilization right (unlimited, a number of times limitation, a time limitation, etc.) selected in the purchase processing and a limitation which is applied on a utilization right until charge information is collected in case of the purchase processing to be settled on a later date is managed by license conditions information in the electronic distribution only recording medium 334, illegal utilization of contents can be prevented in this case as well.

According to the above-mentioned configuration, since contents are recorded in the recording medium 333 and the electronic distribution only recording medium 334 by the KIOSK terminal 332, the contents can be easily provided to a user who does not own an apparatus for establishing a user home network 5 while securing safety of the contents in the recording medium 333 and the electronic distribution recording medium 334.

Figure 102:
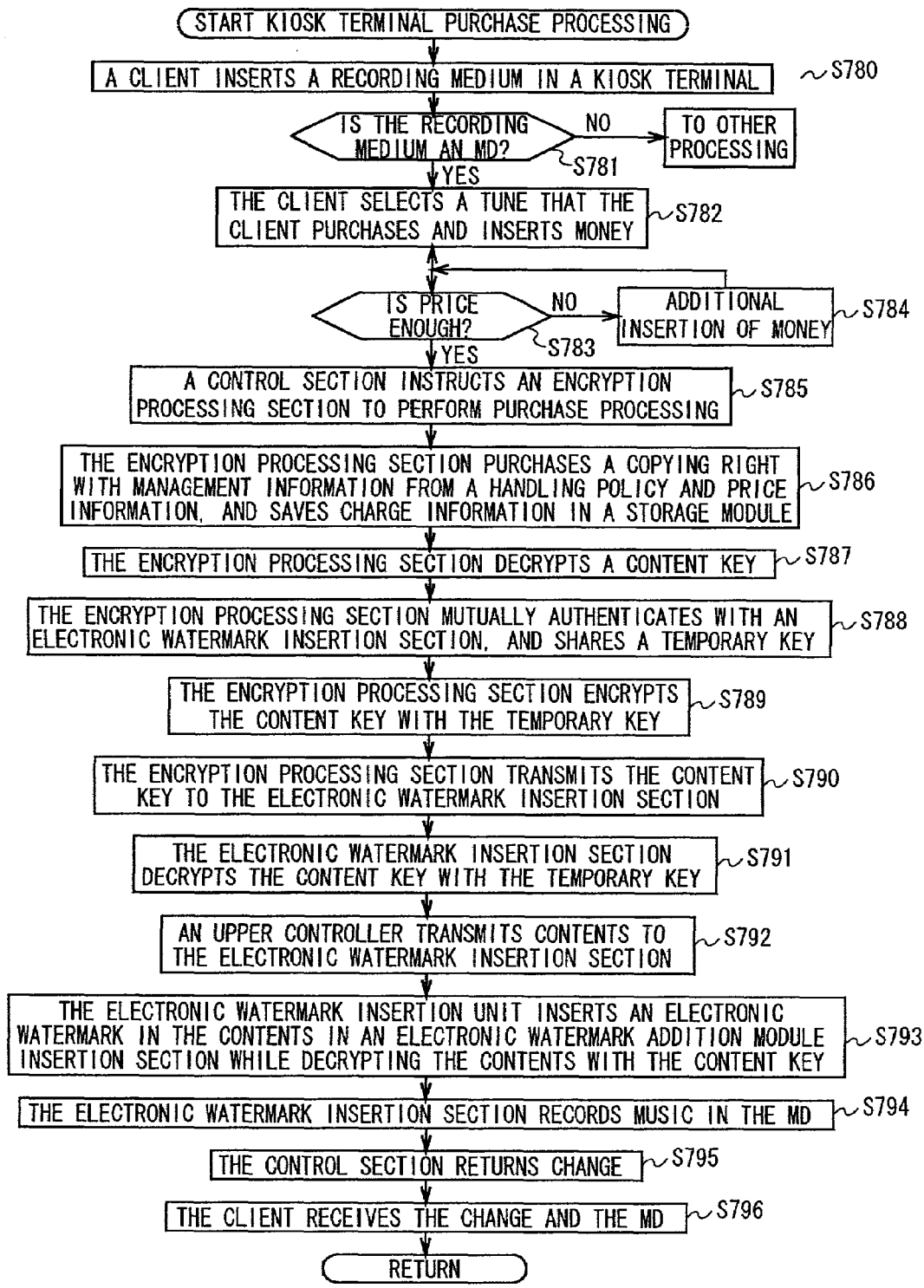
FIG. 102 is a flowchart showing a purchasing procedure of a KIOSK terminal.
Figure 103:
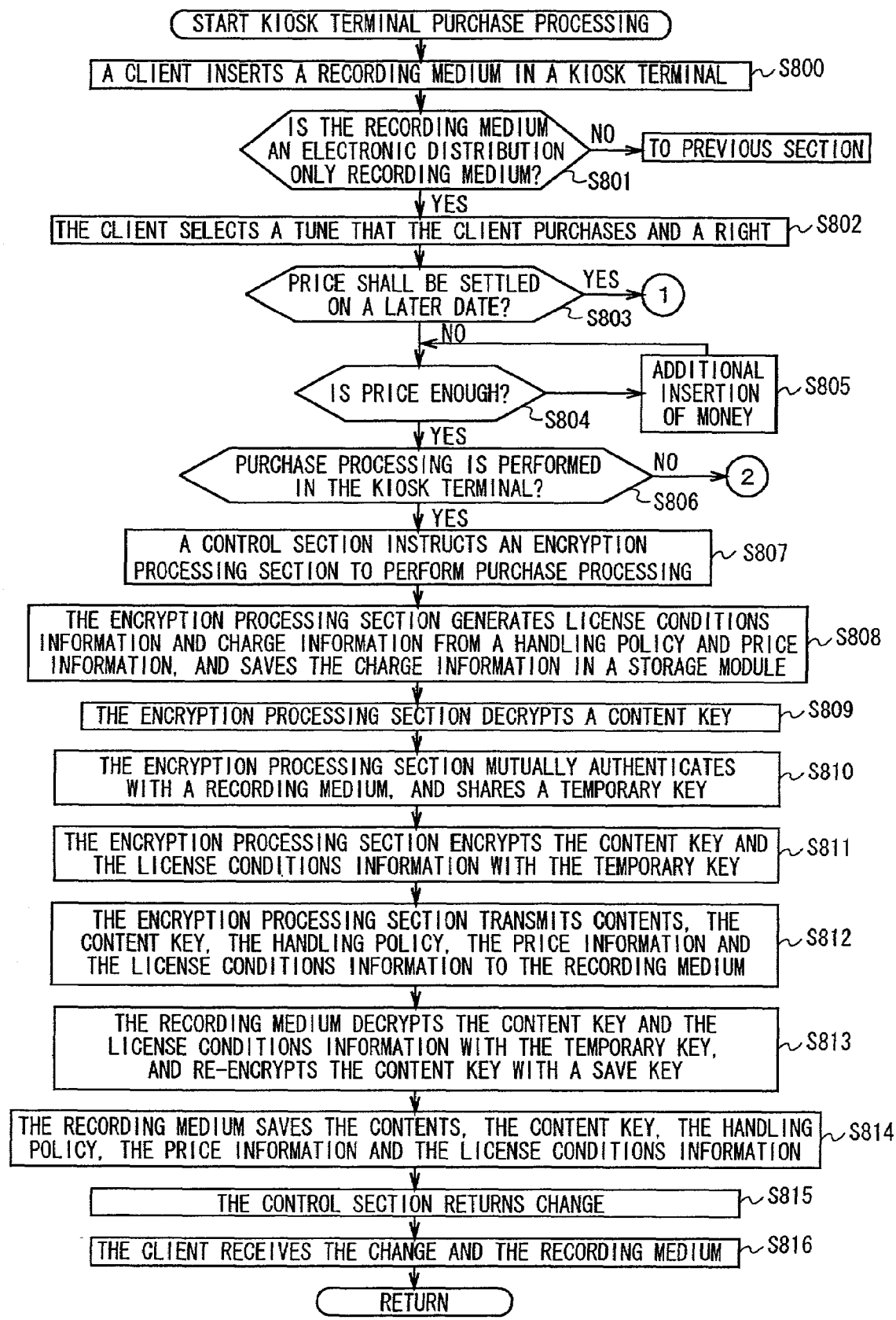
FIG. 103 is a flowchart showing a purchasing procedure of a KIOSK terminal.
Figure 104:
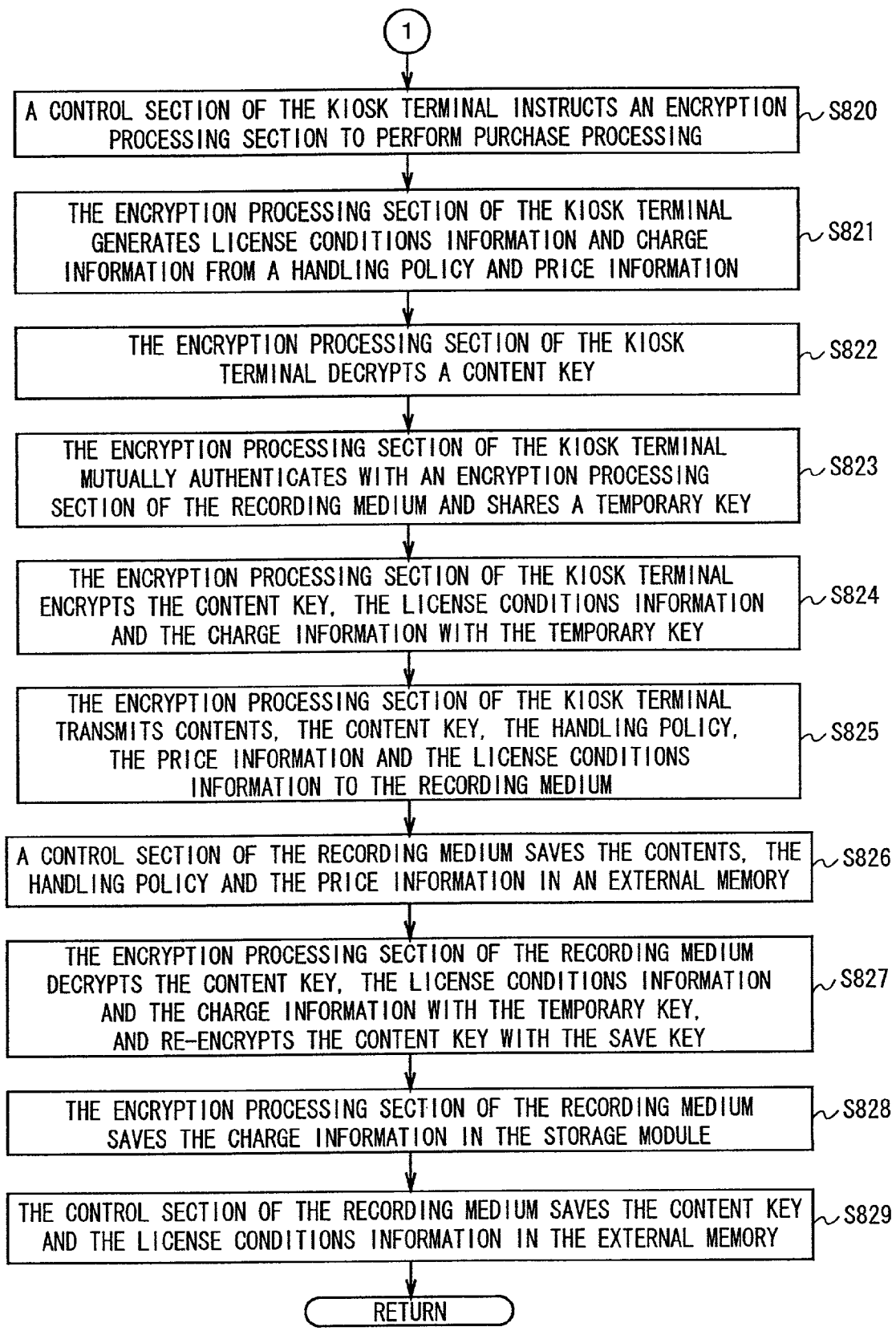
FIG. 104 is a flowchart showing a purchasing procedure of a KIOSK terminal.
Figure 105:
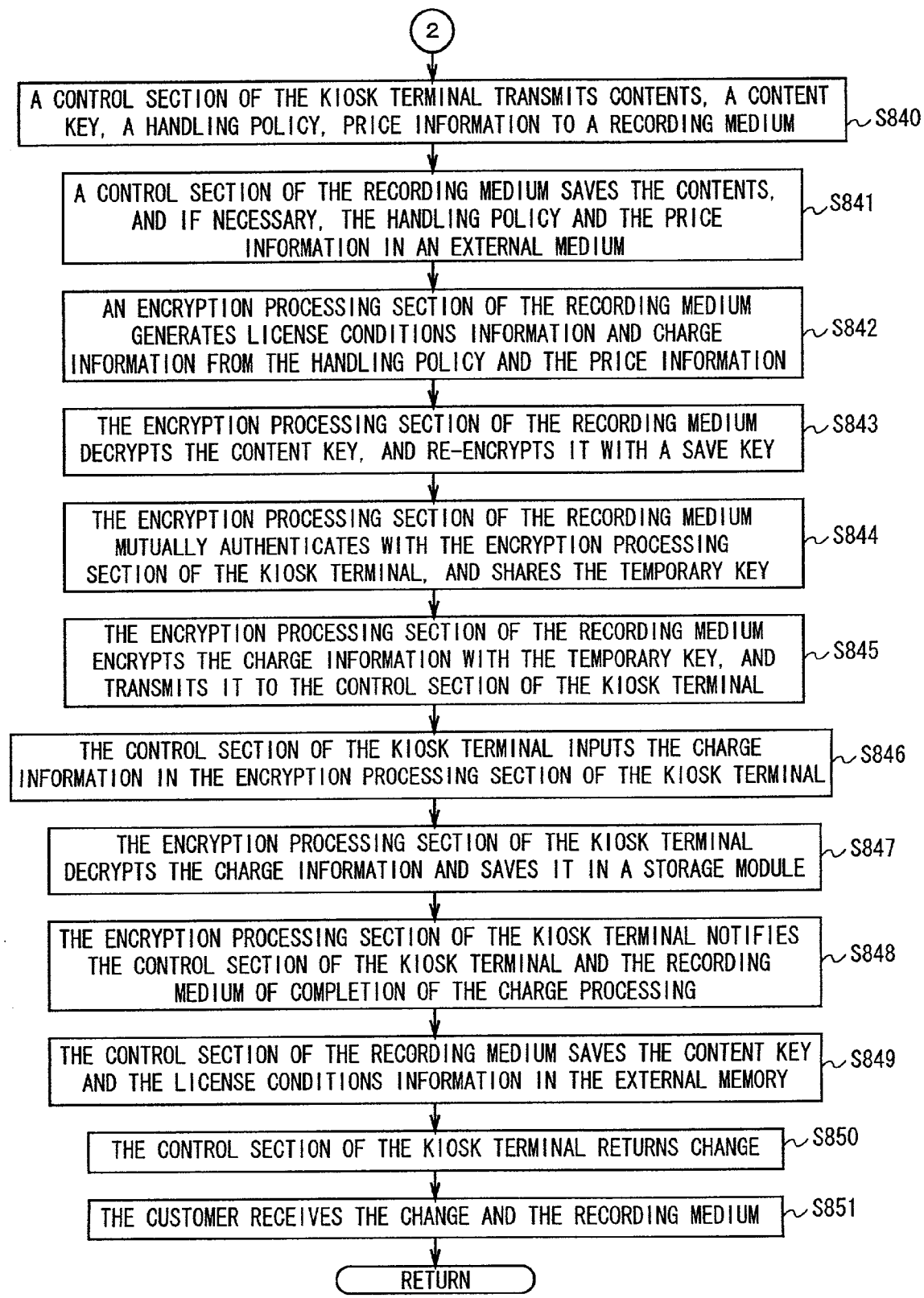
FIG. 105 is a flowchart showing a purchasing procedure of a KIOSK terminal.
Figure 106:
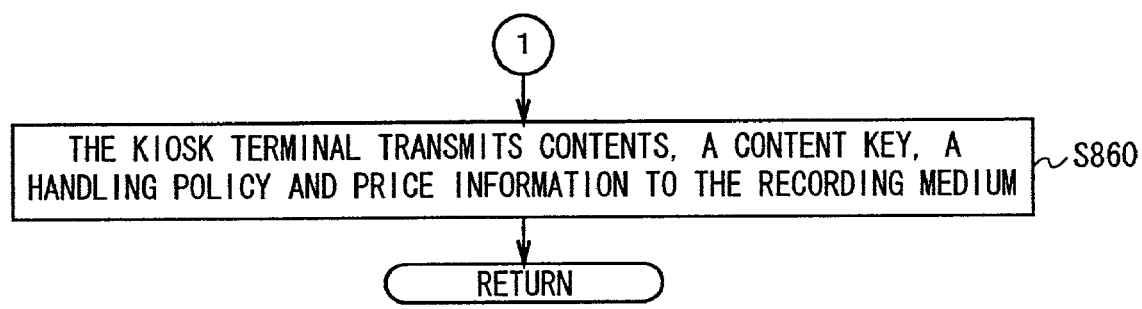
FIG. 106 is a flowchart showing another example of a purchasing procedure of a KIOSK terminal.

In addition, since an information provider holding the KIOSK terminal 332 (the service provider 3 in FIG. 1) provides price information, and therefore content provision fees are distributed to the information provider in any of the systems in FIGS. 103, 105 and 106, these systems are not substantially different from those in FIGS. 101, 102 and 104 in which money is directly collected.

(11) Provision of Contents to be an Album in a KIOSK Terminal 332

In addition to such a configuration, in the case of the information provision apparatus 330, keyword information such as an artist, gender of the artist, a type of a tune (enka, rock'n roll, etc.), a season imagined from a tune, a location (sea, mountain, etc.), a time of a day (evening, morning, etc.), and the like that are generated by the information provider owning the KIOSK terminal 332 generated with respect to contents to be saved in the hosting server 331 is saved in the KIOSK terminal server 357 of the KIOSK terminal 332. Incidentally, as another example, in some cases, the content provider 2 generates this keyword information and saves it in a server 342 that is a content server in the hosting server 331 or the KIOSK terminal server 357.

In addition, various kinds of provision information (e.g., a commercial, content information, etc.) generated by the information provider that is different for each content or keyword (not necessarily different) is saved in the KIOSK terminal server 357 of the KIOSK terminal 332. Incidentally, the content provider 2 may generate the provision information and save it in the server 342 of the hosting server 331 and the KIOSK terminal server 357 of the KIOSK terminal 332, or provision information generated by the content provider 2 or received from the information provider may be collected as one content by linking it to contents. (That is, provision information is embedded in the top, middle, last or the like of music (contents) so that the music and the provision information cannot easily be separated as one tune.)

The upper controller 351 that is selecting means and storing means of the KIOSK terminal 332 prepares a data table in which a plurality of contents saved in the server 342 of the hosting server 331 are categorized based on the keyword information, and saves the prepared data table in the KIOSK terminal server 357. Incidentally, an ID of contents corresponding for each category are registered in the data table. In addition, the data table may be generated by the control section 341 of the hosting server 331, and saved in the server 342 or the KIOSK terminal server 357. Moreover, if the data table is saved in the server 342, the control section 341 of the hosting server 331 transmits keyword information for the contents to the KIOSK terminal 332 via the communication section 340, thereby saving the keyword information in the KIOSK terminal server 357 by the upper controller 351 in the KIOSK terminal 332.

Then, in the KIOSK terminal 332, if a customer inserts an electronic distribution only recording medium 334, the upper controller 351 reads out a keyword corresponding to contents that can be applied purchase processing from the KIOSK terminal server 357, and notifies the customer of the keyword via the displaying means 356. Incidentally, the upper controller 351 may at this time notifies the customer of the keyword for the contents to which purchase processing can be applied read out from the KIOSK terminal server 357 together with information on a tune name or a price for the contents via the displaying means 356.

When the customer selects and designates, for example, a keyword (the number of keywords may be plural) corresponding to desired contents and a number contents to which the customer wishes to apply purchase processing, the inputted data s transmitted to the upper controller 351 as a signal, and the upper controller 351 having received the signal generates a random number by a random number generation program (not shown) held by itself based on the number of contents designated by the customer, or causes the random number generation unit 372 that is random number generating means to generate a random number by controlling the control section 360 of the encryption processing section 352. Incidentally, in some cases, the upper controller 351 transmits the keyword and the random number to the hosting server 331 via the communication section 350. In addition, since the random number is used for selecting contents at random, all the contents belonging to a category of a keyword may be applied purchase processing, or contents belonging to a category of a keyword may be applied purchase processing in the order of appearing on the data table without forcing to generate a random number.

The upper controller 351 retrieves a data table in the KIOSK terminal server 357 based on the random number data previously generated and the keyword inputted via the inputting means 355. Then, the upper controller 351 arbitrarily selects an ID of contents in the number designated by the customer based on the random number data out of a plurality of IDs belonging to a category corresponding to the keyword, and reads out contents corresponding to the selected ID of the contents from the hosting server 331.

In addition, as another example, the control section 341 of the hosting server 331 arbitrarily selects an ID of contents in the number designated by the customer based on the random number data out of a plurality of IDs of contents belonging to a category corresponding to the keyword by retrieving the data table in the server 342 based on the random number data and the keyword transmitted from the KIOSK terminal 332, reads out contents corresponding to the selected ID of the contents from the server 342, and at the same time, transmits read out each content to the KIOSK terminal 332 via the communication section 340.

In this way, the KIOSK terminal 332 executes the above-mentioned purchase processing for FIGS. 103 to 105 and FIG. 106 with respect to the plurality of contents transmitted from the hosting server 331, and records each of the contents altogether in the external memory 123 that is a recording medium via the external memory control section 130 that is a recording medium in the electronic distribution only recording medium 334. Thus, the KIOSK terminal 332 can easily make an album by recording a plurality of tunes altogether that belong to a category a customer prefers in the electronic distribution only recording medium 334.

In addition, in the purchase processing in the KIOSK terminal 332, the KIOSK terminal 332 records the above-mentioned provision information and contents (or, as described above, the provision information and the contents may behave like one content) in the external memory 123 altogether via the external memory control section 130 of the electronic distribution only recording medium 334. Upon reproducing the contents, in order to have a customer listen to the provision information, a reproduction order of the contents can be provided for, for example, a limitation clause may be added to the license conditions information. Then, in the purchase processing of the contents, the customer can select whether to add or not to add provision information, and if the provision information is added, purchase price can be lowered or free in return for it. Thus, the customer can obtain a utilization right of contents inexpensively than usual, and even in such a case, the content provider 2 and the service provide 3 (in this embodiment, a owner of the KIOSK terminal 332) can obtain a profit from provision information fees (so called commercial fees) via the electronic distribution service center 1.

In addition, in the KIOSK terminal 332, in the case in which a plurality of contents are recorded as an album in the electronic distribution only recording medium 334, the control section 360 of the encryption processing section 352 selects, for example, a reproduction right with a number of times limitation that can reproduce contents only once as a utilization right for these contents. Moreover, when preparing license conditions information, the control section 360 of the encryption processing section in the KIOSK terminal 332 or the control section 124 of the encryption processing section 122 in the electronic distribution only recording medium 334 stores an ID that shows that the contents were recorded in the KIOSK terminal 332 as an ID of the service provider 3 that is stored in the license conditions information. For example, if an Id of the service provider 3 is 64 bits, the upper 16 bits are designated as a group number and the lower 48 bits are designated as a serial number, and as an ID allocated to the KIOSK terminal 332 that a single information provider owns, an ID with a group number identical to all the apparatuses and a serial number of the lower 48 bits is different for each apparatus. Then, in order to identify whether or not the contents recorded in the electronic distribution only recording medium 334 are those recorded in the KIOSK terminal 332, the contents is identified by a group number of an ID of a service provider included in license conditions information. (That is, a group number is allocated for each information provider.)

Then, in the KIOSK terminal 332, if the customer inserts the electronic distribution only recording medium 334 again and requests to record a plurality of contents as an album, the control section 360 of the encryption processing section 352 takes out license conditions information from the electronic distribution only recording medium 334, and retrieves the contents that were recorded in the KIOSK terminal 332 and were already reproduced based on the license conditions information.

In this way, in the KIOSK terminal 332, new contents can be recoded that deletes (overwrites) were recorded in the KIOSK terminal 332 of the information provider and already reproduced without deleting contents that were recorded by the KIOSK terminal 332 of the identical information provider but have not reproduced at all or contents that were recorded by a KIOSK terminal of another information provider different from the KIOSK terminal 332 of the identical information provider in the electronic distribution only recording medium 334.

In the above-mentioned configuration, the electronic music distribution system 10 prepares a data table for categorizing a plurality of contents saved in the server 342 of the hosting server 331 by the upper controller 351 of the KIOSK terminal 332, and saves the data table in the KIOSK terminal server 357.

Then, when the customer who has inserted the electronic distribution only recording medium 334 in the KIOSK terminal 332 designates a keyword indicating the customer's own preference, a number of contents to be purchased altogether, and whether or not to insert/not insert provision information (commercial, etc.), if necessary, the KIOSK terminal 332 generates a random number data based on the designated number of contents, specifies IDs of many contents belonging to a category of the designated keyword from the data table, and at the same time, arbitrarily selects IDs of the designated number of contents based on the random number data from the IDs of the specified contents, reads out contents corresponding to the selected IDs of the contents from the hosting server 331, and records the arbitrarily selected plurality of contents and the provision information (commercial, etc.), if necessary, altogether in the electronic distribution only recording medium 334.

Therefore, it is possible to record a plurality of contents (tunes) belonging to a category according to a preference of a customer altogether in the electronic distribution recording medium 334 to easily make an album. In addition, since a random number is used for selection of contents, even if contents are recorded again in the electronic distribution only recording medium 334, a customer can listen to different contents with relatively high probability, and it is also possible to make it unclear which tunes are recorded, therefore, fun of listening to music can be provided to a customer.

Moreover, since a number of reproduction times of contents and an apparatus used for recording the contents are managed in the electronic distribution recording medium 334, if the contents are recorded again in the electronic distribution only recording medium 334 in the KIOSK terminal 332, inadvertent deletion of contents that were recorded in the KIOSK terminal 332 but have not reproduced at all or contents recorded by an apparatus different from the KIOSK terminal 332 can be prevented.

According to the above-mentioned configuration, in the information provision apparatus 330, since a number of contents saved in the hosting server 331 are categorized and managed based on a predetermined keyword by the KIOSK terminal 332, when a customer utilizing the KIOSK terminal 332 designates a keyword indicating the customer's own preference and a desired number of contents, contents in the number designated by the customer are arbitrarily selected, and the selected contents are read out from the hosting server 331 and recorded in the electronic distribution only recording medium 334, the plurality of contents belonging to a category according to the customer's preference can be recorded altogether, thus a plurality of contents according to the customer's preference can be easily recorded.

In addition, a customer can obtain a utilization right of contents inexpensively by saving provision information with contents altogether.

Further, although the information provision apparatus 330 that is an information recording apparatus is configured by connecting the hosting server 331 and the KIOSK terminal 332 by a special purpose cable, a communication satellite or the like in the electronic music distribution system 10, it may be configured by providing the hosting server 331 integrally in the KIOSK terminal 332, or providing the hosting server 331 inside the content provider 2.

In addition, as a medium used as a recording medium 333, various kinds of media other than an MD (trademark) can be applied if a copying limitation can be added as in a medium corresponding to SCMS.

Moreover, although the KIOSK terminal 332 is installed in a simple retail store, it can be installed in various places such as in a large scale store, a public facility, or the like.

Moreover, as a utilization right of purchasable contents, not only a number of times right that can only be reproduced once but also a utilization right whose effective period is limited is envisaged, and when applying purchase processing in the KIOSK terminal 332, contents whose effective period has expired can be deleted.

Furthermore, although a customer is allowed to selected whether or not to attach provision information to contents, a customer may be forced to attach provision information to all contents depending on the contents.

(12) Purchase Prohibition Processing of Contents

Here, a purchase prohibition list preparation section (not shown in FIG. 2) is provided in the electronic distribution service center 1 (FIG. 2) that is a list transmission apparatus, and the purchase prohibition list preparation section prepares a purchase prohibition list of contents indicated in FIG. 108. An ID of contents being objects of purchase prohibition, an ID of a content provider being an object of utilization suspension, and an ID of a service provider being an object of utilization suspension are stored in the purchase prohibition list of contents, and an electronic signature of the electronic distribution service center 1 is attached to the entire list.

In the purchase prohibition list of contents, the ID of contents being an object of purchase prohibition indicates contents that have become objects of purchase prohibition because a defect (an error) has occurred in data, provision of contents has been suspended due to some reason by a provider of contents (a content provider 2 and a service provider 3), or the like. In addition, the ID of a content provider and the ID of the service provider being objects of utilization suspension indicate a content provider 2 and a service provider 3 that have become unable to be utilized for purchase of contents because they have been deprived of a sales right of contents due to illegal distribution of contents being objects of purchase prohibition, they are unable to distribute contents due to bankruptcy or the like.

The electronic distribution service center 1 transmits a purchase prohibition list of an apparatus (in this embodiment, the home server 51 that is an online apparatus) in the user home network 5 connected online to the electronic distribution service center 1 via a predetermined transmitting means (not shown).

The home server 51 receives the purchase prohibition list of contents transmitted from the electronic distribution service center 1 by the communication section 61, and the upper controller 62 forwards the purchase prohibition list to the encryption processing section 65. After verifying an electronic signature attached to the purchase prohibition right in the signature verification unit 115, the encryption processing section 65 saves the purchase prohibition list in, for example, the mass storage section 68 that is a list holding means via the upper controller 62 if the purchase prohibition list is not tampered. Incidentally, the home server 51 may save the purchase prohibition list transmitted from the electronic distribution service center 1 in the mass storage section 68 without verifying the signature attached to it, and verify the signature when using the purchase prohibition list in purchase processing, or the like.

Then, when a content provider secure container and a service provider secure container are transmitted from the content provider 2 via the service provider 3, the upper controller 62 forwards, for example, a handling policy included in the content provider secure container or price information included in the service provider secure container to the encryption processing section 65, and at the same time, reads out a purchase prohibition list of contents from the mass storage section 68 and forwards it to the encryption processing section 65.

The control section 91 that is take-in suspension processing means of the encryption processing section 65 retrieves information in the purchase prohibition list of contents using an ID of the content provider indicating a provider of contents included in the handling policy or the price information, an ID of the service provider, or and an ID of contents to be provided. Then, if the ID of the content provider included in the handling policy or the price information, the ID of the service provider, or and the ID of contents exists in the purchase prohibition list of contents, the control section 91 does not purchase the contents, and executes purchase processing only if the ID of the content provider included in the handling policy or the price information, the ID of the service provider, or and the ID of contents does not exist in the purchase prohibition list.

In this way, even if contents being objects of purchase prohibition are inadvertently transmitted, the home server 51 can prevent purchase of the contents, and at the same time, prevent purchase of contents transmitted from the content provider 2 or the service provider 3 that is an object of utilization suspension. Incidentally, when receiving a purchase prohibition list of contents, the home server 51 can prohibit purchase of contents based on a regular purchase prohibition list prepared in the electronic distribution service center 1 by verifying an electronic signature of the purchase prohibition list.

In addition, in the electronic distribution service center 1, each time new contents becomes object of purchase prohibition other than the contents registered in the purchase prohibition list of contents, or a new content provider 2 or service provider 3 becomes an object of utilization suspension other than the content provider 2 or the service provider 3 registered in the purchase prohibition list, the purchase prohibition list of contents is updated and the updated purchase prohibition list is transmitted to the home server 51.

Thus, each time a purchase prohibition list is transmitted from the electronic distribution service center 1, the home server 51 updates a purchase prohibition list in the mass storage section 68. Incidentally, if the purchase prohibition list is updated, the electronic distribution service center 1 is made such that a receiving side of a purchase prohibition list can identify if the purchase prohibition list is the one newly updated by attaching a date of the update (update date), a number (serial number), or the like to the purchase prohibition list.

Here, a fixed apparatus, a portable apparatus, an electronic distribution only recording medium, and the like (these are collectively hereinafter referred to as offline apparatuses) that are not connected online to the electronic distribution service center 1 are provided in the user home network 5, and the home server 51 transmits a purchase prohibition list of contents to an offline apparatus when the offline apparatus is connected, and causes the offline apparatus to save the purchase prohibition list. Incidentally, since an offline apparatus is not always connected to the home server 51, even if a purchase prohibition list of contents is updated in the electronic distribution service center 1, a purchase prohibition list held inside the purchase prohibition list may not be updated accordingly.

Thus, if an offline apparatus is connected, the home server 51 compares purchase prohibition lists held by them, and if the purchase prohibition list held by the home server 51 is new than the purchase prohibition list held by the offline apparatus, transmits its purchaser prohibition list to the offline apparatus, and causes the offline apparatus to update it.

In addition, if offline apparatuses are connected each other, as in the case in which the home server 51 and an offline apparatus are connected, the home server 51 compares purchase prohibition list held by them, and as a result, an offline apparatus holding the latest purchase prohibition list among the purchase prohibition lists held by them transmits the purchase prohibition list to the other offline apparatus and causes the other offline apparatus to update the purchase prohibition list, and in this way, each offline apparatus update a purchase prohibition list even if it is not connected to the home server 51.

Incidentally, if purchased contents are prohibited purchasing after its purchase or a provider of purchased contents (a content provider 2 and a service provider 3) becomes an object of utilization suspension after purchase of the contents, each apparatus (a home server 51 and an offline apparatus) in the user home network 5 does not prohibit utilization of the contents that are prohibited purchasing after its purchase or contents purchased from the provider (the content provider 2 and the service provider 3) that has become an object of utilization suspension before the utilization suspension, but prohibits redistribution and repurchase of the contents.

Therefore, when redistributing and repurchasing already purchased contents, each apparatus (the home server 51 and the offline apparatus) in the user home network 5 detects whether or not an ID of contents that are objects of the redistribution and the repurchase is registered in the purchase prohibition list, and if the ID of contents that are objects of the redistribution and the repurchase is registered in the purchase prohibition list, does not perform the redistribution and the repurchase of the contents.

In addition, at the time of such redistribution and repurchase, each apparatus (the home server 51 and the offline apparatus) in the user home network 5 detects whether or not an ID of a content provider and an ID of a service provider included in a handling policy and price information corresponding to contents that is object of the redistribution and the repurchase are registered in the purchase prohibition list, and if the ID of a content provider and the ID of a service provider (indicating a provider of the contents) corresponding to contents that is object of the redistribution and the repurchase are registered in the purchase prohibition list, does not perform redistribution and repurchase of the contents.

In addition, although, at the time of redistribution and repurchase, each apparatus (the home server 51 and the offline apparatus) detects whether or not contents that are objects of the redistribution and the repurchase is prohibited purchasing and whether or not the provider of the contents (the content provider 2 and the service provider 3) has become an object of utilization suspension based on the purchase prohibition of contents, if the purchase prohibition list then held is not the latest one, even if the contents that is objects of the redistribution and the repurchase are prohibited repurchase in the latest purchase prohibition list, possibly transmits them to the other apparatus without knowing it.

Thus, if contents are redistributed and repurchased, each apparatus (the home server 51 and the offline apparatus) registers an ID of the redistributed and repurchased contents, an ID of a content provider and an ID of a service provider indicating providers of the contents, and an ID of an encryption processing section provided in an apparatus of a redistributor/repurchaser of the contents in a redistribution/repurchase list of contents shown in FIG. 109, and saves the redistribution/repurchase list in, for example, a mass storage section. Incidentally, each time redistribution and repurchase of contents are performed, each apparatus updates and saves a redistribution/repurchase list.

Then, when receiving a purchase prohibition list of contents from another apparatus (i.e., when the home server receives a purchase prohibition list from the electronic distribution service center 1, and when the offline apparatus receives a purchase prohibition list from the home server 51 or another offline apparatus), each apparatus (the home server 51 and the offline apparatus) retrieves information in the redistribution/repurchase list based on the ID of the contents that are objects of purchase prohibition, the ID of the content provider and the ID of the service provider that are objects of utilization suspension, which are registered in the purchase prohibition list.

As a result, if the ID of the contents that are objects of purchase prohibition, the ID of the content provider and the ID of the service provider that are objects of utilization suspension are registered in the redistribution/repurchase list (in other words, if the contents that has become objects of purchase prohibition and the contents purchased from the provider (the content provider 2 and the service provider 3) that has become an object of utilization suspension are redistributed and repurchased), each apparatus (the home server 51 and the offline apparatus) determines that an apparatus (a home server 51 or an offline apparatus) of the other party that redistributed and repurchased the contents that have become objects of purchase prohibition or the contents purchased from the provider (the content provider 2 and the service provider 3) that has become an object of utilization suspension is likely to have an old purchase prohibition list before update, and transmits a purchase prohibition list to the other party's apparatus (i.e., when the other party's apparatus is connected) based on the ID of the corresponding encryption processing section in the redistribution/repurchase list and causes the other party's apparatus to update its purchase prohibition list.

Figure 110:
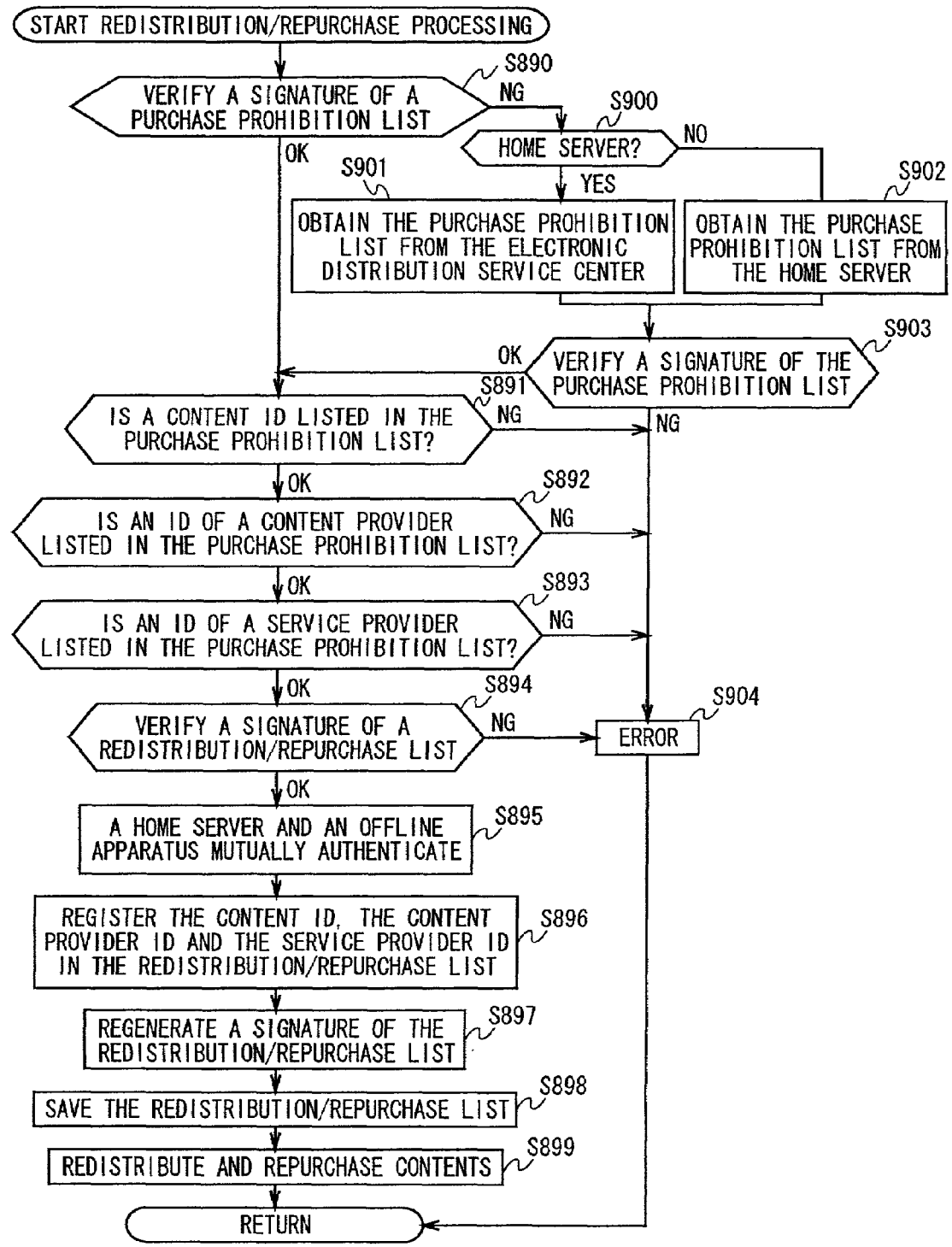
FIG. 110 is a flowchart showing a procedure of contents redistribution/repurchase.

Here, redistribution processing and repurchase processing of contents performed among apparatuses of the user home network 5 will be described in the case of the home server 51 with reference to a flow chart shown in FIG. 110. That is, in step S890, the upper controller 62 in the home server 51 reads out a purchase prohibition list of contents from the mass storage section 68, causes the signature verification unit 115 of the encryption processing section 65 to verify a signature of this purchase prohibition list, and as a result, if the purchase prohibition list is a correct data, the processing proceeds to step S891.

In step S891, the upper controller 62 retrieves information in the information prohibition list based on an ID of contents that are objects of the redistribution processing and the repurchase processing, verifies whether or not the ID of contents that are objects of the redistribution processing and the repurchase processing is registered in the purchase prohibition list (i.e., whether or not contents that are objects of redistribution and repurchase are objects of purchaser prohibition), and if the ID of the contents is not registered in the purchase prohibition list (i.e., the contents that are objects of the redistribution and the repurchase are not objects of purchase prohibition), the processing proceeds to step S892.

In step S892, the upper controller 62 retrieves information in the purchase prohibition list based on an ID of a content provider indicating a provider of contents that are objects of redistribution and repurchase (an ID of a content provider stored in a handling policy), verifies whether or not the ID of the content provider is registered in the purchase prohibition list (i.e., whether or not a content provider 2 that is a provider of the contents that are objects of the redistribution and the repurchase is an object of utilization suspension), and if the ID of the content provider is not registered in the purchase prohibition list (i.e., the content provider 2 that is a provider of the contents that are objects of the redistribution and the repurchase is not an object of utilization suspension), the processing proceeds to step S893.

In step S893, the upper controller 62 retrieves information in the purchase prohibition list based on an ID of a service provider indicating a provider of contents that are objects of the redistribution and the repurchase (an ID of a service provider stored in price information), verifies whether or not the ID of the service provider is registered in the purchase prohibition list (i.e., whether or not a service provider 3 that is a provider of contents that are objects of the redistribution and the repurchase), and if the ID of the service provider is not registered in the purchase prohibition list (i.e., the service provider 3 that is a provider of the contents that are objects of the redistribution and the repurchase is not an object of utilization suspension), the processing proceeds to step S894.

In step S894, the upper controller 62 reads out a redistribution/repurchase list of contents from the mass storage section 68 and forwards it to the control section 91 of the encryption processing section 65, and the control section 91 verifies a signature attached to the redistribution/repurchase list using the signature verification unit 115, and if the redistribution/repurchase list is correct data, the processing proceeds to step S895.

In step S895, when a public key certificate of an offline apparatus that is a counterpart of redistribution processing and repurchase processing, is sent from the offline apparatus, the upper controller 62 receives this by the communication section 61, and forwards the received public key certificate to the control section 91 of the encryption processing section 65. Then, the control section 91 performs mutual authentication with the counterpart offline apparatus by this public key certificate using the mutual authentication module 95, and as a result, when the counterpart offline apparatus is authenticated, the processing proceeds to step S896, where the control section 91 additionally registers an ID of an encryption processing section in the offline apparatus included in the public key certificate (the public key certificate used for the mutual authentication in step S895) in the previously verified redistribution/repurchase list of contents, and at the same time, additionally registers a corresponding ID of contents that are objects of the redistribution and the repurchase, ID of a content provider and ID of a service provider, and the processing proceeds to step S897.

In step S897, the control section 91 regenerates a signature of the redistribution/repurchase list obtained in step S896 using the signature generation unit 14, forwards the redistribution/repurchase list whose signature was regenerated to the mass storage section 68 via the upper controller 62, and saves the redistribution/repurchase list in the mass storage section 68 in the following step S898.

Then, in step S899, the upper controller 62 redistributes and repurchases the contents that are objects of the redistribution and the repurchase.

Incidentally, when the upper controller 62 determines that data is not correct because the purchase prohibition list is tamper or the like in step S890, the processing proceeds to step S900, where the upper controller 62 detects whether or not an apparatus in which the upper controller 62 is provided is the home server 51, and in this case, since the apparatus in which the upper controller 62 is provided is the home server 51, the processing proceeds to step S901, where the upper controller 62 obtains a purchase prohibition list again from the electronic distribution service center 1.

In addition, in step S900, if the apparatus executing the redistribution and the repurchase of contents is an offline apparatus in step S900, the processing proceeds to step S902, where the apparatus executing the redistribution and the repurchase of the contents obtains a purchase prohibition list again from an apparatus that is a counterpart of the redistribution processing and the repurchase processing of the contents (the home server 51 or another apparatuses).

Then, when having obtained the purchase prohibition list in this way, the home server 51 and the offline apparatus verifies a signature of the purchase prohibition list, and if the purchase prohibition list is correct data, the processing proceeds to step S891.

As described above, if an ID of contents that are objects of redistribution and repurchase, an ID of a content provider indicating a provider of the contents and an ID of a service provider do not exist in a purchase prohibition list, the home server 51 determines that the contents of the redistribution and the repurchase are not objects of purchase prohibition and are not those provided from a content provider 2 and a service provider 3 that are objects of utilization suspension, and redistributes and repurchases the contents that are objects of the redistribution and the repurchase with a counterpart offline apparatus. In addition, at this moment, the home server 51 updates a redistribution/repurchase list of contents and saves it in the mass storage section 68.

On the other hand, if an ID that are objects of redistribution and repurchase are registered in a purchase prohibition list in step S891, if an ID of a content provider indicating a provider of the contents is registered in the purchaser prohibition list in step S892, or if an ID of a service provider indicating a provider of the contents is registered in the purchaser prohibition list in step S893, the upper controller 62 in the home server 51 determines that the contents that are objects of the redistribution and the repurchase are objects of purchase prohibition or that the contents are those provided from a content provider 2 or a service provider 3 that is object of utilization suspension, executes error processing in step S904, thereby suspends the redistribution and the repurchase of the contents that are objects of redistribution and repurchase.

Incidentally, if it is determined that a redistribution/repurchase list in the step 894 of contents is incorrect data because it is tampered or the like as a result of verification of the redistribution/repurchase list in the step 894, and if it is determined that a purchase prohibition list is incorrect data because it is tampered or the like as a result of verification of a signature of the purchase prohibition list of contents in step S902, the upper controller 62 executes error processing and suspends redistribution and repurchase of the contents that are objects of the redistribution and the repurchase.

Thus, even if purchased contents become objects of purchase prohibition or a provider of the contents (a content provider 2 and a service provider 3) becomes an object of utilization suspension, the home server 51 can prohibit redistribution and repurchase of the contents. Incidentally, other offline apparatuses excluding the home server 51 in the user home network 5 can execute redistribution/repurchase processing as the home server 51 does, thereby prohibiting redistribution and repurchase of purchased contents that has become objects of purchase prohibition or contents that were purchased from a provider (a content provider 2 and a service provider 3) of contents that have become objects of utilization suspension.

Further, in the home server 51, when a purchase prohibition list of contents transmitted by the electronic distribution service center 1 via a predetermined transmission means is transmitted by the communication section 61, the upper controller 62 forwards the purchase prohibition list of the contents to the encryption processing section 65, and causes the signature verification unit 115 of the encryption processing section 65 to verify the signature. Subsequently, the upper controller 62 reads out a redistribution/repurchase list of contents from the mass storage section 68, transmits it to the encryption processing section 65, and causes the signature verification unit 115 of the encryption processing section 65 to verify the signature.

Then, if an ID of contents that are objects of purchase prohibition registered in a purchase prohibition list of contents is registered in a redistribution/repurchase list, the upper controller 62 transmits the purchase prohibition list to a counterpart offline apparatus or the like that has redistributed and repurchased the contents that are objects of purchase prohibition, thereby causing the counterpart offline apparatus to update the purchase prohibition list. Similarly, if an ID of a content provider or an ID of a service provider that is an object of utilization suspension registered in the purchase prohibition list is registered in the redistribution/repurchase list of contents, the upper controller 62 transmits the purchase prohibition list to a counterpart offline apparatus or the like that has redistributed or repurchased contents purchased from a content provider 2 or a service provider 3 that has become an object of utilization suspension, thereby causing the counterpart offline apparatus to update the purchase prohibition list.

Thus, between the home server 51 connected online to the electronic distribution service center 1 and an offline apparatus, by executing retrieval processing in a redistribution/repurchase list based on a purchase prohibition list each time the purchase prohibition list is obtained, even if contents already redistributed and repurchased becomes objects of purchase prohibition or a provider of the contents (a content provider 2 and a service provider 3) becomes an object of utilization suspension, it is possible to prevent the contents from being redistributed and repurchased again.

Incidentally, between offline apparatuses, by executing processing similar to the retrieval processing in a redistribution/repurchase list performed between the home server 51 and an offline apparatus, even if contents already redistributed and repurchased becomes objects of purchase prohibition or a provider of the contents (a content provider 2 and a service provider 3) becomes an object of utilization suspension, it is possible to prevent the contents from being redistributed and repurchased again.

In the above-mentioned configuration, the electronic music distribution system 10 prepares a purchase prohibition list of contents by the electronic distribution service center 1, and transmits the prepared purchase prohibition list to the home server 51 in the user home network 5 connected online to the electronic distribution service center 1. In addition, in the user home network 5, the home server 51 transmits the purchase prohibition list of contents to an offline apparatus not connected online to the electronic distribution service center 1, and at the same time, purchase prohibition lists held by offline apparatuses are compared with each other among the offline apparatuses at the time of communication, and if one is the purchase prohibition list updated later than the other, the apparatuses mutually hold this new purchase prohibition list.

Then, in the user home network 5, if contents are distributed from a content provider 2 via a service provider 3, or if contents are transmitted from another apparatus in the user home network 5, each apparatus (a home server 51 and an offline apparatus) determines whether or not the contents are objects of purchase prohibition and the content provider 2 and the service provider 3 that are providers of the contents are objects of utilization prohibition using a purchase prohibition list, and when the contents are objects of purchase prohibition or the content provider 2 and the service provider 3 are objects of utilization prohibition, suspends purchase of the contents.

Therefore, in such an electronic music distribution system 10, each apparatus (the home server 51 and an offline apparatus) in the user home network 5 can prevent contents that are objects of purchase prohibition or contents provided from a content provider 2 and/or a service provider 3 that are objects of utilization prohibition from being purchased.

In addition, in the electronic music distribution system 10, if contents redistributed and repurchased among apparatuses in the user home network 5 has become objects of purchase prohibition, or if a content provider 2 and a service provider 3 that are providers of the contents have become objects of utilization suspension, since the apparatuses transmit a purchase prohibition list to a counterpart apparatus that has executed the redistribution processing and the repurchase processing of the contents based on an ID of an encryption processing section in a redistribution/repurchase list of contents, diffusion of illegal contents from the counterpart apparatus to other apparatuses can be prevented.

According to the above-mentioned configuration, since a purchase prohibition list of contents is prepared in the electronic distribution service center 1, the purchase prohibition list is held by each apparatus (the home server 51 and an offline apparatus) in the user home network 5, and each apparatus in the user home network 5 suspends purchase of contents that are objects of purchase prohibition and contents transmitted from a content provider 2 and a service provider 3 that are objects of utilization prohibition based on the purchase prohibition list, in each apparatus in the user home network 5, purchase of the contents that are objects of purchase prohibition and the contents provide from the content provider 2 or the service provider 3 can be prevented, thus it is possible to realize an electronic music distribution system that is capable of substantially certainly preventing contents that are objects of provision prohibition to be utilized.

Incidentally, although an ID of contents that are objects of purchase prohibition, and IDs of a content provider 2 and a service provider 3 that are objects of utilization prohibition are respectively registered in a purchase prohibition list, it is sufficient that at least an ID of contents that are objects of purchase prohibition is registered.

In addition, although a purchase prohibition list of contents is held in a mass storage section in each apparatus in the user home network 5, the purchase prohibition list may be held in various kinds of storage media such as an external memory.

Moreover, although an encryption processing section determines whether or not contents to be purchased are objects of purchase prohibition based on a purchase prohibition list in each apparatus in the user home network 5, this determination processing may be executed by an upper controller.

Furthermore, in such an electronic music distribution system 10, when illegal contents flow into the system, if an ID of the contents can be found, purchase of the illegal content in an apparatus in the user home network 5 can be prevented.

Furthermore, if it is found that contents that re objects of purchase prohibition is held in an apparatus in the user home network 5 by verifying a purchase prohibition list, information indicating that redistribution and the repurchase of the contents are prohibited may be embedded in a predetermined region in license conditions information corresponding to the contents. Similarly, with respect to contents purchased from a content provider 2 and a service provider 3 that are object of utilization prohibition, information indicating that redistribution and the repurchase of the contents are prohibited may be embedded in a predetermined region in license conditions information corresponding to the contents. Thus, when redistributing and repurchasing contents, the contents that are objects of redistribution and repurchase can be easily identified by looking at corresponding license conditions information without retrieving through a purchase prohibition list of contents.

(13) Other Configuration of an Electronic Music Distribution System

Figure 111:
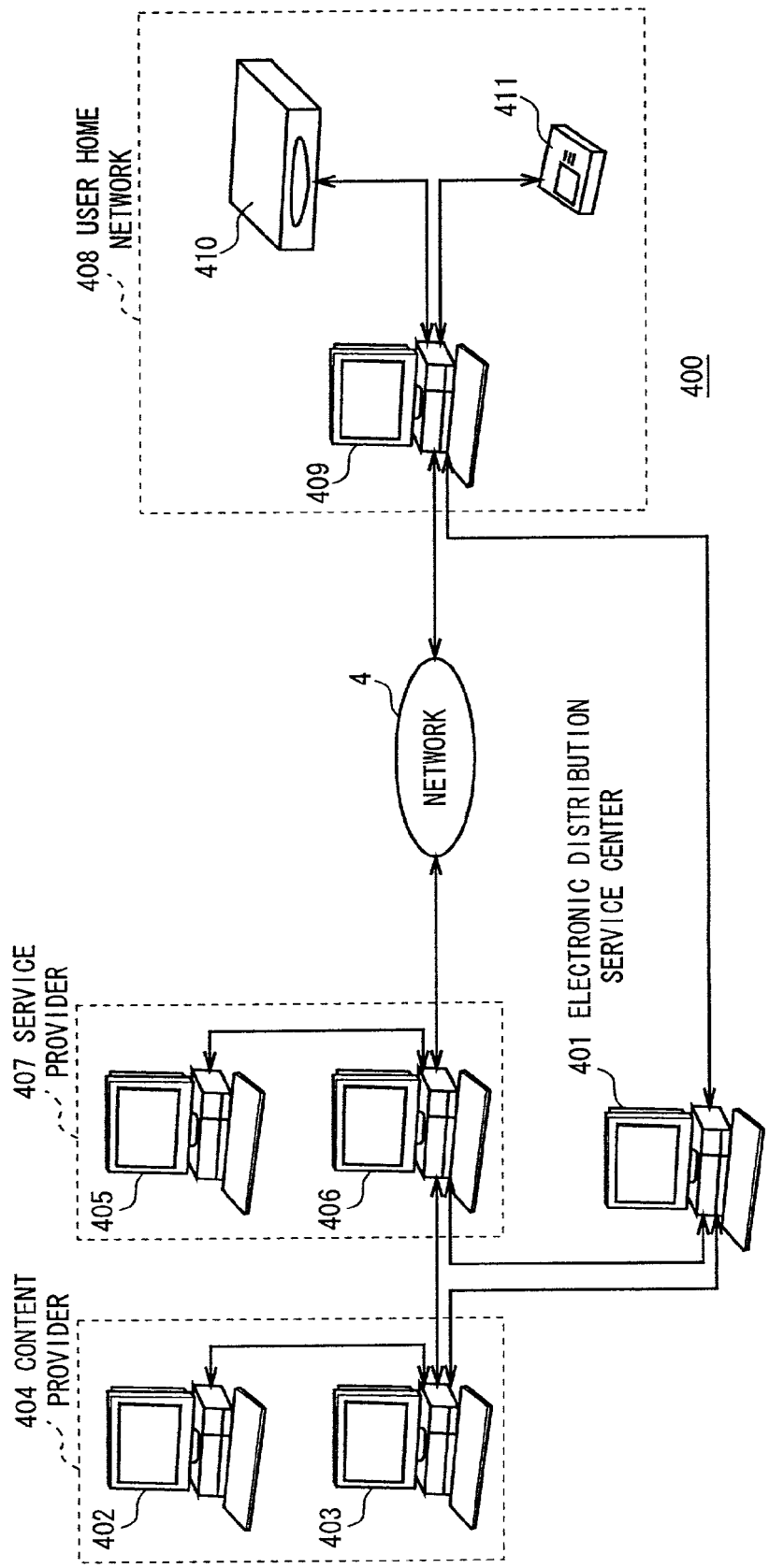
FIG. 111 is a block diagram showing another configuration of an electronic music distribution system.

FIG. 111 illustrates an electronic music distribution system 400 of another configuration. In such an electronic music distribution system 400, personal computers (hereinafter referred to as personal computers for signal processing) 403 and 406 for signal processing between a content provider 404 consisting of two personal computers 402 and 403 for a content server and for signal processing and a service provider 407 consisting of two personal computers 405 and 406 for a content server and for signal processing as well are connected to an electronic distribution service center 401 of a personal computer configuration.

In addition, the personal computer 403 for signal processing of the content provider 404 is connected to the personal computer 406 for signal processing of the service provider 407, and a home server 409 of a personal computer configuration provided in a user home network 408 is also connected via a network 4.

In the user home network 408, a fixed apparatus 410 such as a fixed type record reproduction apparatus and a portable apparatus 411 such as a portable type record reproduction apparatus and a portable type communication terminal (a portable type information apparatus, a cellular phone, or the like) are connected to the home server 409.

Figure 112:
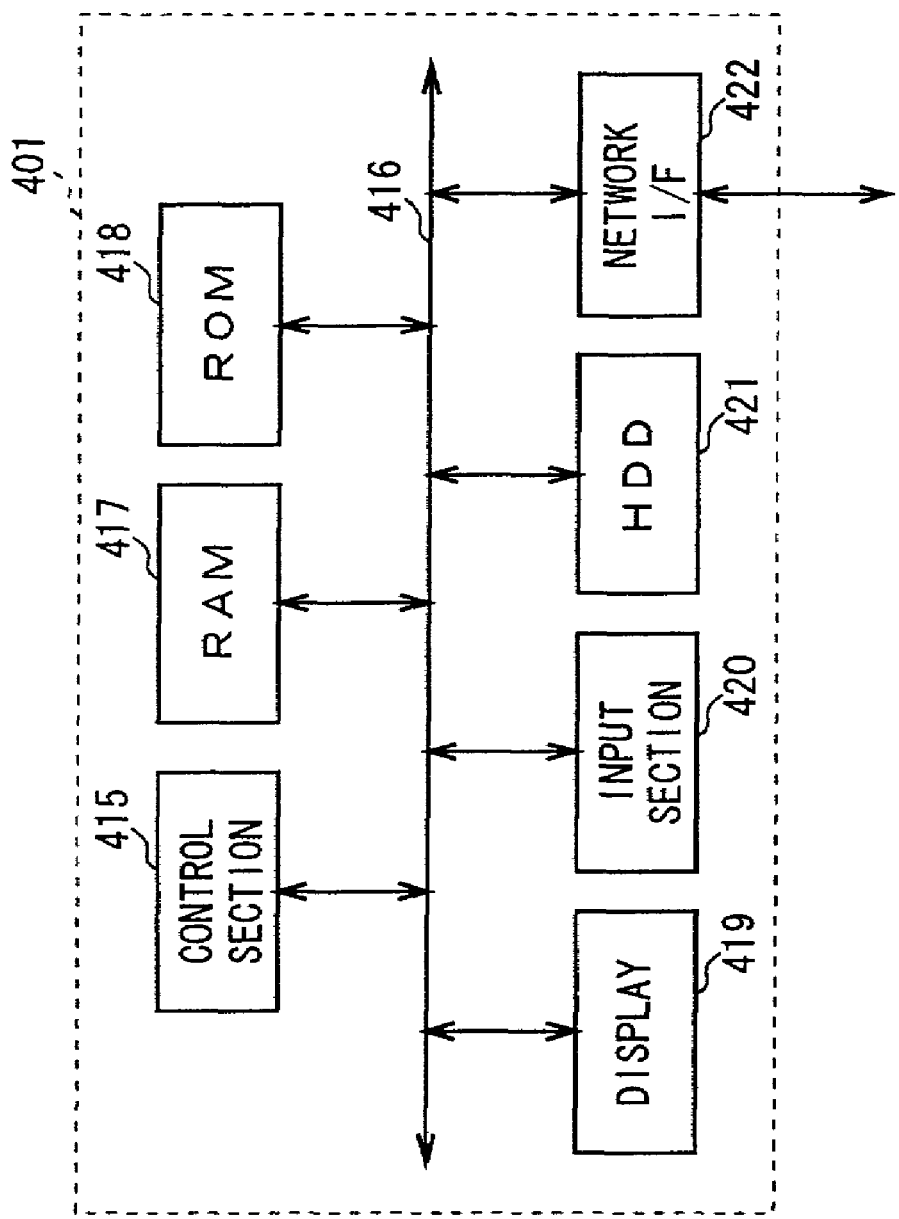
FIG. 112 is a block diagram showing configuration of an electronic distribution service center of personal computer configuration.

As shown in FIG. 112, in the electronic distribution service center 401, an RAM (Random Access Memory) 417, an ROM (Read Only Memory) 418, a display 419, an input section 420, a hard disk drive (HDD) 421 and a network interface 422 are connected to a control section 415 such as a CPU (Central Processing Unit) via a bus 416.

In this case, the control section 415 can execute processing similar to that of the service provider management section 11, the content provider management section 12, the copyright management section 13, the key server 14, the history data management section 15, the profit distribution section 16, the mutual authentication section 17, the user management section 18, the charge billing section 19, the disbursement and receipt section 20 and the audit section 21 in the electronic distribution service center 1 described above for FIG. 2 in accordance with various kinds of programs stored in the ROM 418 in advance by reading out and developing the programs on the RAM 417.

In addition, the control section 415 records a key used for the entire system (a delivery key $K_d$ and an individual key $K_i$, etc.), and various kinds of information such as charge information, price information, a handling policy, and a user registration database in a hard disk of the hard disk drive 421, thereby holding and managing these various kinds of information.

Moreover, the control section 415 can communicate with the content provider 404, the service provider 407, the user home network 408, JASRAC and the like via the network interface 422, thus, can give and receive various kinds of information such as a delivery key $K_d$, an individual key $K_i$ encrypted by the delivery key $K_d$, charge information, price information, a handling policy, registration information utilization results of contents with the content provider 404, the service provider 407, the user home network 408, JASRAC and the like.

In this way, the electronic distribution service center 401 of a personal computer configuration can realize a function similar to that of the electronic distribution service center 1 described above for FIG. 2 in accordance with various kinds of programs.

Incidentally, in the electronic distribution service center 410, although the input section 420 and the display 419 may not be provided because these are not specifically used, the input section 420 and the display section 419 may be used for confirming various kinds of information recorded in the hard disk drive 421.

In addition, in the electronic distribution service center 401, various kinds of programs may be recorded in a hard disk of the hard disk drive 421 instead of the ROM 418.

Figure 113:
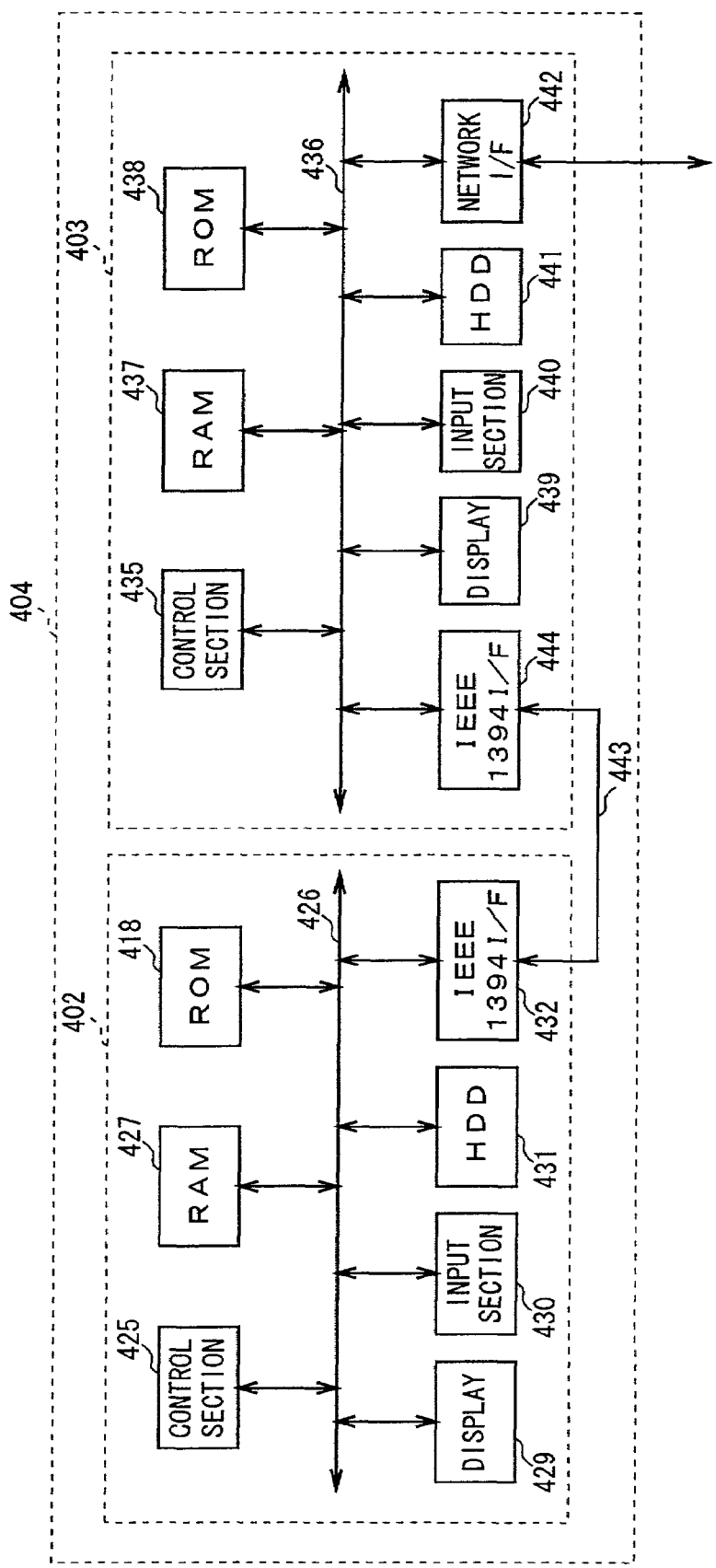
FIG. 113 is a block diagram showing configuration of a contents provider of personal computer configuration.

FIG. 113 is a block diagram showing a configuration of the content provider 404 in which the personal computer for a content server (hereinafter referred to as a personal computer for a server) 402 is configured with an RAM 427, an ROM 428, a display 429, an input section 430, a hard disk drive 431 storing contents to be supplied to a user in a hard disk, and an IEEE (Institute of Electrical and Electronics Engineers) 1394 interface 432 connected to a control section 430 such as a CPU via a bus 426.

In addition, in the content provider 404, the personal computer for signal processing 403 is configured with an RAM 437, an ROM 438, a display 439, an input section 440, a hard disk drive 441, a network interface 442 for connection with the electronic distribution service center 401 and the service provider 407, an IEEE1394 interface 432 of the personal compute for a server 402 and an IEE1394 interface 444 connected via an IEEE1394 cable 443 connected to a control section 435 such as a CPU via a bus 436.

In this case, the control section 425 of the personal computer 402 reads out a predetermined program stored in the ROM 428 in advance and develops it on the RAM 427, thereby operating in accordance with the program, and when a read-out instruction of contents is transmitted from the control section 435 of the personal computer 403 for signal processing via the IEE1394 cable 443, takes in the read-out instruction via the IEEE 1394 interface 432, reads out the contents from a hard disk of the hard disk drive 431 based on the taken in read-out instruction of the contents, and at the same time, transmits the read out contents to the personal computer for signal processing 403 from the IEEE1394 interface 432 via the IEEE1394 cable 443.

Incidentally, in the personal computer 402 for a server, although the input section 430 and the display 429 may not be provided by not specifically using the input section 430 and the display 429, the input section 430 and the display 429 may be used for confirming contents recorded in the hard disk drive 431, storing new contents in the hard disk drive 431 and deleting contents.

In addition, in the personal computer 402 for a server, a program may be recorded in the hard disk of the hard disk drive 431 in advance instead of the ROM 428.

On the other hand, in the content provider 404, the control section 435 of the personal computer 403 for signal processing records an individual key $K_i$, an individual key $K_i$ encrypted by a delivery key $K_d$ and a public key certificate of the content provider 404 in the hard disk of the hard disk drive 439, thereby maintaining and managing the individual key $K_i$, the individual key $K_i$ encrypted by a delivery key $K_d$ and the public key certificate of the content provider 404.

And, the control section 435 can executes processing similar to that of the electronic watermark addition section 32, the compression section 33, the content encryption section 34, the content key generation section 35, the content key encryption section 36, the handling policy generation section 37, the signature generation section 38 and the mutual authentication section 39 of the contents provider 2 described above with reference to FIG. 9 in accordance with predetermined various kinds of programs by reading out the predetermined various kinds of programs, which are stored in the ROM 438 in advance, and developing them on the RAM 437.

Thus, the personal computer for signal processing 403 can give and receive a delivery key $K_d$, an individual key $K_i$ encrypted by the delivery key $K_d$, a handling policy, and a content provider secure container with the electronic distribution service center 401 and the service provider 407 via the network interface 442.

In this way, the content provider 404 of a personal computer configuration can realize a function similar to that of the content provider 2 described above for FIG. 9 in accordance with various kinds of programs.

Incidentally, in the personal computer 403 for signal processing, although the input section 440 and the display 439 may not be provided by not specifically using the input section 400 and the display 439, the input section 440 and the display 439 may be used for confirming an individual key $K_i$, an individual key $K_i$ encrypted by the delivery key $K_d$, a public key certificate of the content provider 404, or the like recorded in the hard disk drive 441.

In addition, in the personal computer 403 for signal processing, various kinds of programs may be recorded in the hard disk of the hard disk drive 441 instead of the ROM 438. Further, in the personal computer for signal processing 403, an individual key $K_i$ may be held by giving tamper resistant feature to the RAM 437.

Further, in the content provider 404, although the personal computer for signal processing 403 and the personal computer for a server 402 are connected via the IEEE1394 cable 443, the personal computer for signal processing 403 and the personal computer for a server 402 may be line connected via a predetermined signal cable such as a USB (Universal Serial Bus) cable, an RS-232C cable, or the like, or wireless connected via predetermined wireless communicating means.

Figure 114:
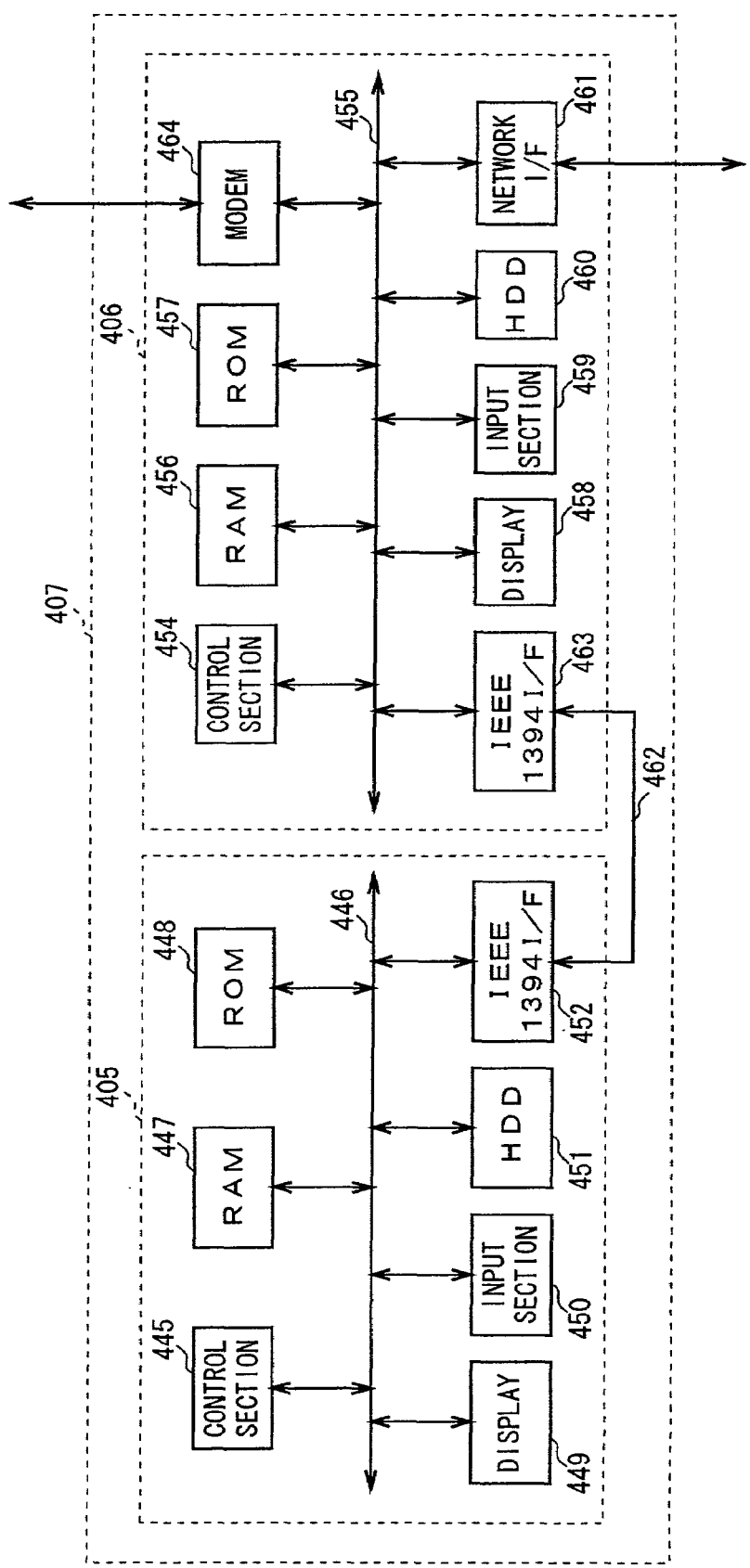
FIG. 114 is a block diagram showing configuration of a service provider of personal computer configuration.

FIG. 114 is a block diagram showing a configuration of the service provider 407, and the personal computer 405 for a server is configured with an RAM 447, an ROM 448, a display 449, an input section 450, a hard disk drive 451 storing a content provider secure container and a public key certificate of the content provider 404 in a hard disk, and IEEE1394 interface 452 connected to a control section 445 such as a CPU via a bus 446.

In addition, in the service provider 407, the personal computer for signal processing 406 is configured with an RAN 456, an ROM 457, a display 458, an input section 449, a hard disk drive 460, a network interface 461 for connection with the electronic distribution service center 401 and the content provider 404, an IEEE1394 interface 463 connected with an IEEE1394 interface 452 of the personal computer for a server 405 via an IEEE1394 cable 462, and a modem 46 for connecting with the user home network 408 via the network 4 connected to a control section 454 such as a CPU via a bus 455.

In this case, the control section 445 of the personal computer for a server 405 reads out a predetermined program stored in the ROM 448 in advance and develops it on the RAM 447, thereby operating in accordance with the program, and when a content provider secure container and a public key certificate of contents provider 404 are give together with writing instruction of these from the control section 454 of the personal computer for signal processing 406 via the IEEE1394 cable 462, takes in the writing instruction via the IEEE1394 interface 452, writes the content provider secure container and the public key certificate of the content provider 404 in the hard disk of the hard disk drive 451 based on the taken in writing instruction, and at the same time, when an read-out instruction of a content provider secure container and a public key certificate of the content provider 404 is given from the control section 454 of the personal computer 406 for signal processing via the IEEE1394 cable 462, takes in the read-out instruction via the IEEE1394 interface 452, reads out the content provider secure container and the public key certificate of the content provider 404 from the hard disk of the hard disk drive 451 based on the taken in read-out instruction, and at the same time, transmits the read out content provider secure container and public key certificate of the content provider 404 to the personal computer for signal processing 406 from the IEEE1394 interface 452 via the IEEE1394 cable 462.

Incidentally, in the personal computer for a server 405, although the input section 450 and the display 449 may not be provided by not specifically using the input section 450 and the display 449, the input section 450 and the display 449 may be used for confirming a content provider secure container and a public key certificate of the content provider 404 recorded in the hard disk drive 451.

In addition, in the personal computer for a server 405, a program may be recorded in the hard disk of the hard disk drive 451 in advance instead of the ROM 448.

On the other hand, in the service provider 407, the control section 454 of the personal computer for signal processing 406 records a public key certificate of the service provider 407 in the hard disk of the hard disk derive 460, and maintains and manages a secret key of the service provider 407 giving tamper resistant feature to the RAM 456.

The control section 454 reads out predetermined various kinds of programs stored in the ROM 457 and develops then on the RAM 456, thereby capable of executing processing similar to that of the certificate verification section 42, the signature verification section 43, the pricing section 44, the signature generation section 45 and the mutual authentication section 46 of the service provider 3 described above for FIG. 14 in accordance with the various kinds of programs.

Thus, the personal computer for signal processing 406 can give and receive price information, a content provider secure container, or the like with the electronic distribution service center 401 and the content provider 407 via the network interface 442, and at the same time, transmit a service provider secure container to the user home network 408 via the modem 464.

In this way, the service provider 407 of a personal computer configuration can realize a function similar to that of the service provider 3 described above for FIG. 14 n accordance with various kinds of programs.

Incidentally, in the personal computer 406 for signal processing, although the input section 459 and the display 458 may not be provided by not specifically using the input section 459 and the display 458, the input section 459 and the display 458 may be used for confirming a public key certificate of the service provider 407 or the like recorded in the hard disk drive 460.

In addition, in the personal computer for signal computer 406, various kinds of programs may be recorded in the hard disk of the hard disk drive 460 in advance instead of the ROM 457.

Moreover, in the service provider 407, although the personal computer for signal processing 406 and the personal computer for a server 405 are connected via the IEEE1394 cable 462, the personal computer for signal processing 406 and the personal computer for a server 405 may be line connected via a predetermined signal cable such as a USB cable, an RS-232C cable or the like, or may be wireless connected via predetermined wireless communicating means.

Figure 115:
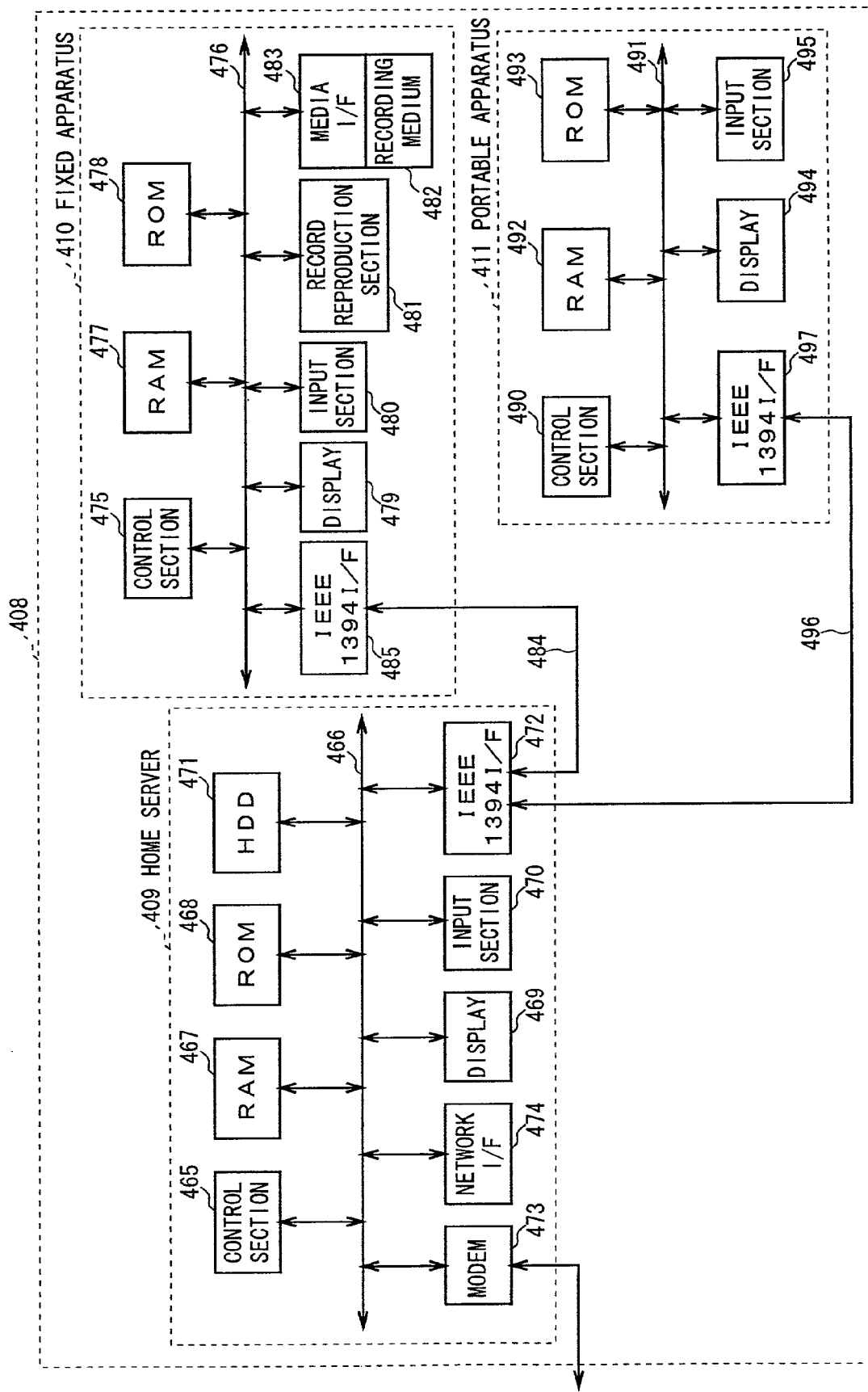
FIG. 115 is a block diagram showing configuration of a user home network using a personal computer.

FIG. 115 is a block diagram showing a configuration of the user home network 408, and the home server 409 of a personal computer configuration is configured with an RAM 467, an ROM 468, a display 469, an input section 470, a hard disk drive 471, an IEEE1394 interface 472, a modem 473 for connecting with the service provider 407 via the network 4, and a network interface 474 for connection with the electronic distribution service center 401 connected to a control section 465 such as a CPU via a bus 466.

In addition, in the user home network 408, the fixed apparatus 410 is configured with an RAM 77, an ROM 478, a display 479, an input section 480, a record reproduction section 481, a media interface 483 for a recording medium 482, and an IEEE1394 interface 495 connected with the IEEE1394 interface 472 of the home server via an IEEE1394 cable 484 connected to a control section 475 such as a CPU via a bus 476.

Moreover, in the user home network 408, the portable apparatus 411 is configured with an RAM 492, an ROM 493, a display 494, an input section 495, and an IEEE1394 interface 497 connected with the IEEE1394 interface 472 of the home server via an IEEE1394 cable 496 connected to a control section 490 such as a CPU via a us 491.

In this case, the control section 465 of the home server 409 reads out various kinds of programs stored in the ROM 468 in advance and develops them on the RAM 467, thereby capable of executing processing similar to that of the upper controller 62, the encryption processing section 65 and the extension section 66 of the home server 51 described above for FIG. 15 in accordance with the various kinds of programs.

In addition, the display 469 of the home server 409 has a function similar to that of the displaying means 64 of the home server 51 described above for FIG. 15, and the input section 470 of the home server 409 has a function similar to that of the inputting means 63 of the home server 51 described above for FIG. 15. Moreover, the hard disk drive 471 of the home server 409 has a function similar to that of the mass storage section 68 of the home server 51 described above for FIG. 15, and at the same time, the modem 473 and the network interface 474 as well as the IEEE1394 interface 472 has a function similar to that of the communication section 61 of the home server 51 described above for FIG. 15, and the RAM 467 of the home server 409 has a function similar to that of the external memory 67 of the home server 51 described above for FIG. 15.

Therefore, the home server 409 of a personal computer configuration can realize a function similar to that of the home server 51 described above for FIG. 15 in accordance with the various kinds of programs.

Incidentally, in the home server 409, various kinds of programs may be recorded in the hard disk of the hard disk drive 471 in advance instead of the ROM 468, or the hard disk drive 471 may be caused to function in the similar manner as the external memory 67 described above for FIG. 15. In addition, in the home server 409, the modem 473 and the network interface 474 may be a single interface such as a modem depending on a communication form with the service provider 407 and the electronic distribution service center 401. Moreover, in the home server 409, the fixed apparatus 410 and the portable apparatus 411 may be line connected via a predetermined signal cable such as an USB cable or an RS-232C cable, or may be wireless connected via predetermined wireless communicating means.

On the other hand, in the user home network 408, the control section 475 of the fixed apparatus 410 reads out various kinds of programs stored in the ROM 478 in advance and develops them on the RAM 477, thereby capable of executing processing similar to the upper controller 72, the encryption processing section 73 and the extension section 74 of the fixed apparatus 52 described above for FIG. 15 in accordance with the various kinds of programs.

In addition, the display 479 of the fixed apparatus 410 has a function similar to that of the displaying means 78 of the fixed apparatus 52 described above for FIG. 15, and at the same time, the input section 480 has a function similar to that of the inputting means 77 of the fixed apparatus 52 described above for FIG. 15, and the IEEE1394 interface 485 has a function similar to that of the communication section 71 of the fixed apparatus 52 described above for FIG. 15. Moreover, the record reproduction section 481 of the fixed apparatus 410 has a function similar to that of the record reproduction section 76 of the fixed apparatus 52 described above for FIG. 15, and at the same time, the recording medium 482 has a function similar to the recording medium 80 of the fixed apparatus 52 described above for FIG. 15, and the RAM 477 of the fixed apparatus 410 has a function similar to that of the external memory 79 and the small storage section 75 of the fixed apparatus 52 described above for FIG. 15.

Therefore, the fixed apparatus 410 of the user home network 408 can realize a function similar to that of the fixed apparatus 52 of the user home network 5 described above for FIG. 15 in accordance with various kinds of programs.

Incidentally, in the fixed apparatus 410, by providing a hard disk drive anew, various kinds of programs may be recorded in a hard disk of the hard disk drive in advance instead of the ROM 478, or the hard disk drive may be caused to function in the similar manner as the external memory 79 and the small storage section 75 of the fixed apparatus 52 described above for FIG. 15. In addition, in the fixed apparatus 410, if the recording medium 482 is a semiconductor memory configuration, the control section 475 may be caused to realize a function of the record reproduction section 481 in accordance with a predetermined program.

In the user home network 408, the control section 490 of the portable apparatus 411 reads out various kind of programs stored in the ROM 493 in advance and develops them on the RAM 492, thereby capable of executing processing similar to that of the upper controller 82, the encryption processing section 83 and the extension section 84 of the portable apparatus 53 described above for FIG. 15 in accordance with the various kinds of programs.

In addition, the RAM 492 of the portable apparatus 411 has a function similar to that of the external memory 85 of the portable apparatus 53 described above for FIG. 15, and the IEEE1394 interface 497 has a function similar to that of the communication section 81 of the portable apparatus 53 described above for FIG. 15. Moreover, in the portable apparatus 411, the display 494 and the input section 495 can be utilized at the time of reproducing contents.

Therefore, the portable apparatus 411 of the user home network 408 can realize a function similar to that of the portable apparatus 53 of the user home network 5 described above for FIG. 15 in accordance with various kinds of programs.

Incidentally, in the portable apparatus 411, a detachable recording medium may be provided for recording and reproducing contents.

In the above-mentioned configuration, in such an electronic music distribution system 400, the electronic distribution service center 401, the content provider 404, the service provider 407 and the home server 409 of the user home network 408 are respectively configured as a personal computer configuration.

Therefore, in the electronic music distribution system 400, the electronic distribution service center 401, the content provider 404, the service provider 407 and the home server 409 do not need to be produced in a hardware configuration anew, and the system can be easily constructed using these personal computers simply by installing various kinds of programs in an existing personal computer.

According to the above-mentioned configuration, by constructing the electronic music distribution system 400 using the electronic distribution service center 401, the content provider 404, the service provider 407 and the home server 409 of a personal computer configuration, an existing personal computer can be easily used as the electronic distribution service center 401, the content provider 404, the service provider 407 and the home server 409, thus the system can be easily and simply constructed.

Further, in such an electronic music distribution system 400, although the case in which the electronic distribution service center 401, the content provider 404, the service provider 407, the home server 409, the fixed apparatus 410 and the portable apparatus 411 are operated in accordance with various kinds of programs stored in the ROMs 418, 428, 438, 448, 457, 468, 478 and 493 in advance has been described, by installing a program storing medium recording various kinds of programs in the electronic distribution service center 401, the content provider 404, the service provider 407, the home server 409, the fixed apparatus 410 and the portable apparatus 411, distribution service center 401, the content provider 404, the service provider 407, the home server 409, the fixed apparatus 410 and the portable apparatus 411 may be operated respectively in accordance with the various kinds of programs stored in the program storing medium and various kinds of programs transferred to a hard disk or the like from the program storing medium.

Incidentally, a program storing medium used for operating distribution service center 401, the content provider 404, the service provider 407, the home server 409, the fixed apparatus 410 and the portable apparatus 411 may be realized not only by a package medium such as a CD-ROM (Compact Disk-Read Only Memory) but also a semiconductor memory and a magnetic disk in which a program is temporarily or permanently stored. In addition, as means for storing a program in these program storing media, a line or wireless communication medium such as a local area network, the Internet, the digital satellite broadcast, or the like may be utilized, or a program may be stored with interposition of various kinds of communication interfaces such as a rooter or a modem.

INDUSTRIAL APPLICABILITY

The present invention can be utilized for an information transmission apparatus such as a provider for providing contents such as music, video, a game program or the like, an information receipt apparatus such as a personal computer or a cellular phone for receiving the provided contents, and a network system that is constructed from these information transmission apparatus and information receipt apparatus.

The invention claimed is:

1. A multimedia content delivery system for sending predetermined content data from an information sending apparatus to an information receiving apparatus, wherein the information sending apparatus comprises:
   means for holding first identification information with an individual key, wherein the first identification information identifies the information sending apparatus and the individual key is unique to the information sending apparatus, and further wherein the first identification information with the individual key is encrypted by a distribution key that is unique to the information receiving apparatus;
   means for adding second identification information to the content data, wherein the second identification information is identical to the first identification information;
   means for encrypting the second identification with the content data by a content key;
   means for encrypting the content key by the individual key;
   means for sending the encrypted first identification information with the individual key, the encrypted second identification information with the content data, and the encrypted content key to the information receiving apparatus; and
   wherein the information receiving apparatus comprises:
   means for holding the distribution key;
   means for receiving the encrypted first identification information with the individual key, the encrypted second identification information with the content data, and the encrypted content key to the information receiving apparatus;
   means for decrypting the encrypted first identification information with the individual key using the distribution key to acquire the first identification information and the individual key;
   means for decrypting the encrypted content key using the individual key to acquire the content key;
   means for decrypting the encrypted second identification information with the content data by using the content key to acquire the second identification information and the content data; and
   means for comparing the first identification information with the second identification information.

2. The delivery system of claim 1, wherein the information sending apparatus further comprises:
   means for generating handling policies prescribing conditions for using the content data and for storing the first or second identification information; and
   means for adding the handling policies to the content data.

3. The delivery system of claim 1, wherein the means for adding the second identification to the content data uses an electronic watermark.

4. The delivery system of claim 1, wherein the information sending apparatus further comprises:

means for adding signature data to the encrypted content key and the encrypted first identification data, wherein the information receiving apparatus comprises means for verifying the signature data.

5. The delivery system of claim 4, wherein the information sending apparatus further comprises:

means for holding a plurality of different encrypted content data aggregated as album content data, and means for adding the signature data to the album content data; and the information receiving apparatus further comprises:

means for verifying the signature data added to the album content data, and means for omitting verification of the signature data added to each of the plurality of encrypted content data upon verifying that the album content data is correct.

6. The delivery system of claim 5, wherein the information sending apparatus further comprises:

means for holding album key data that corresponds to the album content data, wherein the album key data comprises a plurality of the encrypted content keys with signature data and the encrypted first identification information with signature data; and means for adding the signature data to the album key data; and the content receiver further comprises:

means for verifying the signature data added to the album key data, and means for omitting verification of the signature data added to the plurality of encrypted content keys and the encrypted first identification information stored in the album key respectively upon verifying that the album key data is correct.

7. The delivery system of claim 6, wherein the information sending apparatus further comprises:

means for generating content handling policies prescribing conditions for using the content data and for storing the first or second identification information;

means for adding the signature data to the content handling policies;

means for holding album handling policies that correspond to the album content data, wherein the album handling policies comprise a plurality of the content handling policies; and means for adding the signature data to the album handling policies; and the information receiving apparatus further comprises:

means for verifying the signature data added to the album handling policies, and means for omitting verification of the signature data added to the content handling policies stored in the album handling policies upon verifying that the album handling policies are correct.

8. The delivery system of claim 7, wherein the information sending apparatus further comprises:

means for creating content price information that shows a price for the content data and adding the signature data to the content price information;

means for holding album price information data that corresponds to the album content data, wherein the album price information data comprises a plurality of the content price information; and means for adding the signature to the album price information data; and the information receiving apparatus further comprises:

means for verifying the signature data added to the album price information data; and means for omitting verification of the signature data added to the plurality of content price information upon verifying that the album price information data is correct.

9. The delivery system of claim 8, wherein the information sending apparatus further comprises:

means for storing content signature verification information in the content handling policies which represent whether or not the signature data added to the encrypted content data should be verified; and the information receiving apparatus comprises:

means for verifying the signature data added to the encrypted content data when instructed to by the content signature verification information.

10. The delivery system of claim 9, wherein the information sending apparatus further comprises:

means for storing album content signature verification information in the content handling policies which represent whether or not the signature data added to the album content data should be verified; and the information receiving apparatus comprises:

means for verifying the signature data added to the album content data when instructed to by the album content signature verification information.

11. The delivery system of claim 8, wherein the information sending apparatus further comprises:

means for storing content price signature verification information in the content price information which represents whether or not the signature data added to the encrypted content data should be verified; and the information receiving apparatus comprises:

means for verifying the signature data added to the encrypted content data when instructed to by the content price signature verification information.

12. The delivery system of claim 11, wherein the information sending apparatus further comprises:

means for storing album content price signature verification information in the content price information which represents whether or not the signature data added to the album content data should be verified; and the information receiving apparatus comprises:

means for verifying the signature data added to the album content data in accordance with the album content price signature verification information.

13. A multimedia content delivery method for sending predetermined content data from an information sending apparatus to an information receiving apparatus, the method comprising:

holding first identification information with an individual key, wherein the first identification information identifies the information sending apparatus and the individual key is unique to the information sending apparatus, and further wherein the first identification information with the individual key is encrypted by a distribution key that is unique to the information receiving apparatus;

adding second identification information to the content data, wherein the second identification information is identical to the first identification information encrypting the second identification with the content data by a content key;

encrypting the content key by the individual key;

sending the encrypted first identification information with the individual key, the encrypted second identification information with the content data, and the encrypted content key to the information receiving apparatus, where the information is stored in memory.

14. The method of claim 13 further comprising:
generating handling policies prescribing conditions for using the content data and for storing the first or second identification information; and
adding the handling policies to the content data.

15. The method of claim 13, wherein adding the second identification to the content data further comprises using an electronic watermark.

16. The method of claim 13, further comprising:
adding signature data to the encrypted content key and the encrypted first identification data.

17. The method of claim 16, further comprising:
holding a plurality of different encrypted content data aggregated as album content data, and
adding the signature data to the album content data.

18. The method of claim 17, further comprising:
holding album key data that corresponds to the album content data, wherein the album key data comprises a plurality of the encrypted content keys with signature data and the encrypted first identification information with signature data; and
adding the signature data to the album key data.

19. The method of claim 18, further comprising:
generating content handling policies prescribing conditions for using the content data and for storing the first or second identification information;
adding the signature data to the content handling policies;
holding album handling policies that correspond to the album content data, wherein the album handling policies comprise a plurality of the content handling policies; and
adding the signature data to the album handling policies.

20. The method of claim 19, further comprising:
creating content price information that shows a price for the content data and adding the signature data the content price information;
holding album price information data that correspond to the album content data, wherein the album price information data comprises a plurality of the content price information; and
adding the signature to the album price information data.

21. The method of claim 20, further comprising:
storing content signature verification information in the content handling policies which represent whether or not the signature data added to the encrypted content data should be verified.

22. The method of claim 21, further comprising:
storing album content signature verification information in the content handling policies which represent whether or not the signature data added to the album content data should be verified.

23. The method of claim 20, further comprising:
storing content price signature verification information in the content price information which represents whether or not the signature data added to the encrypted content data should be verified.

24. The method of claim 23, further comprising:
storing album content price signature verification information in the content price information which represents whether or not the signature data added to the album content data should be verified.

25. A multimedia content receiving method for receiving predetermined content data at an information receiving apparatus from an information sending apparatus, the method comprising:
holding a distribution key that is unique to the information receiving apparatus; and
receiving, from the information sending apparatus, encrypted first identification information with an individual key, encrypted second identification information with content data, and an encrypted content key;
decrypting the encrypted first identification information with the individual key using the distribution key to acquire the first identification information and the individual key;
decrypting the encrypted content key using the individual key to acquire the content key;
decrypting the encrypted second identification information with the content data by using the content key to acquire the second identification information and the content data; and
comparing the first identification information to the second identification information, and storing the result in memory.

26. The method of claim 25, further comprising:
receiving content handling policies, added to the content data, for proscribing conditions for using the content data from the information sending apparatus; and
purchasing the content data by using the content handling policies if the first identification information matches the second identification information.

27. The method of claim 25, wherein the second identification information is included in the content data as an electronic watermark.

28. The method of claim 25, further comprising:
verifying signature data added to the encrypted content key and the encrypted first identification information; and
detecting whether or not the encrypted content key and the encrypted first identification information are illegal data that has been tampered with.

29. The method of claim 28, further comprising:
receiving, from the information sending apparatus, album content data as a plurality of different encrypted content data;
verifying signature data added to the album content data; and
omitting verification of the signature data added to each of the plurality of encrypted content data upon verifying that the album content data is correct.

30. The method of claim 29, further comprising:
receiving, from the information sending apparatus, album key data that corresponds to the album content data, wherein the album key data comprises a plurality of the encrypted content keys with signature data and the encrypted first identification information with signature data;
verifying signature data added to the album key data; and
omitting verification of the signature data added to the plurality of encrypted content keys and the encrypted first identification information stored in the album key respectively upon verifying that the album key data is correct.

31. The method of claim 28, further comprising:
receiving, from the information sending apparatus, album handling policies that correspond to the album content data, wherein the album handling policies comprise a plurality of content handling policies, and wherein the content handling policies prescribe conditions for using the content data and for storing the first or second identification information;
verifying the signature data added to the album handling policies; and omitting verification of the signature data added to the content handling policies stored in the album handling policies upon verifying that the album handling policies are correct.

32. The method of claim 31, further comprising:

receiving, from the information sending apparatus, album price information data that correspond to the album content data, wherein the album price information data comprises a plurality of content price information, and wherein the content price information shows a price for the content data;

verifying the signature data added to the album price information data; and omitting verification of the signature data added to the plurality of content price information upon verifying that the album price information data is correct.

33. The method of claim 32, further comprising:

receiving, from the information sending apparatus, content signature verification information in the content handling policies which represents whether or not the signature data added to the encrypted content data should be verified; and verifying the signature data added to the encrypted content data when instructed to by the content signature verification information.

34. The method of claim 33, further comprising:

receiving, from the information sending apparatus, album content signature verification information in the content handling policies which represent whether or not the signature data added to the album content data should be verified; and verifying the signature data added to the album content data when instructed to by the album content signature verification information.

35. The method of claim 32, further comprising:

receiving content price signature verification information in the content price information which represents whether or not the signature data added to the encrypted content data should be verified; and verifying the signature data added to the encrypted content data when instructed to by the content price signature verification information.

36. The method of claim 35, further comprising:

receiving, from the information sending apparatus, album content price signature verification information in the content price information which represents whether or not the signature data added to the album content data should be verified; and verifying the signature data added to the album content data when instructed to by the album content price signature verification information.

* * * * *